(12) United States Patent
Ludwig

(10) Patent No.: US 12,447,218 B1
(45) Date of Patent: Oct. 21, 2025

(54) RADIOCONJUGATES DIRECTED TO MHC-COMPLEXED ANTIGENS IN CANCER

(71) Applicant: Actinium Pharmaceuticals, Inc., New York, NY (US)

(72) Inventor: Dale L Ludwig, Rockaway, NJ (US)

( * ) Notice: Subject to any disclaimer, the term of this patent is extended or adjusted under 35 U.S.C. 154(b) by 0 days.

(21) Appl. No.: 17/668,134

(22) Filed: Feb. 9, 2022

Related U.S. Application Data

(60) Provisional application No. 63/147,700, filed on Feb. 9, 2021.

(51) Int. Cl.
  *C07K 16/28* (2006.01)
  *A61K 51/10* (2006.01)
  *C07K 14/725* (2006.01)
  *A61K 38/00* (2006.01)

(52) U.S. Cl.
  CPC ...... *A61K 51/1045* (2013.01); *C07K 14/7051* (2013.01); *C07K 16/2809* (2013.01); *C07K 16/2833* (2013.01); *A61K 38/00* (2013.01); *C07K 2317/31* (2013.01); *C07K 2317/565* (2013.01); *C07K 2319/33* (2013.01)

(58) Field of Classification Search
  None
  See application file for complete search history.

(56) References Cited

U.S. PATENT DOCUMENTS

| | | | |
|---|---|---|---|
| 9,603,954 B2* | 3/2017 | Simon | A61K 51/1027 |
| 10,011,658 B2* | 7/2018 | Liu | A61K 40/4265 |
| 2014/0294841 A1* | 10/2014 | Scheinberg | C07K 16/18 435/7.1 |
| 2018/0228926 A1* | 8/2018 | Kelly | A61K 39/00 |
| 2020/0207858 A1* | 7/2020 | Jakobovits | C07K 16/2833 |

OTHER PUBLICATIONS

Willemsen et al. (Cytometry Part A, 73A: 1093-1099, 2008). (Year: 2008).*
Saeed et al. (International Journal of Nanomedicine 2019:14 2069-2089). (Year: 2019).*
Hulsmeyer et al. (JBC, vol. 280, No. 4, Issue of Jan. 28, 2005 pp. 2972-2980). (Year: 2005).*
Michaeli et al. (J Immunol (2009) 182 (10): 6328-6341). (Year: 2009).*
Tafreshi et al. (Molecules 2019, 24, 4314). (Year: 2019).*
NCI staff ("Off Target: Investigating the Abscopal Effect as a Treatment for Cancer," pp. 1-6, published Jan. 28, 2020). (Year: 2020).*
Gellrich et al. (J. Clin. Med. 2020, 9, 223). (Year: 2020).*
Trenevska et al. (Front. Immunol. 8:1001 (2017)). (Year: 2017).*
Holland et al. (J Clin Invest. May 1, 2020;130(5):2673-2688). (Year: 2020).*
Chang et al. (J Clin Invest. 2017;127(7):2705-2718). (Year: 2017).*

* cited by examiner

*Primary Examiner* — Zachary S Skelding

(57) ABSTRACT

Radionuclide-labeled soluble biologics directed against peptide presenting Major Histocompatibility Complexes (pMHCs), and methods for treating cancers using the biologics are provided. Soluble biologics include recombinant T-cell receptor proteins (rTCR) and TCR-antibody mimics that specifically bind to pMHCs. The soluble biologics may further include a heavy chain of IgG1, IgG2, IgG4, or variants thereof. The radioisotopes used to label the soluble biologic may include alpha-emitting isotopes, such as actinium-225, or beta-emitting isotopes, such as lutetium-177, and may be administered at a maximum tolerated dose in a single bolus or in fractionated doses that together equal the maximum tolerated dose. The methods may further include administration of additional therapeutic agents or modalities.

4 Claims, No Drawings

Specification includes a Sequence Listing.

```
                           SEQUENCE LISTING

<160> NUMBER OF SEQ ID NOS: 246

<210> SEQ ID NO 1
<211> LENGTH: 5
<212> TYPE: PRT
<213> ORGANISM: Mus musculus

<400> SEQUENCE: 1

Ser His Trp Leu His
1               5

<210> SEQ ID NO 2
<211> LENGTH: 17
<212> TYPE: PRT
<213> ORGANISM: Mus musculus

<400> SEQUENCE: 2

Val Leu Asp Pro Ser Asp Phe Tyr Ser Asn Tyr Asn Gln Asn Phe Lys
1               5                   10                  15

Gly

<210> SEQ ID NO 3
<211> LENGTH: 11
<212> TYPE: PRT
<213> ORGANISM: Mus musculus

<400> SEQUENCE: 3

Gly Leu Leu Ser Gly Asp Tyr Ala Met Asp Tyr
1               5                   10

<210> SEQ ID NO 4
<211> LENGTH: 16
<212> TYPE: PRT
<213> ORGANISM: Mus musculus

<400> SEQUENCE: 4

Arg Ser Ser Gln Ser Ile Val His Ser Asn Gly Asn Thr Tyr Leu Glu
1               5                   10                  15

<210> SEQ ID NO 5
<211> LENGTH: 7
<212> TYPE: PRT
<213> ORGANISM: Mus musculus

<400> SEQUENCE: 5

Lys Val Ser Asn Arg Phe Ser
1               5

<210> SEQ ID NO 6
<211> LENGTH: 9
<212> TYPE: PRT
<213> ORGANISM: Mus musculus

<400> SEQUENCE: 6

Phe Gln Gly Ser Tyr Val Pro Trp Thr
1               5

<210> SEQ ID NO 7
<211> LENGTH: 120
```

```
<212> TYPE: PRT
<213> ORGANISM: Mus musculus

<400> SEQUENCE: 7

Gln Val Gln Leu Gln Gln Pro Gly Ala Glu Leu Val Arg Pro Gly Thr
1               5                   10                  15

Ser Val Lys Leu Ser Cys Lys Ala Ser Gly Tyr Thr Phe Thr Ser His
            20                  25                  30

Trp Leu His Trp Val Lys Gln Arg Pro Gly Gln Gly Leu Glu Trp Ile
        35                  40                  45

Gly Val Leu Asp Pro Ser Asp Phe Tyr Ser Asn Tyr Asn Gln Asn Phe
    50                  55                  60

Lys Gly Lys Ala Thr Leu Thr Val Asp Thr Ser Ser Thr Ala Tyr
65                  70                  75                  80

Met Gln Leu Ser Ser Leu Thr Ser Glu Asp Ser Ala Val Tyr Tyr Cys
                85                  90                  95

Ala Arg Gly Leu Leu Ser Gly Asp Tyr Ala Met Asp Tyr Trp Gly Ala
            100                 105                 110

Gly Thr Ser Val Thr Val Ser Ser
        115                 120

<210> SEQ ID NO 8
<211> LENGTH: 112
<212> TYPE: PRT
<213> ORGANISM: Mus musculus

<400> SEQUENCE: 8

Asp Val Leu Met Thr Gln Ile Pro Leu Ser Leu Pro Val Ser Leu Gly
1               5                   10                  15

Asp Gln Ala Ser Ile Ser Cys Arg Ser Ser Gln Ser Ile Val His Ser
            20                  25                  30

Asn Gly Asn Thr Tyr Leu Glu Trp Tyr Leu Gln Lys Pro Gly Gln Ser
        35                  40                  45

Pro Lys Ser Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Phe Gln Gly
                85                  90                  95

Ser Tyr Val Pro Trp Thr Phe Gly Gly Gly Thr Lys Leu Glu Ile Lys
            100                 105                 110

<210> SEQ ID NO 9
<211> LENGTH: 463
<212> TYPE: PRT
<213> ORGANISM: Mus musculus

<400> SEQUENCE: 9

Met Gly Trp Ser Cys Ile Ile Val Leu Leu Val Ser Thr Ala Thr Gly
1               5                   10                  15

Val His Ser Gln Val Gln Leu Gln Gln Pro Gly Ala Glu Leu Val Arg
            20                  25                  30

Pro Gly Thr Ser Val Lys Leu Ser Cys Lys Ala Ser Gly Tyr Thr Phe
        35                  40                  45

Thr Ser His Trp Leu His Trp Val Lys Gln Arg Pro Gly Gln Gly Leu
    50                  55                  60

Glu Trp Ile Gly Val Leu Asp Pro Ser Asp Phe Tyr Ser Asn Tyr Asn
```

```
            65                  70                  75                  80
        Gln Asn Phe Lys Gly Lys Ala Thr Leu Thr Val Asp Thr Ser Ser Ser
                         85                  90                  95
        Thr Ala Tyr Met Gln Leu Ser Ser Leu Thr Ser Glu Asp Ser Ala Val
                        100                 105                 110
        Tyr Tyr Cys Ala Arg Gly Leu Leu Ser Gly Asp Tyr Ala Met Asp Tyr
                        115                 120                 125
        Trp Gly Gln Gly Thr Ser Val Thr Val Ser Ser Ala Lys Thr Thr Pro
                130                 135                 140
        Pro Ser Val Tyr Pro Leu Ala Pro Gly Ser Ala Ala Gln Thr Asn Ser
        145                 150                 155                 160
        Met Val Thr Leu Gly Cys Leu Val Lys Gly Tyr Phe Pro Glu Pro Val
                        165                 170                 175
        Thr Val Thr Trp Asn Ser Gly Ser Leu Ser Ser Gly Val His Thr Phe
                        180                 185                 190
        Pro Ala Val Leu Gln Ser Asp Leu Tyr Thr Leu Ser Ser Ser Val Thr
                        195                 200                 205
        Val Pro Ser Ser Thr Trp Pro Ser Gln Thr Val Thr Cys Asn Val Ala
                210                 215                 220
        His Pro Ala Ser Ser Thr Lys Val Asp Lys Lys Ile Val Pro Arg Asp
        225                 230                 235                 240
        Cys Gly Cys Lys Pro Cys Ile Cys Thr Val Pro Glu Val Ser Ser Val
                        245                 250                 255
        Phe Ile Phe Pro Pro Lys Pro Lys Asp Val Leu Thr Ile Thr Leu Thr
                        260                 265                 270
        Pro Lys Val Thr Cys Val Val Val Asp Ile Ser Lys Asp Asp Pro Glu
                        275                 280                 285
        Val Gln Phe Ser Trp Phe Val Asp Asp Val Glu Val His Thr Ala Gln
                290                 295                 300
        Thr Gln Pro Arg Glu Glu Gln Phe Asn Ser Thr Phe Arg Ser Val Ser
        305                 310                 315                 320
        Glu Leu Pro Ile Met His Gln Asp Trp Leu Asn Gly Lys Glu Phe Lys
                        325                 330                 335
        Cys Arg Val Asn Ser Ala Ala Phe Pro Ala Pro Ile Glu Lys Thr Ile
                        340                 345                 350
        Ser Lys Thr Lys Gly Arg Pro Lys Ala Pro Gln Val Tyr Thr Ile Pro
                        355                 360                 365
        Pro Pro Lys Glu Gln Met Ala Lys Asp Lys Val Ser Leu Thr Cys Met
                370                 375                 380
        Ile Thr Asp Phe Phe Pro Glu Asp Ile Thr Val Glu Trp Gln Trp Asn
        385                 390                 395                 400
        Gly Gln Pro Ala Glu Asn Tyr Lys Asn Thr Gln Pro Ile Met Asp Thr
                        405                 410                 415
        Asp Gly Ser Tyr Phe Val Tyr Ser Lys Leu Asn Val Gln Lys Ser Asn
                        420                 425                 430
        Trp Glu Ala Gly Asn Thr Phe Thr Cys Ser Val Leu His Glu Gly Leu
                        435                 440                 445
        His Asn His His Thr Glu Lys Ser Leu Ser His Ser Pro Gly Lys
                450                 455                 460

<210> SEQ ID NO 10
<211> LENGTH: 238
<212> TYPE: PRT
<213> ORGANISM: Mus musculus
```

<400> SEQUENCE: 10

```
Met Lys Leu Pro Val Arg Leu Leu Val Leu Met Phe Trp Ile Pro Ala
1               5                   10                  15

Ser Ser Ser Asp Val Leu Met Thr Gln Ile Pro Leu Ser Leu Pro Val
            20                  25                  30

Ser Leu Gly Asp Gln Ala Ser Ile Ser Cys Arg Ser Ser Gln Ser Ile
        35                  40                  45

Val His Ser Asn Gly Asn Thr Tyr Leu Glu Trp Tyr Leu Gln Lys Pro
50                  55                  60

Gly Gln Ser Pro Lys Ser Leu Ile Tyr Lys Val Ser Asn Arg Phe Ser
65                  70                  75                  80

Gly Val Pro Asp Arg Phe Ser Gly Ser Gly Ser Gly Thr Asp Phe Thr
                85                  90                  95

Leu Lys Ile Ser Arg Val Glu Ala Glu Asp Leu Gly Val Tyr Tyr Cys
            100                 105                 110

Phe Gln Gly Ser Tyr Val Pro Trp Thr Phe Gly Gly Gly Thr Lys Leu
        115                 120                 125

Glu Ile Lys Arg Ala Asp Ala Ala Pro Thr Val Ser Ile Phe Pro Pro
130                 135                 140

Ser Ser Glu Gln Leu Thr Ser Gly Gly Ala Ser Val Val Cys Phe Leu
145                 150                 155                 160

Asn Asn Phe Tyr Pro Arg Asp Ile Asn Val Lys Trp Lys Ile Asp Gly
                165                 170                 175

Ser Glu Arg Gln Asn Gly Val Leu Asn Ser Trp Thr Asp Gln Asp Ser
            180                 185                 190

Lys Asp Ser Thr Tyr Ser Met Ser Ser Thr Leu Thr Leu Thr Lys Asp
        195                 200                 205

Glu Tyr Glu Arg His Asn Ser Tyr Thr Cys Glu Ala Thr His Lys Thr
210                 215                 220

Ser Thr Ser Pro Ile Val Lys Ser Phe Asn Arg Asn Glu Cys
225                 230                 235
```

<210> SEQ ID NO 11
<211> LENGTH: 444
<212> TYPE: PRT
<213> ORGANISM: Mus musculus

<400> SEQUENCE: 11

```
Gln Val Gln Leu Gln Gln Pro Gly Ala Glu Leu Val Arg Pro Gly Thr
1               5                   10                  15

Ser Val Lys Leu Ser Cys Lys Ala Ser Gly Tyr Thr Phe Thr Ser His
            20                  25                  30

Trp Leu His Trp Val Lys Gln Arg Pro Gly Gln Gly Leu Glu Trp Ile
        35                  40                  45

Gly Val Leu Asp Pro Ser Asp Phe Tyr Ser Asn Tyr Asn Gln Asn Phe
50                  55                  60

Lys Gly Lys Ala Thr Leu Thr Val Asp Thr Ser Ser Ser Thr Ala Tyr
65                  70                  75                  80

Met Gln Leu Ser Ser Leu Thr Ser Glu Asp Ser Ala Val Tyr Tyr Cys
                85                  90                  95

Ala Arg Gly Leu Leu Ser Gly Asp Tyr Ala Met Asp Tyr Trp Gly Gln
            100                 105                 110

Gly Thr Ser Val Thr Val Ser Ser Ala Lys Thr Thr Pro Pro Ser Val
        115                 120                 125
```

```
Tyr Pro Leu Ala Pro Gly Ser Ala Ala Gln Thr Asn Ser Met Val Thr
            130                 135                 140

Leu Gly Cys Leu Val Lys Gly Tyr Phe Pro Glu Pro Val Thr Val Thr
145                 150                 155                 160

Trp Asn Ser Gly Ser Leu Ser Ser Gly Val His Thr Phe Pro Ala Val
            165                 170                 175

Leu Gln Ser Asp Leu Tyr Thr Leu Ser Ser Val Thr Val Pro Ser
            180                 185                 190

Ser Thr Trp Pro Ser Gln Thr Val Thr Cys Asn Val Ala His Pro Ala
            195                 200                 205

Ser Ser Thr Lys Val Asp Lys Lys Ile Val Pro Arg Asp Cys Gly Cys
            210                 215                 220

Lys Pro Cys Ile Cys Thr Val Pro Glu Val Ser Ser Val Phe Ile Phe
225                 230                 235                 240

Pro Pro Lys Pro Lys Asp Val Leu Thr Ile Thr Leu Thr Pro Lys Val
            245                 250                 255

Thr Cys Val Val Val Asp Ile Ser Lys Asp Asp Pro Glu Val Gln Phe
            260                 265                 270

Ser Trp Phe Val Asp Asp Val Glu Val His Thr Ala Gln Thr Gln Pro
            275                 280                 285

Arg Glu Glu Gln Phe Asn Ser Thr Phe Arg Ser Val Ser Glu Leu Pro
290                 295                 300

Ile Met His Gln Asp Trp Leu Asn Gly Lys Glu Phe Lys Cys Arg Val
305                 310                 315                 320

Asn Ser Ala Ala Phe Pro Ala Pro Ile Glu Lys Thr Ile Ser Lys Thr
            325                 330                 335

Lys Gly Arg Pro Lys Ala Pro Gln Val Tyr Thr Ile Pro Pro Pro Lys
            340                 345                 350

Glu Gln Met Ala Lys Asp Lys Val Ser Leu Thr Cys Met Ile Thr Asp
            355                 360                 365

Phe Phe Pro Glu Asp Ile Thr Val Glu Trp Gln Trp Asn Gly Gln Pro
370                 375                 380

Ala Glu Asn Tyr Lys Asn Thr Gln Pro Ile Met Asp Thr Asp Gly Ser
385                 390                 395                 400

Tyr Phe Val Tyr Ser Lys Leu Asn Val Gln Lys Ser Asn Trp Glu Ala
            405                 410                 415

Gly Asn Thr Phe Thr Cys Ser Val Leu His Glu Gly Leu His Asn His
            420                 425                 430

His Thr Glu Lys Ser Leu Ser His Ser Pro Gly Lys
            435                 440

<210> SEQ ID NO 12
<211> LENGTH: 219
<212> TYPE: PRT
<213> ORGANISM: Mus musculus

<400> SEQUENCE: 12

Asp Val Leu Met Thr Gln Ile Pro Leu Ser Leu Pro Val Ser Leu Gly
1               5                   10                  15

Asp Gln Ala Ser Ile Ser Cys Arg Ser Ser Gln Ser Ile Val His Ser
            20                  25                  30

Asn Gly Asn Thr Tyr Leu Glu Trp Tyr Leu Gln Lys Pro Gly Gln Ser
            35                  40                  45

Pro Lys Ser Leu Ile Tyr Lys Val Ser Asn Arg Phe Ser Gly Val Pro
```

```
                    50                  55                  60
Asp Arg Phe Ser Gly Ser Gly Ser Gly Thr Asp Phe Thr Leu Lys Ile
 65                  70                  75                  80

Ser Arg Val Glu Ala Glu Asp Leu Gly Val Tyr Tyr Cys Phe Gln Gly
                 85                  90                  95

Ser Tyr Val Pro Trp Thr Phe Gly Gly Gly Thr Lys Leu Glu Ile Lys
            100                 105                 110

Arg Ala Asp Ala Ala Pro Thr Val Ser Ile Phe Pro Pro Ser Ser Glu
        115                 120                 125

Gln Leu Thr Ser Gly Gly Ala Ser Val Val Cys Phe Leu Asn Asn Phe
    130                 135                 140

Tyr Pro Arg Asp Ile Asn Val Lys Trp Lys Ile Asp Gly Ser Glu Arg
145                 150                 155                 160

Gln Asn Gly Val Leu Asn Ser Trp Thr Asp Gln Asp Ser Lys Asp Ser
                165                 170                 175

Thr Tyr Ser Met Ser Ser Thr Leu Thr Leu Thr Lys Asp Glu Tyr Glu
            180                 185                 190

Arg His Asn Ser Tyr Thr Cys Glu Ala Thr His Lys Thr Ser Thr Ser
        195                 200                 205

Pro Ile Val Lys Ser Phe Asn Arg Asn Glu Cys
    210                 215

<210> SEQ ID NO 13
<211> LENGTH: 10
<212> TYPE: PRT
<213> ORGANISM: Mus musculus

<400> SEQUENCE: 13

Gln Val Gln Leu Gln Gln Pro Gly Ala Glu
 1               5                  10

<210> SEQ ID NO 14
<211> LENGTH: 10
<212> TYPE: PRT
<213> ORGANISM: Mus musculus

<400> SEQUENCE: 14

Asp Val Leu Met Thr Gln Ile Pro Leu Ser
 1               5                  10

<210> SEQ ID NO 15
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Asp Tyr Ala Met Ser
 1               5

<210> SEQ ID NO 16
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16
```

```
Thr Ile Ser Asp Gly Gly Thr Tyr Thr Tyr Tyr Pro Asp Ser Val Lys
1               5                   10                  15
Gly
```

<210> SEQ ID NO 17
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 17

```
Glu Trp Gly Asp Tyr Asp Gly Phe Asp Tyr
1               5                   10
```

<210> SEQ ID NO 18
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

```
Arg Ala Ser Gln Glu Ile Ser Gly Tyr Leu Ser
1               5                   10
```

<210> SEQ ID NO 19
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

```
Ala Ala Ser Thr Leu Asp Ser
1               5
```

<210> SEQ ID NO 20
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

```
Leu Gln Tyr Asp Ser Tyr Pro Tyr Thr
1               5
```

<210> SEQ ID NO 21
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 21

```
Gln Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asp Tyr
            20                  25                  30

Ala Met Ser Trp Ile Arg Gln Ala Pro Gly Lys Gly Leu Glu Trp Val
```

```
                35                  40                  45
Ser Thr Ile Ser Asp Gly Gly Thr Tyr Thr Tyr Tyr Pro Asp Ser Val
         50                  55                  60
Lys Gly Arg Phe Thr Ile Ser Arg Asp Asn Ala Lys Asn Ser Leu Tyr
 65                  70                  75                  80
Leu Gln Met Asn Ser Leu Arg Ala Glu Asp Thr Ala Val Tyr Tyr Cys
                 85                  90                  95
Ala Arg Glu Trp Gly Asp Tyr Asp Gly Phe Asp Tyr Trp Gly Gln Gly
                100                 105                 110
Thr Leu Val Thr Val Ser Ser
        115

<210> SEQ ID NO 22
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 22

Asp Ile Gln Met Thr Gln Ser Pro Ser Ser Leu Ser Ala Ser Val Gly
 1               5                  10                  15
Asp Arg Val Thr Ile Thr Cys Arg Ala Ser Gln Glu Ile Ser Gly Tyr
             20                  25                  30
Leu Ser Trp Tyr Gln Gln Lys Pro Gly Lys Ala Pro Lys Arg Leu Ile
         35                  40                  45
Tyr Ala Ala Ser Thr Leu Asp Ser Gly Val Pro Ser Arg Phe Ser Gly
     50                  55                  60
Ser Gly Ser Gly Thr Glu Phe Thr Leu Thr Ile Ser Ser Leu Gln Pro
 65                  70                  75                  80
Glu Asp Phe Ala Thr Tyr Tyr Cys Leu Gln Tyr Asp Ser Tyr Pro Tyr
                 85                  90                  95
Thr Phe Gly Gln Gly Thr Lys Leu Glu Ile Lys
                100                 105

<210> SEQ ID NO 23
<211> LENGTH: 471
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 23

Met Asp Met Arg Val Pro Ala Gln Leu Leu Gly Leu Leu Leu Leu Trp
 1               5                  10                  15
Leu Arg Gly Ala Arg Cys Gln Val Gln Leu Val Glu Ser Gly Gly Gly
             20                  25                  30
Leu Val Lys Pro Gly Gly Ser Leu Arg Leu Ser Cys Ala Ala Ser Gly
         35                  40                  45
Phe Thr Phe Ser Asp Tyr Ala Met Ser Trp Ile Arg Gln Ala Pro Gly
     50                  55                  60
Lys Gly Leu Glu Trp Val Ser Thr Ile Ser Asp Gly Gly Thr Tyr Thr
 65                  70                  75                  80
Tyr Tyr Pro Asp Ser Val Lys Gly Arg Phe Thr Ile Ser Arg Asp Asn
                 85                  90                  95
Ala Lys Asn Ser Leu Tyr Leu Gln Met Asn Ser Leu Arg Ala Glu Asp
```

```
            100             105             110
Thr Ala Val Tyr Tyr Cys Ala Arg Glu Trp Gly Asp Tyr Asp Gly Phe
        115             120             125

Asp Tyr Trp Gly Gln Gly Thr Leu Val Thr Val Ser Ser Ala Ser Thr
130             135             140

Lys Gly Pro Ser Val Phe Pro Leu Ala Pro Ser Ser Lys Ser Thr Ser
145             150             155             160

Gly Gly Thr Ala Ala Leu Gly Cys Leu Val Lys Asp Tyr Phe Pro Glu
                165             170             175

Pro Val Thr Val Ser Trp Asn Ser Gly Ala Leu Thr Ser Gly Val His
            180             185             190

Thr Phe Pro Ala Val Leu Gln Ser Ser Gly Leu Tyr Ser Leu Ser Ser
        195             200             205

Val Val Thr Val Pro Ser Ser Leu Gly Thr Gln Thr Tyr Ile Cys
    210             215             220

Asn Val Asn His Lys Pro Ser Asn Thr Lys Val Asp Lys Arg Val Glu
225             230             235             240

Pro Lys Ser Cys Asp Lys Thr His Thr Cys Pro Pro Cys Pro Ala Pro
                245             250             255

Glu Leu Leu Gly Gly Pro Ser Val Phe Leu Phe Pro Pro Lys Pro Lys
            260             265             270

Asp Thr Leu Met Ile Ser Arg Thr Pro Glu Val Thr Cys Val Val Val
        275             280             285

Asp Val Ser His Glu Asp Pro Glu Val Lys Phe Asn Trp Tyr Val Asp
    290             295             300

Gly Val Glu Val His Asn Ala Lys Thr Lys Pro Arg Glu Glu Gln Tyr
305             310             315             320

Asn Ser Thr Tyr Arg Val Val Ser Val Leu Thr Val Leu His Gln Asp
                325             330             335

Trp Leu Asn Gly Lys Glu Tyr Lys Cys Lys Val Ser Asn Lys Ala Leu
            340             345             350

Pro Ala Pro Ile Glu Lys Thr Ile Ser Lys Ala Lys Gly Gln Pro Arg
        355             360             365

Glu Pro Gln Val Tyr Thr Leu Pro Pro Ser Arg Glu Glu Met Thr Lys
    370             375             380

Asn Gln Val Ser Leu Thr Cys Leu Val Lys Gly Phe Tyr Pro Ser Asp
385             390             395             400

Ile Ala Val Glu Trp Glu Ser Asn Gly Gln Pro Glu Asn Asn Tyr Lys
                405             410             415

Thr Thr Pro Pro Val Leu Asp Ser Asp Gly Ser Phe Phe Leu Tyr Ser
            420             425             430

Lys Leu Thr Val Asp Lys Ser Arg Trp Gln Gln Gly Asn Val Phe Ser
        435             440             445

Cys Ser Val Met His Glu Ala Leu His Asn His Tyr Thr Gln Lys Ser
    450             455             460

Leu Ser Leu Ser Pro Gly Lys
465             470

<210> SEQ ID NO 24
<211> LENGTH: 236
<212> TYPE: PRT
<213> ORGANISM: Artificial Sequence
<220> FEATURE:
<223> OTHER INFORMATION: Description of Artificial Sequence: Synthetic
      polypeptide
```

<400> SEQUENCE: 24

Met Asp Met Arg Val Pro Ala Gln Leu Leu Gly Leu Leu Leu Leu Trp
1               5                   10                  15

Leu Arg Gly Ala Arg Cys Asp Ile Gln Met Thr Gln Ser Pro Ser Ser
            20                  25                  30

Leu Ser Ala Ser Val Gly Asp Arg Val Thr Ile Thr Cys Arg Ala Ser
        35                  40                  45

Gln Glu Ile Ser Gly Tyr Leu Ser Trp Tyr Gln Gln Lys Pro Gly Lys
    50                  55                  60

Ala Pro Lys Arg Leu Ile Tyr Ala Ala Ser Thr Leu Asp Ser Gly Val
65                  70                  75                  80

Pro Ser Arg Phe Ser Gly Ser Gly Ser Gly Thr Glu Phe Thr Leu Thr
                85                  90                  95

Ile Ser Ser Leu Gln Pro Glu Asp Phe Ala Thr Tyr Tyr Cys Leu Gln
            100                 105                 110

Tyr Asp Ser Tyr Pro Tyr Thr Phe Gly Gln Gly Thr Lys Leu Glu Ile
        115                 120                 125

Lys Arg Thr Val Ala Ala Pro Ser Val Phe Ile Phe Pro Pro Ser Asp
130                 135                 140

Glu Gln Leu Lys Ser Gly Thr Ala Ser Val Val Cys Leu Leu Asn Asn
145                 150                 155                 160

Phe Tyr Pro Arg Glu Ala Lys Val Gln Trp Lys Val Asp Asn Ala Leu
                165                 170                 175

Gln Ser Gly Asn Ser Gln Glu Ser Val Thr Glu Gln Asp Ser Lys Asp
            180                 185                 190

Ser Thr Tyr Ser Leu Ser Ser Thr Leu Thr Leu Ser Lys Ala Asp Tyr
        195                 200                 205

Glu Lys His Lys Val Tyr Ala Cys Glu Val Thr His Gln Gly Leu Ser
210                 215                 220

Ser Pro Val Thr Lys Ser Phe Asn Arg Gly Glu Cys
225                 230                 235

<210> SEQ ID NO 25
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Ser His Trp Leu His
1               5

<210> SEQ ID NO 26
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 26

Val Leu Asp Pro Ser Asp Phe Tyr Ser Asn Tyr Asn Gln Asn Phe Lys
1               5                   10                  15

Gly

```
<210> SEQ ID NO 27
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 27

Gly Leu Leu Ser Gly Asp Tyr Ala Met Asp Tyr
1               5                   10

<210> SEQ ID NO 28
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 28

Arg Ser Ser Gln Ser Ile Val His Ser Asn Gly Asn Thr Tyr Leu Glu
1               5                   10                  15

<210> SEQ ID NO 29
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

Lys Val Ser Asn Arg Phe Ser
1               5

<210> SEQ ID NO 30
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 30

Phe Gln Gly Ser Tyr Val Pro Trp Thr
1               5

<210> SEQ ID NO 31
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 31

Gln Val Gln Leu Gln Gln Pro Gly Ala Glu Leu Val Arg Pro Gly Thr
1               5                   10                  15

Ser Val Lys Leu Ser Cys Lys Ala Ser Gly Tyr Thr Phe Thr Ser His
                20                  25                  30

Trp Leu His Trp Val Lys Gln Arg Pro Gly Gln Gly Leu Glu Trp Ile
            35                  40                  45

Gly Val Leu Asp Pro Ser Asp Phe Tyr Ser Tyr Asn Gln Asn Phe
        50                  55                  60

Lys Gly Lys Ala Thr Leu Thr Val Asp Thr Ser Ser Ser Thr Ala Tyr
```

```
65                  70                  75                  80
Met Gln Leu Ser Ser Leu Thr Ser Glu Asp Ser Ala Val Tyr Tyr Cys
                85                  90                  95

Ala Arg Gly Leu Leu Ser Gly Asp Tyr Ala Met Asp Tyr Trp Gly Gln
            100                 105                 110

Gly Thr Ser Val Thr Val Ser Ser
            115                 120

<210> SEQ ID NO 32
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 32

Asp Val Leu Met Thr Gln Ile Pro Leu Ser Leu Pro Val Ser Leu Gly
1               5                   10                  15

Asp Gln Ala Ser Ile Ser Cys Arg Ser Ser Gln Ser Ile Val His Ser
            20                  25                  30

Asn Gly Asn Thr Tyr Leu Glu Trp Tyr Leu Gln Lys Pro Gly Gln Ser
        35                  40                  45

Pro Lys Ser Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Phe Gln Gly
                85                  90                  95

Ser Tyr Val Pro Trp Thr Phe Gly Gly Gly Thr Lys Leu Glu Ile Lys
            100                 105                 110

<210> SEQ ID NO 33
<211> LENGTH: 463
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

Met Gly Trp Ser Cys Ile Ile Val Leu Leu Val Ser Thr Ala Thr Gly
1               5                   10                  15

Val His Ser Gln Val Gln Leu Gln Gln Pro Gly Ala Glu Leu Val Arg
            20                  25                  30

Pro Gly Thr Ser Val Lys Leu Ser Cys Lys Ala Ser Gly Tyr Thr Phe
        35                  40                  45

Thr Ser His Trp Leu His Trp Val Lys Gln Arg Pro Gly Gln Gly Leu
    50                  55                  60

Glu Trp Ile Gly Val Leu Asp Pro Ser Asp Phe Tyr Ser Asn Tyr Asn
65                  70                  75                  80

Gln Asn Phe Lys Gly Lys Ala Thr Leu Thr Val Asp Thr Ser Ser Ser
                85                  90                  95

Thr Ala Tyr Met Gln Leu Ser Ser Leu Thr Ser Glu Asp Ser Ala Val
            100                 105                 110

Tyr Tyr Cys Ala Arg Gly Leu Leu Ser Gly Asp Tyr Ala Met Asp Tyr
            115                 120                 125

Trp Gly Gln Gly Thr Ser Val Thr Val Ser Ser Ala Lys Thr Thr Pro
```

```
                    130                 135                 140

Pro Ser Val Tyr Pro Leu Ala Pro Gly Ser Ala Ala Gln Thr Asn Ser
145                 150                 155                 160

Met Val Thr Leu Gly Cys Leu Val Lys Gly Tyr Phe Pro Glu Pro Val
                165                 170                 175

Thr Val Thr Trp Asn Ser Gly Ser Leu Ser Ser Gly Val His Thr Phe
            180                 185                 190

Pro Ala Val Leu Gln Ser Asp Leu Tyr Thr Leu Ser Ser Ser Val Thr
        195                 200                 205

Val Pro Ser Ser Thr Trp Pro Ser Gln Thr Val Thr Cys Asn Val Ala
    210                 215                 220

His Pro Ala Ser Ser Thr Lys Val Asp Lys Lys Ile Val Pro Arg Asp
225                 230                 235                 240

Cys Gly Cys Lys Pro Cys Ile Cys Thr Val Pro Glu Val Ser Ser Val
                245                 250                 255

Phe Ile Phe Pro Pro Lys Pro Lys Asp Val Leu Thr Ile Thr Leu Thr
            260                 265                 270

Pro Lys Val Thr Cys Val Val Val Asp Ile Ser Lys Asp Asp Pro Glu
        275                 280                 285

Val Gln Phe Ser Trp Phe Val Asp Asp Val Glu Val His Thr Ala Gln
    290                 295                 300

Thr Gln Pro Arg Glu Glu Gln Phe Asn Ser Thr Phe Arg Ser Val Ser
305                 310                 315                 320

Glu Leu Pro Ile Met His Gln Asp Trp Leu Asn Gly Lys Glu Phe Lys
                325                 330                 335

Cys Arg Val Asn Ser Ala Ala Phe Pro Ala Pro Ile Glu Lys Thr Ile
            340                 345                 350

Ser Lys Thr Lys Gly Arg Pro Lys Ala Pro Gln Val Tyr Thr Ile Pro
        355                 360                 365

Pro Pro Lys Glu Gln Met Ala Lys Asp Lys Val Ser Leu Thr Cys Met
    370                 375                 380

Ile Thr Asp Phe Phe Pro Glu Asp Ile Thr Val Glu Trp Gln Trp Asn
385                 390                 395                 400

Gly Gln Pro Ala Glu Asn Tyr Lys Asn Thr Gln Pro Ile Met Asp Thr
                405                 410                 415

Asp Gly Ser Tyr Phe Val Tyr Ser Lys Leu Asn Val Gln Lys Ser Asn
            420                 425                 430

Trp Glu Ala Gly Asn Thr Phe Thr Cys Ser Val Leu His Glu Gly Leu
        435                 440                 445

His Asn His His Thr Glu Lys Ser Leu Ser His Ser Pro Gly Lys
    450                 455                 460

<210> SEQ ID NO 34
<211> LENGTH: 238
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 34

Met Lys Leu Pro Val Arg Leu Leu Val Leu Met Phe Trp Ile Pro Ala
1               5                   10                  15

Ser Ser Ser Asp Val Leu Met Thr Gln Ile Pro Leu Ser Leu Pro Val
            20                  25                  30
```

```
Ser Leu Gly Asp Gln Ala Ser Ile Ser Cys Arg Ser Ser Gln Ser Ile
            35                  40                  45

Val His Ser Asn Gly Asn Thr Tyr Leu Glu Trp Tyr Leu Gln Lys Pro
 50                  55                  60

Gly Gln Ser Pro Lys Ser Leu Ile Tyr Lys Val Ser Asn Arg Phe Ser
 65                  70                  75                  80

Gly Val Pro Asp Arg Phe Ser Gly Ser Gly Ser Gly Thr Asp Phe Thr
                 85                  90                  95

Leu Lys Ile Ser Arg Val Glu Ala Glu Asp Leu Gly Val Tyr Tyr Cys
            100                 105                 110

Phe Gln Gly Ser Tyr Val Pro Trp Thr Phe Gly Gly Gly Thr Lys Leu
        115                 120                 125

Glu Ile Lys Arg Ala Asp Ala Ala Pro Thr Val Ser Ile Phe Pro Pro
    130                 135                 140

Ser Ser Glu Gln Leu Thr Ser Gly Gly Ala Ser Val Val Cys Phe Leu
145                 150                 155                 160

Asn Asn Phe Tyr Pro Arg Asp Ile Asn Val Lys Trp Lys Ile Asp Gly
                165                 170                 175

Ser Glu Arg Gln Asn Gly Val Leu Asn Ser Trp Thr Asp Gln Asp Ser
            180                 185                 190

Lys Asp Ser Thr Tyr Ser Met Ser Ser Thr Leu Thr Leu Thr Lys Asp
        195                 200                 205

Glu Tyr Glu Arg His Asn Ser Tyr Thr Cys Glu Ala Thr His Lys Thr
    210                 215                 220

Ser Thr Ser Pro Ile Val Lys Ser Phe Asn Arg Asn Glu Cys
225                 230                 235
```

```
<210> SEQ ID NO 35
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 35

Thr Phe Gly Leu Ser Val Gly
1               5
```

```
<210> SEQ ID NO 36
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 36

His Ile Trp Trp Asp Asp Asp Lys Tyr Tyr Asn Pro Ala Leu Lys Ser
1               5                   10                  15
```

```
<210> SEQ ID NO 37
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 37

Ile Gly Ala Asp Ala Leu Pro Phe Asp Tyr
```

<210> SEQ ID NO 38
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 38

Arg Ser Ser Lys Ser Leu Leu His Ser Asn Gly Asn Thr Tyr Leu Tyr
1               5                   10                  15

<210> SEQ ID NO 39
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 39

Arg Met Ser Asn Leu Ala Ser
1               5

<210> SEQ ID NO 40
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 40

Met Gln His Leu Glu Tyr Pro Phe Thr
1               5

<210> SEQ ID NO 41
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 41

Gln Val Thr Leu Lys Glu Ser Gly Pro Gly Ile Leu Arg Pro Ser Gln
1               5                   10                  15

Thr Leu Ser Leu Thr Cys Ser Phe Ser Gly Phe Ser Leu Ser Thr Phe
            20                  25                  30

Gly Leu Ser Val Gly Trp Ile Arg Gln Pro Ser Gly Lys Gly Leu Glu
        35                  40                  45

Trp Leu Ala His Ile Trp Trp Asp Asp Lys Tyr Tyr Asn Pro Ala
    50                  55                  60

Leu Lys Ser Arg Leu Thr Ile Ser Lys Asp Thr Ser Lys Asn Gln Val
65                  70                  75                  80

Phe Leu Lys Ile Ala Asn Val Asp Thr Ala Asp Thr Ala Thr Tyr Tyr
                85                  90                  95

Cys Ala Arg Ile Gly Ala Asp Ala Leu Pro Phe Asp Tyr Trp Gly Gln
            100                 105                 110

Gly Thr Thr Leu Thr Val Ser Ser
        115                 120

```
<210> SEQ ID NO 42
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 42

Asp Ile Val Leu Thr Gln Thr Ala Pro Ser Val Pro Val Thr Pro Gly
1               5                   10                  15

Glu Ser Val Ser Ile Ser Cys Arg Ser Lys Ser Leu Leu His Ser
            20                  25                  30

Asn Gly Asn Thr Tyr Leu Tyr Trp Phe Leu Gln Arg Pro Gly Gln Ser
        35                  40                  45

Pro Gln Leu Leu Ile Tyr Arg Met Ser Asn Leu Ala Ser Gly Val Pro
    50                  55                  60

Asp Arg Phe Ser Gly Ser Gly Ser Gly Thr Ala Phe Thr Leu Arg Ile
65                  70                  75                  80

Ser Arg Val Glu Ala Glu Asp Val Gly Val Tyr Tyr Cys Met Gln His
                85                  90                  95

Leu Glu Tyr Pro Phe Thr Phe Gly Ser Gly Thr Lys Leu Glu Ile Lys
            100                 105                 110

<210> SEQ ID NO 43
<211> LENGTH: 475
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 43

Met Gly Arg Leu Thr Ser Ser Phe Leu Leu Leu Ile Val Pro Ala Tyr
1               5                   10                  15

Val Leu Ser Gln Val Thr Leu Lys Glu Ser Gly Pro Gly Ile Leu Arg
            20                  25                  30

Pro Ser Gln Thr Leu Ser Leu Thr Cys Ser Phe Ser Gly Phe Ser Leu
        35                  40                  45

Ser Thr Phe Gly Leu Ser Val Gly Trp Ile Arg Gln Pro Ser Gly Lys
    50                  55                  60

Gly Leu Glu Trp Leu Ala His Ile Trp Trp Asp Asp Lys Tyr Tyr
65                  70                  75                  80

Asn Pro Ala Leu Lys Ser Arg Leu Thr Ile Ser Lys Asp Thr Ser Lys
                85                  90                  95

Asn Gln Val Phe Leu Lys Ile Ala Asn Val Asp Thr Ala Asp Thr Ala
            100                 105                 110

Thr Tyr Tyr Cys Ala Arg Ile Gly Ala Asp Ala Leu Pro Phe Asp Tyr
        115                 120                 125

Trp Gly Gln Gly Thr Thr Leu Thr Val Ser Ser Ala Lys Thr Thr Pro
    130                 135                 140

Pro Ser Val Tyr Pro Leu Ala Pro Gly Cys Gly Asp Thr Thr Gly Ser
145                 150                 155                 160

Ser Val Thr Ser Gly Cys Leu Val Lys Gly Tyr Phe Pro Glu Pro Val
                165                 170                 175

Thr Val Thr Trp Asn Ser Gly Ser Leu Ser Ser Val His Thr Phe
            180                 185                 190
```

```
Pro Ala Leu Leu Gln Ser Gly Leu Tyr Thr Met Ser Ser Val Thr
            195                 200                 205

Val Pro Ser Ser Thr Trp Pro Ser Gln Thr Val Thr Cys Ser Val Ala
210                 215                 220

His Pro Ala Ser Ser Thr Thr Val Asp Lys Lys Leu Glu Pro Ser Gly
225                 230                 235                 240

Pro Ile Ser Thr Ile Asn Pro Cys Pro Pro Cys Lys Glu Cys His Lys
                245                 250                 255

Cys Pro Ala Pro Asn Leu Glu Gly Gly Pro Ser Val Phe Ile Phe Pro
            260                 265                 270

Pro Asn Ile Lys Asp Val Leu Met Ile Ser Leu Thr Pro Lys Val Thr
            275                 280                 285

Cys Val Val Val Asp Val Ser Glu Asp Asp Pro Asp Val Gln Ile Ser
290                 295                 300

Trp Phe Val Asn Asn Val Glu Val His Thr Ala Gln Thr Gln Thr His
305                 310                 315                 320

Arg Glu Asp Tyr Asn Ser Thr Ile Arg Val Val Ser Thr Leu Pro Ile
                325                 330                 335

Gln His Gln Asp Trp Met Ser Gly Lys Glu Phe Lys Cys Lys Val Asn
            340                 345                 350

Asn Lys Asp Leu Pro Ser Pro Ile Glu Arg Thr Ile Ser Lys Ile Lys
            355                 360                 365

Gly Leu Val Arg Ala Pro Gln Val Tyr Thr Leu Pro Pro Pro Ala Glu
            370                 375                 380

Gln Leu Ser Arg Lys Asp Val Ser Leu Thr Cys Leu Val Val Gly Phe
385                 390                 395                 400

Asn Pro Gly Asp Ile Ser Val Glu Trp Thr Ser Asn Gly His Thr Glu
                405                 410                 415

Glu Asn Tyr Lys Asp Thr Ala Pro Val Leu Asp Ser Asp Gly Ser Tyr
            420                 425                 430

Phe Ile Tyr Ser Lys Leu Asn Met Lys Thr Ser Lys Trp Glu Lys Thr
            435                 440                 445

Asp Ser Phe Ser Cys Asn Val Arg His Glu Gly Leu Lys Asn Tyr Tyr
450                 455                 460

Leu Lys Lys Thr Ile Ser Arg Ser Pro Gly Lys
465                 470                 475

<210> SEQ ID NO 44
<211> LENGTH: 239
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 44

Met Arg Cys Leu Ala Glu Phe Leu Gly Leu Leu Val Leu Trp Ile Pro
1               5                   10                  15

Gly Ala Ile Gly Asp Ile Val Leu Thr Gln Thr Ala Pro Ser Val Pro
            20                  25                  30

Val Thr Pro Gly Glu Ser Val Ser Ile Ser Cys Arg Ser Ser Lys Ser
        35                  40                  45

Leu Leu His Ser Asn Gly Asn Thr Tyr Leu Tyr Trp Phe Leu Gln Arg
    50                  55                  60

Pro Gly Gln Ser Pro Gln Leu Leu Ile Tyr Arg Met Ser Asn Leu Ala
65                  70                  75                  80
```

```
Ser Gly Val Pro Asp Arg Phe Ser Gly Ser Gly Ser Gly Thr Ala Phe
                85                  90                  95
Thr Leu Arg Ile Ser Arg Val Glu Ala Glu Asp Val Gly Val Tyr Tyr
                100                 105                 110
Cys Met Gln His Leu Glu Tyr Pro Phe Thr Phe Gly Ser Gly Thr Lys
                115                 120                 125
Leu Glu Ile Lys Arg Ala Asp Ala Ala Pro Thr Val Ser Ile Phe Pro
                130                 135                 140
Pro Ser Ser Glu Gln Leu Thr Ser Gly Gly Ala Ser Val Val Cys Phe
145                 150                 155                 160
Leu Asn Asn Phe Tyr Pro Arg Asp Ile Asn Val Lys Trp Lys Ile Asp
                165                 170                 175
Gly Ser Glu Arg Gln Asn Gly Val Leu Asn Ser Trp Thr Asp Gln Asp
                180                 185                 190
Ser Lys Asp Ser Thr Tyr Ser Met Ser Ser Thr Leu Thr Leu Thr Lys
                195                 200                 205
Asp Glu Tyr Glu Arg His Asn Ser Tyr Thr Cys Glu Ala Thr His Lys
                210                 215                 220
Thr Ser Thr Ser Pro Ile Val Lys Ser Phe Asn Arg Asn Glu Cys
225                 230                 235

<210> SEQ ID NO 45
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 45

Asp His Ile Ile His
1               5

<210> SEQ ID NO 46
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 46

Tyr Ile Tyr Pro Arg Asp Gly Tyr Ile Lys Tyr Asn Glu Lys Phe Lys
1               5                   10                  15
Gly

<210> SEQ ID NO 47
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 47

Gly Tyr Tyr Tyr Ala Met Asp Tyr
1               5

<210> SEQ ID NO 48
<211> LENGTH: 16
<212> TYPE: PRT
```

```
<213> ORGANISM: Artificial Sequence
<220> FEATURE:
<223> OTHER INFORMATION: Description of Artificial Sequence: Synthetic
      peptide

<400> SEQUENCE: 48

Arg Ser Ser Gln Ser Ile Val His Ser Ile Gly Asn Thr Tyr Leu Glu
1               5                   10                  15

<210> SEQ ID NO 49
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 49

Phe Gln Gly Ser His Val Pro Phe Thr
1               5

<210> SEQ ID NO 50
<211> LENGTH: 117
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 50

Gln Val Gln Leu Gln Gln Ser Asp Ala Glu Leu Val Lys Pro Gly Ala
1               5                   10                  15

Ser Val Lys Ile Ser Cys Lys Val Ser Gly Tyr Thr Phe Thr Asp His
                20                  25                  30

Ile Ile His Trp Met Lys Gln Arg Pro Glu Gln Gly Leu Glu Trp Ile
            35                  40                  45

Gly Tyr Ile Tyr Pro Arg Asp Gly Tyr Ile Lys Tyr Asn Glu Lys Phe
        50                  55                  60

Lys Gly Lys Ala Thr Leu Thr Ala Asp Lys Ser Ser Ser Thr Ala Tyr
65                  70                  75                  80

Met Gln Val Asn Ser Leu Thr Ser Glu Asp Ser Ala Val Tyr Phe Cys
                85                  90                  95

Ala Arg Gly Tyr Tyr Tyr Ala Met Asp Tyr Trp Gly Gln Gly Thr Ser
            100                 105                 110

Val Thr Val Ser Ser
        115

<210> SEQ ID NO 51
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 51

Asp Val Leu Met Thr Gln Thr Pro Leu Ser Leu Pro Val Ser Leu Gly
1               5                   10                  15

Asp Gln Ala Ser Ile Ser Cys Arg Ser Ser Gln Ser Ile Val His Ser
                20                  25                  30

Ile Gly Asn Thr Tyr Leu Glu Trp Tyr Leu Gln Lys Pro Gly Gln Ser
            35                  40                  45
```

```
Pro Lys Leu Leu Ile Tyr Lys Val Ser Asn Arg Phe Ser Gly Val Pro
    50                  55                  60

Glu Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Phe Gln Gly
                85                  90                  95

Ser His Val Pro Phe Thr Phe Gly Ser Gly Thr Lys Leu Glu Ile Lys
                100                 105                 110

<210> SEQ ID NO 52
<211> LENGTH: 460
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 52

Met Glu Trp Ser Trp Val Ser Leu Phe Phe Leu Ser Val Thr Thr Gly
1               5                   10                  15

Val His Ser Gln Val Gln Leu Gln Gln Ser Asp Ala Glu Leu Val Lys
                20                  25                  30

Pro Gly Ala Ser Val Lys Ile Ser Cys Lys Val Ser Gly Tyr Thr Phe
            35                  40                  45

Thr Asp His Ile Ile His Trp Met Lys Gln Arg Pro Glu Gln Gly Leu
        50                  55                  60

Glu Trp Ile Gly Tyr Ile Tyr Pro Arg Asp Gly Tyr Ile Lys Tyr Asn
65                  70                  75                  80

Glu Lys Phe Lys Gly Lys Ala Thr Leu Thr Ala Asp Lys Ser Ser Ser
                85                  90                  95

Thr Ala Tyr Met Gln Val Asn Ser Leu Thr Ser Glu Asp Ser Ala Val
                100                 105                 110

Tyr Phe Cys Ala Arg Gly Tyr Tyr Tyr Ala Met Asp Tyr Trp Gly Gln
            115                 120                 125

Gly Thr Ser Val Thr Val Ser Ser Ala Lys Thr Thr Pro Pro Ser Val
        130                 135                 140

Tyr Pro Leu Ala Pro Gly Ser Ala Ala Gln Thr Asn Ser Met Val Thr
145                 150                 155                 160

Leu Gly Cys Leu Val Lys Gly Tyr Phe Pro Glu Pro Val Thr Val Thr
                165                 170                 175

Trp Asn Ser Gly Ser Leu Ser Ser Gly Val His Thr Phe Pro Ala Val
                180                 185                 190

Leu Gln Ser Asp Leu Tyr Thr Leu Ser Ser Ser Val Thr Val Pro Ser
            195                 200                 205

Ser Thr Trp Pro Ser Gln Thr Val Thr Cys Asn Val Ala His Pro Ala
        210                 215                 220

Ser Ser Thr Lys Val Asp Lys Lys Ile Val Pro Arg Asp Cys Gly Cys
225                 230                 235                 240

Lys Pro Cys Ile Cys Thr Val Pro Glu Val Ser Ser Val Phe Ile Phe
                245                 250                 255

Pro Pro Lys Pro Lys Asp Val Leu Thr Ile Thr Leu Thr Pro Lys Val
                260                 265                 270

Thr Cys Val Val Val Asp Ile Ser Lys Asp Asp Pro Glu Val Gln Phe
            275                 280                 285

Ser Trp Phe Val Asp Asp Val Glu Val His Thr Ala Gln Thr Gln Pro
        290                 295                 300
```

Arg Glu Glu Gln Phe Asn Ser Thr Phe Arg Ser Val Ser Glu Leu Pro
305                 310                 315                 320

Ile Met His Gln Asp Trp Leu Asn Gly Lys Glu Phe Lys Cys Arg Val
            325                 330                 335

Asn Ser Ala Ala Phe Pro Ala Pro Ile Glu Lys Thr Ile Ser Lys Thr
        340                 345                 350

Lys Gly Arg Pro Lys Ala Pro Gln Val Tyr Thr Ile Pro Pro Pro Lys
    355                 360                 365

Glu Gln Met Ala Lys Asp Lys Val Ser Leu Thr Cys Met Ile Thr Asp
370                 375                 380

Phe Phe Pro Glu Asp Ile Thr Val Glu Trp Gln Trp Asn Gly Gln Pro
385                 390                 395                 400

Ala Glu Asn Tyr Lys Asn Thr Gln Pro Ile Met Asp Thr Asp Gly Ser
            405                 410                 415

Tyr Phe Val Tyr Ser Lys Leu Asn Val Gln Lys Ser Asn Trp Glu Ala
        420                 425                 430

Gly Asn Thr Phe Thr Cys Ser Val Leu His Glu Gly Leu His Asn His
    435                 440                 445

His Thr Glu Lys Ser Leu Ser His Ser Pro Gly Lys
450                 455                 460

<210> SEQ ID NO 53
<211> LENGTH: 238
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 53

Met Lys Leu Pro Val Arg Leu Leu Val Leu Met Phe Trp Ile Pro Ala
1               5                   10                  15

Ser Arg Ser Asp Val Leu Met Thr Gln Thr Pro Leu Ser Leu Pro Val
            20                  25                  30

Ser Leu Gly Asp Gln Ala Ser Ile Ser Cys Arg Ser Ser Gln Ser Ile
        35                  40                  45

Val His Ser Ile Gly Asn Thr Tyr Leu Glu Trp Tyr Leu Gln Lys Pro
    50                  55                  60

Gly Gln Ser Pro Lys Leu Leu Ile Tyr Lys Val Ser Asn Arg Phe Ser
65                  70                  75                  80

Gly Val Pro Glu Arg Phe Ser Gly Ser Gly Ser Gly Thr Asp Phe Thr
            85                  90                  95

Leu Lys Ile Ser Arg Val Glu Ala Glu Asp Leu Gly Val Tyr Tyr Cys
        100                 105                 110

Phe Gln Gly Ser His Val Pro Phe Thr Phe Gly Ser Gly Thr Lys Leu
    115                 120                 125

Glu Ile Lys Arg Ala Asp Ala Ala Pro Thr Val Ser Ile Phe Pro Pro
130                 135                 140

Ser Ser Glu Gln Leu Thr Ser Gly Gly Ala Ser Val Val Cys Phe Leu
145                 150                 155                 160

Asn Asn Phe Tyr Pro Lys Asp Ile Asn Val Lys Trp Lys Ile Asp Gly
            165                 170                 175

Ser Glu Arg Gln Asn Gly Val Leu Asn Ser Trp Thr Asp Gln Asp Ser
        180                 185                 190

Lys Asp Ser Thr Tyr Ser Met Ser Ser Thr Leu Thr Leu Thr Lys Asp

```
                195                 200                 205
Glu Tyr Glu Arg His Asn Ser Tyr Thr Cys Glu Ala Thr His Lys Thr
    210                 215                 220

Ser Thr Ser Pro Ile Val Lys Ser Phe Asn Arg Asn Glu Cys
225                 230                 235

<210> SEQ ID NO 54
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 54

Ser Tyr Trp Met His
1               5

<210> SEQ ID NO 55
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 55

Met Ile Asp Pro Ser Asp Val Tyr Thr Asn Tyr Asn Pro Lys Phe Lys
1               5                   10                  15

Gly

<210> SEQ ID NO 56
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 56

Asn Tyr Ser Gly Asp Tyr
1               5

<210> SEQ ID NO 57
<211> LENGTH: 115
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 57

Gln Val Gln Leu Leu Gln Pro Gly Ala Glu Leu Val Arg Pro Gly Thr
1               5                   10                  15

Ser Val Lys Leu Ser Cys Lys Thr Ser Gly Tyr Thr Phe Ser Ser Tyr
            20                  25                  30

Trp Met His Trp Val Lys Gln Arg Pro Gly Gln Gly Leu Glu Trp Ile
        35                  40                  45

Gly Met Ile Asp Pro Ser Asp Val Tyr Thr Asn Tyr Asn Pro Lys Phe
    50                  55                  60

Lys Gly Lys Ala Thr Leu Thr Val Asp Thr Ser Ser Ser Thr Ala Tyr
65                  70                  75                  80

Met Gln Leu Ser Ser Leu Thr Ser Glu Asp Ser Ala Val Tyr Tyr Cys
```

```
                85                  90                  95
Ala Arg Asn Tyr Ser Gly Asp Tyr Trp Gly Gln Gly Thr Thr Leu Thr
            100                 105                 110
Val Ser Ser
        115

<210> SEQ ID NO 58
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 58

Asp Val Leu Met Thr Gln Ile Pro Leu Ser Leu Pro Val Ser Leu Gly
1               5                   10                  15

Asp Gln Ala Ser Ile Ser Cys Arg Ser Ser Gln Ser Ile Val His Ser
            20                  25                  30

Asn Gly Asn Thr Tyr Leu Glu Trp Tyr Leu Gln Lys Pro Gly Gln Ser
        35                  40                  45

Pro Lys Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Phe Gln Gly
                85                  90                  95

Ser Tyr Val Pro Trp Thr Phe Gly Gly Gly Thr Lys Leu Glu Ile Lys
            100                 105                 110

<210> SEQ ID NO 59
<211> LENGTH: 458
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 59

Met Gly Trp Ser Cys Ile Ile Val Leu Leu Val Ser Thr Ala Thr Cys
1               5                   10                  15

Val His Ser Gln Val Gln Leu Leu Gln Pro Gly Ala Glu Leu Val Arg
            20                  25                  30

Pro Gly Thr Ser Val Lys Leu Ser Cys Lys Thr Ser Gly Tyr Thr Phe
        35                  40                  45

Ser Ser Tyr Trp Met His Trp Val Lys Gln Arg Pro Gly Gln Gly Leu
    50                  55                  60

Glu Trp Ile Gly Met Ile Asp Pro Ser Asp Val Tyr Thr Asn Tyr Asn
65                  70                  75                  80

Pro Lys Phe Lys Gly Lys Ala Thr Leu Thr Val Asp Thr Ser Ser Ser
                85                  90                  95

Thr Ala Tyr Met Gln Leu Ser Ser Leu Thr Ser Glu Asp Ser Ala Val
            100                 105                 110

Tyr Tyr Cys Ala Arg Asn Tyr Ser Gly Asp Tyr Trp Gly Gln Gly Thr
        115                 120                 125

Thr Leu Thr Val Ser Ser Ala Lys Thr Thr Pro Pro Ser Val Tyr Pro
    130                 135                 140

Leu Ala Pro Gly Ser Ala Ala Gln Thr Asn Ser Met Val Thr Leu Gly
```

```
            145                 150                 155                 160
        Cys Leu Val Lys Gly Tyr Phe Pro Glu Pro Val Thr Val Thr Trp Asn
                        165                 170                 175

Ser Gly Ser Leu Ser Ser Gly Val His Thr Phe Pro Ala Val Leu Gln
                        180                 185                 190

Ser Asp Leu Tyr Thr Leu Ser Ser Val Thr Val Pro Ser Ser Thr
                        195                 200                 205

Trp Pro Ser Gln Thr Val Thr Cys Asn Val Ala His Pro Ala Ser Ser
                210                 215                 220

Thr Lys Val Asp Lys Lys Ile Val Pro Arg Asp Cys Gly Cys Lys Pro
        225                 230                 235                 240

Cys Ile Cys Thr Val Pro Glu Val Ser Ser Val Phe Ile Phe Pro Pro
                        245                 250                 255

Lys Pro Lys Asp Val Leu Thr Ile Thr Leu Thr Pro Lys Val Thr Cys
                        260                 265                 270

Val Val Val Asp Ile Ser Lys Asp Asp Pro Glu Val Gln Phe Ser Trp
                        275                 280                 285

Phe Val Asp Asp Val Glu Val His Thr Ala Gln Thr Gln Pro Arg Glu
                        290                 295                 300

Glu Gln Phe Asn Ser Thr Phe Arg Ser Val Ser Glu Leu Pro Ile Met
        305                 310                 315                 320

His Gln Asp Trp Leu Asn Gly Lys Glu Phe Lys Cys Arg Val Asn Ser
                        325                 330                 335

Ala Ala Phe Pro Ala Pro Ile Glu Lys Thr Ile Ser Lys Thr Lys Gly
                        340                 345                 350

Arg Pro Lys Ala Pro Gln Val Tyr Thr Ile Pro Pro Pro Lys Glu Gln
                        355                 360                 365

Met Ala Lys Asp Lys Val Ser Leu Thr Cys Met Ile Thr Asp Phe Phe
                        370                 375                 380

Pro Glu Asp Ile Thr Val Glu Trp Gln Trp Asn Gly Gln Pro Ala Glu
        385                 390                 395                 400

Asn Tyr Lys Asn Thr Gln Pro Ile Met Asp Thr Asp Gly Ser Tyr Phe
                        405                 410                 415

Val Tyr Ser Lys Leu Asn Val Gln Lys Ser Asn Trp Glu Ala Gly Asn
                        420                 425                 430

Thr Phe Thr Cys Ser Val Leu His Glu Gly Leu His Asn His His Thr
                        435                 440                 445

Glu Lys Ser Leu Ser His Ser Pro Gly Lys
                450                 455

<210> SEQ ID NO 60
<211> LENGTH: 238
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 60

Met Lys Leu Pro Val Arg Leu Leu Val Leu Met Phe Trp Ile Pro Ala
1               5                   10                  15

Ser Ser Ser Asp Val Leu Met Thr Gln Ile Pro Leu Ser Leu Pro Val
                20                  25                  30

Ser Leu Gly Asp Gln Ala Ser Ile Ser Cys Arg Ser Ser Gln Ser Ile
                35                  40                  45
```

Val His Ser Asn Gly Asn Thr Tyr Leu Glu Trp Tyr Leu Gln Lys Pro
 50                  55                  60

Gly Gln Ser Pro Lys Leu Leu Ile Tyr Lys Val Ser Asn Arg Phe Ser
 65                  70                  75                  80

Gly Val Pro Asp Arg Phe Ser Gly Ser Gly Ser Gly Thr Asp Phe Thr
                 85                  90                  95

Leu Lys Ile Ser Arg Val Glu Ala Glu Asp Leu Gly Val Tyr Tyr Cys
                100                 105                 110

Phe Gln Gly Ser Tyr Val Pro Trp Thr Phe Gly Gly Gly Thr Lys Leu
            115                 120                 125

Glu Ile Lys Arg Ala Asp Ala Ala Pro Thr Val Ser Ile Phe Pro Pro
130                 135                 140

Ser Ser Glu Gln Leu Thr Ser Gly Gly Ala Ser Val Val Cys Phe Leu
145                 150                 155                 160

Asn Asn Phe Tyr Pro Arg Asp Ile Asn Val Lys Trp Lys Ile Asp Gly
                165                 170                 175

Ser Glu Arg Gln Asn Gly Val Leu Asn Ser Trp Thr Asp Gln Asp Ser
            180                 185                 190

Lys Asp Ser Thr Tyr Ser Met Ser Ser Thr Leu Thr Leu Thr Lys Asp
        195                 200                 205

Glu Tyr Glu Arg His Asn Ser Tyr Thr Cys Glu Ala Thr His Lys Thr
210                 215                 220

Ser Thr Ser Pro Ile Val Lys Ser Phe Asn Arg Asn Glu Cys
225                 230                 235

<210> SEQ ID NO 61
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 61

Thr Tyr Gly Met Ser
1               5

<210> SEQ ID NO 62
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 62

Trp Ile Asn Thr Tyr Ser Gly Val Pro Thr Tyr Ala Asp Asp Phe Lys
1               5                   10                  15

Gly

<210> SEQ ID NO 63
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 63

Gly Arg Asp Gly Tyr Gln Val Ala Trp Phe Ala Tyr
1               5                   10

<210> SEQ ID NO 64
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 64

Ile Thr Ser Thr Asp Ile Asp Asp Asp Met Asn
1               5                   10

<210> SEQ ID NO 65
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 65

Glu Gly Asn Thr Leu Arg Pro
1               5

<210> SEQ ID NO 66
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 66

Leu Gln Ser Asp Asn Leu Pro Tyr Thr
1               5

<210> SEQ ID NO 67
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 67

Gln Ile Gln Leu Val Gln Ser Gly Pro Glu Leu Lys Lys Pro Gly Glu
1               5                   10                  15

Ala Val Lys Ile Ser Cys Lys Ser Ser Gly Tyr Thr Phe Thr Thr Tyr
            20                  25                  30

Gly Met Ser Trp Val Lys Gln Ala Pro Gly Arg Ala Leu Lys Trp Met
        35                  40                  45

Gly Trp Ile Asn Thr Tyr Ser Gly Val Pro Thr Tyr Ala Asp Asp Phe
    50                  55                  60

Lys Gly Arg Phe Ala Phe Ser Leu Glu Ser Ser Ala Ser Thr Ala Tyr
65                  70                  75                  80

Leu Gln Ile Asn Asn Leu Lys Asn Glu Asp Thr Ala Thr Tyr Phe Cys
                85                  90                  95

Ala Arg Gly Arg Asp Gly Tyr Gln Val Ala Trp Phe Ala Tyr Trp Gly
            100                 105                 110

Gln Gly Thr Leu Val Thr Val Ser Ala
        115                 120

```
<210> SEQ ID NO 68
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 68
```

Glu Thr Thr Val Thr Gln Ser Pro Ala Ser Leu Ser Met Ala Ile Gly
1               5                   10                  15

Asp Lys Val Thr Ile Arg Cys Ile Thr Ser Thr Asp Ile Asp Asp Asp
            20                  25                  30

Met Asn Trp Phe Gln Gln Lys Pro Gly Glu Pro Pro Lys Leu Leu Ile
        35                  40                  45

Ser Glu Gly Asn Thr Leu Arg Pro Gly Val Pro Ser Arg Phe Ser Gly
    50                  55                  60

Ser Gly Tyr Gly Thr Asp Phe Ile Phe Thr Ile Glu Asn Met Leu Ser
65                  70                  75                  80

Glu Asp Val Ala Asp Tyr Tyr Cys Leu Gln Ser Asp Asn Leu Pro Tyr
                85                  90                  95

Thr Phe Gly Gly Gly Thr Lys Leu Glu Ile Lys
            100                 105

```
<210> SEQ ID NO 69
<211> LENGTH: 464
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 69
```

Met Gly Trp Leu Trp Asn Leu Leu Phe Leu Met Ala Ala Ala Gln Ser
1               5                   10                  15

Ala Gln Ala Gln Ile Gln Leu Val Gln Ser Gly Pro Glu Leu Lys Lys
            20                  25                  30

Pro Gly Glu Ala Val Lys Ile Ser Cys Lys Ser Ser Gly Tyr Thr Phe
        35                  40                  45

Thr Thr Tyr Gly Met Ser Trp Val Lys Gln Ala Pro Gly Arg Ala Leu
    50                  55                  60

Lys Trp Met Gly Trp Ile Asn Thr Tyr Ser Gly Val Pro Thr Tyr Ala
65                  70                  75                  80

Asp Asp Phe Lys Gly Arg Phe Ala Phe Ser Leu Glu Ser Ser Ala Ser
                85                  90                  95

Thr Ala Tyr Leu Gln Ile Asn Asn Leu Lys Asn Glu Asp Thr Ala Thr
            100                 105                 110

Tyr Phe Cys Ala Arg Gly Arg Asp Gly Tyr Gln Val Ala Trp Phe Ala
        115                 120                 125

Tyr Trp Gly Gln Gly Thr Leu Val Thr Val Ser Ala Ala Lys Thr Thr
    130                 135                 140

Pro Pro Ser Val Tyr Pro Leu Ala Pro Gly Ser Ala Ala Gln Thr Asn
145                 150                 155                 160

Ser Met Val Thr Leu Gly Cys Leu Val Lys Gly Tyr Phe Pro Glu Pro
                165                 170                 175

Val Thr Val Thr Trp Asn Ser Gly Ser Leu Ser Ser Gly Val His Thr
            180                 185                 190

Phe Pro Ala Val Leu Gln Ser Asp Leu Tyr Thr Leu Ser Ser Ser Val

```
                195                 200                 205
Thr Val Pro Ser Ser Thr Trp Pro Ser Gln Thr Val Thr Cys Asn Val
    210                 215                 220

Ala His Pro Ala Ser Ser Thr Lys Val Asp Lys Ile Val Pro Arg
225                 230                 235                 240

Asp Cys Gly Cys Lys Pro Cys Ile Cys Thr Val Pro Glu Val Ser Ser
                245                 250                 255

Val Phe Ile Phe Pro Pro Lys Pro Lys Asp Val Leu Thr Ile Thr Leu
            260                 265                 270

Thr Pro Lys Val Thr Cys Val Val Asp Ile Ser Lys Asp Asp Pro
        275                 280                 285

Glu Val Gln Phe Ser Trp Phe Val Asp Val Glu Val His Thr Ala
    290                 295                 300

Gln Thr Gln Pro Arg Glu Glu Gln Phe Asn Ser Thr Phe Arg Ser Val
305                 310                 315                 320

Ser Glu Leu Pro Ile Met His Gln Asp Trp Leu Asn Gly Lys Glu Phe
                325                 330                 335

Lys Cys Arg Val Asn Ser Ala Ala Phe Pro Ala Pro Ile Glu Lys Thr
            340                 345                 350

Ile Ser Lys Thr Lys Gly Arg Pro Lys Ala Pro Gln Val Tyr Thr Ile
        355                 360                 365

Pro Pro Pro Lys Glu Gln Met Ala Lys Asp Lys Val Ser Leu Thr Cys
    370                 375                 380

Met Ile Thr Asp Phe Phe Pro Glu Asp Ile Thr Val Glu Trp Gln Trp
385                 390                 395                 400

Asn Gly Gln Pro Ala Glu Asn Tyr Lys Asn Thr Gln Pro Ile Met Asp
                405                 410                 415

Thr Asp Gly Ser Tyr Phe Val Tyr Ser Lys Leu Asn Val Gln Lys Ser
            420                 425                 430

Asn Trp Glu Ala Gly Asn Thr Phe Thr Cys Ser Val Leu His Glu Gly
        435                 440                 445

Leu His Asn His His Thr Glu Lys Ser Leu Ser His Ser Pro Gly Lys
    450                 455                 460

<210> SEQ ID NO 70
<211> LENGTH: 234
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 70

Met Phe Ser Leu Ala Leu Leu Leu Ser Leu Leu Leu Leu Cys Val Ser
1               5                   10                  15

Asp Ser Arg Ala Glu Thr Thr Val Thr Gln Ser Pro Ala Ser Leu Ser
                20                  25                  30

Met Ala Ile Gly Asp Lys Val Thr Ile Arg Cys Ile Thr Ser Thr Asp
            35                  40                  45

Ile Asp Asp Asp Met Asn Trp Phe Gln Gln Lys Pro Gly Glu Pro Pro
        50                  55                  60

Lys Leu Leu Ile Ser Glu Gly Asn Thr Leu Arg Pro Gly Val Pro Ser
65                  70                  75                  80

Arg Phe Ser Gly Ser Gly Tyr Gly Thr Asp Phe Ile Phe Thr Ile Glu
                85                  90                  95
```

Asn Met Leu Ser Glu Asp Val Ala Asp Tyr Tyr Cys Leu Gln Ser Asp
            100                 105                 110

Asn Leu Pro Tyr Thr Phe Gly Gly Thr Lys Leu Glu Ile Lys Arg
        115                 120                 125

Ala Asp Ala Ala Pro Thr Val Ser Ile Phe Pro Pro Ser Ser Glu Gln
    130                 135                 140

Leu Thr Ser Gly Gly Ala Ser Val Val Cys Phe Leu Asn Asn Phe Tyr
145                 150                 155                 160

Pro Arg Asp Ile Asn Val Lys Trp Lys Ile Asp Gly Ser Glu Arg Gln
                165                 170                 175

Asn Gly Val Leu Asn Ser Trp Thr Asp Gln Asp Ser Lys Asp Ser Thr
            180                 185                 190

Tyr Ser Met Ser Ser Thr Leu Thr Leu Thr Lys Asp Glu Tyr Glu Arg
        195                 200                 205

His Asn Ser Tyr Thr Cys Glu Ala Thr His Lys Thr Ser Thr Ser Pro
    210                 215                 220

Ile Val Lys Ser Phe Asn Arg Asn Glu Cys
225                 230

<210> SEQ ID NO 71
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 71

Asn Tyr Trp Met His
1               5

<210> SEQ ID NO 72
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 72

Met Ile Asp Pro Ser Asp Ser Tyr Thr Asn Tyr Asn Pro Lys Phe Lys
1               5                   10                  15

Gly

<210> SEQ ID NO 73
<211> LENGTH: 115
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 73

Gln Val Gln Leu Gln Gln Pro Gly Ala Glu Leu Val Arg Pro Gly Thr
1               5                   10                  15

Ser Val Lys Leu Ser Cys Lys Ala Ser Gly Tyr Thr Phe Thr Asn Tyr
            20                  25                  30

Trp Met His Trp Val Lys Gln Arg Pro Gly Gln Gly Leu Glu Trp Ile
        35                  40                  45

Gly Met Ile Asp Pro Ser Asp Ser Tyr Thr Asn Tyr Asn Pro Lys Phe
    50                  55                  60

```
Lys Gly Lys Ala Thr Leu Thr Val Asp Thr Ser Ser Thr Ala Tyr
 65                  70                  75                  80

Met Gln Leu Ser Ser Leu Thr Ser Glu Asp Ser Ala Val Tyr Tyr Cys
                 85                  90                  95

Ala Arg Asn Tyr Ser Gly Asp Tyr Trp Gly Gln Gly Thr Thr Leu Thr
            100                 105                 110

Val Ser Ser
        115

<210> SEQ ID NO 74
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 74

Asp Val Leu Met Thr Gln Thr Pro Leu Ser Leu Pro Val Ser Leu Gly
 1               5                  10                  15

Asp Gln Ala Ser Ile Ser Cys Arg Ser Ser Gln Ser Ile Val His Ser
            20                  25                  30

Asn Gly Asn Thr Tyr Leu Glu Trp Tyr Leu Gln Lys Pro Gly Gln Ser
        35                  40                  45

Pro Lys Leu Leu Ile Tyr Lys Val Ser Asn Arg Phe Ser Gly Val Pro
 50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Leu Gly Val Tyr Tyr Cys Phe Gln Gly
                 85                  90                  95

Ser Tyr Val Pro Trp Thr Phe Gly Gly Gly Thr Lys Leu Glu Ile Lys
            100                 105                 110

<210> SEQ ID NO 75
<211> LENGTH: 458
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 75

Met Gly Trp Ser Cys Ile Ile Val Leu Leu Val Ser Thr Ala Thr Gly
 1               5                  10                  15

Val His Ser Gln Val Gln Leu Gln Gln Pro Gly Ala Glu Leu Val Arg
            20                  25                  30

Pro Gly Thr Ser Val Lys Leu Ser Cys Lys Ala Ser Gly Tyr Thr Phe
        35                  40                  45

Thr Asn Tyr Trp Met His Trp Val Lys Gln Arg Pro Gly Gln Gly Leu
 50                  55                  60

Glu Trp Ile Gly Met Ile Asp Pro Ser Asp Ser Tyr Thr Asn Tyr Asn
 65                  70                  75                  80

Pro Lys Phe Lys Gly Lys Ala Thr Leu Thr Val Asp Thr Ser Ser Ser
                 85                  90                  95

Thr Ala Tyr Met Gln Leu Ser Ser Leu Thr Ser Glu Asp Ser Ala Val
            100                 105                 110

Tyr Tyr Cys Ala Arg Asn Tyr Ser Gly Asp Tyr Trp Gly Gln Gly Thr
        115                 120                 125
```

```
Thr Leu Thr Val Ser Ser Ala Lys Thr Thr Pro Ser Val Tyr Pro
        130                 135                 140

Leu Ala Pro Gly Ser Ala Ala Gln Thr Asn Ser Met Val Thr Leu Gly
145                 150                 155                 160

Cys Leu Val Lys Gly Tyr Phe Pro Glu Pro Val Thr Val Thr Trp Asn
                165                 170                 175

Ser Gly Ser Leu Ser Ser Gly Val His Thr Phe Pro Ala Val Leu Gln
            180                 185                 190

Ser Asp Leu Tyr Thr Leu Ser Ser Val Thr Val Pro Ser Ser Thr
        195                 200                 205

Trp Pro Ser Gln Thr Val Thr Cys Asn Val Ala His Pro Ala Ser Ser
210                 215                 220

Thr Lys Val Asp Lys Lys Ile Val Pro Arg Asp Cys Gly Cys Lys Pro
225                 230                 235                 240

Cys Ile Cys Thr Val Pro Glu Val Ser Ser Val Phe Ile Phe Pro Pro
                245                 250                 255

Lys Pro Lys Asp Val Leu Thr Ile Thr Leu Thr Pro Lys Val Thr Cys
                260                 265                 270

Val Val Val Asp Ile Ser Lys Asp Asp Pro Glu Val Gln Phe Ser Trp
                275                 280                 285

Phe Val Asp Asp Val Glu Val His Thr Ala Gln Thr Gln Pro Arg Glu
        290                 295                 300

Glu Gln Phe Asn Ser Thr Phe Arg Ser Val Ser Glu Leu Pro Ile Met
305                 310                 315                 320

His Gln Asp Trp Leu Asn Gly Lys Glu Phe Lys Cys Arg Val Asn Ser
                325                 330                 335

Ala Ala Phe Pro Ala Pro Ile Glu Lys Thr Ile Ser Lys Thr Lys Gly
                340                 345                 350

Arg Pro Lys Ala Pro Gln Val Tyr Thr Ile Pro Pro Lys Glu Gln
        355                 360                 365

Met Ala Lys Asp Lys Val Ser Leu Thr Cys Met Ile Thr Asp Phe Phe
370                 375                 380

Pro Glu Asp Ile Thr Val Glu Trp Gln Trp Asn Gly Gln Pro Ala Glu
385                 390                 395                 400

Asn Tyr Lys Asn Thr Gln Pro Ile Met Asp Thr Asp Gly Ser Tyr Phe
                405                 410                 415

Val Tyr Ser Lys Leu Asn Val Gln Lys Ser Asn Trp Glu Ala Gly Asn
                420                 425                 430

Thr Phe Thr Cys Ser Val Leu His Glu Gly Leu His Asn His His Thr
        435                 440                 445

Glu Lys Ser Leu Ser His Ser Pro Gly Lys
    450                 455

<210> SEQ ID NO 76
<211> LENGTH: 238
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 76

Met Lys Leu Pro Val Arg Leu Leu Val Leu Met Phe Trp Ile Pro Ala
1               5                   10                  15

Ser Ser Ser Asp Val Leu Met Thr Gln Thr Pro Leu Ser Leu Pro Val
```

```
                20                  25                  30
Ser Leu Gly Asp Gln Ala Ser Ile Ser Cys Arg Ser Ser Gln Ser Ile
            35                  40                  45
Val His Ser Asn Gly Asn Thr Tyr Leu Glu Trp Tyr Leu Gln Lys Pro
        50                  55                  60
Gly Gln Ser Pro Lys Leu Leu Ile Tyr Lys Val Ser Asn Arg Phe Ser
65                  70                  75                  80
Gly Val Pro Asp Arg Phe Ser Gly Ser Gly Ser Gly Thr Asp Phe Thr
                85                  90                  95
Leu Lys Ile Ser Arg Val Glu Ala Glu Asp Leu Gly Val Tyr Tyr Cys
            100                 105                 110
Phe Gln Gly Ser Tyr Val Pro Trp Thr Phe Gly Gly Gly Thr Lys Leu
        115                 120                 125
Glu Ile Lys Arg Ala Asp Ala Ala Pro Thr Val Ser Ile Phe Pro Pro
    130                 135                 140
Ser Ser Glu Gln Leu Thr Ser Gly Gly Ala Ser Val Val Cys Phe Leu
145                 150                 155                 160
Asn Asn Phe Tyr Pro Arg Asp Ile Asn Val Lys Trp Lys Ile Asp Gly
                165                 170                 175
Ser Glu Arg Gln Asn Gly Val Leu Asn Ser Trp Thr Asp Gln Asp Ser
            180                 185                 190
Lys Asp Ser Thr Tyr Ser Met Ser Ser Thr Leu Thr Leu Thr Lys Asp
        195                 200                 205
Glu Tyr Glu Arg His Asn Ser Tyr Thr Cys Glu Ala Thr His Lys Thr
    210                 215                 220
Ser Thr Ser Pro Ile Val Lys Ser Phe Asn Arg Asn Glu Cys
225                 230                 235

<210> SEQ ID NO 77
<211> LENGTH: 449
<212> TYPE: PRT
<213> ORGANISM: Artificial Sequence
<220> FEATURE:
<223> OTHER INFORMATION: Antibody heavy chain

<400> SEQUENCE: 77

Gln Val Gln Leu Val Glu Ser Gly Gly Gly Leu Val Lys Pro Gly Gly
1               5                   10                  15
Ser Leu Arg Leu Ser Cys Ala Ala Ser Gly Phe Thr Phe Ser Asp Tyr
            20                  25                  30
Ala Met Ser Trp Ile Arg Gln Ala Pro Gly Lys Gly Leu Glu Trp Val
        35                  40                  45
Ser Thr Ile Ser Asp Gly Gly Thr Tyr Thr Tyr Tyr Pro Asp Ser Val
    50                  55                  60
Lys Gly Arg Phe Thr Ile Ser Arg Asp Asn Ala Lys Asn Ser Leu Tyr
65                  70                  75                  80
Leu Gln Met Asn Ser Leu Arg Ala Glu Asp Thr Ala Val Tyr Tyr Cys
                85                  90                  95
Ala Arg Glu Trp Gly Asp Tyr Asp Gly Phe Asp Tyr Trp Gly Gln Gly
            100                 105                 110
Thr Leu Val Thr Val Ser Ser Ala Ser Thr Lys Gly Pro Ser Val Phe
        115                 120                 125
Pro Leu Ala Pro Ser Ser Lys Ser Thr Ser Gly Gly Thr Ala Ala Leu
    130                 135                 140
Gly Cys Leu Val Lys Asp Tyr Phe Pro Glu Pro Val Thr Val Ser Trp
```

```
                145                 150                 155                 160
Asn Ser Gly Ala Leu Thr Ser Gly Val His Thr Phe Pro Ala Val Leu
            165                 170                 175
Gln Ser Ser Gly Leu Tyr Ser Leu Ser Ser Val Val Thr Val Pro Ser
            180                 185                 190
Ser Ser Leu Gly Thr Gln Thr Tyr Ile Cys Asn Val Asn His Lys Pro
            195                 200                 205
Ser Asn Thr Lys Val Asp Lys Lys Val Glu Pro Lys Ser Cys Asp Lys
            210                 215                 220
Thr His Thr Cys Pro Pro Cys Pro Ala Pro Glu Leu Leu Gly Gly Pro
225                 230                 235                 240
Ser Val Phe Leu Phe Pro Pro Lys Pro Lys Asp Thr Leu Met Ile Ser
            245                 250                 255
Arg Thr Pro Glu Val Thr Cys Val Val Val Asp Val Ser His Glu Asp
            260                 265                 270
Pro Glu Val Lys Phe Asn Trp Tyr Val Asp Gly Val Glu Val His Asn
            275                 280                 285
Ala Lys Thr Lys Pro Arg Glu Glu Gln Tyr Asn Ser Thr Tyr Arg Val
            290                 295                 300
Val Ser Val Leu Thr Val Leu His Gln Asp Trp Leu Asn Gly Lys Glu
305                 310                 315                 320
Tyr Lys Cys Lys Val Ser Asn Lys Ala Leu Pro Ala Pro Ile Glu Lys
            325                 330                 335
Thr Ile Ser Lys Ala Lys Gly Gln Pro Arg Glu Pro Gln Val Tyr Thr
            340                 345                 350
Leu Pro Pro Ser Arg Asp Glu Leu Thr Lys Asn Gln Val Ser Leu Thr
            355                 360                 365
Cys Leu Val Lys Gly Phe Tyr Pro Ser Asp Ile Ala Val Glu Trp Glu
            370                 375                 380
Ser Asn Gly Gln Pro Glu Asn Asn Tyr Lys Thr Thr Pro Pro Val Leu
385                 390                 395                 400
Asp Ser Asp Gly Ser Phe Phe Leu Tyr Ser Lys Leu Thr Val Asp Lys
            405                 410                 415
Ser Arg Trp Gln Gln Gly Asn Val Phe Ser Cys Ser Val Met His Glu
            420                 425                 430
Ala Leu His Asn His Tyr Thr Gln Lys Ser Leu Ser Leu Ser Pro Gly
            435                 440                 445
Lys

<210> SEQ ID NO 78
<211> LENGTH: 214
<212> TYPE: PRT
<213> ORGANISM: Artificial Sequence
<220> FEATURE:
<223> OTHER INFORMATION: Antibody light chain

<400> SEQUENCE: 78

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Tyr Gln Gln Lys Pro Gly Lys Ala Pro Lys Arg Leu Ile
        35                  40                  45

Tyr Ala Ala Ser Thr Leu Asp Ser Gly Val Pro Ser Arg Phe Ser Gly
    50                  55                  60
```

Ser Gly Ser Gly Thr Glu Phe Thr Leu Thr Ile Ser Ser Leu Gln Pro
 65                  70                  75                  80

Glu Asp Phe Ala Thr Tyr Tyr Cys Leu Gln Tyr Asp Ser Tyr Pro Tyr
                 85                  90                  95

Thr Phe Gly Gln Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 79
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 79

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asp Tyr
            20                  25                  30

Ala Met Ser Trp Val Arg Gln Ala Pro Gly Lys Gly Leu Glu Trp Val
        35                  40                  45

Ala Thr Ile Ser Asp Gly Gly Thr Tyr Thr Tyr Tyr Pro Asp Asn Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser
        115

<210> SEQ ID NO 80
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 80

Gln Val Gln Leu Val Glu Ser Gly Gly Gly Leu Val Lys Pro Gly Gly
1               5                   10                  15

-continued

```
Ser Leu Arg Leu Ser Cys Ala Ala Ser Gly Phe Thr Phe Ser Asp Tyr
            20                  25                  30

Ala Met Ser Trp Ile Arg Gln Ala Pro Gly Lys Gly Leu Glu Trp Val
        35                  40                  45

Ser Thr Ile Ser Asp Gly Gly Thr Tyr Thr Tyr Tyr Pro Asp Asn Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser
            115

<210> SEQ ID NO 81
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 81

Gln Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asp Tyr
            20                  25                  30

Ala Met Ser Trp Ile Arg Gln Ala Pro Gly Lys Gly Leu Glu Trp Val
        35                  40                  45

Ser Thr Ile Ser Asp Gly Gly Thr Tyr Thr Tyr Tyr Pro Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser
            115

<210> SEQ ID NO 82
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 82

Glu Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asp Tyr
            20                  25                  30

Ala Met Ser Trp Val Arg Gln Ala Pro Gly Lys Gly Leu Glu Trp Val
        35                  40                  45

Ser Thr Ile Ser Asp Gly Gly Thr Tyr Thr Tyr Tyr Pro Asp Asn Val
    50                  55                  60
```

```
Lys Gly Arg Phe Thr Ile Ser Arg Asp Asn Ala Lys Asn Ser Leu Tyr
 65                  70                  75                  80

Leu Gln Met Asn Ser Leu Arg Ala Glu Asp Thr Ala Val Tyr Tyr Cys
                 85                  90                  95

Ala Arg Glu Trp Gly Asp Tyr Asp Gly Phe Asp Tyr Trp Gly Gln Gly
            100                 105                 110

Thr Leu Val Thr Val Ser Ser
        115

<210> SEQ ID NO 83
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 83

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Asp Tyr
            20                  25                  30

Ala Met Ser Trp Val Arg Gln Ala Pro Gly Lys Gly Leu Glu Trp Val
        35                  40                  45

Ser Thr Ile Ser Asp Gly Gly Thr Tyr Thr Tyr Tyr Pro Asp Asn Val
    50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Glu Trp Gly Asp Tyr Asp Gly Phe Asp Tyr Trp Gly Gln Gly
            100                 105                 110

Thr Leu Val Thr Val Ser Ser
        115

<210> SEQ ID NO 84
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 84

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Asp Tyr
            20                  25                  30

Ala Met Ser Trp Val Arg Gln Ala Pro Gly Lys Gly Leu Glu Trp Val
        35                  40                  45

Ala Thr Ile Ser Asp Gly Gly Thr Tyr Thr Tyr Tyr Pro Asp Asn Val
    50                  55                  60

Lys Gly Arg Phe Thr Ile Ser Arg Asp Asn Ser Lys Asn Thr Leu Tyr
 65                  70                  75                  80

Leu Gln Met Ser Ser Leu Arg Ala Glu Asp Thr Ala Val Tyr Tyr Cys
                 85                  90                  95

Ala Arg Glu Trp Gly Asp Tyr Asp Gly Phe Asp Tyr Trp Gly Gln Gly
            100                 105                 110
```

Thr Leu Val Thr Val Ser Ser
        115

<210> SEQ ID NO 85
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 85

Glu Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asp Tyr
            20                  25                  30

Ala Met Ser Trp Val Arg Gln Ala Pro Gly Lys Gly Leu Glu Trp Val
        35                  40                  45

Ala Thr Ile Ser Asp Gly Gly Thr Tyr Thr Tyr Tyr Pro Asp Asn Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser
        115

<210> SEQ ID NO 86
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 86

Asp Ile Gln Leu Thr Gln Ser Pro Ser Phe Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Tyr Gln Gln Lys Pro Gly Lys Ala Pro Lys Leu Leu Ile
        35                  40                  45

Tyr Ala Ala Ser Thr Leu Asp Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys
            100                 105

<210> SEQ ID NO 87
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 87

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Phe Gln Gln Lys Pro Gly Lys Ala Pro Lys Ser Leu Ile
        35                  40                  45

Tyr Ala Ala Ser Thr Leu Asp Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys
            100                 105

<210> SEQ ID NO 88
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 88

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Tyr Gln Gln Lys Pro Gly Lys Ala Pro Lys Arg Leu Ile
        35                  40                  45

Tyr Ala Ala Ser Thr Leu Asp Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys
            100                 105

<210> SEQ ID NO 89
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 89

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Tyr Gln Gln Lys Pro Gly Lys Ala Pro Lys Leu Leu Ile
        35                  40                  45

Tyr Ala Ala Ser Thr Leu Asp Ser Gly Val Pro Ser Arg Phe Ser Gly
    50                  55                  60

Ser Gly Ser Gly Thr Asp Phe Thr Phe Thr Ile Ser Ser Leu Gln Pro
65                  70                  75                  80

Glu Asp Ile Ala Thr Tyr Tyr Cys Leu Gln Tyr Asp Ser Tyr Pro Tyr
                85                  90                  95

Thr Phe Gly Gln Gly Thr Lys Leu Glu Ile Lys
            100                 105

<210> SEQ ID NO 90
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 90

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
                20                  25                  30

Leu Ser Trp Tyr Gln Gln Lys Pro Gly Lys Ala Pro Lys Leu Leu Ile
            35                  40                  45

Tyr Ala Ala Ser Thr Leu Asp Ser Gly Val Pro Ser Arg Phe Ser Gly
        50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys
            100                 105

<210> SEQ ID NO 91
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 91

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
                20                  25                  30

Leu Ser Trp Leu Gln Gln Lys Pro Gly Gly Ala Ile Lys Arg Leu Ile
            35                  40                  45

Tyr Ala Ala Ser Thr Leu Asp Ser Gly Val Pro Ser Arg Phe Ser Gly
        50                  55                  60

Ser Gly Ser Gly Ser Asp Tyr Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys
            100                 105

<210> SEQ ID NO 92
<211> LENGTH: 468
<212> TYPE: PRT
<213> ORGANISM: Artificial Sequence
<220> FEATURE:

<223> OTHER INFORMATION: Description of Artificial Sequence: Synthetic polypeptide

<400> SEQUENCE: 92

```
Met Asn Phe Gly Leu Ser Leu Met Phe Leu Val Leu Val Leu Lys Gly
1               5                   10                  15

Val Gln Cys Glu Val Gln Leu Val Glu Ser Gly Gly Gly Leu Val Lys
            20                  25                  30

Pro Gly Gly Ser Leu Lys Leu Ser Cys Ala Ala Ser Gly Phe Thr Phe
        35                  40                  45

Ser Asp Tyr Ala Met Ser Trp Val Arg Gln Thr Pro Glu Lys Arg Leu
    50                  55                  60

Glu Trp Val Ala Thr Ile Ser Asp Gly Gly Thr Tyr Thr Tyr Tyr Pro
65                  70                  75                  80

Asp Asn Val Lys Gly Arg Phe Thr Ile Ser Arg Asp Asn Ala Lys Asn
                85                  90                  95

Asn Leu Tyr Leu Gln Met Ser His Leu Lys Ser Glu Asp Thr Ala Met
            100                 105                 110

Tyr Tyr Cys Ala Arg Glu Trp Gly Asp Tyr Asp Gly Phe Asp Tyr Trp
        115                 120                 125

Gly Gln Gly Thr Thr Leu Thr Val Ser Ser Ala Ser Thr Lys Gly Pro
130                 135                 140

Ser Val Phe Pro Leu Ala Pro Ser Ser Lys Ser Thr Ser Gly Gly Thr
145                 150                 155                 160

Ala Ala Leu Gly Cys Leu Val Lys Asp Tyr Phe Pro Glu Pro Val Thr
                165                 170                 175

Val Ser Trp Asn Ser Gly Ala Leu Thr Ser Gly Val His Thr Phe Pro
            180                 185                 190

Ala Val Leu Gln Ser Ser Gly Leu Tyr Ser Leu Ser Ser Val Val Thr
        195                 200                 205

Val Pro Ser Ser Ser Leu Gly Thr Gln Thr Tyr Ile Cys Asn Val Asn
    210                 215                 220

His Lys Pro Ser Asn Thr Lys Val Asp Lys Arg Val Glu Pro Lys Ser
225                 230                 235                 240

Cys Asp Lys Thr His Thr Cys Pro Pro Cys Pro Ala Pro Glu Leu Leu
                245                 250                 255

Gly Gly Pro Ser Val Phe Leu Phe Pro Pro Lys Pro Lys Asp Thr Leu
            260                 265                 270

Met Ile Ser Arg Thr Pro Glu Val Thr Cys Val Val Val Asp Val Ser
        275                 280                 285

His Glu Asp Pro Glu Val Lys Phe Asn Trp Tyr Val Asp Gly Val Glu
    290                 295                 300

Val His Asn Ala Lys Thr Lys Pro Arg Glu Glu Gln Tyr Asn Ser Thr
305                 310                 315                 320

Tyr Arg Val Val Ser Val Leu Thr Val Leu His Gln Asp Trp Leu Asn
                325                 330                 335

Gly Lys Glu Tyr Lys Cys Lys Val Ser Asn Lys Ala Leu Pro Ala Pro
            340                 345                 350

Ile Glu Lys Thr Ile Ser Lys Ala Lys Gly Gln Pro Arg Glu Pro Gln
        355                 360                 365

Val Tyr Thr Leu Pro Pro Ser Arg Glu Glu Met Thr Lys Asn Gln Val
    370                 375                 380

Ser Leu Thr Cys Leu Val Lys Gly Phe Tyr Pro Ser Asp Ile Ala Val
385                 390                 395                 400
```

```
Glu Trp Glu Ser Asn Gly Gln Pro Glu Asn Asn Tyr Lys Thr Thr Pro
                405                 410                 415

Pro Val Leu Asp Ser Asp Gly Ser Phe Phe Leu Tyr Ser Lys Leu Thr
            420                 425                 430

Val Asp Lys Ser Arg Trp Gln Gln Gly Asn Val Phe Ser Cys Ser Val
        435                 440                 445

Met His Glu Ala Leu His Asn His Tyr Thr Gln Lys Ser Leu Ser Leu
    450                 455                 460

Ser Pro Gly Lys
465

<210> SEQ ID NO 93
<211> LENGTH: 236
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 93

Met Asp Met Arg Val Pro Ala His Val Phe Gly Phe Leu Leu Leu Trp
1               5                   10                  15

Phe Pro Gly Thr Arg Cys Asp Ile Gln Met Thr Gln Ser Pro Ser Ser
            20                  25                  30

Leu Ser Ala Ser Leu Gly Glu Arg Val Ser Leu Thr Cys Arg Ala Ser
        35                  40                  45

Gln Glu Ile Ser Gly Tyr Leu Ser Trp Leu Gln Gln Lys Pro Asp Gly
    50                  55                  60

Thr Ile Lys Arg Leu Ile Tyr Ala Ala Ser Thr Leu Asp Ser Gly Val
65                  70                  75                  80

Pro Lys Arg Phe Ser Gly Ser Arg Ser Gly Ser Asp Tyr Ser Leu Thr
                85                  90                  95

Ile Gly Ser Leu Glu Ser Glu Asp Leu Ala Asp Tyr Tyr Cys Leu Gln
            100                 105                 110

Tyr Asp Ser Tyr Pro Tyr Thr Phe Gly Gly Gly Thr Lys Leu Glu Ile
        115                 120                 125

Lys Arg Thr Val Ala Ala Pro Ser Val Phe Ile Phe Pro Pro Ser Asp
    130                 135                 140

Glu Gln Leu Lys Ser Gly Thr Ala Ser Val Val Cys Leu Leu Asn Asn
145                 150                 155                 160

Phe Tyr Pro Arg Glu Ala Lys Val Gln Trp Lys Val Asp Asn Ala Leu
                165                 170                 175

Gln Ser Gly Asn Ser Gln Glu Ser Val Thr Glu Gln Asp Ser Lys Asp
            180                 185                 190

Ser Thr Tyr Ser Leu Ser Ser Thr Leu Thr Leu Ser Lys Ala Asp Tyr
        195                 200                 205

Glu Lys His Lys Val Tyr Ala Cys Glu Val Thr His Gln Gly Leu Ser
    210                 215                 220

Ser Pro Val Thr Lys Ser Phe Asn Arg Gly Glu Cys
225                 230                 235

<210> SEQ ID NO 94
<211> LENGTH: 471
<212> TYPE: PRT
<213> ORGANISM: Artificial Sequence
<220> FEATURE:
<223> OTHER INFORMATION: Description of Artificial Sequence: Synthetic
``` polypeptide

<400> SEQUENCE: 94

```
Met Asp Met Arg Val Pro Ala Gln Leu Leu Gly Leu Leu Leu Leu Trp
1               5                   10                  15

Leu Arg Gly Ala Arg Cys Gln Val Gln Leu Val Glu Ser Gly Gly Gly
            20                  25                  30

Leu Val Lys Pro Gly Gly Ser Leu Arg Leu Ser Cys Ala Ala Ser Gly
        35                  40                  45

Phe Thr Phe Ser Asp Tyr Ala Met Ser Trp Ile Arg Gln Ala Pro Gly
    50                  55                  60

Lys Gly Leu Glu Trp Val Ser Thr Ile Ser Asp Gly Gly Thr Tyr Thr
65                  70                  75                  80

Tyr Tyr Pro Asp Ser Val Lys Gly Arg Phe Thr Ile Ser Arg Asp Asn
                85                  90                  95

Ala Lys Asn Ser Leu Tyr Leu Gln Met Asn Ser Leu Arg Ala Glu Asp
            100                 105                 110

Thr Ala Val Tyr Tyr Cys Ala Arg Glu Trp Gly Asp Tyr Asp Gly Phe
        115                 120                 125

Asp Tyr Trp Gly Gln Gly Thr Leu Val Thr Val Ser Ser Ala Ser Thr
    130                 135                 140

Lys Gly Pro Ser Val Phe Pro Leu Ala Pro Ser Ser Lys Ser Thr Ser
145                 150                 155                 160

Gly Gly Thr Ala Ala Leu Gly Cys Leu Val Lys Asp Tyr Phe Pro Glu
                165                 170                 175

Pro Val Thr Val Ser Trp Asn Ser Gly Ala Leu Thr Ser Gly Val His
            180                 185                 190

Thr Phe Pro Ala Val Leu Gln Ser Ser Gly Leu Tyr Ser Leu Ser Ser
        195                 200                 205

Val Val Thr Val Pro Ser Ser Ser Leu Gly Thr Gln Thr Tyr Ile Cys
    210                 215                 220

Asn Val Asn His Lys Pro Ser Asn Thr Lys Val Asp Lys Arg Val Glu
225                 230                 235                 240

Pro Lys Ser Cys Asp Lys Thr His Thr Cys Pro Pro Cys Pro Ala Pro
                245                 250                 255

Glu Leu Leu Gly Gly Pro Ser Val Phe Leu Phe Pro Pro Lys Pro Lys
            260                 265                 270

Asp Thr Leu Met Ile Ser Arg Thr Pro Glu Val Thr Cys Val Val Val
        275                 280                 285

Asp Val Ser His Glu Asp Pro Glu Val Lys Phe Asn Trp Tyr Val Asp
    290                 295                 300

Gly Val Glu Val His Asn Ala Lys Thr Lys Pro Arg Glu Glu Gln Tyr
305                 310                 315                 320

Asn Ser Thr Tyr Arg Val Val Ser Val Leu Thr Val Leu His Gln Asp
                325                 330                 335

Trp Leu Asn Gly Lys Glu Tyr Lys Cys Lys Val Ser Asn Lys Ala Leu
            340                 345                 350

Pro Ala Pro Ile Glu Lys Thr Ile Ser Lys Ala Lys Gly Gln Pro Arg
        355                 360                 365

Glu Pro Gln Val Tyr Thr Leu Pro Pro Ser Arg Glu Glu Met Thr Lys
    370                 375                 380

Asn Gln Val Ser Leu Thr Cys Leu Val Lys Gly Phe Tyr Pro Ser Asp
385                 390                 395                 400
```

-continued

```
Ile Ala Val Glu Trp Glu Ser Asn Gly Gln Pro Glu Asn Asn Tyr Lys
                405                 410                 415

Thr Thr Pro Pro Val Leu Asp Ser Asp Gly Ser Phe Phe Leu Tyr Ser
            420                 425                 430

Lys Leu Thr Val Asp Lys Ser Arg Trp Gln Gln Gly Asn Val Phe Ser
        435                 440                 445

Cys Ser Val Met His Glu Ala Leu His Asn His Tyr Thr Gln Lys Ser
    450                 455                 460

Leu Ser Leu Ser Pro Gly Lys
465                 470

<210> SEQ ID NO 95
<211> LENGTH: 467
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 95

Met Asp Met Arg Val Pro Ala Gln Leu Leu Gly Leu Leu Leu Leu Trp
1               5                   10                  15

Leu Arg Gly Ala Arg Cys Gln Val Gln Leu Val Glu Ser Gly Gly Gly
            20                  25                  30

Leu Val Lys Pro Gly Gly Ser Leu Arg Leu Ser Cys Ala Ala Ser Gly
        35                  40                  45

Phe Thr Phe Ser Asp Tyr Ala Met Ser Trp Ile Arg Gln Ala Pro Gly
    50                  55                  60

Lys Gly Leu Glu Trp Val Ser Thr Ile Ser Asp Gly Gly Thr Tyr Thr
65                  70                  75                  80

Tyr Tyr Pro Asp Ser Val Lys Gly Arg Phe Thr Ile Ser Arg Asp Asn
                85                  90                  95

Ala Lys Asn Ser Leu Tyr Leu Gln Met Asn Ser Leu Arg Ala Glu Asp
            100                 105                 110

Thr Ala Val Tyr Tyr Cys Ala Arg Glu Trp Gly Asp Tyr Asp Gly Phe
        115                 120                 125

Asp Tyr Trp Gly Gln Gly Thr Leu Val Thr Val Ser Ser Ala Ser Thr
    130                 135                 140

Lys Gly Pro Ser Val Phe Pro Leu Ala Pro Cys Ser Arg Ser Thr Ser
145                 150                 155                 160

Glu Ser Thr Ala Ala Leu Gly Cys Leu Val Lys Asp Tyr Phe Pro Glu
                165                 170                 175

Pro Val Thr Val Ser Trp Asn Ser Gly Ala Leu Thr Ser Gly Val His
            180                 185                 190

Thr Phe Pro Ala Val Leu Gln Ser Ser Gly Leu Tyr Ser Leu Ser Ser
        195                 200                 205

Val Val Thr Val Pro Ser Ser Asn Phe Gly Thr Gln Thr Tyr Thr Cys
    210                 215                 220

Asn Val Asp His Lys Pro Ser Asn Thr Lys Val Asp Lys Thr Val Glu
225                 230                 235                 240

Arg Lys Cys Cys Val Glu Cys Pro Pro Cys Pro Ala Pro Pro Val Ala
                245                 250                 255

Gly Pro Ser Val Phe Leu Phe Pro Pro Lys Pro Lys Asp Thr Leu Met
            260                 265                 270

Ile Ser Arg Thr Pro Glu Val Thr Cys Val Val Val Asp Val Ser His
        275                 280                 285
```

```
Glu Asp Pro Glu Val Gln Phe Asn Trp Tyr Val Asp Gly Val Glu Val
    290                 295                 300

His Asn Ala Lys Thr Lys Pro Arg Glu Glu Gln Phe Asn Ser Thr Phe
305                 310                 315                 320

Arg Val Val Ser Val Leu Thr Val Val His Gln Asp Trp Leu Asn Gly
                325                 330                 335

Lys Glu Tyr Lys Cys Lys Val Ser Asn Lys Gly Leu Pro Ala Pro Ile
            340                 345                 350

Glu Lys Thr Ile Ser Lys Thr Lys Gly Gln Pro Arg Glu Pro Gln Val
        355                 360                 365

Tyr Thr Leu Pro Pro Ser Arg Glu Glu Met Thr Lys Asn Gln Val Ser
    370                 375                 380

Leu Thr Cys Leu Val Lys Gly Phe Tyr Pro Ser Asp Ile Ala Val Glu
385                 390                 395                 400

Trp Glu Ser Asn Gly Gln Pro Glu Asn Asn Tyr Lys Thr Thr Pro Pro
                405                 410                 415

Met Leu Asp Ser Asp Gly Ser Phe Phe Leu Tyr Ser Lys Leu Thr Val
            420                 425                 430

Asp Lys Ser Arg Trp Gln Gln Gly Asn Val Phe Ser Cys Ser Val Met
        435                 440                 445

His Glu Ala Leu His Asn His Tyr Thr Gln Lys Ser Leu Ser Leu Ser
    450                 455                 460

Pro Gly Lys
465

<210> SEQ ID NO 96
<211> LENGTH: 236
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 96

Met Asp Met Arg Val Pro Ala Gln Leu Leu Gly Leu Leu Leu Leu Trp
1               5                   10                  15

Leu Arg Gly Ala Arg Cys Asp Ile Gln Met Thr Gln Ser Pro Ser Ser
                20                  25                  30

Leu Ser Ala Ser Val Gly Asp Arg Val Thr Ile Thr Cys Arg Ala Ser
            35                  40                  45

Gln Glu Ile Ser Gly Tyr Leu Ser Trp Phe Gln Lys Pro Gly Lys
        50                  55                  60

Ala Pro Lys Ser Leu Ile Tyr Ala Ala Ser Thr Leu Asp Ser Gly Val
65                  70                  75                  80

Pro Ser Arg Phe Ser Gly Ser Gly Ser Gly Thr Asp Phe Thr Leu Thr
                85                  90                  95

Ile Ser Ser Leu Gln Pro Glu Asp Phe Ala Thr Tyr Tyr Cys Leu Gln
            100                 105                 110

Tyr Asp Ser Tyr Pro Tyr Thr Phe Gly Gln Gly Thr Lys Leu Glu Ile
        115                 120                 125

Lys Arg Thr Val Ala Ala Pro Ser Val Phe Ile Phe Pro Pro Ser Asp
    130                 135                 140

Glu Gln Leu Lys Ser Gly Thr Ala Ser Val Val Cys Leu Leu Asn Asn
145                 150                 155                 160

Phe Tyr Pro Arg Glu Ala Lys Val Gln Trp Lys Val Asp Asn Ala Leu
```

```
                        165                 170                 175
Gln Ser Gly Asn Ser Gln Glu Ser Val Thr Glu Gln Asp Ser Lys Asp
            180                 185                 190

Ser Thr Tyr Ser Leu Ser Ser Thr Leu Thr Leu Ser Lys Ala Asp Tyr
        195                 200                 205

Glu Lys His Lys Val Tyr Ala Cys Glu Val Thr His Gln Gly Leu Ser
    210                 215                 220

Ser Pro Val Thr Lys Ser Phe Asn Arg Gly Glu Cys
225                 230                 235

<210> SEQ ID NO 97
<211> LENGTH: 236
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 97

Met Asp Met Arg Val Pro Ala Gln Leu Leu Gly Leu Leu Leu Leu Trp
1               5                   10                  15

Leu Arg Gly Ala Arg Cys Asp Ile Gln Met Thr Gln Ser Pro Ser Ser
            20                  25                  30

Leu Ser Ala Ser Val Gly Asp Arg Val Thr Ile Thr Cys Arg Ala Ser
        35                  40                  45

Gln Glu Ile Ser Gly Tyr Leu Ser Trp Tyr Gln Gln Lys Pro Gly Lys
    50                  55                  60

Ala Pro Lys Arg Leu Ile Tyr Ala Ala Ser Thr Leu Asp Ser Gly Val
65                  70                  75                  80

Pro Ser Arg Phe Ser Gly Ser Gly Ser Gly Thr Glu Phe Thr Leu Thr
                85                  90                  95

Ile Ser Ser Leu Gln Pro Glu Asp Phe Ala Thr Tyr Tyr Cys Leu Gln
            100                 105                 110

Tyr Asp Ser Tyr Pro Tyr Thr Phe Gly Gln Gly Thr Lys Leu Glu Ile
        115                 120                 125

Lys Arg Thr Val Ala Ala Pro Ser Val Phe Ile Phe Pro Pro Ser Asp
    130                 135                 140

Glu Gln Leu Lys Ser Gly Thr Ala Ser Val Val Cys Leu Leu Asn Asn
145                 150                 155                 160

Phe Tyr Pro Arg Glu Ala Lys Val Gln Trp Lys Val Asp Asn Ala Leu
                165                 170                 175

Gln Ser Gly Asn Ser Gln Glu Ser Val Thr Glu Gln Asp Ser Lys Asp
            180                 185                 190

Ser Thr Tyr Ser Leu Ser Ser Thr Leu Thr Leu Ser Lys Ala Asp Tyr
        195                 200                 205

Glu Lys His Lys Val Tyr Ala Cys Glu Val Thr His Gln Gly Leu Ser
    210                 215                 220

Ser Pro Val Thr Lys Ser Phe Asn Arg Gly Glu Cys
225                 230                 235

<210> SEQ ID NO 98
<211> LENGTH: 449
<212> TYPE: PRT
<213> ORGANISM: Artificial Sequence
<220> FEATURE:
<223> OTHER INFORMATION: Antibody heavy chain no leader sequence

<400> SEQUENCE: 98
```

```
Gln Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asp Tyr
            20                  25                  30

Ala Met Ser Trp Ile Arg Gln Ala Pro Gly Lys Gly Leu Glu Trp Val
        35                  40                  45

Ser Thr Ile Ser Asp Gly Gly Thr Tyr Thr Tyr Tyr Pro Asp Ser Val
    50                  55                  60

Lys Gly Arg Phe Thr Ile Ser Arg Asp Asn Ala Lys Asn Ser Leu Tyr
65              70                  75                  80

Leu Gln Met Asn Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415
```

Ser Arg Trp Gln Gln Gly Asn Val Phe Ser Cys Ser Val Met His Glu
                420                 425                 430

Ala Leu His Asn His Tyr Thr Gln Lys Ser Leu Ser Leu Ser Pro Gly
            435                 440                 445

Lys

<210> SEQ ID NO 99
<211> LENGTH: 445
<212> TYPE: PRT
<213> ORGANISM: Artificial Sequence
<220> FEATURE:
<223> OTHER INFORMATION: Antibody heavy chain no leader sequence

<400> SEQUENCE: 99

Gln Val Gln Leu Val Glu Ser Gly Gly Gly Leu Val Lys Pro Gly Gly
1               5                   10                  15

Ser Leu Arg Leu Ser Cys Ala Ala Ser Gly Phe Thr Phe Ser Asp Tyr
            20                  25                  30

Ala Met Ser Trp Ile Arg Gln Ala Pro Gly Lys Gly Leu Glu Trp Val
        35                  40                  45

Ser Thr Ile Ser Asp Gly Gly Thr Tyr Thr Tyr Tyr Pro Asp Ser Val
50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Arg Glu Trp Gly Asp Tyr Asp Gly Phe Asp Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Cys Ser Arg Ser Thr Ser Glu Ser Thr Ala Ala Leu
130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Asn Phe Gly Thr Gln Thr Tyr Thr Cys Asn Val Asp His Lys Pro
        195                 200                 205

Ser Asn Thr Lys Val Asp Lys Thr Val Glu Arg Lys Cys Cys Val Glu
210                 215                 220

Cys Pro Pro Cys Pro Ala Pro Pro Val Ala Gly Pro Ser Val Phe Leu
225                 230                 235                 240

Phe Pro Pro Lys Pro Lys Asp Thr Leu Met Ile Ser Arg Thr Pro Glu
                245                 250                 255

Val Thr Cys Val Val Val Asp Val Ser His Glu Asp Pro Glu Val Gln
            260                 265                 270

Phe Asn Trp Tyr Val Asp Gly Val Glu Val His Asn Ala Lys Thr Lys
        275                 280                 285

Pro Arg Glu Glu Gln Phe Asn Ser Thr Phe Arg Val Val Ser Val Leu
    290                 295                 300

Thr Val Val His Gln Asp Trp Leu Asn Gly Lys Glu Tyr Lys Cys Lys
305                 310                 315                 320

Val Ser Asn Lys Gly Leu Pro Ala Pro Ile Glu Lys Thr Ile Ser Lys

-continued

```
                    325                 330                 335
Thr Lys Gly Gln Pro Arg Glu Pro Gln Val Tyr Thr Leu Pro Pro Ser
                340                 345                 350

Arg Glu Glu Met Thr Lys Asn Gln Val Ser Leu Thr Cys Leu Val Lys
            355                 360                 365

Gly Phe Tyr Pro Ser Asp Ile Ala Val Glu Trp Glu Ser Asn Gly Gln
        370                 375                 380

Pro Glu Asn Asn Tyr Lys Thr Thr Pro Pro Met Leu Asp Ser Asp Gly
385                 390                 395                 400

Ser Phe Phe Leu Tyr Ser Lys Leu Thr Val Asp Lys Ser Arg Trp Gln
                405                 410                 415

Gln Gly Asn Val Phe Ser Cys Ser Val Met His Glu Ala Leu His Asn
            420                 425                 430

His Tyr Thr Gln Lys Ser Leu Ser Leu Ser Pro Gly Lys
        435                 440                 445

<210> SEQ ID NO 100
<211> LENGTH: 214
<212> TYPE: PRT
<213> ORGANISM: Artificial Sequence
<220> FEATURE:
<223> OTHER INFORMATION: Antibody light chain no leader sequence

<400> SEQUENCE: 100

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Phe Gln Gln Lys Pro Gly Lys Ala Pro Lys Ser Leu Ile
        35                  40                  45

Tyr Ala Ala Ser Thr Leu Asp Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 101
<211> LENGTH: 214
<212> TYPE: PRT
```

```
<213> ORGANISM: Artificial Sequence
<220> FEATURE:
<223> OTHER INFORMATION: Antibody light chain no leader sequence

<400> SEQUENCE: 101

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Glu Ile Ser Gly Tyr
            20                  25                  30

Leu Ser Trp Tyr Gln Gln Lys Pro Gly Lys Ala Pro Lys Arg Leu Ile
        35                  40                  45

Tyr Ala Ala Ser Thr Leu Asp Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr Tyr Cys Leu Gln Tyr Asp Ser Tyr Pro Tyr
                85                  90                  95

Thr Phe Gly Gln Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 102
<211> LENGTH: 450
<212> TYPE: PRT
<213> ORGANISM: Artificial Sequence
<220> FEATURE:
<223> OTHER INFORMATION: Antibody heavy chain

<400> SEQUENCE: 102

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Ile Lys Asp Thr
            20                  25                  30

Tyr Ile His Trp Val Arg Gln Ala Pro Gly Lys Gly Leu Glu Trp Val
        35                  40                  45

Ala Arg Ile Tyr Pro Thr Asn Gly Tyr Thr Arg Tyr Ala Asp Ser Val
    50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ser Arg Trp Gly Gly Asp Gly Phe Tyr Ala Met Asp Tyr Trp Gly Gln
            100                 105                 110
```

```
Gly Thr Leu Val Thr Val Ser Ser Ala Ser Thr Lys Gly Pro Ser Val
            115                 120                 125

Phe Pro Leu Ala Pro Ser Ser Lys Ser Thr Ser Gly Gly Thr Ala Ala
130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Glu Glu Met Thr Lys Asn Gln Val Ser Leu
        355                 360                 365

Thr Cys Leu Val Lys Gly Phe Tyr Pro Ser Asp Ile Ala Val Glu Trp
370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
        435                 440                 445

Gly Lys
    450

<210> SEQ ID NO 103
<211> LENGTH: 214
<212> TYPE: PRT
<213> ORGANISM: Artificial Sequence
<220> FEATURE:
<223> OTHER INFORMATION: Antibody light chain

<400> SEQUENCE: 103

Asp Ile Gln Met Thr Gln Ser Pro Ser Ser Leu Ser Ala Ser Val Gly
1               5                   10                  15
```

-continued

Asp Arg Val Thr Ile Thr Cys Arg Ala Ser Gln Asp Val Asn Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
 50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln Gln His Tyr Thr Thr Pro Pro
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 104
<211> LENGTH: 448
<212> TYPE: PRT
<213> ORGANISM: Artificial Sequence
<220> FEATURE:
<223> OTHER INFORMATION: Antibody heavy chain

<400> SEQUENCE: 104

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Thr Asp Tyr
            20                  25                  30

Thr Met Asp Trp Val Arg Gln Ala Pro Gly Lys Gly Leu Glu Trp Val
        35                  40                  45

Ala Asp Val Asn Pro Asn Ser Gly Gly Ser Ile Tyr Asn Gln Arg Phe
 50                  55                  60

Lys Gly Arg Phe Thr Leu Ser Val Asp Arg Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asn Leu Gly Pro Ser Phe Tyr Phe Asp Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Lys Val Glu Pro Lys Ser Cys Asp Lys
    210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
        435                 440                 445

<210> SEQ ID NO 105
<211> LENGTH: 214
<212> TYPE: PRT
<213> ORGANISM: Artificial Sequence
<220> FEATURE:
<223> OTHER INFORMATION: Antibody light chain

<400> SEQUENCE: 105

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Asp Val Ser Ile Gly
            20                  25                  30

Val Ala Trp Tyr Gln Gln Lys Pro Gly Lys Ala Pro Lys Leu Leu Ile
        35                  40                  45

Tyr Ser Ala Ser Tyr Arg Tyr Thr Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

```
Glu Asp Phe Ala Thr Tyr Tyr Cys Gln Gln Tyr Tyr Ile Tyr Pro Tyr
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
            130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
            195                 200                 205

Phe Asn Arg Gly Glu Cys
            210

<210> SEQ ID NO 106
<211> LENGTH: 447
<212> TYPE: PRT
<213> ORGANISM: Artificial Sequence
<220> FEATURE:
<223> OTHER INFORMATION: Antibody heavy chain

<400> SEQUENCE: 106

Gln Val Gln Leu Gln Gln Trp Gly Ala Gly Leu Leu Lys Pro Ser Glu
1               5                   10                  15

Thr Leu Ser Leu Thr Cys Ala Val Tyr Gly Gly Ser Phe Ser Gly Tyr
            20                  25                  30

Tyr Trp Ser Trp Ile Arg Gln Pro Pro Gly Lys Gly Leu Glu Trp Ile
        35                  40                  45

Gly Glu Ile Asn His Ser Gly Ser Thr Asn Tyr Asn Pro Ser Leu Lys
    50                  55                  60

Ser Arg Val Thr Ile Ser Val Glu Thr Ser Lys Asn Gln Phe Ser Leu
65                  70                  75                  80

Lys Leu Ser Ser Val Thr Ala Ala Asp Thr Ala Val Tyr Tyr Cys Ala
            85                  90                  95

Arg Asp Lys Trp Thr Trp Tyr Phe Asp Leu Trp Gly Arg Gly Thr Leu
            100                 105                 110

Val Thr Val Ser Ser Ala Ser Thr Lys Gly Pro Ser Val Phe Pro Leu
            115                 120                 125

Ala Pro Ser Ser Lys Ser Thr Ser Gly Gly Thr Ala Ala Leu Gly Cys
130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
            180                 185                 190

Leu Gly Thr Gln Thr Tyr Ile Cys Asn Val Asn His Lys Pro Ser Asn
            195                 200                 205

Thr Lys Val Asp Lys Arg Val Glu Pro Lys Ser Cys Asp Lys Thr His
            210                 215                 220
```

```
Thr Cys Pro Pro Cys Pro Ala Pro Glu Leu Leu Gly Gly Pro Ser Val
225                 230                 235                 240

Phe Leu Phe Pro Pro Lys Pro Lys Asp Thr Leu Met Ile Ser Arg Thr
            245                 250                 255

Pro Glu Val Thr Cys Val Val Val Asp Val Ser His Glu Asp Pro Glu
        260                 265                 270

Val Lys Phe Asn Trp Tyr Val Asp Gly Val Glu Val His Asn Ala Lys
        275                 280                 285

Thr Lys Pro Arg Glu Glu Gln Tyr Asn Ser Thr Tyr Arg Val Val Ser
    290                 295                 300

Val Leu Thr Val Leu His Gln Asp Trp Leu Asn Gly Lys Glu Tyr Lys
305                 310                 315                 320

Cys Lys Val Ser Asn Lys Ala Leu Pro Ala Pro Ile Glu Lys Thr Ile
                325                 330                 335

Ser Lys Ala Lys Gly Gln Pro Arg Glu Pro Gln Val Tyr Thr Leu Pro
            340                 345                 350

Pro Ser Arg Glu Glu Met Thr Lys Asn Gln Val Ser Leu Thr Cys Leu
        355                 360                 365

Val Lys Gly Phe Tyr Pro Ser Asp Ile Ala Val Glu Trp Glu Ser Asn
370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Lys Leu Thr Val Asp Lys Ser Arg
                405                 410                 415

Trp Gln Gln Gly Asn Val Phe Ser Cys Ser Val Met His Glu Ala Leu
            420                 425                 430

His Asn His Tyr Thr Gln Lys Ser Leu Ser Leu Ser Pro Gly Lys
        435                 440                 445

<210> SEQ ID NO 107
<211> LENGTH: 220
<212> TYPE: PRT
<213> ORGANISM: Artificial Sequence
<220> FEATURE:
<223> OTHER INFORMATION: Antibody light chain

<400> SEQUENCE: 107

Asp Ile Glu Met Thr Gln Ser Pro Asp Ser Leu Ala Val Ser Leu Gly
1               5                   10                  15

Glu Arg Ala Thr Ile Asn Cys Arg Ser Ser Gln Ser Val Leu Tyr Ser
            20                  25                  30

Ser Ser Asn Arg Asn Tyr Leu Ala Trp Tyr Gln Gln Asn Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Gln Gln
                85                  90                  95

Tyr Tyr Ser Thr Pro Arg Thr Phe Gly Gln Gly Thr Lys Val Glu Ile
            100                 105                 110

Lys Arg Thr Val Ala Ala Pro Ser Val Phe Ile Phe Pro Pro Ser Asp
        115                 120                 125

Glu Gln Leu Lys Ser Gly Thr Ala Ser Val Val Cys Leu Leu Asn Asn
    130                 135                 140
```

```
Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
            180                 185                 190

Glu Lys His Lys Val Tyr Ala Cys Glu Val Thr His Gln Gly Leu Ser
        195                 200                 205

Ser Pro Val Thr Lys Ser Phe Asn Arg Gly Glu Cys
            210                 215                 220
```

<210> SEQ ID NO 108
<211> LENGTH: 445
<212> TYPE: PRT
<213> ORGANISM: Artificial Sequence
<220> FEATURE:
<223> OTHER INFORMATION: Antibody heavy chain

<400> SEQUENCE: 108

```
Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser His Tyr
            20                  25                  30

Val Met Ala Trp Val Arg Gln Ala Pro Gly Lys Gly Leu Glu Trp Val
        35                  40                  45

Ser Ser Ile Ser Ser Ser Gly Gly Trp Thr Leu Tyr Ala Asp Ser Val
    50                  55                  60

Lys Gly Arg Phe Thr Ile Ser Arg Asp Asn Lys Asn Thr Leu Tyr
65                  70                  75                  80

Leu Gln Met Asn Ser Leu Arg Ala Glu Asp Thr Ala Val Tyr Tyr Cys
                85                  90                  95

Thr Arg Gly Leu Lys Met Ala Thr Ile Phe Asp Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Cys Ser Arg Ser Thr Ser Glu Ser Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Asn Phe Gly Thr Gln Thr Tyr Thr Cys Asn Val Asp His Lys Pro
        195                 200                 205

Ser Asn Thr Lys Val Asp Lys Thr Val Glu Arg Lys Cys Cys Val Glu
    210                 215                 220

Cys Pro Pro Cys Pro Ala Pro Pro Val Ala Gly Pro Ser Val Phe Leu
225                 230                 235                 240

Phe Pro Pro Lys Pro Lys Asp Thr Leu Met Ile Ser Arg Thr Pro Glu
                245                 250                 255

Val Thr Cys Val Val Val Asp Val Ser His Glu Asp Pro Glu Val Gln
            260                 265                 270

Phe Asn Trp Tyr Val Asp Gly Val Glu Val His Asn Ala Lys Thr Lys
        275                 280                 285
```

```
Pro Arg Glu Glu Gln Phe Asn Ser Thr Phe Arg Val Val Ser Val Leu
    290                 295                 300
Thr Val Val His Gln Asp Trp Leu Asn Gly Lys Glu Tyr Lys Cys Lys
305                 310                 315                 320
Val Ser Asn Lys Gly Leu Pro Ala Pro Ile Glu Lys Thr Ile Ser Lys
                325                 330                 335
Thr Lys Gly Gln Pro Arg Glu Pro Gln Val Tyr Thr Leu Pro Pro Ser
            340                 345                 350
Arg Glu Glu Met Thr Lys Asn Gln Val Ser Leu Thr Cys Leu Val Lys
        355                 360                 365
Gly Phe Tyr Pro Ser Asp Ile Ala Val Glu Trp Glu Ser Asn Gly Gln
370                 375                 380
Pro Glu Asn Asn Tyr Lys Thr Thr Pro Pro Met Leu Asp Ser Asp Gly
385                 390                 395                 400
Ser Phe Phe Leu Tyr Ser Lys Leu Thr Val Asp Lys Ser Arg Trp Gln
                405                 410                 415
Gln Gly Asn Val Phe Ser Cys Ser Val Met His Glu Ala Leu His Asn
            420                 425                 430
His Tyr Thr Gln Lys Ser Leu Ser Leu Ser Pro Gly Lys
        435                 440                 445

<210> SEQ ID NO 109
<211> LENGTH: 217
<212> TYPE: PRT
<213> ORGANISM: Artificial Sequence
<220> FEATURE:
<223> OTHER INFORMATION: Antibody light chain

<400> SEQUENCE: 109

Gln Ser Ala Leu Thr Gln Pro Ala Ser Val Ser Gly Ser Pro Gly Gln
1               5                   10                  15
Ser Ile Thr Ile Ser Cys Thr Gly Thr Ser Ser Asp Val Gly Ser Tyr
            20                  25                  30
Asn Val Val Ser Trp Tyr Gln Gln His Pro Gly Lys Ala Pro Lys Leu
        35                  40                  45
Ile Ile Tyr Glu Val Ser Gln Arg Pro Ser Gly Val Ser Asn Arg Phe
    50                  55                  60
Ser Gly Ser Lys Ser Gly Asn Thr Ala Ser Leu Thr Ile Ser Gly Leu
65                  70                  75                  80
Gln Thr Glu Asp Glu Ala Asp Tyr Tyr Cys Cys Ser Tyr Ala Gly Ser
                85                  90                  95
Ser Ile Phe Val Ile Phe Gly Gly Gly Thr Lys Val Thr Val Leu Gly
            100                 105                 110
Gln Pro Lys Ala Ala Pro Ser Val Thr Leu Phe Pro Pro Ser Ser Glu
        115                 120                 125
Glu Leu Gln Ala Asn Lys Ala Thr Leu Val Cys Leu Val Ser Asp Phe
    130                 135                 140
Tyr Pro Gly Ala Val Thr Val Ala Trp Lys Ala Asp Gly Ser Pro Val
145                 150                 155                 160
Lys Val Gly Val Glu Thr Thr Lys Pro Ser Lys Gln Ser Asn Asn Lys
                165                 170                 175
Tyr Ala Ala Ser Ser Tyr Leu Ser Leu Thr Pro Glu Gln Trp Lys Ser
            180                 185                 190
His Arg Ser Tyr Ser Cys Arg Val Thr His Glu Gly Ser Thr Val Glu
        195                 200                 205
```

Lys Thr Val Ala Pro Ala Glu Cys Ser
    210                 215

<210> SEQ ID NO 110
<211> LENGTH: 449
<212> TYPE: PRT
<213> ORGANISM: Artificial Sequence
<220> FEATURE:
<223> OTHER INFORMATION: Antibody heavy chain

<400> SEQUENCE: 110

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Arg Ser Ser
            20                  25                  30

Tyr Ile Ser Trp Val Arg Gln Ala Pro Gly Gln Gly Leu Glu Trp Met
        35                  40                  45

Gly Trp Ile Tyr Ala Gly Thr Gly Ser Pro Ser Tyr Asn Gln Lys Leu
    50                  55                  60

Gln Gly Arg Val Thr Met Thr Thr Asp Thr Ser Thr Ser Thr Ala Tyr
65                  70                  75                  80

Met Glu Leu Arg Ser Leu Arg Ser Asp Asp Thr Ala Val Tyr Tyr Cys
                85                  90                  95

Ala Arg His Arg Asp Tyr Tyr Ser Asn Ser Leu Thr Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

```
Thr Leu Pro Pro Ser Arg Asp Glu Leu Thr Lys Asn Gln Val Ser Leu
            355                 360                 365

Thr Cys Leu Val Lys Gly Phe Tyr Pro Ser Asp Ile Ala Val Glu Trp
    370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
                420                 425                 430

Glu Ala Leu His Asn His Tyr Thr Gln Lys Ser Leu Ser Leu Ser Pro
            435                 440                 445

Gly

<210> SEQ ID NO 111
<211> LENGTH: 220
<212> TYPE: PRT
<213> ORGANISM: Artificial Sequence
<220> FEATURE:
<223> OTHER INFORMATION: Antibody light chain

<400> SEQUENCE: 111

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Val Leu Asn Ser
            20                  25                  30

Gly Asn Gln Lys Asn Tyr Leu Thr Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Gln Ser
                85                  90                  95

Asp Tyr Ser Tyr Pro Tyr Thr Phe Gly Gln Gly Thr Lys Leu Glu Ile
            100                 105                 110

Lys Arg Thr Val Ala Ala Pro Ser Val Phe Ile Phe Pro Pro Ser Asp
        115                 120                 125

Glu Gln Leu Lys Ser Gly Thr Ala Ser Val Val Cys Leu Leu Asn Asn
    130                 135                 140

Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
            180                 185                 190

Glu Lys His Lys Val Tyr Ala Cys Glu Val Thr His Gln Gly Leu Ser
        195                 200                 205

Ser Pro Val Thr Lys Ser Phe Asn Arg Gly Glu Cys
    210                 215                 220

<210> SEQ ID NO 112
<211> LENGTH: 446
<212> TYPE: PRT
<213> ORGANISM: Artificial Sequence
<220> FEATURE:
<223> OTHER INFORMATION: Antibody heavy chain
```

<400> SEQUENCE: 112

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Asn Ser Gln Gly Lys Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Trp Gly Asp Glu Gly Phe Asp Ile Trp Gly Gln Gly Thr Leu
            100                 105                 110

Val Thr Val Ser Ser Ala Ser Thr Lys Gly Pro Ser Val Phe Pro Leu
        115                 120                 125

Ala Pro Ser Ser Lys Ser Thr Ser Gly Gly Thr Ala Ala Leu Gly Cys
    130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
            180                 185                 190

Leu Gly Thr Gln Thr Tyr Ile Cys Asn Val Asn His Lys Pro Ser Asn
        195                 200                 205

Thr Lys Val Asp Lys Arg Val Glu Pro Lys Ser Cys Asp Lys Thr His
    210                 215                 220

Thr Cys Pro Pro Cys Pro Ala Pro Glu Leu Leu Gly Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser His Glu Asp Pro Glu
            260                 265                 270

Val Lys Phe Asn Trp Tyr Val Asp Gly Val Glu Val His Asn Ala Lys
        275                 280                 285

Thr Lys Pro Arg Glu Glu Gln Tyr Asn Ser Thr Tyr Arg Val Val Ser
    290                 295                 300

Val Leu Thr Val Leu His Gln Asp Trp Leu Asn Gly Lys Glu Tyr Lys
305                 310                 315                 320

Cys Lys Val Ser Asn Lys Ala Leu Pro Ala Pro Ile Glu Lys Thr Ile
                325                 330                 335

Ser Lys Ala Lys Gly Gln Pro Arg Glu Pro Gln Val Tyr Thr Leu Pro
            340                 345                 350

Pro Ser Arg Glu Glu Met Thr Lys Asn Gln Val Ser Leu Thr Cys Leu
        355                 360                 365

Val Lys Gly Phe Tyr Pro Ser Asp Ile Ala Val Glu Trp Glu Ser Asn
    370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Lys Leu Thr Val Asp Lys Ser Arg

```
                    405                 410                 415
Trp Gln Gln Gly Asn Val Phe Ser Cys Ser Val Met His Glu Ala Leu
            420                 425                 430
His Asn His Tyr Thr Gln Lys Ser Leu Ser Leu Ser Pro Gly
            435                 440                 445
```

<210> SEQ ID NO 113
<211> LENGTH: 214
<212> TYPE: PRT
<213> ORGANISM: Artificial Sequence
<220> FEATURE:
<223> OTHER INFORMATION: Antibody light chain

<400> SEQUENCE: 113

```
Asp Ile Gln Met Thr Gln Ser Pro Ser Ser Leu Ser Ala Ser Val Gly
1               5                   10                  15
Asp Arg Val Thr Ile Thr Cys Arg Ala Ser Gln Gly Ile Ser Asn Trp
            20                  25                  30
Leu Ala Trp Tyr Gln Gln Lys Pro Gly Lys Ala Pro Lys Leu Leu Ile
        35                  40                  45
Tyr Gly Ala Ser Ser Leu Gln Ser Gly Val Pro Ser Arg Phe Ser Gly
    50                  55                  60
Ser Gly Ser Gly Thr Asp Phe Thr Leu Thr Ile Ser Ser Leu Gln Pro
65                  70                  75                  80
Glu Asp Phe Ala Thr Tyr Tyr Cys Gln Gln Tyr Ser Ser Phe Pro Thr
                85                  90                  95
Thr Phe Gly Gln Gly Thr Lys Val Glu Ile Lys Arg Thr Val Ala Ala
            100                 105                 110
Pro Ser Val Phe Ile Phe Pro Pro Ser Asp Glu Gln Leu Lys Ser Gly
        115                 120                 125
Thr Ala Ser Val Val Cys Leu Leu Asn Asn Phe Tyr Pro Arg Glu Ala
    130                 135                 140
Lys Val Gln Trp Lys Val Asp Asn Ala Leu Gln Ser Gly Asn Ser Gln
145                 150                 155                 160
Glu Ser Val Thr Glu Gln Asp Ser Lys Asp Ser Thr Tyr Ser Leu Ser
                165                 170                 175
Ser Thr Leu Thr Leu Ser Lys Ala Asp Tyr Glu Lys His Lys Val Tyr
            180                 185                 190
Ala Cys Glu Val Thr His Gln Gly Leu Ser Ser Pro Val Thr Lys Ser
        195                 200                 205
Phe Asn Arg Gly Glu Cys
    210
```

<210> SEQ ID NO 114
<211> LENGTH: 25
<212> TYPE: DNA
<213> ORGANISM: Artificial Sequence
<220> FEATURE:
<223> OTHER INFORMATION: Morpholino

<400> SEQUENCE: 114
cgtcacaggc aggacccact gccca                                  25

<210> SEQ ID NO 115
<211> LENGTH: 1342
<212> TYPE: PRT
<213> ORGANISM: Homo sapiens

<400> SEQUENCE: 115

```
Met Arg Ala Asn Asp Ala Leu Gln Val Leu Gly Leu Phe Ser Leu
1               5                   10                  15

Ala Arg Gly Ser Glu Val Gly Asn Ser Gln Ala Val Cys Pro Gly Thr
            20                  25                  30

Leu Asn Gly Leu Ser Val Thr Gly Asp Ala Glu Asn Gln Tyr Gln Thr
            35                  40                  45

Leu Tyr Lys Leu Tyr Glu Arg Cys Glu Val Val Met Gly Asn Leu Glu
        50                  55                  60

Ile Val Leu Thr Gly His Asn Ala Asp Leu Ser Phe Leu Gln Trp Ile
65                  70                  75                  80

Arg Glu Val Thr Gly Tyr Val Leu Val Ala Met Asn Glu Phe Ser Thr
                85                  90                  95

Leu Pro Leu Pro Asn Leu Arg Val Val Arg Gly Thr Gln Val Tyr Asp
                100                 105                 110

Gly Lys Phe Ala Ile Phe Val Met Leu Asn Tyr Asn Thr Asn Ser Ser
            115                 120                 125

His Ala Leu Arg Gln Leu Arg Leu Thr Gln Leu Thr Glu Ile Leu Ser
            130                 135                 140

Gly Gly Val Tyr Ile Glu Lys Asn Asp Lys Leu Cys His Met Asp Thr
145                 150                 155                 160

Ile Asp Trp Arg Asp Ile Val Arg Asp Arg Asp Ala Glu Ile Val Val
                165                 170                 175

Lys Asp Asn Gly Arg Ser Cys Pro Pro Cys His Glu Val Cys Lys Gly
            180                 185                 190

Arg Cys Trp Gly Pro Gly Ser Glu Asp Cys Gln Thr Leu Thr Lys Thr
            195                 200                 205

Ile Cys Ala Pro Gln Cys Asn Gly His Cys Phe Gly Pro Asn Pro Asn
210                 215                 220

Gln Cys Cys His Asp Glu Cys Ala Gly Gly Cys Ser Gly Pro Gln Asp
225                 230                 235                 240

Thr Asp Cys Phe Ala Cys Arg His Phe Asn Asp Ser Gly Ala Cys Val
            245                 250                 255

Pro Arg Cys Pro Gln Pro Leu Val Tyr Asn Lys Leu Thr Phe Gln Leu
            260                 265                 270

Glu Pro Asn Pro His Thr Lys Tyr Gln Tyr Gly Gly Val Cys Val Ala
            275                 280                 285

Ser Cys Pro His Asn Phe Val Val Asp Gln Thr Ser Cys Val Arg Ala
            290                 295                 300

Cys Pro Pro Asp Lys Met Glu Val Asp Lys Asn Gly Leu Lys Met Cys
305                 310                 315                 320

Glu Pro Cys Gly Gly Leu Cys Pro Lys Ala Cys Glu Gly Thr Gly Ser
            325                 330                 335

Gly Ser Arg Phe Gln Thr Val Asp Ser Ser Asn Ile Asp Gly Phe Val
            340                 345                 350

Asn Cys Thr Lys Ile Leu Gly Asn Leu Asp Phe Leu Ile Thr Gly Leu
            355                 360                 365

Asn Gly Asp Pro Trp His Lys Ile Pro Ala Leu Asp Pro Glu Lys Leu
            370                 375                 380

Asn Val Phe Arg Thr Val Arg Glu Ile Thr Gly Tyr Leu Asn Ile Gln
385                 390                 395                 400

Ser Trp Pro Pro His Met His Asn Phe Ser Val Phe Ser Asn Leu Thr
                405                 410                 415
```

-continued

```
Thr Ile Gly Gly Arg Ser Leu Tyr Asn Arg Gly Phe Ser Leu Leu Ile
            420                 425                 430

Met Lys Asn Leu Asn Val Thr Ser Leu Gly Phe Arg Ser Leu Lys Glu
        435                 440                 445

Ile Ser Ala Gly Arg Ile Tyr Ile Ser Ala Asn Arg Gln Leu Cys Tyr
    450                 455                 460

His His Ser Leu Asn Trp Thr Lys Val Leu Arg Gly Pro Thr Glu Glu
465                 470                 475                 480

Arg Leu Asp Ile Lys His Asn Arg Pro Arg Asp Cys Val Ala Glu
            485                 490                 495

Gly Lys Val Cys Asp Pro Leu Cys Ser Ser Gly Gly Cys Trp Gly Pro
            500                 505                 510

Gly Pro Gly Gln Cys Leu Ser Cys Arg Asn Tyr Ser Arg Gly Gly Val
            515                 520                 525

Cys Val Thr His Cys Asn Phe Leu Asn Gly Glu Pro Arg Glu Phe Ala
            530                 535                 540

His Glu Ala Glu Cys Phe Ser Cys His Pro Glu Cys Gln Pro Met Glu
545                 550                 555                 560

Gly Thr Ala Thr Cys Asn Gly Ser Gly Ser Asp Thr Cys Ala Gln Cys
            565                 570                 575

Ala His Phe Arg Asp Gly Pro His Cys Val Ser Ser Cys Pro His Gly
            580                 585                 590

Val Leu Gly Ala Lys Gly Pro Ile Tyr Lys Tyr Pro Asp Val Gln Asn
            595                 600                 605

Glu Cys Arg Pro Cys His Glu Asn Cys Thr Gln Gly Cys Lys Gly Pro
610                 615                 620

Glu Leu Gln Asp Cys Leu Gly Gln Thr Leu Val Leu Ile Gly Lys Thr
625                 630                 635                 640

His Leu Thr Met Ala Leu Thr Val Ile Ala Gly Leu Val Val Ile Phe
            645                 650                 655

Met Met Leu Gly Gly Thr Phe Leu Tyr Trp Arg Gly Arg Arg Ile Gln
            660                 665                 670

Asn Lys Arg Ala Met Arg Arg Tyr Leu Glu Arg Gly Glu Ser Ile Glu
            675                 680                 685

Pro Leu Asp Pro Ser Glu Lys Ala Asn Lys Val Leu Ala Arg Ile Phe
690                 695                 700

Lys Glu Thr Glu Leu Arg Lys Leu Lys Val Leu Gly Ser Gly Val Phe
705                 710                 715                 720

Gly Thr Val His Lys Gly Val Trp Ile Pro Glu Gly Glu Ser Ile Lys
            725                 730                 735

Ile Pro Val Cys Ile Lys Val Ile Glu Asp Lys Ser Gly Arg Gln Ser
            740                 745                 750

Phe Gln Ala Val Thr Asp His Met Leu Ala Ile Gly Ser Leu Asp His
            755                 760                 765

Ala His Ile Val Arg Leu Leu Gly Leu Cys Pro Gly Ser Ser Leu Gln
            770                 775                 780

Leu Val Thr Gln Tyr Leu Pro Leu Gly Ser Leu Leu Asp His Val Arg
785                 790                 795                 800

Gln His Arg Gly Ala Leu Gly Pro Gln Leu Leu Leu Asn Trp Gly Val
            805                 810                 815

Gln Ile Ala Lys Gly Met Tyr Tyr Leu Glu Glu His Gly Met Val His
            820                 825                 830

Arg Asn Leu Ala Ala Arg Asn Val Leu Leu Lys Ser Pro Ser Gln Val
```

```
               835                 840                 845
Gln Val Ala Asp Phe Gly Val Ala Asp Leu Leu Pro Pro Asp Asp Lys
850                 855                 860
Gln Leu Leu Tyr Ser Glu Ala Lys Thr Pro Ile Lys Trp Met Ala Leu
865                 870                 875                 880
Glu Ser Ile His Phe Gly Lys Tyr Thr His Gln Ser Asp Val Trp Ser
                    885                 890                 895
Tyr Gly Val Thr Val Trp Glu Leu Met Thr Phe Gly Ala Glu Pro Tyr
                900                 905                 910
Ala Gly Leu Arg Leu Ala Glu Val Pro Asp Leu Leu Glu Lys Gly Glu
                915                 920                 925
Arg Leu Ala Gln Pro Gln Ile Cys Thr Ile Asp Val Tyr Met Val Met
                930                 935                 940
Val Lys Cys Trp Met Ile Asp Glu Asn Ile Arg Pro Thr Phe Lys Glu
945                 950                 955                 960
Leu Ala Asn Glu Phe Thr Arg Met Ala Arg Asp Pro Pro Arg Tyr Leu
                965                 970                 975
Val Ile Lys Arg Glu Ser Gly Pro Gly Ile Ala Pro Gly Pro Glu Pro
                980                 985                 990
His Gly Leu Thr Asn Lys Lys Leu Glu Glu Val Glu Leu Glu Pro Glu
                995                1000                1005
Leu Asp Leu Asp Leu Asp Leu Glu Ala Glu Glu Asp Asn Leu Ala
                1010                1015                1020
Thr Thr Thr Leu Gly Ser Ala Leu Ser Leu Pro Val Gly Thr Leu
                1025                1030                1035
Asn Arg Pro Arg Gly Ser Gln Ser Leu Leu Ser Pro Ser Ser Gly
                1040                1045                1050
Tyr Met Pro Met Asn Gln Gly Asn Leu Gly Glu Ser Cys Gln Glu
                1055                1060                1065
Ser Ala Val Ser Gly Ser Ser Glu Arg Cys Pro Arg Pro Val Ser
                1070                1075                1080
Leu His Pro Met Pro Arg Gly Cys Leu Ala Ser Glu Ser Ser Glu
                1085                1090                1095
Gly His Val Thr Gly Ser Glu Ala Glu Leu Gln Glu Lys Val Ser
                1100                1105                1110
Met Cys Arg Ser Arg Ser Arg Ser Arg Ser Pro Arg Pro Arg Gly
                1115                1120                1125
Asp Ser Ala Tyr His Ser Gln Arg His Ser Leu Leu Thr Pro Val
                1130                1135                1140
Thr Pro Leu Ser Pro Pro Gly Leu Glu Glu Glu Asp Val Asn Gly
                1145                1150                1155
Tyr Val Met Pro Asp Thr His Leu Lys Gly Thr Pro Ser Ser Arg
                1160                1165                1170
Glu Gly Thr Leu Ser Ser Val Gly Leu Ser Ser Val Leu Gly Thr
                1175                1180                1185
Glu Glu Glu Asp Glu Asp Glu Glu Tyr Glu Tyr Met Asn Arg Arg
                1190                1195                1200
Arg Arg His Ser Pro Pro His Pro Pro Arg Pro Ser Ser Leu Glu
                1205                1210                1215
Glu Leu Gly Tyr Glu Tyr Met Asp Val Gly Ser Asp Leu Ser Ala
                1220                1225                1230
Ser Leu Gly Ser Thr Gln Ser Cys Pro Leu His Pro Val Pro Ile
                1235                1240                1245
```

```
Met Pro Thr Ala Gly Thr Thr Pro Asp Glu Asp Tyr Glu Tyr Met
    1250                1255                1260

Asn Arg Gln Arg Asp Gly Gly Pro Gly Gly Asp Tyr Ala Ala
1265                1270                1275

Met Gly Ala Cys Pro Ala Ser Glu Gln Gly Tyr Glu Glu Met Arg
    1280                1285                1290

Ala Phe Gln Gly Pro Gly His Gln Ala Pro His Val His Tyr Ala
    1295                1300                1305

Arg Leu Lys Thr Leu Arg Ser Leu Glu Ala Thr Asp Ser Ala Phe
    1310                1315                1320

Asp Asn Pro Asp Tyr Trp His Ser Arg Leu Phe Pro Lys Ala Asn
    1325                1330                1335

Ala Gln Arg Thr
    1340

<210> SEQ ID NO 116
<211> LENGTH: 345
<212> TYPE: PRT
<213> ORGANISM: Artificial Sequence
<220> FEATURE:
<223> OTHER INFORMATION: Fusion protein

<400> SEQUENCE: 116

Glu Glu Glu Leu Gln Val Ile Gln Pro Asp Lys Ser Val Ser Val Ala
1               5                   10                  15

Ala Gly Glu Ser Ala Ile Leu His Cys Thr Val Thr Ser Leu Ile Pro
                20                  25                  30

Val Gly Pro Ile Gln Trp Phe Arg Gly Ala Gly Pro Ala Arg Glu Leu
            35                  40                  45

Ile Tyr Asn Gln Lys Glu Gly His Phe Pro Arg Val Thr Thr Val Ser
50                  55                  60

Glu Ser Thr Lys Arg Glu Asn Met Asp Phe Ser Ile Ser Ile Ser Asn
65                  70                  75                  80

Ile Thr Pro Ala Asp Ala Gly Thr Tyr Tyr Cys Val Lys Phe Arg Lys
                85                  90                  95

Gly Ser Pro Asp Thr Glu Phe Lys Ser Gly Ala Gly Thr Glu Leu Ser
                100                 105                 110

Val Arg Ala Lys Pro Ser Asp Lys Thr His Thr Cys Pro Pro Cys Pro
            115                 120                 125

Ala Pro Glu Leu Leu Gly Gly Pro Ser Val Phe Leu Phe Pro Pro Lys
    130                 135                 140

Pro Lys Asp Thr Leu Met Ile Ser Arg Thr Pro Glu Val Thr Cys Val
145                 150                 155                 160

Val Val Asp Val Ser His Glu Asp Pro Glu Val Lys Phe Asn Trp Tyr
                165                 170                 175

Val Asp Gly Val Glu Val His Asn Ala Lys Thr Lys Pro Arg Glu Glu
            180                 185                 190

Gln Tyr Asn Ser Thr Tyr Arg Val Val Ser Val Leu Thr Val Leu His
        195                 200                 205

Gln Asp Trp Leu Asn Gly Lys Glu Tyr Lys Cys Lys Val Ser Asn Lys
    210                 215                 220

Ala Leu Pro Ala Pro Ile Glu Lys Thr Ile Ser Lys Ala Lys Gly Gln
225                 230                 235                 240

Pro Arg Glu Pro Gln Val Tyr Thr Leu Pro Pro Ser Arg Asp Glu Leu
                245                 250                 255
```

Thr Lys Asn Gln Val Ser Leu Thr Cys Leu Val Lys Gly Phe Tyr Pro
                260                 265                 270

Ser Asp Ile Ala Val Glu Trp Glu Ser Asn Gly Gln Pro Glu Asn Asn
            275                 280                 285

Tyr Lys Thr Thr Pro Pro Val Leu Asp Ser Asp Gly Ser Phe Phe Leu
        290                 295                 300

Tyr Ser Lys Leu Thr Val Asp Lys Ser Arg Trp Gln Gln Gly Asn Val
305                 310                 315                 320

Phe Ser Cys Ser Val Met His Glu Ala Leu His Asn His Tyr Thr Gln
                325                 330                 335

Lys Ser Leu Ser Leu Ser Pro Gly Lys
                340                 345

<210> SEQ ID NO 117
<211> LENGTH: 345
<212> TYPE: PRT
<213> ORGANISM: Artificial Sequence
<220> FEATURE:
<223> OTHER INFORMATION: Fusion protein

<400> SEQUENCE: 117

Glu Glu Glu Leu Gln Val Ile Gln Pro Asp Lys Ser Val Ser Val Ala
1               5                   10                  15

Ala Gly Glu Ser Ala Ile Leu His Cys Thr Val Thr Ser Leu Ile Pro
            20                  25                  30

Val Gly Pro Ile Gln Trp Phe Arg Gly Ala Gly Pro Ala Arg Glu Leu
        35                  40                  45

Ile Tyr Asn Gln Lys Glu Gly His Phe Pro Arg Val Thr Thr Val Ser
50                  55                  60

Glu Ser Thr Lys Arg Glu Asn Met Asp Phe Ser Ile Ser Ile Ser Asn
65                  70                  75                  80

Ile Thr Pro Ala Asp Ala Gly Thr Tyr Tyr Cys Val Lys Phe Arg Lys
                85                  90                  95

Gly Ser Pro Asp Thr Glu Phe Lys Ser Gly Ala Gly Thr Glu Leu Ser
            100                 105                 110

Val Arg Ala Lys Pro Ser Asp Lys Thr His Thr Cys Pro Pro Cys Pro
        115                 120                 125

Ala Pro Glu Leu Leu Gly Gly Pro Ser Val Phe Leu Phe Pro Pro Lys
    130                 135                 140

Pro Lys Asp Thr Leu Met Ile Ser Arg Thr Pro Glu Val Thr Cys Val
145                 150                 155                 160

Val Val Asp Val Ser His Glu Asp Pro Glu Val Lys Phe Asn Trp Tyr
                165                 170                 175

Val Asp Gly Val Glu Val His Asn Ala Lys Thr Lys Pro Arg Glu Glu
            180                 185                 190

Gln Tyr Asn Ser Thr Tyr Arg Val Val Ser Val Leu Thr Val Leu His
        195                 200                 205

Gln Asp Trp Leu Asn Gly Lys Glu Tyr Lys Cys Lys Val Ser Asn Lys
    210                 215                 220

Ala Leu Pro Ala Pro Ile Glu Lys Thr Ile Ser Lys Ala Lys Gly Gln
225                 230                 235                 240

Pro Arg Glu Pro Gln Val Tyr Thr Leu Pro Pro Ser Arg Asp Glu Leu
                245                 250                 255

Thr Lys Asn Gln Val Ser Leu Thr Cys Leu Val Lys Gly Phe Tyr Pro
            260                 265                 270

```
Ser Asp Ile Ala Val Glu Trp Glu Ser Asn Gly Gln Pro Glu Asn Asn
        275                 280                 285

Tyr Lys Thr Thr Pro Pro Val Leu Asp Ser Asp Gly Ser Phe Phe Leu
    290                 295                 300

Tyr Ser Lys Leu Thr Val Asp Lys Ser Arg Trp Gln Gln Gly Asn Val
305                 310                 315                 320

Phe Ser Cys Ser Val Met His Glu Ala Leu His Asn His Tyr Thr Gln
                325                 330                 335

Lys Ser Leu Ser Leu Ser Pro Gly Lys
                340                 345

<210> SEQ ID NO 118
<211> LENGTH: 347
<212> TYPE: PRT
<213> ORGANISM: Artificial Sequence
<220> FEATURE:
<223> OTHER INFORMATION: Fusion protein

<400> SEQUENCE: 118

Glu Glu Glu Leu Gln Val Ile Gln Pro Asp Lys Ser Val Ser Val Ala
1               5                   10                  15

Ala Gly Glu Ser Ala Ile Leu His Cys Thr Val Thr Ser Leu Ile Pro
                20                  25                  30

Val Gly Pro Ile Gln Trp Phe Arg Gly Ala Gly Pro Ala Arg Glu Leu
            35                  40                  45

Ile Tyr Asn Gln Lys Glu Gly His Phe Pro Arg Val Thr Thr Val Ser
    50                  55                  60

Glu Ser Thr Lys Arg Glu Asn Met Asp Phe Ser Ile Ser Ile Ser Asn
65                  70                  75                  80

Ile Thr Pro Ala Asp Ala Gly Thr Tyr Tyr Cys Val Lys Phe Arg Lys
                85                  90                  95

Gly Ser Pro Asp Thr Glu Phe Lys Ser Gly Ala Gly Thr Glu Leu Ser
            100                 105                 110

Val Arg Ala Lys Pro Ser Glu Ser Lys Tyr Gly Pro Pro Cys Pro Pro
        115                 120                 125

Cys Pro Ala Pro Glu Phe Leu Gly Gly Pro Ser Val Phe Leu Phe Pro
    130                 135                 140

Pro Lys Pro Lys Asp Thr Leu Met Ile Ser Arg Thr Pro Glu Val Thr
145                 150                 155                 160

Cys Val Val Val Asp Val Ser Gln Glu Asp Pro Glu Val Gln Phe Asn
                165                 170                 175

Trp Tyr Val Asp Gly Val Glu Val His Asn Ala Lys Thr Lys Pro Arg
            180                 185                 190

Glu Glu Gln Phe Asn Ser Thr Tyr Arg Val Val Ser Val Leu Thr Val
        195                 200                 205

Leu His Gln Asp Trp Leu Asn Gly Lys Glu Tyr Lys Cys Lys Val Ser
    210                 215                 220

Asn Lys Gly Leu Pro Ser Ser Ile Glu Lys Thr Ile Ser Lys Ala Lys
225                 230                 235                 240

Gly Gln Pro Arg Glu Pro Gln Val Tyr Thr Leu Pro Pro Ser Gln Glu
                245                 250                 255

Glu Met Thr Lys Asn Gln Val Ser Leu Thr Cys Leu Val Lys Gly Phe
            260                 265                 270

Tyr Pro Ser Asp Ile Ala Val Glu Trp Glu Ser Asn Gly Gln Pro Glu
        275                 280                 285
```

```
Asn Asn Tyr Lys Thr Thr Pro Pro Val Leu Asp Ser Asp Gly Ser Phe
            290                 295                 300

Phe Leu Tyr Ser Arg Leu Thr Val Asp Lys Ser Arg Trp Gln Glu Gly
305                 310                 315                 320

Asn Val Phe Ser Cys Ser Val Met His Glu Ala Leu His Asn His Tyr
                325                 330                 335

Thr Gln Lys Ser Leu Ser Leu Ser Leu Gly Lys
            340                 345

<210> SEQ ID NO 119
<211> LENGTH: 119
<212> TYPE: PRT
<213> ORGANISM: Artificial Sequence
<220> FEATURE:
<223> OTHER INFORMATION: Heavy chain variable region

<400> SEQUENCE: 119

Glu Val Gln Leu Val Glu Ser Gly Gly Gly Val Val Gln Pro Gly Arg
1               5                   10                  15

Ser Leu Arg Leu Ser Cys Ser Ser Gly Phe Thr Phe Ser Asp Tyr
            20                  25                  30

Tyr Met Tyr Trp Val Arg Gln Ala Pro Gly Lys Gly Leu Glu Trp Val
            35                  40                  45

Ala Tyr Met Ser Asn Val Gly Ala Ile Thr Asp Tyr Pro Asp Thr Val
        50                  55                  60

Lys Gly Arg Phe Thr Ile Ser Arg Asp Asn Ser Lys Asn Thr Leu Phe
65                  70                  75                  80

Leu Gln Met Asp Ser Leu Arg Pro Glu Asp Thr Gly Val Tyr Phe Cys
                85                  90                  95

Ala Arg Gly Thr Arg Asp Gly Ser Trp Phe Ala Tyr Trp Gly Gln Gly
            100                 105                 110

Thr Pro Val Thr Val Ser Ser
        115

<210> SEQ ID NO 120
<211> LENGTH: 119
<212> TYPE: PRT
<213> ORGANISM: Artificial Sequence
<220> FEATURE:
<223> OTHER INFORMATION: Heavy chain variable region

<400> SEQUENCE: 120

Glu Val Gln Leu Val Glu Ser Gly Gly Gly Val Val Gln Pro Gly Arg
1               5                   10                  15

Ser Leu Arg Leu Ser Cys Ser Thr Ser Gly Phe Thr Phe Ser Asp Tyr
            20                  25                  30

Tyr Met Tyr Trp Val Arg Gln Ala Pro Gly Lys Gly Leu Glu Trp Val
            35                  40                  45

Ala Tyr Met Ser Asn Val Gly Ala Ile Thr Asp Tyr Pro Asp Thr Val
        50                  55                  60

Lys Gly Arg Phe Thr Ile Ser Arg Asp Asn Ser Lys Asn Thr Leu Phe
65                  70                  75                  80

Leu Gln Met Asp Ser Leu Arg Pro Glu Asp Thr Gly Val Tyr Phe Cys
                85                  90                  95

Ala Arg Gly Thr Arg Asp Gly Ser Trp Phe Ala Tyr Trp Gly Gln Gly
            100                 105                 110

Thr Pro Val Thr Val Ser Ser
```

115

<210> SEQ ID NO 121
<211> LENGTH: 119
<212> TYPE: PRT
<213> ORGANISM: Artificial Sequence
<220> FEATURE:
<223> OTHER INFORMATION: Heavy chain variable region

<400> SEQUENCE: 121

Glu Val Gln Leu Val Glu Ser Gly Gly Gly Val Val Gln Pro Gly Arg
1               5                   10                  15

Ser Leu Arg Leu Ser Cys Ser Ser Gly Phe Thr Phe Ser Asp Tyr
            20                  25                  30

Tyr Met Tyr Trp Val Arg Gln Ala Pro Gly Lys Gly Leu Glu Trp Val
            35                  40                  45

Ala Tyr Met Ser Asn Val Gly Ala Ile Thr Asp Tyr Pro Asp Thr Val
            50                  55                  60

Lys Gly Arg Phe Thr Ile Ser Arg Asp Asn Ala Lys Asn Thr Leu Phe
65                  70                  75                  80

Leu Gln Met Asp Ser Leu Arg Pro Glu Asp Thr Gly Val Tyr Phe Cys
                85                  90                  95

Ala Arg Gly Thr Arg Asp Gly Ser Trp Phe Ala Tyr Trp Gly Gln Gly
            100                 105                 110

Thr Pro Val Thr Val Ser Ser
            115

<210> SEQ ID NO 122
<211> LENGTH: 119
<212> TYPE: PRT
<213> ORGANISM: Artificial Sequence
<220> FEATURE:
<223> OTHER INFORMATION: Heavy chain variable region

<400> SEQUENCE: 122

Glu Val Gln Leu Val Glu Ser Gly Gly Gly Val Val Gln Pro Gly Arg
1               5                   10                  15

Ser Leu Arg Leu Ser Cys Ser Ser Gly Phe Thr Phe Ser Asp Tyr
            20                  25                  30

Tyr Met Tyr Trp Val Arg Gln Ala Pro Gly Lys Gly Leu Glu Trp Val
            35                  40                  45

Ala Tyr Met Ser Asn Val Gly Ala Ile Thr Asp Tyr Pro Asp Thr Val
            50                  55                  60

Lys Gly Arg Phe Thr Ile Ser Arg Asp Asn Ala Lys Ser Thr Leu Phe
65                  70                  75                  80

Leu Gln Met Asp Ser Leu Arg Pro Glu Asp Thr Gly Val Tyr Phe Cys
                85                  90                  95

Ala Arg Gly Thr Arg Asp Gly Ser Trp Phe Ala Tyr Trp Gly Gln Gly
            100                 105                 110

Thr Pro Val Thr Val Ser Ser
            115

<210> SEQ ID NO 123
<211> LENGTH: 119
<212> TYPE: PRT
<213> ORGANISM: Artificial Sequence
<220> FEATURE:
<223> OTHER INFORMATION: Heavy chain variable region

<400> SEQUENCE: 123

Glu Val Gln Leu Val Glu Ser Gly Gly Val Val Gln Pro Gly Arg
1               5                   10                  15

Ser Leu Arg Leu Ser Cys Ser Ser Gly Phe Thr Phe Ser Asp Tyr
            20                  25                  30

Tyr Met Tyr Trp Val Arg Gln Ala Pro Gly Lys Gly Leu Glu Trp Val
        35                  40                  45

Ala Tyr Met Ser Asn Val Gly Ala Ile Thr Asp Tyr Pro Asp Thr Val
    50                  55                  60

Lys Gly Arg Phe Thr Ile Ser Arg Asp Asn Ala Lys Ser Thr Leu Tyr
65                  70                  75                  80

Leu Gln Met Asp Ser Leu Arg Pro Glu Asp Thr Gly Val Tyr Phe Cys
            85                  90                  95

Ala Arg Gly Thr Arg Asp Gly Ser Trp Phe Ala Tyr Trp Gly Gln Gly
            100                 105                 110

Thr Pro Val Thr Val Ser Ser
            115

<210> SEQ ID NO 124
<211> LENGTH: 112
<212> TYPE: PRT
<213> ORGANISM: Artificial Sequence
<220> FEATURE:
<223> OTHER INFORMATION: Light chain variable region

<400> SEQUENCE: 124

Asp Ile Gln Met Thr Gln Ser Pro Ser Ser Leu Ser Ala Ser Val Gly
1               5                   10                  15

Asp Arg Val Thr Ile Thr Cys Arg Ser Ser Gln Arg Ile Val His Ser
            20                  25                  30

Asn Gly Asn Thr Tyr Leu Glu Trp Tyr Gln Gln Thr Pro Gly Lys Ala
            35                  40                  45

Pro Lys Leu Leu Ile Tyr Lys Val Ser Asn Arg Phe Ser Gly Val Pro
    50                  55                  60

Ser Arg Phe Ser Gly Ser Gly Ser Gly Thr Asp Tyr Thr Phe Thr Ile
65                  70                  75                  80

Ser Ser Leu Gln Pro Glu Asp Ile Ala Thr Tyr Tyr Cys Phe Gln Gly
            85                  90                  95

Ser His Val Pro Phe Thr Phe Gly Gln Gly Thr Lys Leu Gln Ile Thr
            100                 105                 110

<210> SEQ ID NO 125
<211> LENGTH: 112
<212> TYPE: PRT
<213> ORGANISM: Artificial Sequence
<220> FEATURE:
<223> OTHER INFORMATION: Light chain variable region

<400> SEQUENCE: 125

Asp Ile Gln Met Thr Gln Ser Pro Ser Ser Leu Ser Ala Ser Val Gly
1               5                   10                  15

Asp Arg Val Thr Ile Thr Cys Arg Ser Ser Gln Arg Ile Val His Ser
            20                  25                  30

Asn Gly Asn Thr Tyr Leu Glu Trp Tyr Gln Gln Thr Pro Gly Lys Ala
            35                  40                  45

Pro Lys Leu Leu Ile Tyr Lys Val Ser Asn Arg Phe Ser Gly Val Pro
    50                  55                  60

Ser Arg Phe Ser Gly Ser Gly Ser Gly Thr Asp Phe Thr Phe Thr Ile

```
                65                  70                  75                  80
Ser Ser Leu Gln Pro Glu Asp Ile Ala Thr Tyr Tyr Cys Phe Gln Gly
                    85                  90                  95
Ser His Val Pro Phe Thr Phe Gly Gln Gly Thr Lys Leu Gln Ile Thr
                    100                 105                 110

<210> SEQ ID NO 126
<211> LENGTH: 10
<212> TYPE: PRT
<213> ORGANISM: Artificial Sequence
<220> FEATURE:
<223> OTHER INFORMATION: Heavy chain N-terminal region

<400> SEQUENCE: 126

Glu Val Gln Leu Val Glu Ser Gly Gly Gly
1               5                   10

<210> SEQ ID NO 127
<211> LENGTH: 5
<212> TYPE: PRT
<213> ORGANISM: Artificial Sequence
<220> FEATURE:
<223> OTHER INFORMATION: Heavy chain CDR1

<400> SEQUENCE: 127

Asp Tyr Tyr Met Tyr
1               5

<210> SEQ ID NO 128
<211> LENGTH: 17
<212> TYPE: PRT
<213> ORGANISM: Artificial Sequence
<220> FEATURE:
<223> OTHER INFORMATION: Heavy chain CDR2

<400> SEQUENCE: 128

Tyr Met Ser Asn Val Gly Ala Ile Thr Asp Tyr Pro Asp Thr Val Lys
1               5                   10                  15
Gly

<210> SEQ ID NO 129
<211> LENGTH: 10
<212> TYPE: PRT
<213> ORGANISM: Artificial Sequence
<220> FEATURE:
<223> OTHER INFORMATION: Heavy chain CDR3

<400> SEQUENCE: 129

Gly Thr Arg Asp Gly Ser Trp Phe Ala Tyr
1               5                   10

<210> SEQ ID NO 130
<211> LENGTH: 10
<212> TYPE: PRT
<213> ORGANISM: Artificial Sequence
<220> FEATURE:
<223> OTHER INFORMATION: Light chain N-terminal region

<400> SEQUENCE: 130

Asp Ile Gln Met Thr Gln Ser Pro Ser Ser
1               5                   10

<210> SEQ ID NO 131
<211> LENGTH: 16
<212> TYPE: PRT
```

```
<213> ORGANISM: Artificial Sequence
<220> FEATURE:
<223> OTHER INFORMATION: Light chain CDR1

<400> SEQUENCE: 131

Arg Ser Ser Gln Arg Ile Val His Ser Asn Gly Asn Thr Tyr Leu Glu
1               5                   10                  15

<210> SEQ ID NO 132
<211> LENGTH: 7
<212> TYPE: PRT
<213> ORGANISM: Artificial Sequence
<220> FEATURE:
<223> OTHER INFORMATION: Light chain CDR2

<400> SEQUENCE: 132

Lys Val Ser Asn Arg Phe Ser
1               5

<210> SEQ ID NO 133
<211> LENGTH: 9
<212> TYPE: PRT
<213> ORGANISM: Artificial Sequence
<220> FEATURE:
<223> OTHER INFORMATION: Light chain CDR3

<400> SEQUENCE: 133

Phe Gln Gly Ser His Val Pro Phe Thr
1               5

<210> SEQ ID NO 134
<211> LENGTH: 672
<212> TYPE: PRT
<213> ORGANISM: Artificial Sequence
<220> FEATURE:
<223> OTHER INFORMATION: Mutated and Conjugated Protein
<220> FEATURE:
<221> NAME/KEY: MISC_FEATURE
<222> LOCATION: (459)..(672)
<223> OTHER INFORMATION: Light Chain

<400> SEQUENCE: 134

Glu Val Gln Leu Gln Gln Ser Gly Pro Asp Leu Val Lys Pro Gly Ala
1               5                   10                  15

Ser Val Lys Ile Ser Cys Lys Ala Ser Gly Tyr Ser Phe Thr Gly Tyr
                20                  25                  30

Tyr Met His Trp Val Lys Gln Ser Pro Gly Lys Gly Leu Glu Trp Ile
            35                  40                  45

Gly Arg Ile Asn Pro Asn Asn Gly Val Thr Leu Tyr Asn Gln Lys Phe
        50                  55                  60

Lys Asp Lys Ala Thr Leu Thr Val Asp Lys Ser Ser Thr Thr Ala Tyr
65                  70                  75                  80

Met Glu Leu Arg Ser Leu Thr Ser Glu Asp Ser Ala Val Tyr Tyr Cys
                85                  90                  95

Ala Arg Ser Thr Met Ile Thr Asn Tyr Val Met Asp Tyr Trp Gly Gln
                100                 105                 110

Gly Thr Ser Val Thr Val Ser Ser Ala Lys Thr Thr Pro Pro Ser Val
            115                 120                 125

Tyr Pro Leu Ala Pro Gly Ser Ala Ala Gln Thr Asn Ser Met Val Thr
        130                 135                 140

Leu Gly Cys Leu Val Lys Gly Tyr Phe Pro Glu Pro Val Thr Val Thr
145                 150                 155                 160
```

```
Trp Asn Ser Gly Ser Leu Ser Ser Gly Val His Thr Phe Pro Ala Val
            165                 170                 175
Leu Gln Ser Asp Leu Tyr Thr Leu Ser Ser Val Thr Val Pro Ser Ser
        180                 185                 190
Ser Thr Trp Pro Ser Glu Thr Val Thr Cys Asn Val Ala His Pro Ala
    195                 200                 205
Ser Ser Thr Lys Val Asp Lys Lys Ile Val Pro Arg Asp Ser Gly Gly
210                 215                 220
Pro Ser Glu Lys Ser Glu Ile Asn Glu Lys Asp Leu Arg Lys Lys
225                 230                 235                 240
Ser Glu Leu Gln Gly Thr Ala Leu Gly Asn Leu Lys Gln Ile Tyr Tyr
                245                 250                 255
Tyr Asn Ser Lys Ala Ile Thr Ser Ser Glu Lys Ser Ala Asp Gln Phe
            260                 265                 270
Leu Thr Asn Thr Leu Leu Phe Lys Gly Phe Phe Thr Gly His Pro Trp
        275                 280                 285
Tyr Asn Asp Leu Leu Val Asp Leu Gly Ser Thr Ala Ala Thr Ser Glu
    290                 295                 300
Tyr Glu Gly Ser Ser Val Asp Leu Tyr Gly Ala Tyr Tyr Gly Tyr Gln
305                 310                 315                 320
Cys Ala Gly Gly Thr Pro Asn Lys Thr Ala Cys Met Tyr Gly Val
                325                 330                 335
Thr Leu His Asp Asn Asn Arg Leu Thr Glu Glu Lys Lys Val Pro Ile
            340                 345                 350
Asn Leu Trp Ile Asp Gly Lys Gln Thr Thr Val Pro Ile Asp Lys Val
        355                 360                 365
Lys Thr Ser Lys Lys Glu Val Thr Val Gln Glu Leu Asp Leu Gln Ala
    370                 375                 380
Arg His Tyr Leu His Gly Lys Phe Gly Leu Tyr Asn Ser Asp Ser Phe
385                 390                 395                 400
Gly Gly Lys Val Gln Arg Gly Leu Ile Val Phe His Ser Ser Glu Gly
                405                 410                 415
Ser Thr Val Ser Tyr Asp Leu Phe Asp Ala Gln Gly Gln Tyr Pro Asp
            420                 425                 430
Thr Leu Leu Arg Ile Tyr Arg Asp Asn Thr Thr Ile Ser Ser Thr Ser
        435                 440                 445
Leu Ser Ile Ser Leu Tyr Leu Tyr Thr Thr Ser Ile Val Met Thr Gln
    450                 455                 460
Thr Pro Thr Ser Leu Leu Val Ser Ala Gly Asp Arg Val Thr Ile Thr
465                 470                 475                 480
Cys Lys Ala Ser Gln Ser Val Ser Asn Asp Val Ala Trp Tyr Gln Gln
                485                 490                 495
Lys Pro Gly Gln Ser Pro Lys Leu Leu Ile Ser Tyr Thr Ser Ser Arg
            500                 505                 510
Tyr Ala Gly Val Pro Asp Arg Phe Ser Gly Ser Gly Tyr Gly Thr Asp
        515                 520                 525
Phe Thr Leu Thr Ile Ser Ser Val Gln Ala Glu Asp Ala Ala Val Tyr
    530                 535                 540
Phe Cys Gln Gln Asp Tyr Asn Ser Pro Pro Thr Phe Gly Gly Gly Thr
545                 550                 555                 560
Lys Leu Glu Ile Lys Arg Ala Asp Ala Ala Pro Thr Val Ser Ile Phe
                565                 570                 575
Pro Pro Ser Ser Glu Gln Leu Thr Ser Gly Gly Ala Ser Val Val Cys
```

```
                    580                 585                 590
Phe Leu Asn Asn Phe Tyr Pro Lys Asp Ile Asn Val Lys Trp Lys Ile
            595                 600                 605

Asp Gly Ser Glu Arg Gln Asn Gly Val Leu Asn Ser Trp Thr Asp Gln
610                 615                 620

Asp Ser Lys Asp Ser Thr Tyr Ser Met Ser Ser Thr Leu Thr Leu Thr
625                 630                 635                 640

Lys Asp Glu Tyr Glu Arg His Asn Ser Tyr Thr Cys Glu Ala Thr His
                645                 650                 655

Lys Thr Ser Thr Ser Pro Ile Val Lys Ser Phe Asn Arg Asn Glu Ser
            660                 665                 670

<210> SEQ ID NO 135
<211> LENGTH: 458
<212> TYPE: PRT
<213> ORGANISM: Artificial Sequence
<220> FEATURE:
<223> OTHER INFORMATION: Synthetic polypeptide

<400> SEQUENCE: 135

Glu Val Gln Leu Gln Gln Ser Gly Pro Asp Leu Val Lys Pro Gly Ala
1               5                   10                  15

Ser Val Lys Ile Ser Cys Lys Ala Ser Gly Tyr Ser Phe Thr Gly Tyr
                20                  25                  30

Tyr Met His Trp Val Lys Gln Ser Pro Gly Lys Gly Leu Glu Trp Ile
            35                  40                  45

Gly Arg Ile Asn Pro Asn Asn Gly Val Thr Leu Tyr Asn Gln Lys Phe
        50                  55                  60

Lys Asp Lys Ala Thr Leu Thr Val Asp Lys Ser Ser Thr Thr Ala Tyr
65                  70                  75                  80

Met Glu Leu Arg Ser Leu Thr Ser Glu Asp Ser Ala Val Tyr Tyr Cys
                85                  90                  95

Ala Arg Ser Thr Met Ile Thr Asn Tyr Val Met Asp Tyr Trp Gly Gln
            100                 105                 110

Gly Thr Ser Val Thr Val Ser Ser Ala Lys Thr Thr Pro Pro Ser Val
        115                 120                 125

Tyr Pro Leu Ala Pro Gly Ser Ala Ala Gln Thr Asn Ser Met Val Thr
    130                 135                 140

Leu Gly Cys Leu Val Lys Gly Tyr Phe Pro Glu Pro Val Thr Val Thr
145                 150                 155                 160

Trp Asn Ser Gly Ser Leu Ser Ser Gly Val His Thr Phe Pro Ala Val
                165                 170                 175

Leu Gln Ser Asp Leu Tyr Thr Leu Ser Ser Ser Val Thr Val Pro Ser
            180                 185                 190

Ser Thr Trp Pro Ser Glu Thr Val Thr Cys Asn Val Ala His Pro Ala
        195                 200                 205

Ser Ser Thr Lys Val Asp Lys Lys Ile Val Pro Arg Asp Ser Gly Gly
    210                 215                 220

Pro Ser Glu Lys Ser Glu Glu Ile Asn Glu Lys Asp Leu Arg Lys Lys
225                 230                 235                 240

Ser Glu Leu Gln Gly Thr Ala Leu Gly Asn Leu Lys Gln Ile Tyr Tyr
                245                 250                 255

Tyr Asn Ser Lys Ala Ile Thr Ser Ser Glu Lys Ser Ala Asp Gln Phe
            260                 265                 270

Leu Thr Asn Thr Leu Leu Phe Lys Gly Phe Phe Thr Gly His Pro Trp
```

```
                    275                 280                 285
Tyr Asn Asp Leu Leu Val Asp Leu Gly Ser Thr Ala Ala Thr Ser Glu
    290                 295                 300
Tyr Glu Gly Ser Ser Val Asp Leu Tyr Gly Ala Tyr Gly Tyr Gln
305                 310                 315                 320
Cys Ala Gly Gly Thr Pro Asn Lys Thr Ala Cys Met Tyr Gly Gly Val
                325                 330                 335
Thr Leu His Asp Asn Asn Arg Leu Thr Glu Glu Lys Lys Val Pro Ile
            340                 345                 350
Asn Leu Trp Ile Asp Gly Lys Gln Thr Thr Val Pro Ile Asp Lys Val
                355                 360                 365
Lys Thr Ser Lys Lys Glu Val Thr Val Gln Glu Leu Asp Leu Gln Ala
        370                 375                 380
Arg His Tyr Leu His Gly Lys Phe Gly Leu Tyr Asn Ser Asp Ser Phe
385                 390                 395                 400
Gly Gly Lys Val Gln Arg Gly Leu Ile Val Phe His Ser Ser Glu Gly
                405                 410                 415
Ser Thr Val Ser Tyr Asp Leu Phe Asp Ala Gln Gly Gln Tyr Pro Asp
                420                 425                 430
Thr Leu Leu Arg Ile Tyr Arg Asp Asn Thr Thr Ile Ser Ser Thr Ser
            435                 440                 445
Leu Ser Ile Ser Leu Tyr Leu Tyr Thr Thr
            450                 455

<210> SEQ ID NO 136
<211> LENGTH: 214
<212> TYPE: PRT
<213> ORGANISM: Artificial Sequence
<220> FEATURE:
<223> OTHER INFORMATION: Synthetic polypeptide

<400> SEQUENCE: 136

Ser Ile Val Met Thr Gln Thr Pro Thr Ser Leu Leu Val Ser Ala Gly
1               5                   10                  15
Asp Arg Val Thr Ile Thr Cys Lys Ala Ser Gln Ser Val Ser Asn Asp
            20                  25                  30
Val Ala Trp Tyr Gln Gln Lys Pro Gly Gln Ser Pro Lys Leu Leu Ile
        35                  40                  45
Ser Tyr Thr Ser Ser Arg Tyr Ala Gly Val Pro Asp Arg Phe Ser Gly
    50                  55                  60
Ser Gly Tyr Gly Thr Asp Phe Thr Leu Thr Ile Ser Ser Val Gln Ala
65                  70                  75                  80
Glu Asp Ala Ala Val Tyr Phe Cys Gln Gln Asp Tyr Asn Ser Pro Pro
                85                  90                  95
Thr Phe Gly Gly Gly Thr Lys Leu Glu Ile Lys Arg Ala Asp Ala Ala
            100                 105                 110
Pro Thr Val Ser Ile Phe Pro Pro Ser Ser Glu Gln Leu Thr Ser Gly
        115                 120                 125
Gly Ala Ser Val Val Cys Phe Leu Asn Asn Phe Tyr Pro Lys Asp Ile
    130                 135                 140
Asn Val Lys Trp Lys Ile Asp Gly Ser Glu Arg Gln Asn Gly Val Leu
145                 150                 155                 160
Asn Ser Trp Thr Asp Gln Asp Ser Lys Asp Ser Thr Tyr Ser Met Ser
                165                 170                 175
Ser Thr Leu Thr Leu Thr Lys Asp Glu Tyr Glu Arg His Asn Ser Tyr
```

```
                180               185                190
Thr Cys Glu Ala Thr His Lys Thr Ser Thr Ser Pro Ile Val Lys Ser
        195                 200                 205

Phe Asn Arg Asn Glu Ser
    210
```

<210> SEQ ID NO 137
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 137

```
Ala Cys Asp Pro His Ser Gly His Phe Val
1               5                   10
```

<210> SEQ ID NO 138
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 138

```
Ser Tyr Leu Asp Ser Gly Ile His Phe
1               5
```

<210> SEQ ID NO 139
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 139

```
Phe Pro Ser Asp Ser Trp Cys Tyr Phe
1               5
```

<210> SEQ ID NO 140
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 140

```
Glu Ala Asp Pro Thr Gly His Ser Tyr
1               5
```

<210> SEQ ID NO 141
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 141

```
Ser Leu Phe Arg Ala Val Ile Thr Lys
1               5
```

```
<210> SEQ ID NO 142
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 142

Tyr Leu Gln Leu Val Phe Gly Ile Glu Val
1               5                   10

<210> SEQ ID NO 143
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 143

Lys Met Val Glu Leu Val His Phe Leu
1               5

<210> SEQ ID NO 144
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 144

Glu Ala Asp Pro Ile Gly His Leu Tyr
1               5

<210> SEQ ID NO 145
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 145

Phe Leu Trp Gly Pro Arg Ala Leu Val
1               5

<210> SEQ ID NO 146
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 146

Ser Leu Leu Met Trp Ile Thr Gln Cys Phe Leu
1               5                   10

<210> SEQ ID NO 147
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 147
```

```
Gln Leu Ser Leu Leu Met Trp Ile Thr
1               5
```

<210> SEQ ID NO 148
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 148

```
Arg Met Phe Pro Asn Ala Pro Tyr Leu
1               5
```

<210> SEQ ID NO 149
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 149

```
Lys Leu Val Val Val Gly Ala Gly Gly Val
1               5                   10
```

<210> SEQ ID NO 150
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 150

```
Lys Leu Val Val Val Gly Ala Val Gly Val
1               5                   10
```

<210> SEQ ID NO 151
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 151

```
Lys Leu Val Val Val Gly Ala Cys Gly Val
1               5                   10
```

<210> SEQ ID NO 152
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 152

```
Lys Leu Val Val Val Gly Ala Asp Gly Val
1               5                   10
```

<210> SEQ ID NO 153
<211> LENGTH: 9
<212> TYPE: PRT
<213> ORGANISM: Artificial Sequence

```
<220> FEATURE:
<223> OTHER INFORMATION: Description of Artificial Sequence: Synthetic
      peptide

<400> SEQUENCE: 153

Val Val Gly Ala Val Gly Val Gly Lys
1               5

<210> SEQ ID NO 154
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 154

Val Val Gly Ala Cys Gly Val Gly Lys
1               5

<210> SEQ ID NO 155
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 155

Val Val Gly Ala Gly Gly Val Gly Lys
1               5

<210> SEQ ID NO 156
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 156

Lys Ile Thr Asp Phe Gly Leu Ala Lys
1               5

<210> SEQ ID NO 157
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 157

Val Leu Gln Glu Leu Asn Val Thr Val
1               5

<210> SEQ ID NO 158
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 158

Leu Leu Gly Arg Asn Ser Phe Glu Val
1               5
```

```
<210> SEQ ID NO 159
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 159

Ser Thr Thr Pro Pro Pro Gly Thr Arg Val
1               5                   10

<210> SEQ ID NO 160
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 160

Arg Met Pro Glu Ala Ala Pro Pro Val
1               5

<210> SEQ ID NO 161
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 161

Gly Leu Ala Pro Pro Gln His Leu Ile Arg Val
1               5                   10

<210> SEQ ID NO 162
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 162

Glu Leu Ala Gly Ile Gly Ile Leu Thr Val
1               5                   10

<210> SEQ ID NO 163
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 163

Glu Ala Ala Gly Ile Gly Ile Leu Thr Val
1               5                   10

<210> SEQ ID NO 164
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 164

Ile Met Asp Gln Val Pro Phe Ser Val
1               5

<210> SEQ ID NO 165
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 165

Lys Thr Trp Gly Gln Tyr Trp Gln Val
1               5

<210> SEQ ID NO 166
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 166

Tyr Leu Glu Pro Gly Pro Val Thr Val
1               5

<210> SEQ ID NO 167
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 167

Tyr Leu Glu Pro Gly Pro Val Thr Ala
1               5

<210> SEQ ID NO 168
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 168

Ile Thr Asp Gln Val Pro Phe Ser Val
1               5

<210> SEQ ID NO 169
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 169

Lys Ile Phe Gly Ser Leu Ala Phe Leu
1               5

<210> SEQ ID NO 170
<211> LENGTH: 9
<212> TYPE: PRT
```

```
<213> ORGANISM: Artificial Sequence
<220> FEATURE:
<223> OTHER INFORMATION: Description of Artificial Sequence: Synthetic
      peptide

<400> SEQUENCE: 170

Leu Leu Leu Thr Val Leu Thr Val Val
1               5

<210> SEQ ID NO 171
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 171

Phe Leu Arg Asn Phe Ser Leu Met Leu
1               5

<210> SEQ ID NO 172
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 172

Ala Leu Tyr Val Asp Ser Leu Phe Phe Leu
1               5                   10

<210> SEQ ID NO 173
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 173

Phe Leu Ser Glu Leu Thr Gln Gln Leu
1               5

<210> SEQ ID NO 174
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 174

Tyr Leu Leu Pro Ala Ile Val His Ile
1               5

<210> SEQ ID NO 175
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 175

Ile Leu Ala Lys Phe Leu His Trp Leu
1               5
```

```
<210> SEQ ID NO 176
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 176

Arg Leu Val Asp Asp Phe Leu Leu Val
1               5

<210> SEQ ID NO 177
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 177

Asp Tyr Ala Met His
1               5

<210> SEQ ID NO 178
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 178

Gly Ile Ser Trp Asn Ser Gly Ser Ile Gly Tyr Ala Asp Ser Val Lys
1               5                   10                  15

Gly

<210> SEQ ID NO 179
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 179

Gly Arg Gly Phe His Tyr Tyr Tyr Gly Met Asp Ile
1               5                   10

<210> SEQ ID NO 180
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 180

Gly Gly Asn Asn Ile Gly Ser Arg Ser Val His
1               5                   10

<210> SEQ ID NO 181
<211> LENGTH: 7
<212> TYPE: PRT
<213> ORGANISM: Artificial Sequence
<220> FEATURE:
```

```
<223> OTHER INFORMATION: Description of Artificial Sequence: Synthetic
      peptide

<400> SEQUENCE: 181

Asp Asp Ser Asp Arg Pro Ser
1               5

<210> SEQ ID NO 182
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 182

Gln Val Trp Asp Ser Arg Thr Asp His Trp Val
1               5                   10

<210> SEQ ID NO 183
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 183

Gly Val Leu Pro Ala Leu Pro Gln Val
1               5

<210> SEQ ID NO 184
<211> LENGTH: 9
<212> TYPE: PRT
<213> ORGANISM: Homo sapiens

<400> SEQUENCE: 184

Ser Leu Leu Met Trp Ile Thr Gln Val
1               5

<210> SEQ ID NO 185
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 185

Gly Phe Thr Phe Ser Thr Tyr
1               5

<210> SEQ ID NO 186
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 186

Ile Val Ser Ser Gly Gly Ser Thr
1               5

<210> SEQ ID NO 187
<211> LENGTH: 12
<212> TYPE: PRT
```

```
<213> ORGANISM: Artificial Sequence
<220> FEATURE:
<223> OTHER INFORMATION: Description of Artificial Sequence: Synthetic
      peptide

<400> SEQUENCE: 187

Ala Gly Glu Leu Leu Pro Tyr Tyr Gly Met Asp Val
1               5                   10

<210> SEQ ID NO 188
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 188

Glu Arg Asp Val Gly Gly Asn Tyr
1               5

<210> SEQ ID NO 189
<211> LENGTH: 3
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 189

Asp Val Ile
1

<210> SEQ ID NO 190
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 190

Trp Ser Phe Ala Gly Gly Tyr Tyr Val
1               5

<210> SEQ ID NO 191
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 191

Gly Phe Thr Phe Ser Thr Tyr
1               5

<210> SEQ ID NO 192
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 192

Ile Leu Ser Ser Gly Gly Glu Thr
1               5
```

<210> SEQ ID NO 193
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 193

Ala Gly Met Leu Leu Pro Tyr Tyr Gly Met Asp Val
1               5                   10

<210> SEQ ID NO 194
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 194

Glu Arg Asp Val Gly Gly Asn Tyr
1               5

<210> SEQ ID NO 195
<211> LENGTH: 3
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 195

Asp Val Ile
1

<210> SEQ ID NO 196
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 196

Trp Ser Phe Ala Gly Gly Tyr Tyr Val
1               5

<210> SEQ ID NO 197
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 197

Gly Phe Thr Phe Ser Thr Tyr
1               5

<210> SEQ ID NO 198
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 198

Ile Ala Ser Ser Gly Gly Glu Thr
1               5

<210> SEQ ID NO 199
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 199

Ala Gly Ser Leu Leu Pro Tyr Tyr Gly Met Asp Val
1               5                   10

<210> SEQ ID NO 200
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 200

Glu Arg Asp Val Gly Gly Asn Tyr
1               5

<210> SEQ ID NO 201
<211> LENGTH: 3
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 201

Asp Val Ile
1

<210> SEQ ID NO 202
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 202

Trp Ser Phe Ala Gly Gly Tyr Tyr Val
1               5

<210> SEQ ID NO 203
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 203

Tyr Met Asp Gly Thr Met Ser Gln Val
1               5

<210> SEQ ID NO 204
<211> LENGTH: 5

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 204

Ser Tyr Gly Val His
1               5

<210> SEQ ID NO 205
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 205

Val Ile Trp Ala Gly Gly Thr Thr Asn Tyr Asn Ser Ala Leu Met Ser
1               5                   10                  15

<210> SEQ ID NO 206
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 206

Asp Gly His Phe His Phe Asp Phe
1               5

<210> SEQ ID NO 207
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 207

Arg Ala Ser Asp Ile Ile Tyr Ser Asn Leu Ala
1               5                   10

<210> SEQ ID NO 208
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 208

Ala Ala Thr Asn Leu Ala Ala
1               5

<210> SEQ ID NO 209
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 209

Gln His Phe Trp Gly Ser Ser Ile Ser
```

```
1               5

<210> SEQ ID NO 210
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 210

Ser Tyr Asp Met Ser
1               5

<210> SEQ ID NO 211
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 211

Tyr Met Ser Ser Gly Gly Gly Thr Tyr Tyr Pro Asp Thr Val Lys Gly
1               5                   10                  15

<210> SEQ ID NO 212
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 212

His Asp Glu Ile Thr Asn Phe Asp Tyr
1               5

<210> SEQ ID NO 213
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 213

Arg Ala Ser Cys Ile Ser Ile Ser Asn Ser Leu His
1               5                   10

<210> SEQ ID NO 214
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 214

Tyr Ala Ser Cys Ile Ser Ile Ser
1               5

<210> SEQ ID NO 215
<211> LENGTH: 11
<212> TYPE: PRT
<223> OTHER INFORMATION: Description of Artificial Sequence: Synthetic
``` peptide

<400> SEQUENCE: 215

Cys Ile Cys Ile Ser Tyr Ser Trp Pro Leu Thr
1               5                   10

<210> SEQ ID NO 216
<211> LENGTH: 767
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 216

```
gcggcccagc cggccatggc cgagggcagc tggtggagtc tgggggaggc ttggtacagc      60
ctggcaggtc cctgagactc tcctgtgcag cctctggatt cacctttgat gattatgcca     120
tgcactgggt ccgcaagct ccagggaagg gcctggagtg gtctcaggt attagttgga       180
atagtggtag cataggctat gcggactctg tgaagggccg attcaccatc tccagagaca     240
acgccaagaa ctccctgtat ctgcaaatga acagtctgag agctgaggac acggctgtgt     300
attactgtgc gaggggtcgt ggattccact actactatta cggtatggac atctggggcc     360
aagggaccac ggtcaccgtc caagatctgg ctctacttcc ggtagcggca atcctctga     420
aggcaaaggt actagacagt ctgtgctgac cagccaccct cggtgtcagt ggccccagga     480
cagacggcca ggattacctg tgggggaaac aacattggaa gtagaagtgt gcactggtac     540
cagcagaagc caggccaggc ccctgtgctg gtcgtctatg atgatagcga ccggccctca     600
gggatccctg agcgattctc tggctccaac tctgggaaca tggccaccct gaccatcagc     660
agggtcgaag ccggggatga ggccgactat tactgtcagg tgtgggatag tcgtactgat     720
cattgggtgt tcggcggagg gaccaagctg accgtcctcg cggccgc                   767
```

<210> SEQ ID NO 217
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 217

Gly Val Tyr Asp Gly Arg Glu His Thr Val
1               5                   10

<210> SEQ ID NO 218
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 218

Gly Tyr Trp Ile Glu
1               5

<210> SEQ ID NO 219
<211> LENGTH: 17
<212> TYPE: PRT
<213> ORGANISM: Artificial Sequence
<220> FEATURE:
<223> OTHER INFORMATION: Description of Artificial Sequence: Synthetic -continued

```
      peptide

<400> SEQUENCE: 219

Glu Ile Leu Pro Gly Ser Gly Gly Thr Asn Tyr Asn Glu Lys Phe Lys
1               5                   10                  15

Gly

<210> SEQ ID NO 220
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 220

Asp Ser Asn Ser Phe Thr Tyr
1               5

<210> SEQ ID NO 221
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 221

Ser Val Ser Ser Ser Val Asp Tyr Ile His
1               5                   10

<210> SEQ ID NO 222
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 222

Ser Thr Ser Ile Leu Ala Ser
1               5

<210> SEQ ID NO 223
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 223

Gln Gln Arg Ser Ser Tyr Thr
1               5

<210> SEQ ID NO 224
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 224

Ala Leu Ser Val Met Gly Val Tyr Val
1               5
```

<210> SEQ ID NO 225
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 225

Phe Ser Ser Ser Trp Met Asn
1               5

<210> SEQ ID NO 226
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 226

Arg Ile Tyr Pro Gly Asp Gly Asp Thr Asn Tyr Asn Glu Lys Phe Lys
1               5                   10                  15

Gly

<210> SEQ ID NO 227
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 227

Glu Ala Thr Thr Val Val Ala Pro Tyr Tyr Phe Asp Tyr
1               5                   10

<210> SEQ ID NO 228
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 228

Arg Ala Ser Glu Asn Ile Tyr Arg Asn Leu Ala
1               5                   10

<210> SEQ ID NO 229
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 229

Ala Ala Thr Asn Leu Ala Asp
1               5

<210> SEQ ID NO 230
<211> LENGTH: 9
<212> TYPE: PRT
<213> ORGANISM: Artificial Sequence
<220> FEATURE:
<223> OTHER INFORMATION: Description of Artificial Sequence: Synthetic

```
                              peptide

<400> SEQUENCE: 230

Gln His Phe Trp Gly Thr Pro Leu Thr
1               5

<210> SEQ ID NO 231
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 231

Thr Leu Met Ser Ala Met Thr Asn Leu
1               5

<210> SEQ ID NO 232
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 232

Asp Tyr Asn Met Asp
1               5

<210> SEQ ID NO 233
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 233

Asp Ile Asn Pro Asn Tyr Asp Thr Thr Thr Tyr Asn Gln Lys Phe Lys
1               5                   10                  15

Gly

<210> SEQ ID NO 234
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 234

Arg Asn Tyr Gly Asn Tyr Val Gly Phe Asp Phe
1               5                   10

<210> SEQ ID NO 235
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 235

Lys Ala Ser Gln Arg Val Asn Asn Asp Val Ala
1               5                   10
```

```
<210> SEQ ID NO 236
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 236

Tyr Ala Ser Asn Arg Tyr Thr
1               5

<210> SEQ ID NO 237
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 237

Gln Gln Asp Tyr Ser Ser Pro Phe Thr
1               5

<210> SEQ ID NO 238
<211> LENGTH: 9
<212> TYPE: PRT
<213> ORGANISM: Homo sapiens

<400> SEQUENCE: 238

Ser Leu Leu Met Trp Ile Thr Gln Cys
1               5

<210> SEQ ID NO 239
<211> LENGTH: 7
<212> TYPE: PRT
<213> ORGANISM: Homo sapiens

<400> SEQUENCE: 239

Pro Asp Thr Arg Pro Ala Pro
1               5

<210> SEQ ID NO 240
<211> LENGTH: 9
<212> TYPE: PRT
<213> ORGANISM: Homo sapiens

<400> SEQUENCE: 240

Ser Thr Ala Pro Pro Val His Asn Val
1               5

<210> SEQ ID NO 241
<211> LENGTH: 5
<212> TYPE: PRT
<213> ORGANISM: Homo sapiens
<220> FEATURE:
<221> NAME/KEY: MOD_RES
<222> LOCATION: (3)..(3)
<223> OTHER INFORMATION: O-glycosylated with GalNAca1- or a similar
      short, non-sialylated glycan such as Galb1-3GalNAca1-(core-1))

<400> SEQUENCE: 241

Pro Asp Thr Arg Pro
1               5

<210> SEQ ID NO 242
```

```
<211> LENGTH: 6
<212> TYPE: PRT
<213> ORGANISM: Homo sapiens

<400> SEQUENCE: 242

Asp Thr Arg Pro Ala Pro
1               5

<210> SEQ ID NO 243
<211> LENGTH: 6
<212> TYPE: PRT
<213> ORGANISM: Homo sapiens

<400> SEQUENCE: 243

Asp Thr Arg Pro Ala Pro
1               5

<210> SEQ ID NO 244
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 244

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Thr Tyr
            20                  25                  30

Gln Met Ser Trp Val Arg Gln Ala Pro Gly Lys Gly Leu Glu Trp Val
        35                  40                  45

Ser Gly Ile Val Ser Ser Gly Gly Ser Thr Ala Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Gly Glu Leu Leu Pro Tyr Tyr Gly Met Asp Val Trp Gly Gln Gly
            100                 105                 110

Thr Thr Val Thr Val Ser Ser
        115

<210> SEQ ID NO 245
<211> LENGTH: 109
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 245

Gln Ser Glu Leu Thr Gln Pro Arg Ser Val Ser Gly Ser Pro Gly Gln
1               5                   10                  15

Ser Val Thr Ile Ser Cys Thr Gly Thr Glu Arg Asp Val Gly Gly Tyr
            20                  25                  30

Asn Tyr Val Ser Trp Tyr Gln Gln His Pro Gly Lys Ala Pro Lys Leu
        35                  40                  45

Ile Ile His Asp Val Ile Glu Arg Ser Ser Gly Val Pro Asp Arg Phe
    50                  55                  60

Ser Gly Ser Lys Ser Gly Asn Thr Ala Ser Leu Thr Ile Ser Gly Leu
```

-continued

```
                65                  70                  75                  80
Gln Ala Glu Asp Glu Ala Asp Tyr Tyr Cys Trp Ser Phe Ala Gly Gly
                        85                  90                  95

Tyr Tyr Val Phe Gly Thr Gly Thr Asp Val Thr Val Leu
                100                 105

<210> SEQ ID NO 246
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 246

Ala Ser Gly Pro Gly Gly Gly Ala Pro Arg
1               5                   10
```

RADIOCONJUGATES DIRECTED TO MHC-COMPLEXED ANTIGENS IN CANCER

CROSS-REFERENCE TO RELATED APPLICATIONS

This application claims the benefit of U.S. provisional application Ser. No. 63/147,700 filed Feb. 9, 2021 which is hereby incorporated by reference in its entirety.

SEQUENCE LISTING

The instant application contains a Sequence Listing which has been submitted electronically in ASCII format and is hereby incorporated by reference in its entirety. Said ASCII copy, created on Sep. 13, 2023, is named ATNM-015US_SL_ST25.txt and is 239,426 bytes in size.

FIELD OF THE INVENTION

The present invention relates to the field of radiopharmaceuticals.

BACKGROUND OF THE INVENTION

Cancer cells aberrantly express proteins that can be detected by T cells through T cell receptor (TCR)-mediated recognition of peptide fragments presented by the major histocompatibility complex (MHC) on the cell surface (collectively, peptide-MHC or pMHC). These aberrantly expressed proteins may be tumor-specific (neoantigens), resulting from non-synonymous mutations (e.g., KRAS G12V, TP53 G245S, BCR-ABL E225K) that are never displayed by normal cells. Alternatively, the aberrantly expressed proteins may be tumor-associated antigens that are derived from wild-type overexpressed proteins (e.g., HER2, EGFR) or proteins with tissue-restricted expression patterns that become abnormally induced in cancer cells (e.g., NY-ESO-1, MAGE-A1, WT1).

Both types of tumor antigens, i.e., neoantigens and tumor-associated antigens, may be therapeutically targeted by TCR-based treatment modalities directed against pMHCs that are specifically or highly expressed in various cancers. Furthermore, of critical distinction between conventional antibody-based or cell-based therapies that can only target extracellular proteins, TCR-based therapies may target and ablate cancer cells based on the expression of both intracellular and extracellular proteins, expanding the clinical utility of the cancer proteome (Dahan 2012; Dubrovsky 2016; Chang 2016; Wang 2017; Han 2020; Shen 2020).

Cell-based immunotherapy is one avenue to target the pMHC on cancer cells. To this end, certain forms of adoptive cell therapy (ACT) or chimeric antigen receptor T cell (CAR-T) therapy that employ recombinant TCRs directed against tumor pMHCs are being investigated (He, J Hem Onc 2019 12:139). In addition, to generate bispecific T cell engagers (BiTEs) called ImmTACs (Immunocore), recombinant affinity-enhanced TCRs have been fused with an anti-CD3 single-chain variable fragment (scFv; Oates 2013). However, there are limitations to therapeutic approaches that depend on immune stimulation. While the adaptive cellular immune response of a cancer patient may effectively recognize tumor antigens, not all patients are able to mount a robust response, due in part to patient condition but also to the immunosuppressive environment that may develop within the tumor itself. Factors that limit immune response against malignant cells include expression of immune checkpoint ligands on the tumor cell surface (e.g., PD-L1; Sun 2018), physical barriers to cell therapy (Han 2020), and metabolic changes (e.g., nutrient starvation; Wei 2017). Indeed, even with immune checkpoint inhibitor therapy, BiTEs and CAR-T therapy may not result in durable response in many patients (Wang 2019; Yoon 2018).

While immunosuppressive mechanisms may prevent the body from mounting a productive adaptive immune response against the tumor, recombinant biologic therapy may be a promising alternative for targeting tumor antigens. This would include either a soluble, recombinant TCR or a monoclonal antibody that specifically recognizes a pMHC (TCR-mimic antibody; Dubrovsky 2016; He, J Hem Onc 2019 12:139). By using recombinant biologics such as those containing or fused with Fc domains, antibody-dependent cellular cytotoxicity (ADCC) and complement-dependent cytotoxicity (CDC) can be triggered against tumor cells, which would be beneficial in the event of T cell immunosuppression. However, given the low density on the tumor cell surface of pMHCs specific for a given antigen, recombinant TCR or TCR-mimic antibodies would likely be ineffective when relying solely on Fc-immune effector functions (Dubrovsky 2016).

Accordingly, what is needed are improved biologics and methods to target tumor markers, such as those with low expression patterns and/or those that are cytosolic/intracellular, to provide therapeutic compositions and methods useful in the treatment of cancer.

SUMMARY OF THE INVENTION

The presently disclosed invention provides recombinant TCRs, TCR-mimic antibodies, and other pMHC-targeting biologics conjugated to radionuclides that clinically benefit patients whose tumors (liquid or solid) express one or more tumor antigens. In contrast to conventional monoclonal antibody therapy that can only target extracellular proteins, the pMHC-targeted therapeutics disclosed herein can also target intracellular markers of tumorigenesis. Because of the potency of radionuclides, even tumor antigens with low cell surface density can be therapeutically exploited. Moreover, since radiation induces pMHC expression on cells, the radioconjugated pMHC-targeting biologics may induce a feed-forward mechanism of increased target expression, thereby improving tumor ablation.

Accordingly, the present disclosure provides compositions including a soluble radiolabeled biologic that binds specifically to a complex composed of an antigen-presenting molecule such as a Major Histocompatibility Complex (MHC) having a peptide bound or restricted thereon ("pMHC"). The MHC-restricted peptide may be derived from a disease related antigen, such as a cancer antigen. The biologic may, for example, be an antibody or non-antibody scaffold including an antigen-binding region that binds specifically to the pMHC, such as a designed ankyrin repeat protein, an anticalin, a recombinant T-cell receptor (TCR), a TCR-fusion protein, or the like.

The soluble biologic may, for example, include an immune cell modulation motif selected from a heavy chain of IgG (IgG1, IgG2, or IgG4).

The cancer antigen may, for example, be a tumor-specific antigen, i.e., neoantigen, or a tumor-associated antigen. For example, the MHC-restricted peptide may be any of the peptides listed in Table 1, such as a WT1 peptide, a NY-ESO peptide, a KRAS peptide, a PR1 peptide, a MAGE peptide, a P53 peptide, a gp100 peptide, a HER2 peptide, a PRAME peptide, a MIF peptide, a p68 peptide, a TARP peptide, a MUC1 peptide, an hTERT peptide, etc.

The MHC may, for example, be a Human Leukocyte Antigen (HLA) molecule (e.g., an HLA class I or II molecule).

The soluble radiolabeled biologic includes a radiolabel (radionuclide label) selected from $^{131}$I, $^{125}$I, $^{123}$I, $^{90}$Y, $^{177}$Lu, $^{186}$Re, $^{188}$Re, $^{89}$Sr, $^{153}$Sm, $^{32}$P, $^{225}$Ac, $^{213}$Bi, $^{213}$Po, $^{211}$At, $^{212}$Bi, $^{213}$Bi, $^{223}$Ra, $^{227}$Th, $^{149}$Tb, $^{137}$Cs, $^{212}$Pb or $^{103}$Pd, or a combination thereof. Preferred radiolabels include $^{211}$At, $^{212}$Bi, $^{213}$Bi, $^{223}$Ra, $^{227}$Th, $^{149}$Tb, $^{212}$Pb, $^{225}$Ac, and $^{177}$Lu.

When the soluble radiolabeled biologic includes an $^{225}$Ac radiolabel, a radiation dose may, for example, be 0.1 to 50 μCi/kg body weight of the subject, or 0.1 to 5 μCi/kg body weight of the subject, or 5 to 20 μCi/kg subject body weight; or 2 μCi to 2 mCi, or 2 μCi to 250 μCi, or 75 μCi to 400 μCi. The radiation dose may, for example, be 2 μCi to 2 mCi, or 2 μCi to 250 μCi, or 75 μCi to 400 μCi.

When the soluble radiolabeled biologic includes a $^{177}$Lu radiolabel, the radiation dose may, for example, be a dose of less than or equal to 1000 μCi/kg body weight of the subject, or 1 to 1000 μCi/kg body weight of the subject, or 1 to 900 μCi/kg body weight of the subject, or 5 to 250 μCi/kg body weight of the subject, or 50 to 450 μCi/kg body weight. The radiation dose may, for example, be 10 mCi to 30 mCi, 10 mCi to below 30 mCi, 100 μCi to 3 mCi, 100 μCi to below 3 mCi, 3 mCi to 30 mCi, or 3 mCi to below 30 mCi.

The composition may, for example, further include an unlabeled soluble biologic in a protein dose of less than 3 mg/kg body weight of the subject, such as from 0.001 mg/kg patient weight to 3.0 mg/kg patient weight, or from 0.005 mg/kg patient weight to 2.0 mg/kg patient weight, or from 0.01 mg/kg patient weight to 1 mg/kg patient weight, or from 0.1 mg/kg patient weight to 0.6 mg/kg patient weight, or 0.3 mg/kg patient weight, or 0.4 mg/kg patient weight, or 0.5 mg/kg patient weight, or 0.6 mg/kg patient weight.

The present disclosure also relates to methods for killing or damaging a target cell expressing or displaying a naturally processed complex composed of a peptide-MHC complex (pMHC), wherein the MHC-restricted peptide is derived from a tumor specific or tumor related antigen. The method generally includes contacting the target cell with the any of the compositions disclosed herein, wherein the composition includes a soluble radiolabeled biologic directed against a/the target pMHC.

The present disclosure also relates to methods for treating a subject, such as a mammalian subject, such as a human, having a cancer characterized by a tumor related or tumor specific antigen, the method including administering to the subject a therapeutically effective amount of a composition includes a soluble radiolabeled biologic that specifically binds the tumor antigen bound to an MHC, such as any such compositions disclosed herein. The therapeutically effective amount of the composition may, for example, include a maximum tolerated dose of the soluble radiolabeled biologic. The therapeutically effective amount may, for example, be administered as a single bolus or infusion in a single subject specific dose.

The method may further include administering to the subject a therapeutically effective amount of one or more further therapeutic agents, such as an anti-inflammatory agent, an immunosuppressive agent, an immunomodulatory agent, a cytokine, or a combination thereof.

The method may further include administering to the subject a therapeutically effective amount of an immune checkpoint therapy, a DNA damage response inhibitor (DDRi), a HDAC inhibitor, an LSD1 inhibitor, a demethylating agent, a CD47 blockade, a chemotherapeutic agent, radiotherapy, or any combination thereof.

Additional features, advantages, and embodiments of the invention may be set forth or apparent from consideration of the following detailed description, drawings if any, and claims. Moreover, it is to be understood that both the foregoing summary of the invention and the following detailed description are exemplary and intended to provide further explanation without limiting the scope of the invention as claimed.

DETAILED DESCRIPTION OF THE INVENTION

The presently disclosed invention provides compositions useful for the treatment of cancer in patients expressing cancer related antigens, such as tumor-specific or tumor-associated antigens. Such compositions may include recombinant TCRs, TCR-mimic antibodies, and other pMHC-targeting biologics conjugated to radionuclides that clinically benefit patients whose tumors (liquid or solid) express one or more tumor antigens and present one or more fragments of the antigens complexed with MHC.

The soluble radiolabeled biologics target pMHC complexes expressed on the surface of malignant cells, and are thus therapeutically applicable to all cancers, i.e., both liquid and solid tumors, that display neoantigens or tumor-associated antigens. The mechanism of action for tumor ablation involves delivering a potent dose of radiation, from as low as a single radionuclide, to targeted cancer cells as well as to adjacent malignant cells. The radioimmunotherapy (RIT) approach is particularly novel in the context of pMHC-targeted therapy because radiation itself induces pMHC, leading to a feed-forward mechanism of tumor ablation.

In addition, the RIT strategy of the present disclosure does not require activation of an immune response or internalization of the biologic, thereby overcoming the limitations of prior art TCR-BiTEs, antibody drug conjugates (ADCs), and cell based therapies, namely, the immunosuppression that prevents T cell-mediated cancer cell death and low pMHC density that impedes sufficient levels of a chemotherapeutic or toxin from accumulating inside the cancer cell (Dubrovsky 2016; Beckermann 2017).

Consequently, radioconjugated TCR-based biologics offer a unique niche for drug development in cancer because these novel agents are therapeutically viable even against tumors with low target expression levels and would be clinically beneficial in patients whose adaptive immune response has been weakened for various reasons. Thus, compared to unconjugated or drug-conjugated TCR-based therapies, RIT may be able to exploit a greater number of pMHC targets.

Accordingly, the presently disclosed soluble radiolabeled biologics, and compositions including the same, are useful for the treatment of cancer in subjects/patients expressing cancer related antigens, such as tumor-specific or tumor-associated antigens. Such compositions may, for example, include recombinant TCRs, TCR-mimic antibodies, and other pMHC-targeting biologics conjugated to radionuclides. Moreover, because of the unique feed-forward mechanism of tumor ablation, lower doses of the soluble biologic may induce high levels of biological response (i.e., lower protein and/or radiation doses)

Prior to setting forth the aspects of the invention in greater detail, it may be helpful to an understanding thereof to set forth definitions of certain terms to be used hereinafter.

Definitions and Abbreviations

The singular forms "a," "an," "the" and the like include plural referents unless the context clearly dictates otherwise. Thus, for example, reference to "an" antibody includes both a single antibody and a plurality of different antibodies.

The term "about" when used in this disclosure in connection with a numerical designation or value, e.g., in describing temperature, time, amount, and concentration, including in the description of a range, indicates a variance of ±10% and, within that larger variance, variances of ±5% or ±1% of the numerical designation or value.

As used herein, "administer", with respect to a targeting agent such as an antibody, antibody fragment, Fab fragment, or aptamer, means to deliver the agent to a subject's body via any known method suitable for antibody delivery. Specific modes of administration include, without limitation, intravenous, transdermal, subcutaneous, intraperitoneal, intrathecal and intratumoral administration. Exemplary administration methods for antibodies may be as substantially described in U.S. Pat. No. 10,736,975 and International Pub. No. WO 2016/187514, each of which is incorporated by reference herein.

In addition, in this invention, compositions including any of the soluble radiolabeled biologics may be formulated using one or more routinely used pharmaceutically acceptable excipients or pharmaceutically acceptable carriers. Such carriers are well known to those skilled in the art. For example, injectable drug delivery systems include solutions, suspensions, gels, microspheres and polymeric injectables, and can include excipients such as solubility-altering agents (e.g., ethanol, propylene glycol and sucrose) and polymers (e.g., polycaprylactones and PLGA's).

As used herein, the term "antibody" includes, without limitation, (a) an immunoglobulin molecule including two heavy chains and two light chains and which recognizes an antigen; (b) polyclonal and monoclonal immunoglobulin molecules; (c) monovalent and divalent fragments thereof, such as Fab, $Fab_2$, di-Fab, scFvs, diabodies, minibodies, and nanobodies (sdAb); (d) naturally occurring and non-naturally occurring, such as wholly synthetic antibodies, IgG-Fc-silent, and chimeric; and (e) bi-specific forms thereof. Immunoglobulin molecules may derive from any of the commonly known classes, including but not limited to IgA, secretory IgA, IgG and IgM. IgG subclasses are also well known to those in the art and include, but are not limited to, human IgG1, IgG2, IgG3 and IgG4. The N-terminus of each chain defines a "variable region" of about 100 to 110 or more amino acids primarily responsible for antigen recognition. The terms variable light chain (VL) and variable heavy chain (VH) refer to these regions of light and heavy chains respectively. Antibodies may be human, humanized or non-human. When a specific aspect of the presently disclosed invention refers to or recites an "antibody," it is envisioned as referring to any of the full-length antibodies or fragments thereof disclosed herein, unless explicitly denoted otherwise.

A "humanized" antibody refers to an antibody in which some, most or all amino acids outside the CDR domains of a non-human antibody are replaced with corresponding amino acids derived from human immunoglobulins. In one embodiment of a humanized form of an antibody, some, most or all of the amino acids outside the CDR domains have been replaced with amino acids from human immunoglobulins, whereas some, most or all amino acids within one or more CDR regions are unchanged. Small additions, deletions, insertions, substitutions or modifications of amino acids are permissible as long as they do not abrogate the ability of the antibody to bind to a particular antigen. A "humanized" antibody retains an antigenic specificity similar to that of the original antibody.

A "chimeric antibody" refers to an antibody in which the variable regions are derived from one species and the constant regions are derived from another species, such as an antibody in which the variable regions are derived from a mouse antibody and the constant regions are derived from a human antibody, for example, the constant region includes the Fc domain of a human IgG.

A "complementarity-determining region", or "CDR", refers to amino acid sequences that, together, define the binding affinity and specificity of the variable region of a native immunoglobulin binding site. There are three CDRs in each of the light and heavy chains of an antibody. CDRs may, for example, be described and delineated in accordance with the Kabat numbering system.

A "framework region", or "FR", refers to amino acid sequences interposed between CDRs, typically conserved, that act as the scaffold between the CDRs.

A "constant region" refers to the portion of an antibody molecule that is consistent for a class of antibodies and is defined by the type of light and heavy chains. For example, a light chain constant region can be of the kappa or lambda chain type and a heavy chain constant region can be of one of the five chain isotypes: alpha, delta, epsilon, gamma or mu. This constant region, in general, can confer effector functions exhibited by the antibodies. Heavy chains of various subclasses (such as the IgG subclass of heavy chains) are mainly responsible for different effector functions.

As used herein, the term "biologic" includes, without limitation antibodies and other biomolecules, such as other proteins, capable of, or configured for, a specific recognition function, including at least specific recognition and binding of peptides presented in a major histocompatibility complex (p-MHC). Such antibodies that mimic the specific recognition of a pMHC by a TCR protein may be referred to as TCR mimic or TCRm antibodies. Engineered molecules, i.e., non-antibody scaffolds, that may be employed in the various aspects of the invention include at least a recombinant soluble T-cell receptor or T-cell receptor fusion proteins, designed ankyrin repeat proteins (DARPins), anticalin, and the like, which are antibody mimetic proteins having high specificity and high binding affinity to a target protein or peptide (e.g., pMHC complex). See for example the antibody mimetics described in Vazquez-Lombardi (2015). As used herein, the term "pMHC targeting agent" includes such biologics that specifically bind to a pMHC complex.

As used herein, the terms "antigen presenting molecule" and "major histocompatibility complex" and "MHC" are used interchangeably and refer to an MHC class I molecule and/or an MHC class II molecule, wherein the MHC is defined as a set of gene loci specifying major histocompatibility antigens. In humans, the MHC complex is encoded by the human leukocyte antigen (HLA) gene complex. Thus, in the present context, the term "MHC" also encompasses "HLA".

As used herein, the term "peptide-MHC complex" or "pMHC complex" refers to an MHC molecule (MHC class I or MHC class II) with a peptide bound in the art-recognized peptide binding pocket of the MHC.

The peptides of interest may be associated with at least one of a tumorigenic state, an infectious state, and a disease state, or the peptide of interest may be specific to a particular organ or tissue or cell type. The presentation of the peptide in the context of an MHC molecule may be novel to cancer cells, or it may be greatly increased in cancer cells when compared to normal cells.

Soluble recombinant T-Cell receptor proteins (rTCR), such as human/human-derived forms thereof, may include at least a soluble polypeptide derived from the various polypeptides including the TCR that is capable of binding to a surface antigen on target cells. rTCR proteins may further include a heavy chain of IgG1, IgG2, or IgG4, such as the human forms thereof. For example, a rTCR may include a TCR alpha chain variable domain (V-α) and a TCR beta chain variable domain (V-β), wherein the TCR is capable of binding to a cancer related or cancer specific peptide in the context of an MHC molecule (i.e., pMHC), and activating immune cells to elicit an anti-tumor response.

In general, preparation of the present soluble rTCR can be accomplished by recognized recombinant DNA techniques. For example, preparation of plasmid DNA, DNA cleavage with restriction enzymes, ligation of DNA, introduction of DNA into a cell, culturing the cell, and isolation and purification of the expressed protein are known techniques. See generally Sambrook et al. in Molecular Cloning: A Laboratory Manual (2d ed. 1989); and Ausubel et al. (1989), Current Protocols in Molecular Biology, John Wiley & Sons, New York.

Soluble rTCR may include heterodimers in which the transmembrane sequence of the alpha and beta chains has been deleted, and in some cases each of the alpha chain constant domain (C-α) and beta chain constant domain (C-β) may also be deleted. Soluble rTCR may include single-chain ("sc-") constructs wherein the V-α and V-β chains are covalently linked through a suitable peptide linker sequence. Such linkers may include protein sequences, and domains such as immunoglobin, leucine zipper, helix-turn-helix, and barrel-barrel motifs that facilitate protein dimerization. Moreover, various domains of a TCR molecule may be chemically crosslinked via reactive amino acids or polysaccharides. Such amino acids (or polysaccharides) can be inherent in the TCR structure or can be added through genetic modification.

For example, the V-α chain can be covalently linked to the V-β chain through a suitable peptide linker sequence fused to the C-terminus of the V-α chain and the N-terminus of the V-β chain. Exemplary V-α and V-β chains of the sc-TCR fusion protein are generally about 200 to 400 amino acids in length, preferably about 300 to 350 amino acids in length, and will be at least 90% identical, such as 95% identical or even 100% identical to the V-α and V-β chains of a naturally-occurring TCR. By the term "identical" is meant that the amino acids of the V-α or V-β chain are 100% homologous to the corresponding naturally-occurring TCR V-β or V-α chains.

The V-α chain of the sc-TCR molecule can further include a C-β chain or fragment thereof fused to the C-terminus of the V-β chain. Further, the V-α chain can include a C-α chain or fragment thereof fused to the C-terminus of the V-α chain and the N-terminus of the peptide linker sequence. Generally, in those fusion proteins including a C-β chain fragment, the fragment will usually not include the last cysteine residue (at position 127 in the mouse or at position 131 in the human) of the C-β chain. For those fusion proteins including a C-α chain, the length can vary between approximately 1 to 90 amino acids (i.e. the C-α chain up to but not including the final cysteine). The nucleic acid and protein sequences of suitable TCR chains have been disclosed. See e.g., Fundamental Immunology, (1993) 3$^{rd}$ Edi. W. Paul. Ed. Rsen Press Ltd. New York; and Kabat, E. A., et al., (1991) Sequences of Proteins of Immunological Interest (5$^{th}$ Ed.) Public Health Services, National Institutes of Health.

pMHC-targeting TCRs used in or embodied in various aspects of the invention may, for example, be fusion proteins with an immunoglobulin Fc constant region, such as an IgG Fc.

As used herein, the term "DARPin", refers to an antibody mimetic protein consisting of 2 to 5 ankyrin repeat motifs with high selectivity and high affinity for a specific antigen such as a protein, such as a pMHC complex. DARPins have a molecular weight of 14 to 21 kDa. They include a core region having a conserved amino acid sequence that provides structure and a variable target binding region that resides outside of the core and binds to a target. DARPins may further include an immune cell modulation motif, such as any described hereinabove. As used herein, the term "Anticalin" refers to a scaffold protein that is a single-chain-based antibody mimetic capable of specifically binding to an antigen and has a size of about 20 kDa.

As used herein, "Immunoreactivity" refers to a measure of the ability of an antibody or antibody mimetic (i.e., biologic) to recognize and bind to a specific antigen. "Specific binding" or "specifically binds" or "binds" refers to a biologic binding to an antigen or an epitope within the antigen with greater affinity than for other antigens with the relevant milieu such as with the body of the subject. The biologic may, for example, bind to the antigen or the epitope within the antigen with an equilibrium dissociation constant ($K_D$) of about $1 \times 10^{-7}$ M or less, for example about $1 \times 10^{-8}$ M or less, for example about $1 \times 10^{-9}$ M or less, about $1 \times 10^{-10}$ M or less, about $1 \times 10^{-11}$ M or less, or about $1 \times 10^{-12}$ M or less, typically with the $K_D$ that is at least one hundred fold less than its $K_D$ for binding to a nonspecific antigen (e.g., BSA, casein). The dissociation constant may be measured using standard procedures. Biologics that specifically bind to the antigen or the epitope within the antigen may, however, have cross-reactivity to other related antigens, for example to the same antigen from other species (homologs), such as human or monkey, for example Macaca fascicularis (cynomolgus, cyno), Pan troglodytes (chimpanzee, chimp) or Callithrix jacchus (common marmoset, marmoset).

An "epitope" refers to the target molecule site(s) (e.g., at least a portion of an antigen) capable of being recognized by, and bound by, a targeting agent such as an antibody, antibody fragment, Fab fragment, aptamer, T-cell receptor, or any of the antibody mimetics disclosed herein. For a protein antigen, for example, this may refer to the region of the protein (i.e., amino acids, and particularly their side chains) that is bound by the antibody. Overlapping epitopes include at least one to five common amino acid residues. Methods of identifying epitopes of antibodies are well known in the art and include, for example, those described in Antibodies, A Laboratory Manual, Cold Spring Harbor Laboratory, Ed Harlow and David Lane (1988).

As used herein, the terms "proliferative disorder" and "cancer" may be used interchangeably and may include, without limitation, solid cancers (e.g., tumors) and hematological (liquid) cancers. Solid cancers that may be treated by the various aspects of the invention include, without limitation, bone cancer, pancreatic cancer, skin cancer, cancer of the head or neck, cutaneous or intraocular malignant melanoma, uterine cancer, ovarian cancer, prostate cancer, castration-resistant prostate cancer (CRPC), rectal cancer, colorectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, pediatric tumors, cancer of the bladder, cancer of the kidney or ureter, carcinoma of the renal pelvis, neoplasm of the central nervous system (CNS), primary CNS lymphoma, tumor angiogenesis, spinal axis tumor, brain stem glioma, pituitary adenoma, Kaposi's sarcoma, epidermoid cancer, squamous cell cancer, environmentally-induced cancers including those induced by asbestos.

According to certain aspects, the solid cancer that is treated may be breast cancer, tamoxifen-resistant breast cancer, triple negative breast cancer (TNBC), gastric cancer, bladder cancer, cervical cancer, endometrial cancer, skin cancer, stomach cancer, testicular cancer, esophageal cancer, bronchioloalveolar cancer, prostate cancer, colorectal cancer, ovarian cancer, cervical epidermoid cancer, pancreatic cancer, lung cancer such as non-small cell lung carcinoma (NSCLC), renal cancer, head and neck cancer such as head and neck squamous cell cancer, or any combination thereof. The solid cancers treated by the various aspect of the invention may be metastatic or non-metastatic.

The biologics disclosed herein include a radioisotope label such as any of $^{131}$I, $^{125}$I, $^{123}$I, $^{90}$Y, $^{177}$Lu, $^{186}$Re, $^{188}$Re, $^{89}$Sr, $^{153}$Sm, $^{32}$P, $^{225}$Ac, $^{213}$Bi, $^{213}$Po, $^{211}$At, $^{212}$Bi, $^{213}$Bi, $^{223}$Ra, $^{227}$Th, $^{149}$Tb, $^{137}$Cs, $^{212}$Pb and $^{103}$Pd. As used herein, "radioisotope" is synonymous with "radionuclide." can be. According to certain aspects, the radioisotope is an alpha particle-emitting isotope, such as $^{211}$At, $^{212}$Bi, $^{213}$Bi, $^{223}$Ra, $^{227}$Th, $^{149}$Tb, $^{212}$Pb, or $^{225}$Ac. Methods for affixing a protein such as an antibody or antibody fragment (i.e., "labeling" an antibody with a radioisotope) are well known. Specific methods for labeling are described, for example, in U.S. Pat. No. 10,420,851, International Pub. No. WO 2017/155937, U.S. Pat. No. 9,603,954 and U.S. Provisional Patent Application No. 63/119,093 filed Nov. 30, 2020 and titled "Compositions and methods for preparation of site-specific radioconjugates," each of which is incorporated by reference herein.

The biologic may, for example, be radiolabeled with $^{225}$Ac ("$^{225}$Ac-labeled"), and the effective amount may be, for example, at or below 50.0 μCi/kg (i.e., where the amount of $^{225}$Ac-labeled biologic administered to the subject delivers a radiation dose of below 50.0 μCi per kilogram of subject's body weight). The effective amount of the $^{225}$Ac-labeled biologic may, for example, be at or below 50 μCi/kg, 40 μCi/kg, 30 μCi/kg, 20 μCi/kg, 10 μCi/kg, 5 μCi/kg, 4 μCi/kg, 3 μCi/kg, 2 μCi/kg, 1 μCi/kg, or even 0.5 μCi/kg. The effective amount of the $^{225}$Ac-labeled biologic may, for example, be at least 0.05 μCi/kg, or 0.1 μCi/kg, 0.2 μCi/kg, 0.3 μCi/kg, 0.4 μCi/kg, 0.5 μCi/kg, 1 μCi/kg, 2 μCi/kg, 3 μCi/kg, 4 μCi/kg, 5 μCi/kg, 6 μCi/kg, 7 μCi/kg, 8 μCi/kg, 9 μCi/kg, 10 μCi/kg, 12 μCi/kg, 14 μCi/kg, 15 μCi/kg, 16 μCi/kg, 18 μCi/kg, 20 μCi/kg, 30 μCi/kg, or 40 μCi/kg. The $^{225}$Ac-labeled biologic may, for example, be administered at a dose that includes any combination of upper and lower limits as described herein, such as from 0.1 μCi/kg to 5 μCi/kg, or from 5 μCi/kg to 20 μCi/kg.

The effective amount of the $^{225}$Ac-labeled biologic may, for example, be at or below 2 mCi (i.e., wherein the $^{225}$Ac-labeled biologic is administered to the subject in a non-weight-based dosage). The effective amount of the $^{225}$Ac-labeled biologic may, for example, be at or below 1 mCi, such as 0.9 mCi, 0.8 mCi, 0.7 mCi, 0.6 mCi, 0.5 mCi, 0.4 mCi, 0.3 mCi, 0.2 mCi, 0.1 mCi, 90 μCi, 80 μCi, 70 μCi, 60 μCi, 50 μCi, 40 μCi, 30 μCi, 20 μCi, 10 μCi, or 5 μCi. The effective amount of the $^{225}$Ac-labeled biologic may, for example, be at least 2 μCi, such as at least 5 μCi, 10 μCi, 20 μCi, 30 μCi, 40 μCi, 50 μCi, 60 μCi, 70 μCi, 80 μCi, 90 μCi, 100 μCi, 200 μCi, 300 μCi, 400 μCi, 500 μCi, 600 μCi, 700 μCi, 800 μCi, 900 μCi, 1 mCi, 1.1 mCi, 1.2 mCi, 1.3 mCi, 1.4 mCi, or 1.5 mCi. The $^{225}$Ac-labeled biologic may, for example, be administered at a dose that includes any combination of upper and lower limits as described herein, such as from 2 μCi to 1 mCi, or from 2 μCi to 250 μCi, or from 75 μCi to 400 μCi.

The effective amount of the $^{225}$Ac-labeled biologic may, for example, include a single dose that delivers less than 12Gy, or less than 8 Gy, or less than 6 Gy, or less than 4 Gy, or less than 2 Gy, such as doses of 2 Gy to 8 Gy, to the subject, such as predominantly to the targeted solid tumor.

The biologic may, for example, be radiolabeled with $^{177}$Lu ("$^{177}$Lu-labeled"), and the effective amount may, for example, be at or below 1 mCi/kg (i.e., where the amount of $^{177}$Lu-labeled biologic administered to the subject delivers a radiation dose of below 1000 mCi per kilogram of subject's body weight). The effective amount of the $^{177}$Lu-labeled biologic may, for example, be at or below 900 μCi/kg, 800 μCi/kg, 700 μCi/kg, 600 μCi/kg, 500 μCi/kg, 400 μCi/kg, 300 μCi/kg, 200 μCi/kg, 150 μCi/kg, 100 μCi/kg, 80 μCi/kg, 60 μCi/kg, 50 μCi/kg, 40 μCi/kg, 30 μCi/kg, 20 μCi/kg, 10 μCi/kg, 5 μCi/kg, or 1 μCi/kg. The effective amount of the $^{177}$Lu-labeled biologic may, for example, be at least 1 μCi/kg, 2.5 μCi/kg, 5 μCi/kg, 10 μCi/kg, 20 μCi/kg, 30 μCi/kg, 40 μCi/kg, 50 μCi/kg, 60 μCi/kg, 70 μCi/kg, 80 μCi/kg, 90 μCi/kg, 100 μCi/kg, 150 μCi/kg, 200 μCi/kg, 250 μCi/kg, 300 μCi/kg, 350 μCi/kg, 400 μCi/kg or 450 μCi/kg. The $^{177}$Lu-labeled biologic may, for example, be administered at a dose that includes any combination of upper and lower limits as described herein, such as from 5 mCi/kg to 50 μCi/kg, or from 50 mCi/kg to 500 μCi/kg.

The effective amount of the $^{177}$Lu-labeled biologic may, for example, be at or below 45 mCi, such as at or below 40 mCi, 30 mCi, 20 mCi, 10 mCi, 5 mCi, 3.0 mCi, 2.0 mCi, 1.0 mCi, 800 μCi, 600 μCi, 400 μCi, 200 μCi, 100 μCi, or 50 μCi. The effective amount of the $^{177}$Lu-labeled biologic may, for example, be at least 10 μCi, such as at least 25 μCi, 50 μCi, 100 μCi, 200 μCi, 300 μCi, 400 μCi, 500 μCi, 600 μCi, 700 μCi, 800 μCi, 900 μCi, 1 mCi, 2 mCi, 3 mCi, 4 mCi, 5 mCi, 10 mCi, 15 mCi, 20 mCi, 25 mCi, 30 mCi. The $^{177}$Lu-labeled biologic may, for example, be administered at a dose that includes any combination of upper and lower limits as described herein, such as from 10 mCi to 30 mCi, or from 100 μCi to 3 mCi, or from 3 mCi to 30 mCi.

As used herein, a composition including a soluble radiolabeled biologic may include or be a "patient specific composition" that includes both a radionuclide labeled portion and a non-labeled portion. In this case, the majority of the biologic administered to a patient may consist of non-radiolabeled biologic, with the minority being the radiolabeled biologic. The ratio of labeled to non-labeled targeting agent can be adjusted using known methods. According to certain aspects of the present invention, the patient specific composition may include the biologic in a ratio of labeled: unlabeled portions, based on protein concentration, of from about 0.01:10 to 1:1, such as 0.1:10 to 1:1 labeled:unlabeled.

According to certain aspects of the present invention, the biologic may, for example, be provided in a total protein amount of up to 100 mg, such as in a range of 5-100 mg, or up to 60 mg, such as in a range of 5-60 mg or 5-45 mg, or a total protein amount of from 0.001 mg/kg patient weight to 3.0 mg/kg patient weight, such as from 0.005 mg/kg patient weight to 2.0 mg/kg patient weight, or from 0.01 mg/kg patient weight to 1 mg/kg patient weight, or from 0.1 mg/kg patient weight to 0.6 mg/kg patient weight, or 0.3 mg/kg patient weight, or 0.4 mg/kg patient weight, or 0.5 mg/kg patient weight, or 0.6 mg/kg patient weight.

This inventive combination of a radiolabeled fraction and a non-radiolabeled fraction of the biologic allows the composition to be tailored to a specific patient, wherein each of the radiation dose and the protein dose are personalized to that patient based on at least one patient specific parameter. As such, each vial of the composition may be made for a specific patient, where the entire content of the vial is delivered to that patient in a single dose. When a treatment regime calls for multiple doses, each dose may be formulated as a patient specific dose in a vial to be administered to the patient as a "single dose" (i.e., full contents of the vial administered at one time). The subsequent dose may be formulated in a similar manner, such that each dose in the regime provides a patient specific dose in a single dose container. One of the advantages of such a composition is that there will be no left-over radiation that would need to be discarded or handled by the medical personnel, e.g., no dilution, or other manipulation to obtain a dose for the patient. When provided in a single dose container, the container is simply placed in-line in an infusion tubing set for infusion to the patient. Moreover, the volume can be standardized so that there is a greatly reduced possibility of medical error (i.e., delivery of an incorrect dose, as the entire volume of the composition is to be administered in one infusion).

Thus, according to certain aspects, the soluble radiolabeled biologic may be provided as a single dose composition tailored to a specific patient, wherein the amount of labeled and unlabeled biologic in the composition may depend on one or more of a patient weight, age, gender, disease state, and/or health status, such as detailed in U.S. Pat. No. 10,736,975 and International Pub. No. WO 2016/187514. According to certain aspects, the biologic may be provided as a multi-dose therapeutic, wherein each dose in the treatment regime is provided as a patient specific composition. The patient specific composition includes labeled and unlabeled fractions of the biologic, wherein the amounts of each depend on one or more of patient weight, age, gender, disease state, and/or health status.

As used herein, the terms "subject" and "patient" are interchangeable and include, without limitation, a mammal such as a human, a non-human primate, a dog, a cat, a horse, a sheep, a goat, a cow, a rabbit, a pig, a rat and a mouse. Where the subject is human, the subject can be of any age. For example, the subject can be 60 years or older, 65 or older, 70 or older, 75 or older, 80 or older, 85 or older, or 90 or older. Alternatively, the subject can be 50 years or younger, 45 or younger, 40 or younger, 35 or younger, 30 or younger, 25 or younger, or 20 or younger. For a human subject afflicted with cancer, the subject can be newly diagnosed, or relapsed and/or refractory, or in remission.

As used herein, "treating" a subject afflicted with a cancer shall include, without limitation, (i) slowing, stopping or reversing the cancer's progression, (ii) slowing, stopping or reversing the progression of the cancer's symptoms, (iii) reducing the likelihood of the cancer's recurrence, and/or (iv) reducing the likelihood that the cancer's symptoms will recur. According to certain preferred aspects, treating a subject afflicted with a cancer means (i) reversing the cancer's progression, ideally to the point of eliminating the cancer, and/or (ii) reversing the progression of the cancer's symptoms, ideally to the point of eliminating the symptoms, and/or (iii) reducing or eliminating the likelihood of relapse (i.e., consolidation, which ideally results in the destruction of any remaining cancer cells).

"Chemotherapeutic," in the context of this invention, shall mean a chemical compound which inhibits or kills growing cells, and which can be used or is approved for use in the treatment of cancer. Exemplary chemotherapeutic agents include cytostatic agents which prevent, disturb, disrupt or delay cell division at the level of nuclear division or cell plasma division. Such agents may stabilize microtubules, such as taxanes, in particular docetaxel or paclitaxel, and epothilones, in particular epothilone A, B, C, D, E, and F, or may destabilize microtubules such as *vinca* alkaloids, in particular vinblastine, vincristine, vindesine, vinflunine, and vinorelbine. Exemplary chemotherapeutics also include radiosensitizers that may synergize with the soluble radiolabeled biologics, such as temozolomide, cisplatin, and/or fluorouracil.

"Therapeutically effective amount" or "effective amount" refers to an amount effective, at dosages and for periods of time necessary, to achieve a therapeutic result. A therapeutically effective amount may vary according to factors such as the disease state, age, sex, and weight of the individual, and the ability of a therapeutic or a combination of therapeutics to elicit a desired response in the individual. Exemplary indicators of an effective therapeutic or combination of therapeutics may, for example, include improved well-being of the patient, reduction in a tumor burden, arrested or slowed growth of a tumor, and/or absence of metastasis of cancer cells to other locations in the body. According to certain aspects, "therapeutically effective amount" or "effective amount" refers to an amount of the soluble radiolabeled biologic that may deplete or cause a reduction in the overall number of cells expressing a targeted antigen (tumor specific or tumor associated antigens), or an amount of the soluble radiolabeled biologic that may inhibit growth of cells expressing the targeted antigen.

As used herein, "depleting", with respect to cells expressing the targeted antigen, shall mean to lower the population of at least one type of cells that express or overexpress the target antigen (e.g., antigen presenting cells in a solid tumor or circulating in a subject's blood). According to certain aspects of this invention, a decrease is determined by comparison of the numbers of antigen-positive cells in the subject's blood or in a tissue biopsy, such as from the solid tumor, before and after initiation of treatment with the soluble radiolabeled biologic. As such, and by way of example, a subject's antigen-positive cells may be considered to be depleted if the population is lowered, such as by at least 10%, 20%, 30%, 40%, 50%, 60%, 70%, 80%, 90% or 99%.

"Inhibits growth" refers to a measurable decrease or delay in the growth of a malignant cell or tissue (e.g., tumor) in vitro or in vivo when contacted with a therapeutic or a combination of therapeutics or drugs, when compared to the decrease or delay in the growth of the same cells or tissue in the absence of the therapeutic or the combination of therapeutic drugs. Inhibition of growth of a malignant cell or tissue in vitro or in vivo may, for example, be at least about 10%, 20%, 30%, 40%, 50%, 60%, 70%, 80%, 90%, 95%, 96%, 97%, 98%, 99%, or 100%.

The term "immune checkpoint therapy" refers to a molecule capable of modulating the function of an immune checkpoint protein in a positive or negative way (in particular the interaction between an antigen presenting cell (APC) such as a cancer cell and an immune T effector cell). The term "immune checkpoint" refers to a protein directly or indirectly involved in an immune pathway that under normal physiological conditions is crucial for preventing uncontrolled immune reactions and thus for the maintenance of self-tolerance and/or tissue protection. The one or more immune checkpoint therapies described herein may independently act at any step of the T cell-mediated immunity including clonal selection of antigen-specific cells, T cell activation, proliferation, trafficking to sites of antigen and inflammation, execution of direct effector function and signaling through cytokines and membrane ligands. Each of these steps is regulated by counterbalancing stimulatory and inhibitory signals that fine tune the response.

In the context of the present invention, an immune checkpoint therapy encompasses therapies such as antibodies capable of down-regulating at least partially the function of an inhibitory immune checkpoint (antagonist) and/or up-regulating at least partially the function of a stimulatory immune checkpoint (agonist). As an example, an immune checkpoint therapy may refer to an antibody against an immune checkpoint inhibitor (ICI) that may be upregulated in certain cancers, and thus may inhibit the function of the ICI.

The term "DDRi" refers to an inhibitor of a DNA damage response pathway protein, of which a PARPi is an example. The term "PARPi" refers to an inhibitor of poly(ADP-ribose) polymerase. In the context of the present invention, the term PARPi encompasses molecules that may bind to and inhibitor the function of poly(ADP-ribose) polymerase, such as antibodies, peptides, or small molecules.

The term "CD47 blockade" refers to an agent that prevents CD47 binding to SIRPα, such as agents that bind to either of CD47 or SIRPα, or those that modulate expression of CD47 or SIRPα. In the context of the present invention, a CD47 binding moiety encompasses at least antibodies that bind to CD47 such as magrolimab, lemzoparlimab, and AO-176, and/or agents that modulate the expression of CD47 and/or SIRPα, such as phosphorodiamidate morpholino oligomers (PMO) that block/prevent translation of CD47 mRNA.

As used herein, administering to a subject one or more additional therapies, such as one or more of an immune checkpoint therapy and/or DDRi and/or CD47 blockade and/or radiosensitizer "in conjunction with" a soluble radiolabeled biologic means administering the additional therapy before, during and/or after administration of the soluble radiolabeled biologic. This administration includes, without limitation, the following scenarios: (i) the additional therapy is administered first, and the soluble radiolabeled biologic is administered second; (ii) the additional therapy is administered concurrently with the soluble radiolabeled biologic (e.g., a DDRi is administered orally once per day for n days, and the soluble radiolabeled biologic is administered intravenously in a single dose on one of days 2 through n−1 of the DDRi regimen); (iii) the additional therapy is administered concurrently with the soluble radiolabeled biologic (e.g., a DDRi is administered orally for a duration of greater than one month, such as orally once per day for 35 days, 42 days, 49 days, or a longer period during which the cancer being treated does not progress and during which the DDRi does not cause unacceptable toxicity, and the soluble radiolabeled biologic is administered intravenously in a single dose on a day within the first month of the DDRi regimen); and (iv) the soluble radiolabeled biologic is administered first (e.g., intravenously in a single dose or a plurality of doses over a period of weeks), and the additional therapy is administered second (e.g., a DDRi is administered orally once per day for 21 days, 28 days, 35 days, 42 days, 49 days, or a longer period during which the cancer being treated does not progress and during which the DDRi does not cause unacceptable toxicity). Additional permutations that would be obvious to one of skill in the art are possible and within the scope of the presently claimed invention.

An "article of manufacture" indicates a package containing materials useful for the treatment, prevention and/or diagnosis of the disorders described herein. The article of manufacture may include a container and a label or package insert on or associated with the container. Suitable containers include, for example, bottles, vials, syringes, IV solution bags, etc. The containers may be formed from a variety of materials such as glass or plastic. The container holds a composition which is by itself or combined with another composition effective for treating, preventing and/or diagnosing the condition and may have a sterile access port (for example the container may be an intravenous solution bag or a vial having a stopper pierceable by a hypodermic injection needle). At least one active agent in the composition is a soluble radiolabeled biologic according to aspects of the presently disclosed invention.

A "label" or "package insert" is used to refer to instructions customarily included in commercial packages of therapeutic products that contain information about the indications, usage, dosage, administration, combination therapy, contraindications and/or warnings concerning the use of such therapeutic products. As used herein, a label may indicate that the composition is used for treating a cancer and may optionally indicate administration routes and/or methods. Moreover, the article of manufacture may include (a) a first container with a composition contained therein, wherein the composition includes a soluble radiolabeled biologic; and (b) a second container with a composition contained therein, wherein the composition includes a further cytotoxic or otherwise therapeutic agent according to aspects of the presently disclosed invention. Alternatively, or additionally, the article of manufacture may further include a second (or third) container including a pharmaceutically acceptable buffer, such as bacteriostatic water for injection (BWFI), phosphate-buffered saline, Ringer's solution and dextrose solution. It may further include other materials desirable from a commercial and user standpoint, including other buffers, diluents, filters, needles, and syringes.

Throughout this application, various publications are cited. The disclosure of these publications is hereby incorporated by reference into this application to describe more fully the state of the art to which this invention pertains.

Unless otherwise defined, all technical and scientific terms used herein have the same meaning as commonly understood by one of ordinary skill in the art to which the present invention belongs. Although methods and materials similar or equivalent to those described herein can be used in the practice or testing described herein, suitable methods and materials are described below.

Aspects of the Invention

The presently disclosed invention relates to soluble radiolabeled biologics that target a complex composed of an antigen-presenting molecule such as an MHC protein and a peptide derived from a tumor antigen (together, the pMHC complex or pMHC), methods for treating cancers using these biologics, uses of these biologics for killing or damaging cancer cells and/or treating cancers, and radiopharmaceutical compositions that include these biologics that may be for the treatment of cancers.

In contrast to therapy with non-radiolabeled biologics, the radioconjugate methods disclosed herein are ideal for targeting tumor markers with relatively low expression since the conjugated radionuclide provide very potent cell damaging/killing radiation independent of internalization of the biologic by the target cells. pMHC complexes decorate the surface of a cancer cell with only hundreds of copies, as opposed to tens to hundreds of thousands of copies for targets of conventional monoclonal antibody therapy (Dubrovsky 2016). However, this low-level expression of pMHCs is sufficient for RIT. Recombinant TCRs or TCR-mimic antibodies conjugated with a radionuclide, such as a potent alpha-particle emitter like Actinium-225 ($^{225}$Ac), can selectively target pMHC-positive tumors, delivering high energy alpha radiation to cause lethal DNA damage that cannot be repaired. Because a pMHC for a tumor-specific or tumor-associated antigen is highly restricted to cancer cells, off-target damage to normal tissue will be limited (Nelson 2020; Chang 2016; Dubrovsky 2016).

Further, pMHC targets are not amenable to alternative therapies that utilize cytotoxic small-molecules or toxins primarily due to low antigen density. For example, antibody drug-conjugate (ADC) therapies typically require high antigen density to internalize, release, and accumulate sufficient levels of the cytotoxic payload, and the levels of pMHC may simply be inadequate for ADC-mediated cancer cell death to occur (Hafeez 2020). This contrasts with the mechanism of action of a targeted radiolabeled biologic, which is less sensitive to antigen density, does not require internalization or release of the conjugated payload, and can mediate tumor cell killing with a single emission of an alpha particle. Moreover, due to the "cross-fire" phenomenon, whereby the radionuclide is delivered not only to the cancer cell but also to neighboring malignant cells, tumor ablation is promoted even when pMHC expression is heterogeneous within the tumor (Nelson 2020). The simultaneous delivery of the toxic radiation to multiple cancer cells may be clinically advantageous, especially in the context of TCR-based therapies since many cancer types downregulate MHC as an immune escape mechanism (Cornel 2020).

In light of this MHC-downregulating escape mechanism of cancer cells, RIT possesses another key advantage over non-radio-conjugated approaches: the potential to induce pMHC expression and activate a feed-forward mechanism of tumor destruction. External radiation is known to upregulate pMHC levels on the cancer cell surface, augmenting the T cell response against tumors (Reits 2006). However, external radiation damages healthy tissue surrounding the tumor. In contrast, internal administration of a targeted soluble radiolabeled biologic (e.g., TCR fusion protein, TCRm antibody) delivers radiation specifically to tumors, minimizing harm to healthy tissue. In response to the radiation, tumor cells would upregulate pMHC on the cell surface, which would then cause the soluble radiolabeled biologic to accumulate even further within the malignant tissues. Thus, by eliciting a radiation stress response, RIT will itself induce the therapeutic target, leading to a feed-forward mechanism of tumor eradication. This feed-forward upregulation of pMHC may also convert low-expressing, non-viable pMHC targets into viable ones, expanding the potential for clinical translation.

Accordingly, the presently disclosed invention provides soluble biologics labeled with a radioisotope that are capable of, and configured for, specific recognition of pMHCs, which biologics may include antibodies as well as non-antibody scaffolds such as an affinity enhanced recombinant TCR proteins, TCR fusion protein, DARPins, anticalins, and the like, or a fully human, humanized, or chimeric IgG TCR-mimic antibody.

High energy, short path length alpha particle emitting radionuclides offer an excellent warhead for use in the various aspects of the invention. For example, $^{225}$Ac is a radionuclide that emits alpha particles with high linear energy transfer (80 keV/μm) over a short distance (50-100 μm). The clusters of double strand DNA breaks that result after exposure to alpha particles are much more difficult to repair than damage from radionuclides that emit beta particles with low linear energy transfer (0.2 keV/μm). The inability to repair DNA damage eventually leads to cancer cell death. This potency of alpha particles is exploited in the present compositions and therapies that employ soluble radiolabeled biologics because the lethal radiation is delivered specifically to cells bearing the target (e.g., tumor marker), allowing precise ablation of tumor cells while minimizing damage to healthy tissues. Furthermore, the long half-life of $^{225}$Ac (10 days) makes this radionuclide particularly attractive for therapeutic application.

$^{225}$Ac can be conjugated to any biologic (e.g., full-length antibody, scFv, Fab, TCR fusion protein, peptide) via a linker-chelator moiety, and in preclinical and clinical studies, dodecane tetraacetic acid (DOTA) is commonly used to stably chelate $^{225}$Ac, although other chelating agents may be used as indicated above. Examples of $^{225}$Ac-conjugated anti-cancer agents include CD33-targeting $^{225}$Ac-lintuzumab to treat acute myeloid leukemia, glypican-3-targeting $^{225}$Ac-GC33 to treat hepatocellular carcinoma, CD45-targeting $^{225}$Ac-BC8 to treat multiple myeloma, and PSMA-targeting $^{225}$Ac-PSMA617 to treat prostate cancer (Nelson 2020; Garg 2020; Bell 2020).

Other radionuclides that may be used in the various aspect of the invention include, but are not limited to, Astatine-211, Bismuth-213, Iodine-131, Lead-212, Lutetium-177, Radium-223, Thorium-227, Yttrium-90, or any of those disclosed herein.

While beta-emitting radionuclides generally cause substantial toxicity to normal tissues due to the crossfire effect from the long range of beta-particles, one beta-emitter appears to be more highly tolerated and effective as an antibody radioconjugate. Specifically, lutetium-177 ($^{177}$Lu) appears to deliver a more tumor-specific radiation compared other beta-emitters due to chemical properties more suitable for cell internalization and more favorable radiation properties with a higher component of beta particle emission vs. gamma ray emission.

Due to the potency of the radiolabeled biologic, a lower dose may be administered compared to an unlabeled biologic. For example, an $^{225}$Ac-labeled biologic may be dosed at least 20× to 100× lower than unlabeled biologics, such as at a radiation dose of 5-800 mCi/m$^2$ (0.1-20 mCi/kg) and a protein dose of less than 10 mg/m$^2$ (0.01-0.5 mg/kg). A $^{177}$Lu-labeled biologic would be dosed at least 20× to 100× lower, such as at a radiation dose of 0.2-20 mCi/m$^2$ (5-500 mCi/kg) and a protein dose of less than 10 mg/m$^2$ (0.01-0.5 mg/kg).

Moreover, due to the unique free-forward mechanism of the presently disclosed soluble radiolabeled biologics, lower protein and/or radiation doses may be needed to achieve a biologic and therapeutic effect. For example, the therapeutic response may be at least 10% greater, as measure by at least reduced tumor volume, than prior art therapies and compositions. The therapeutic response may be at least 20% greater, or 30% greater, 40% greater, 50% greater, 60% greater, 70% greater, 80% greater, 90% greater, 100% greater, than prior art therapies. The therapeutic response may occur at least 10% faster, such as at least 20% faster, 30% faster, 40% faster, 50% faster, 60% faster, 70% faster, 80% faster, 90% faster, 100% faster, than prior art therapies. Alternatively, the dose may be at least 10% lower to achieve the same therapeutic response as a prior art therapy and/or composition, such as at least 20% lower, 30% lower, 40% lower, 50% lower, 60% lower, 70% lower, 80% lower, 90% lower, 100% lower, 200% lower, 300% lower, 400% lower, or even 500% lower.

Without limitation, any of the following types of targeting agents and specific targeting agents that specifically bind pMHC may be radiolabeled and used in or embodied in the various aspects of the presently disclosed invention.

Previously, bifunctional TCR fusion proteins called ImmTACs have been reported, which utilize recombinant TCRs to target pMHCs on cancer cells and recruit T cells via an anti-CD3 moiety. An alternative approach that does not rely on T cell recruitment for therapeutic effect is to utilize a recombinant TCR fused to an immune cell modulation motif, such as 1) a human IgG1 Fc to create a TCR-antibody hybrid or 2) a human CH1-CL constant region to generate a TCR-Fab hybrid. Both TCR-antibody and TCR-Fab hybrids can be readily conjugated with radionuclides and are amenable to treat both liquid and solid tumors (Dubrovsky 2016).

For hematological (liquid) tumors, the use of radioconjugated TCR fusion proteins is particularly attractive because neoantigens are rare in hematologic malignancies due to low mutation load (Janelle 2020). As such, pMHC-presented neoantigens represent a unique opportunity for biologics-based RIT, particularly in blood cancers, because the potency of the radionuclide payload still permits killing of cancer cells with low mutation burden and thus, low levels of targetable pMHCs. A variety of tumor-associated antigens and neoantigens have been identified for which the invention can be directed, including gp100, WT1, MAGE-A1, NY-ESO-1, HER2, EGFR, TP53, KRAS, and CDK4, but the number of tumor antigens is virtually limitless since novel tumor markers and neoantigens are constantly being discovered. As a testament to the therapeutic potential of TCR-based treatment options, affinity enhanced TCRs or TCR-mimic antibodies have already been identified for several of these targets, but radioconjugation of these biologics has not been reported (He J Hem Onc 2019 12:99; Hoydahl 2019).

Neoantigens were first discovered in the 1990's and continue to be identified (see Table 1). In 1995, the first tumor-specific neoantigen was reported in human melanoma using a cDNA expression library screen, which identified a peptide derived from CDK4 (ACDPHSGHFV, mutation underlined (SEQ ID NO:137)). Afterwards, neoantigens from β-catenin (SYLDSGIHF (SEQ ID NO:138)) and caspase-8 (FPSDSWCYF*, * stop codon; SEQ ID NO:139) were identified in melanoma (1996) and head & neck carcinoma (1997), respectively. Some proteins display multiple neoantigens, as is the case with the following TP53 mutations: R175H, Y220C, G245S, R248Q, R248W. In addition to single nucleotide variants, aberrant RNA splicing, aberrant translation, post-translational modifications, mutational frameshifts, and gene fusions can also lead to neoantigens that get detected by T cells (Wang 2017; Minati 2020).

In contrast to neoantigens, tumor-associated antigens are wild-type, but expression is normally highly restricted to certain organs. For instance, members of the Melanoma Antigen Gene (MAGE) family are normally expressed only in reproductive tissues but are aberrantly induced in a large number of tumor types (e.g., non-small cell lung cancer, melanoma, breast cancer, multiple myeloma). Within this gene family, numerous antigens recognized by T cells have been identified, including MAGE-A1 (EADPTGHSY (SEQ ID NO:140), SLFRAVITK (SEQ ID NO:141)), MAGE-A2 (YLQLVFGIEV (SEQ ID NO:142), KMVELVHFL (SEQ ID NO:143), and MAGE-A3 (EADPIGHLY (SEQ ID NO:144), FLWGPRALV (SEQ ID NO:145)). See Table 1. In addition to members of the MAGE family, New York esophageal squamous cell carcinoma 1 (NY-ESO-1) is another antigen that is normally testis-specific but abnormally expressed in various tumors (e.g., neuroblastoma, melanoma, synovial sarcoma, ovarian cancer, prostate cancer). Peptides derived from NY-ESO-1 that are recognized by T cells include SLLMWITQCFL (SEQ ID NO:146), QLSLLMWIT (SEQ ID NO:147), and ASGPGGGAPR (SEQ ID NO:246, Wang 2017).

A number of additional neoantigens and tumor-associated antigens have been catalogued and are maintained in databases, such as the Database of Collected Peptides for Neoantigen (www*biostatistics*online/dbPepNeo/), Tumor-Specific NeoAntigen database (biopharm*zju*edu*cn/tsnadb/), TANTIGEN 2.0: Tumor T-cell Antigen Database (projects*met-hilab*org/tadb/), and Cancer Antigenic Peptide Database (caped*icp*ucl*ac*be/). Tumor antigens listed in these databases, as well as additional antigens identified in patients, also merit investigation using the radio-conjugation approach.

Radiolabeled soluble TCRs including an alpha and beta chain fused to an immune cell modulation motif, such as IL-2, the heavy chain of IgG1, IgG2, IgG4, or variants thereof, may, for example, be used to therapeutically target pMHCs. IL-2 activates immune cells to elicit anti-tumor response, whereas the Fc domain of IgG's is responsible for ADCC- or CDC-dependent tumor lysis. However, fusion of TCRs with alternative moieties is theoretically possible, provided that the recombinant protein modulates the immune system to generate a more robust immune response or delivers a cytotoxic payload in a targeted manner.

TABLE 1

| Source | AMINO ACID SEQUENCE | SEQ ID NO: |
|---|---|---|
| CDK4 | ACDPHSGHFV | 137 |
| β-catenin | SYLDSGIHF | 138 |
| caspase-8 | FPSDSWCYF* | 139 |
| MAGE-A1 | EADPTGHSY | 140 |
|  | SLFRA VITK | 141 |
| MAGE-A2 | YLQLVFGIEV | 142 |
|  | KMVELVHFL | 143 |
| MAGE-A3 | EADPIGHLY | 144 |
|  | FLWGPRALV | 145 |
| NY-ESO-1 | SLLMWITQCFL | 146 |
|  | QLSLLMWIT | 147 |
| WT1 | RMFPNAPYL | 148 |
| KRAS | KLVVVGAGGV | 149 |
|  | KLVVVGAVGV | 150 |
|  | KLVVVGACGV | 151 |
|  | KLVVVGADGV | 152 |
|  | VVGAVGVGK | 153 |
|  | VVGACGVGK | 154 |
|  | VVGAGGVGK | 155 |

TABLE 1-continued

| Source | AMINO ACID SEQUENCE | SEQ ID NO: |
|---|---|---|
| EGFP | KITDFGLAK | 156 |
| PR1 | VLQELNVTV | 157 |
| P53 | LLGRNSFEV | 158 |
|  | STTPPPGTRV | 159 |
|  | RMPEAAPPV | 160 |
|  | GLAPPQHLIRV | 161 |
| MART-1 | ELAGIGILTV | 162 |
|  | EAAGIGILTV | 163 |
| gp100 | IMDQVPFSV | 164 |
|  | KTWGQYWQV | 165 |
|  | YLEPGPVTV | 166 |
|  | YLEPGPVTA | 167 |
|  | ITDQVPFSV | 168 |
| Her2 | KIFGSLAFL | 169 |
| MUC1 | LLLTVLTVV | 170 |
| TARP | FLRNFSLML | 171 |
| PRAME | ALYVDSLFFL | 172 |
| MIF | FLSELTQQL | 173 |
| P68 | YLLPAIVHI | 174 |
| hTERT | ILAKFLHWL | 175 |
|  | RLVDDFLLV | 176 | mutations underlined; *stop codon

Any of the following types of modified TCRs may also be radiolabeled for use in or embodiment in the various aspects of the present invention.

The first TCR-IL-2 fusion construct, reported in 2004, included a p53-specific TCR fused to IL-2 (designated as ALT-801, 264scTCR/IL-2). Synthesized in a mammalian expression system, ALT-801 induced tumor responses in xenograft models of melanoma, breast cancer, and pancreatic carcinoma. In a phase I study, ALT-801 demonstrated stable disease in 10 out of 26 patients with advanced metastatic melanoma (He J Hem Onc 2019 12:139).

A TCR-Fc fusion molecule was first reported in 2005, which also targeted p53. This construct, termed 264scTCR/IgG1, was composed of a single-chain TCR (intervening linker between the alpha and beta chains of the TCR) fused to the heavy chain of IgG1 and was produced in a stable mammalian cell line. 264scTCR/IgG1 induced tumor response in a dose-dependent manner in a murine model of metastatic non-small cell lung cancer (He J Hem Onc 2019 12:139).

ImmTACs, which are soluble TCRs fused to anti-CD3 scFv, were first reported in 2012, which targeted the tumor-associated antigens MAGE-A3, NY-ESO-1, gp100, and MART-1 with picomolar affinity. Unlike the previously mentioned TCR fusion proteins, ImmTACs are produced in E. coli expression system. A phase Ib/II clinical study is currently being conducted to test the gp100-targeting ImmTAC (in combination with PD-L1 or CTLA-4 blockade) in patients with metastatic melanoma (NCT02535078; He J Hem Onc 2019 12:139). ImmTACs targeting MAGE-A4 and PRAME are also being clinically investigated (NCT04262466, NCT03973333).

In addition to recombinant TCRs, TCR-mimicking (TCRm) antibodies with analogous functions may also be radiolabeled for use in the various aspects of the present invention. Although structurally distinct from TCRs, TCRm antibodies also recognize specific peptides presented on MHCs. The first TCRm antibody was reported in 2000, a Fab antibody against a peptide derived from MAGE-A1 (EADPTGHSY (SEQ ID NO:140) identified using a phage display screen. See Table 2. Importantly, this antibody only bound to melanoma cells expressing MAGE-A1, thus proving that the identified antibody can recognize the endogenous pMHC complex. To improve the utility of the antibody, a higher-affinity Fab was generated through light-chain shuffling and heavy-chain mutagenesis, which was eventually designated as Fab-Hyb3.

A radiolabeled soluble biologic that specifically binds MAGE-A1 MHC complex for use or embodiment in various aspects of the invention may, for example, include or be an antibody, such as a monoclonal antibody, such as a full-length immunoglobulin, such as an IgG, or an antigen-binding fragment of an antibody, such as a Fab fragment or a $Fab_2$ fragment, or an scFv molecule, wherein the antibody includes the complementarity determining regions of Fab-Hyb3 set forth in Hulsmeyer et al., *The Journal of Biological Chemistry*, January 2005 Vol. 280(4), p. 2972-2980.

A radiolabeled soluble biologic that specifically binds MAGE-A1 MHC complex for use or embodiment in various aspects of the invention may, for example, include or be an antibody, such as a monoclonal antibody, such as a full-length immunoglobulin, such as an IgG, or an antigen-binding fragment of an antibody, such as a Fab fragment or a $Fab_2$ fragment, or an scFv molecule, wherein the antibody includes 1, 2 or 3 of the following immunoglobulin heavy chain CDR sequences ($CDR_{H1-3}$) and 1, 2, or 3 of the following immunoglobulin light chain CDR sequences ($CDR_{L1-3}$):

$CDR_{H1}$ including amino acid sequence DYAMH (SEQ ID NO:177), $CDR_{H2}$ including amino acid sequence GISWNSGSIG-YADSVKG (SEQ ID NO:178), $CDR_{H3}$ including amino acid sequence GRGFHYYYYGMDI (SEQ ID NO:179), $CDR_{L1}$ including amino acid sequence GGNNIGSRSVH (SEQ ID NO:180), $CDR_{L2}$ including amino acid sequence DDSDRPS (SEQ ID NO:181), and $CDR_{L3}$ including amino acid sequence QVWDSRTDHWV (SEQ ID NO:182).

Another early example of a TCRm antibody is 3.2G1, which targets a peptide from human chorionic gonadotropin β (GVLPALPQV (SEQ ID NO:183)), and in a murine model, 3.2G1 induced both ADCC and CDC to inhibit mammary tumor growth (He 2019 12:99). A TCRm antibody (Fab T1) was also developed early on against the tumor-associated antigen, NY-ESO-1. T1 (recognizing the peptide SLLMWITQV (SEQ ID NO:184)) is remarkable because the affinity was optimized to 2-4 nM, which is approximately 1000-times greater compared to a typical TCR (Dahan 2012; Hoydahl 2019).

In addition to these antigens, there are now over 30 TCRm antibodies at the pre-clinical stage that recognize a wide array of tumor-associated antigens, including gp100, hTERT, MUC1, MAGE-A3, HER2, MART-1, TARP, TP53, tyrosinase, p68, MIF, proteinase 3, WTi, HA-1H, PRAME, and HTLV-1 (TAX-11) (He 2019 12:99; Hoydahl 2019). TRCm antibodies are typically screened by either of hybridoma methodology or phage display. Hybridoma selection generates full-length IgGs produced in mammalian expression systems, whereas phage display generates scFvs or Fabs that can be produced in bacterial expression systems (Dahan 2012). Using recombinant technology, scFvs or Fabs can be converted into full-length IgGs, such as has been done with the TCRm antibody, ESK1, which targets the oncoprotein WT1-derived peptide RMFPNAPYL (SEQ TD NO: 148) and, in a preclinical model, cleared human acute lymphocytic leukemia (Table 2; Hoydahl 2019).

TABLE 2

| Clone | Target | Peptide Sequence | Antibody Sequence |
|---|---|---|---|
| T1 | NY-ESO-1 | SLLMWITQV (SEQ ID NO: 184) | Heavy chain CDR sequences: GFTFSTY (SEQ ID NO: 185), IVSSGGST (SEQ ID NO: 186) and AGELLPYYGMDV (SEQ ID NO: 187) Light chain CDR sequences: ERDVGGNY (SEQ ID NO: 188), DVI (SEQ ID NO: 189) and WSFAGGYYV (SEQ ID NO: 190) |
| T2 | NY-ESO-1 | SLLMWITQV (SEQ ID NO: 184) | Heavy chain CDR sequences: GFTFSTY (SEQ ID NO: 191), ILSSGGET (SEQ ID NO: 192) and AGMLLPYYGMDV (SEQ ID NO: 193) Light chain CDR sequences: ERDVGGNY (SEQ ID NO: 194), DVI (SEQ ID NO: 195) and WSFAGGYYV (SEQ ID NO: 196) |
| T3 | NY-ESO-1 | SLLMWITQV (SEQ ID NO: 184) | Heavy chain CDR sequences: GFTFSTY (SEQ ID NO: 197), IASSGGET (SEQ ID NO: 198) and AGSLLPYYGMDV (SEQ ID NO: 199) Light chain CDR sequences: ERDVGGNY (SEQ ID NO: 200), DVI (SEQ ID NO: 201) and WSFAGGYYV (SEQ ID NO: 202) |
| D7 | Tyrosinase | YMDGTMSQV (SEQ ID NO: 203) | CDR1 HC: SYGVH (SEQ ID NO: 204) CDR2 HC: VIWAGGTTNYNSALMS (SEQ ID NO: 205) CDR3 HC: DGHFHFDF (SEQ ID NO: 206) CDR1 LC: RASDIIYSNLA (SEQ ID NO: 207) CDR2 LC: AATNLAA (SEQ ID NO: 208) CDR3 LC: QHFWGSSIS (SEQ ID NO: 209) |
| B47B6 | WT1 | RMFPNAPYL (SEQ ID NO: 148) | CDR1 HC: SYDMS (SEQ ID NO: 210) CDR2 HC: YMSSGGGTYYPDTVKG (SEQ ID NO: 211) CDR3 HC: HDEITNFDY (SEQ ID NO: 212) CDR1 LC: RASCISISNSLH (SEQ ID NO: 213) CDR2 LC: YASCISIS (SEQ ID NO: 214) CDR3 LC: CICISYSWPLT (SEQ ID NO: 215) |
| Hyb3 | MAGE-A1 | EADPTGHSY (SEQ ID NO: 140) | scFV sequence: GCGGCCCAGCCGGCCATGGCCGAGGGCAGCT GGTGGAGTCTGGGGGAGGCTTGGTACAGCCT GGCAGGTCCCTGAGACTCTCCTGTGCAGCCT CTGGATTCACCTTTGATGATTATGCCATGCAC TGGGTCCGGCAAGCTCCAGGGAAGGGCCTGG AGTGGGTCTCAGGTATTAGTTGGAATAGTGG TAGCATAGGCTATGCGGACTCTGTGAAGGGC CGATTCACCATCTCCAGAGACAACGCCAAGA ACTCCCTGTATCTGCAAATGAACAGTCTGAG AGCTGAGGACACGGCTGTGTATTACTGTGCG AGGGGTCGTGGATTCCACTACTACTATTACG GTATGGACATCTGGGGCCAAGGGACCACGGT CACCGTCCAAGATCTGGCTCTACTTCCGGTA GCGGCAAATCCTCTGAAGGCAAAGGTACTAG ACAGTCTGTGCTGACCAGCCACCCTCGGTGT CAGTGGCCCCAGGACAGACGGCCAGGATTAC CTGTGGGGAAACAACATTGGAAGTAGAAGT GTGCACTGGTACCAGCAGAAGCCAGGCCAGG CCCCTGTGCTGGTCGTCTATGATGATAGCGA CCGGCCCTCAGGGATCCCTGAGCGATTCTCT GGCTCCAACTCTGGGAACATGGCCACCCTGA CCATCAGCAGGGTCGAAGCCGGGGATGAGG CCGACTATTACTGTCAGGTGTGGGATAGTCG TACTGATCATTGGGTGTTCGGCGGAGGGACC AAGCTGACCGTCCTCGCGGCCGC (SEQ ID NO: 216) |

TABLE 2-continued

| Clone | Target | Peptide Sequence | Antibody Sequence |
|---|---|---|---|
| C106B9 | MAGE-A4 | GVYDGREHTV (SEQ ID NO: 217) | CDR1 HC: GYWIE (SEQ ID NO: 218)<br>CDR2 HC: EILPGSGGTNYNEKFKG (SEQ ID NO: 219)<br>CDR3 HC: DSNSFTY (SEQ ID NO: 220)<br>CDR1 LC: SVSSSVDYIH (SEQ ID NO: 221)<br>CDR2 LC: STSILAS (SEQ ID NO: 222)<br>CDR3 LC: QQRSSYT (SEQ ID NO: 223) |
| F184C7 | MAGE-A9 | ALSVMGVYV (SEQ ID NO: 224) | CDR1 HC: FSSSWMN (SEQ ID NO: 225)<br>CDR2 HC: RIYPGDGDTNYNEKFKG (SEQ ID NO: 226)<br>CDR3 HC: EATTVVAPYYFDY (SEQ ID NO: 227)<br>CDR1 LC: RASENIYRNLA (SEQ ID NO: 228)<br>CDR2 LC: AATNLAD (SEQ ID NO: 229)<br>CDR3 LC: QHFWGTPLT (SEQ ID NO: 230) |
| D10A3 | PAP | TLMSAMTNL (SEQ ID NO: 231) | CDR1 HC: DYNMD (SEQ ID NO: 232)<br>CDR2 HC: DINPNYDTTTYNQKFKG (SEQ ID NO: 233)<br>CDR3 HC: RNYGNYVGFDF (SEQ ID NO: 234)<br>CDR1 LC: KASQRVNNDVA (SEQ ID NO: 235)<br>CDR2 LC: YASNRYT (SEQ ID NO: 236)<br>CDR3 LC: QQDYSSPFT (SEQ ID NO: 237) |

Table 2 source notes: NY-EOS-1 targets disclosed in WO 2010/106431; MAGE-A1 targets and scFv antibodies disclosed in U.S. Pub. No. 20090208502 and Int'l Pub. No. WO 2007/073147; Tyrosinase, WT1, MAGE-A4, MAGE-A9, and PAP disclosed in US 2018/0171024.

Lastly, engineered proteins have also been reported to exhibit specific pMHC binding activity. Designed ankyrin repeat proteins (DARPins) are antibody mimetics that are engineered from ankyrin repeat proteins, which are one of the most common proteins that mediate protein-protein interactions in nature. In 2020, DARPins that target pMHCs were first reported. These proteins are engineered to recognize an MHC displaying a peptide derived from NY-ESO-1 (SLLMWITQC (SEQ ID NO:238)) and are fused to an anti-CD3 moiety, creating a BiTE that elicits T cell-mediated cell death (Walcer 2020).

Accordingly, the present disclosure provides soluble radiolabeled biologics including a complex composed of Major Histocompatibility Complex (MHC) having an antigenic peptide bound thereon (pMHC). The peptide may be derived from a disease related antigen such as a cancer antigen, i.e., tumor-associated or tumor-specific antigen. Exemplary biologics include at least TCR mimic antibodies (TCRm), recombinant T-cell receptor proteins (rTCR), designed ankyrin repeat proteins (DARPins), and anticalins. The biologic may further include an immune cell modulation motif, or a heavy chain of IgG1, IgG2, IgG4, or a derivative thereof, such as a heavy chain of a human IgG1, IgG2, IgG4, or a derivative thereof.

The antigen presenting molecule is an MHC, such as MHC class I or class II. The MHC may be a human leukocyte antigen (HLA), such as an HLA class I or Class II. The HLA class I molecules may be HLA-A1 or HLA-A2.

The soluble radiolabeled biologic may bind the pMHC but not the antigen-presenting molecule in absence of the MHC-restricted peptide or the MHC-restricted peptide in absence of the antigen-presenting molecule.

While specific biologics have been described, any biologic, both naturally-derived and synthetically produced, that binds to pMHC complexes may be evaluated as therapeutic options to eradicate malignancies that display tumor antigens via an MHC.

Soluble Radiolabeled Biologic

The presently disclosed invention provides soluble radiolabeled biologics that target pMHCs, therapeutic methods for treating cancers using the soluble radiolabeled biologics, uses of the soluble radiolabeled biologics for treating cancers, and pharmaceutical compositions including the soluble radiolabeled biologics such as for the treatment of cancers. To evoke the desired therapeutic effects, the biologics are conjugated with radionuclides. Radionuclides are unique from other conjugation approaches, such as drug and toxin conjugation, because internalization of the biologic-conjugate complex is not necessary; instead, lethal radiation can be delivered from the cell surface. This is particularly beneficial in the case of pMHCs, since the antigen density of pMHCs may be low compared to tumor markers that are highly expressed. Alpha emitting and certain beta emitting radionuclides (e.g., $^{177}$Lu) exhibit a favorable profile for conjugation to biologics that target tumors.

One aspect of the invention provides, methods that include administering to a patient an effective amount of the soluble radiolabeled biologic, such as in a patient specific composition in one or more doses that deliver a therapeutically effective amount of the soluble radiolabeled biologics.

The soluble radiolabeled biologic may, for example, be administered to a patient that has also undergone a treatment, such as surgery for treatment of the cancer, such as to remove all or a portion of a solid tumor.

The methods may, for example, further include one or more diagnostic steps to identify if the patient has a cancer specific antigen, such as by identifying antigen positive cells within solid tumors or circulating in a blood sample from the patient.

The patient may, for example, be monitored at intervals during the therapy for the presence of the tumor antigen to evaluate the reduction in antigen positive cells. Detecting a decreased number of the antigen positive cells after treatment with the soluble radiolabeled biologic, as compared to the number of antigen positive cells prior to treatment may indicate effectiveness of the biologic in treating an antigen-positive cancer in the mammalian subject.

The soluble radiolabeled biologic may, for example, exhibit essentially the same immunoreactivity to the antigen (pMIC) as a control unlabeled biologic.

Moreover, the soluble radiolabeled biologic, such as a soluble biologic labeled with $^{225}$Ac or $^{177}$Lu, may, for example, be at least 5-fold more effective at causing cell death of antigen-presenting cells (pMHC targeted by the biologic) than a control unlabeled biologic. For example, a $^{225}$Ac or $^{177}$Lu-labeled soluble biologic may be at least 10-fold more effective, at least 20-fold more effective, at least 50-fold more effective, or at least 100-fold more effective at causing cell death than the control biologic.

According to certain aspects of the present invention, the methods may include administration of radiolabeled and non-radiolabeled (e.g., "naked") fractions of the soluble biologic, such as in a patient specific composition. In this way, the total radioactivity of the soluble biologic may be varied or may be held constant while the overall protein concentration of the biologic may be held constant or may be varied, respectively. For example, the total protein concentration of non-radiolabeled biologic administered may vary depending on the exact nature of the disease to be treated, age, gender, and weight of the patient, identity of the monoclonal antibody, and the label (e.g., radionuclide) selected for labeling of the monoclonal antibody.

According to certain aspects of the present invention, the effective amount of the soluble radiolabeled biologic is a maximum tolerated dose (MTD).

According to certain aspects of the methods of the present invention, the soluble radiolabeled biologic may be administered according to a dosing schedule selected from the group consisting of one every 7, 10, 12, 14, 20, 24, 28, 35, and 42 days throughout a treatment period, wherein the treatment period includes at least two doses.

According to certain aspects of the present invention, the soluble radiolabeled biologic may be administered according to a dose schedule that includes 2 doses, such as on days 1 and 5, 6, 7, 8, 9, or 10 of a treatment period, or days 1 and 8 of a treatment period.

Administration of the soluble radiolabeled biologic, in addition to other therapeutic agents, may be provided in a number of ways depending upon whether local or systemic treatment is desired and upon the area to be treated. Administration may, for example, be intratracheal, intranasal, epidermal and transdermal, oral or parenteral. Parenteral administration includes intravenous, intra-arterial, subcutaneous, intraperitoneal or intramuscular injection or infusion; or intracranial, e.g., intrathecal or intraventricular, administration. A slow-release preparation including the targeting agents(s) and/or other therapeutic agents may be administered. The various agents may be administered as a single treatment or in a series of treatments that continue as needed and for a duration of time that causes one or more symptoms of the cancer to be reduced or ameliorated, or that achieves another desired effect.

The dose(s) of the soluble radiolabeled biologic may for example, vary or be determined depending upon the gender, age, weight, and medical status and/or history of the subject, further depending upon the route by which the composition is to be administered and the desired effect. Appropriate doses of a therapeutic agent depend upon the potency with respect to the expression or activity to be modulated. The therapeutic agents can be administered to an animal (e.g., a human) at a relatively low dose at first, with the dose subsequently increased until an appropriate response is obtained.

Radiolabeling pMHC Targeting Agents and Other Targeting Agents

The pMHC targeting agent and other targeting agents disclosed herein may, for example, be labeled with a radioisotope, such as an alpha particle emitter (e.g., $^{22}$Ac), through conjugation of a chelator molecule, and chelation of the radioisotope thereto. According to certain aspects, the targeting agent may be an antibody against that is deglycosylated in the constant region, such as at asparagine-297 (Asn-297, N297; Kabat number) in the heavy chain CH2 domain, for the purpose of uncovering a unique conjugation site, glutamine (i.e., Gln-295, Q295) so that it is available for conjugation with bifunctional chelator molecules.

According to certain aspects, the radiotherapeutic may be an antibody that may have reduced disulfide bonds such as by using reducing agents, which may then be converted to dehydroalanine for the purpose of conjugating with a bifunctional chelator molecule.

According to certain aspects, the radiotherapeutic may be an antibody for which the disulfide bonds have been reduced using reducing agents, which is then conjugated via aryl bridges with a bifunctional chelator molecule. For example, according to certain aspects a linker molecule such as 3,5-bis(bromomethyl)benzene may be used to bridge the free sulfhydryl groups on the antibody.

According to certain aspects, the radiotherapeutic may be an antibody that may have certain specific existing amino acids replaced with cysteine(s) that then can be used for site-specific labeling.

Exemplary chelators that may be linked to targeting agents in the various aspects of the invention include: 1,4,7,10-tetraazacyclododecane-1,4,7-triacetic acid (DO3A) or a derivative thereof; 1,4,7-triazacyclononane-1,4-diacetic acid (NODA) or a derivative thereof; 1,4,7-triazacyclononane-1,4,7-triacetic acid (NOTA) or a derivative thereof, 1,4,7,10-tetraazacyclododecane-1,4,7,10-tetraacetic acid (DOTA) or a derivative thereof, 1,4,7-triazacyclononane, 1-glutaric acid-4,7-diacetic acid (NODAGA) or a derivative thereof; 1,4,7,10-tetraazacyclodecane, 1-glutaric acid-4,7,10-triacetic acid (DOTAGA) or a derivative thereof, 1,4,8,11-tetraazacyclotetradecane-1,4,8,11-tetraacetic acid (TETA) or a derivative thereof; 1,4,8,11-tetraazabicyclo[6.6.2]hexadecane-4,11-diacetic acid (CB-TE2A) or a derivative thereof; diethylene triamine pentaacetic acid (DTPA), its diester, or a derivative thereof; 2-cyclohexyl diethylene triamine pentaacetic acid (CHX-A"-DTPA) or a derivative thereof, deforoxamine (DFO) or a derivative thereof, 1,2-[[6-carboxypyridin-2-yl]methylamino]ethane ($H_2$dedpa) or a derivative thereof, DADA or a derivative thereof; 1,4,7,10-Tetraazacyclododecane-1,4,7,10-tetra(methylene phosphonic acid) (DOTP) or a derivative thereof; 4-amino-6-[[16-[(6-carboxypyridin-2-yl)methyl]-1,4,10,13-tetraoxa-7,16-diazacyclooctadec-7-yl]methyl]pyridine-2-carboxylic acid (MACROPA-$NH_2$) or a derivative thereof, MACROPA or a derivative thereof, 1,4,7,10-tetrakis(carbamoylmethyl)-1,4,7,10-tetraazacyclododecane (TCMC) or a derivative thereof; {4-[2-(bis-carboxymethyl-amino)-ethyl]-7-carboxymethyl-[1,4,7]triazonan-1-yl}-acetic acid (NETA) or a derivative thereof, Diamsar or a derivative thereof; 1,4,7-triazacyclononane-1,4,7-tris[methyl(2-carboxyethyl)phosphinic acid (TRAP, PRP9, TRAP-Pr) or a derivative thereof; N,N'-bis(6-carboxy-2-pyridylmethyl)ethylenediamine-N,N'-diacetic acid (H4octapa) or a derivative thereof; N,N'-[1-benzyl-1,2,3-triazole-4-yl]methyl-N,N'-[6-(carboxy)pyridin-2-yl]-1,2-diaminoethane (H2azapa) or a derivative thereof; N,N"-[[6-(carboxy)pyridin-2-yl]methyl]diethylenetriamine-N,N',N"- triacetic acid (H5decapa) or a derivative thereof; N,N'-bis (2-hydroxy-5-sulfobenzyl)ethylenediamine-N,N'-diacetic acid (SHBED) or a derivative thereof; N,N'-bis(2-hydroxybenzyl)ethylenediamine-N,N'-diacetic acid (HBED) or a derivative thereof; 3,6,9,15-tetraazabicyclo[9.3.1]pentadeca-1(15),11,13-triene-3,6,9,-triacetic acid (PCTA) or a derivative thereof; desferrioxamine B (DFO) or a derivative thereof; N,N'-(methylenephosphonate)-N,N'-[6-(methoxycarbonyl)pyridin-2-yl]methyl-1,2-diaminoethane (H6phospa) or a derivative thereof; 1,4,7,10,13,16-hexaazacyclohexadecane-N,N',N'',N''',N'''',N'''''-hexaacetic acid (HEHA) or a derivative thereof, 1,4,7,10,13-pentaazacyclopentadecane-N,N',N'',N''',N''''-pentaacetic acid (PEPA) or a derivative thereof, or 3,4,3-LI(1,2-HOPO) or a derivative thereof.

According to certain aspects, the targeting agent may be radiolabeled through chemical conjugation of suitable bifunctional chelators that can chelate one or more radionuclides. Exemplary chelator molecules that may be used include p-SCN-Bn-DOTA, $NH_2$-DOTA, $NH_2$—$(CH_2)_{1-20}$-DOTA, $NH_2$-$(PEG)_{1-20}$-DOTA, HS-DOTA, HS—$(CH_2)_{1-20}$-DOTA, HS-$(PEG)_{1-20}$-DOTA, dibromo-S—$(CH_2)_{1-20}$-DOTA, dibromo-S-$(PEG)_{1-20}$-DOTA, p-SCN-Bn-DOTP, $NH_2$-DOTP, $NH_2$—$(CH_2)_{1-20}$-DOTP, $NH_2$-$(PEG)_{1-20}$-DOTP, HS-DOTP, HS—$(CH_2)_{1-20}$-DOTP, HS-$(PEG)_{1-20}$-DOTP, dibromo-S—$(CH_2)_{1-20}$-DOTP, and dibromo-S-$(PEG)_{1-20}$-DOTP.

The chelator molecules may, for example, be attached to a targeting agent through a linker molecule. Exemplary linker molecules include:

—$CH_2(C_6H_4)NH_2$ or —$CH_2(C_6H_4)NH$—X—Y,
wherein X is
—$R_2$—$CH_2CH_2O(CH_2CH_2O)_nCH_2CH_2$—,
—$R_2$—$CH_2CH_2NHC(O)CH_2CH_2O(CH_2CH_2O)_nCH_2CH_2$—,
—$R_2$—$(CH_2)_nCH_2$—,
—$R_2$—$CH_2CH_2NHC(O)(CH_2)_nCH_2$—,
—$R_2$—$CH(C(O)R_3)CH_2$—, wherein $R_3$ is —OH or a short peptide (1-20 amino acids),
—$R_2$—$CH_2CH_2O(CH_2CH_2O)_nCH_2C(O)O$—, or
—$R_2$—$CH_2CH_2NHC(O)CH_2CH_2O(CH_2CH_2O)_nCH_2CC(O)O$—,
wherein n is 1-20, and
$R_2$ is —C(O)— or —C(S)NH—; and
Y is —$NH_2$ or —$SR_4$—, wherein $R_4$ is —H or —$CH_2$-3,5-bis(bromomethyl)benzene.

Targeting agents, such as protein targeting agents, for example antibodies and antigen-binding antibody fragments, and peptide targeting agents may, for example, be conjugated with a chelator for radiolabeling the targeting agent via chelation of a radionuclide. Such protein or peptide targeting agents, for example, that include lysine(s), may conveniently be conjugated to a DOTA chelating moiety using the bifunctional agent S-2-(4-Isothiocyanatobenzyl)-1,4,7,10-tetraazacyclododecane tetraacetic acid a/k/a/"p-SCN-Bn-DOTA" (Catalog #B205; Macrocyclics, Inc., Plano, TX, USA). p-SCN-Bn-DOTA may be synthesized by a multi-step organic synthesis fully described in U.S. Pat. No. 4,923,985. Chelation of a radionuclide by the DOTA moiety may be performed prior to chemical conjugation of the antibody with p-SCN-Bn-DOTA and/or after said conjugation. Methods for conjugating a targeting agent such as an antibody to DOTA using p-SCN-DOTA and/or labeling the conjugate with a radionuclide via chelation to the DOTA moiety which may be employed in the present invention are disclosed, for example, in U.S. Pat. No. 9,603,954.

pMIC targeting agents and other targeting agents containing one or more cysteine residues, such as peptides, proteins, antibodies and protein antibody mimetics may, for example, be chemically conjugated to any of the chelator-bearing, such as DOTA-bearing, stable linkers disclosed in U.S. Pat. No. 11,000,604 titled "Reagent for site-selective bioconjugation of proteins or antibodies" for radionuclide labeling.

Methods for conjugating a targeting agent such as an antibody with DOTA using p-SCN-DOTA or PODS-DOTA and labeling the chelator-conjugated targeting agent with an exemplary radionuclide are further described in Example 1.

Diagnostic Aspects

The presently disclosed methods may include diagnosing the subject to ascertain if cells positive for a selected pHMC target are present. Such antigen-positive cells may be detectable and/or present in a number of biological specimens, such as in circulating cells in a sample of blood from the subject or tumor cells in a biopsy of the subject. The diagnosing step may, for example, include obtaining a sample of blood or tissue from the subject and mounting the sample on a substrate. The presence or absence of the antigen may be detected using a diagnostic antibody, peptide, or small molecule, wherein the diagnostic antibody peptide, or small molecule is labeled with any of the standard imaging labels known in the art. Exemplary labeling agents include, for example, radiolabels such as $^3$H, $^{14}$C, $^{32}$P, $^{35}$S, and $^{125}$I; fluorescent or chemiluminescent compounds, such as fluorescein isothiocyanate, rhodamine, or luciferin; and enzymes, such as alkaline phosphatase, β-galactosidase, or horseradish peroxidase used in conjunction, for example, with colorimetric substrates as known in the art. An exemplary labeled agent used in such a diagnostic assay may include any of the soluble radiolabeled biologics disclosed herein.

Alternatively, the methods may include diagnosing the subject to ascertain if antigen-positive cells are present using a soluble radiolabeled biologic labeled with any of $^{18}$F, $^{11}$C, $^{68}$Ga, $^{64}$Cu, $^{89}$Zr, or $^{124}$I, which are useful for PET imaging, or $^{99m}$Tc or $^{111}$In, which are useful for SPECT imaging. Accordingly, the method may include administering to the subject a soluble radiolabeled biologic labeled with one or more of $^{18}$F, $^{11}$C, $^{68}$Ga, $^{64}$Cu, $^{89}$Zr, $^{124}$I, $^{99m}$Tc, or $^{111}$In, and performing a non-invasive imaging technique on the subject, such as performing a PET or SPECT scan on the subject. The method may, for example, include, performing the imaging after a sufficient amount of time from administration of the soluble radiolabeled biologic has elapsed for the soluble radiolabeled biologic to accumulate in tissues of the subject, such as after at least 10 minutes, after at least 15 minutes, after at least 20 minutes, after at least 30 minutes, after at least 40 minutes, after at least 50 minutes, or after at least 60 minutes, for example, after 10-120 minutes. According to certain preferred aspects of the method, the soluble radiolabeled biologic may include $^{68}$Ga, $^{89}$Zr, or $^{111}$In, and may be labeled using any of the methods disclosed herein (e.g., such as disclosed in Example 1).

If the subject has antigen-positive cells, the therapeutic methods of the presently disclosed invention may be carried out, i.e., administration of a therapeutically effective amount of a soluble radiolabeled biologic, either alone or in combination with one or more additional therapeutic agents or treatments.

Additional Specificities: Multispecific and Additional Targeting Agents

The presently disclosed invention also provides therapeutic methods, uses and compositions that utilize and/or include radiolabeled multispecific targeting agents, such as radiolabeled bispecific targeting agents, that specifically bind to a selected pMHC complex and to a different selected pMHC complex or a different non-pMHC antigen. Where a multispecific targeting agent is radiolabeled, any part or component of the agent may bear the radiolabel.

The presently disclosed invention also provides therapeutic methods, uses and compositions that administer, employ, or include a radiolabeled bispecific targeting agent, that specifically binds to a selected pMHC complex and a different targeting agent that may be radiolabeled, drug-conjugated, or unlabeled, which specifically binds to a different pMHC complex or to a non-pMHC antigen, such as a cell-surface presented antigen. In aspects in which two or more targeting agents are administered to a subject, such combination use or administration may be simultaneous, separate or sequential with the administration of the effective amount of the soluble radiolabeled biologic. For simultaneous administration, the agents may be administered as one composition, or as separate compositions, as appropriate. Those skilled in the art will appreciate that even when different agents are administered at separate times to a subject, the agents themselves and/or their biological effects may be present in an at least partially temporally overlapping manner within the subject.

In one aspect, the present invention provides a method for treating a proliferative disorder such as any of those disclosed herein by administering to a subject in need of treatment a first soluble radiolabeled biologic that recognizes a pMHC for a proliferative disorder/cancer associated antigen (such as any of those disclosed herein) and administering a second soluble radiolabeled biologic that recognizes a different pMHC for the same or a different proliferative disorder/cancer associated antigen (such as any of those disclosed herein). When the pMHC for the pMHCs for the first and second soluble radiolabeled biologics are from different proliferative disorder/cancer associated antigen, those different proliferative disorder/cancer associated antigen may be each be associated with the same proliferative disorder/cancer, which a patient may be treated for and may be expressed by the same or different cells.

In another aspect, the present invention provides a method for treating a proliferative disorder such as any of those disclosed herein by administering to a subject in need of treatment a soluble radiolabeled biologic that recognizes a pMHC for a proliferative disorder/cancer associated antigen (such as any of those disclosed herein) and administering a different targeting agent that may be radiolabeled, drug-conjugated or unlabeled and recognizes a non-pMHC proliferative disorder/cancer associated target antigen (such as a cell surface protein) that may be the same or different antigen as from the antigen from which the pMHC targeted by the soluble radiolabeled biologic is derived. The antigen from which the pMHC targeted by the soluble radiolabeled biologic is derived and the antigen targeted by the different targeting agent may be each be associated with the same proliferative disorder/cancer, which a patient may be treated for and may be expressed by the same or different cells.

A further aspect of the invention provides multi-specific, such as bispecific, radiolabeled targeting agents, such as radiolabeled bi/multispecific antibody or DARPin, that include a first binding specificity to a pMHC derived from a proliferative disorder/cancer associated antigen and a second binding specificity to different pMHC or a non-pMHC target antigen, which second specificity may be to the same or a different antigen as for the first specificity, which may be also be a proliferative disorder/cancer-associated antigen. The antigen targeted by the first specificity and the antigen targeted by the second specificity may be each be associated with the same proliferative disorder/cancer, which a patient may be treated for and may be expressed by the same or different cells.

The additional different antigens may, for example, be antigens whose expression is upregulated on cells involved in various diseases or disorders, such as proliferative disorders, for example, solid tumor cancers, such as those in which a pMHC is also or can also be upregulated. For example, the additional different antigens may be selected from the group including mesothelin, TSHR, CD19, CD123, CD22, CD30, CD45, CD171, CD138, CS-1, CLL-1, GD2, GD3, B-cell maturation antigen (BCMA), T-Ag, TnAg, prostate specific membrane antigen (PSMA), ROR1, FLT3, TROP2, T-cell receptor gamma (TCRγ) chain alternate reading frame protein (TRAP), fibroblast activation protein (FAP), calreticulin, phosphatidylserine, GRP78 (BiP), TAG72, CD38, CD44v6, CEA, EPCAM, B7H3, KIT, IL-13Ra2, interleukin-11 receptor a (IL-llRa), PSCA, PRSS21, VEGFR2, LewisY, CD24, platelet-derived growth factor receptor-beta (PDGFR-beta), SSEA-4, CD20, Folate receptor alpha (FRa), ERBB2 (Her2/neu), ERBB3/Her3, MUC1, epidermal growth factor receptor (EGFR), EGFRvIII, NCAM, Prostase, PAP, ELF2M, Ephrin B2, IGF-I receptor, CAIX, LMP2, gplOO, bcr-abl, tyrosinase, EphA2, Fucosyl GM1, sLe, GM3, DR5, 5T4, TGS5, HMW-MAA, o-acetyl-GD2, Folate receptor beta, TEM1/CD248, TEM7R, CLDN6, GPRC5D, CXORF61, CD97, CD 179a, ALK, Polysialic acid, PLAC1, GloboH, NY-BR-1, UPK2, HAVCR1, ADRB3, PANX3, GPR20, LY6K, OR51E2, TARP, WTi, NY-ESO-1, LAGE-la, MAGE-A1, legumain, HPV E6,E7, MAGE A1, MAGEA3, MAGEA3/A6, ETV6-AML, sperm protein 17, XAGE1, Tie 2, MAD-CT-1, MAD-CT-2, Fos-related antigen 1, prostein, survivin and telomerase, PCTA-1/Galectin 8, KRAS, MelanA/MARTI, Ras mutant, hTERT, Lewis Y (LeY) antigen, sarcoma translocation breakpoints, ML-IAP, ERG (TMPRSS2 ETS fusion gene), NA17, PAX3, Androgen receptor, Cyclin B 1, MYCN, RhoC, TRP-2, CYP1B 1, BORIS, SART3, PAX5, OY-TES 1, LCK, AKAP-4, SSX2, RAGE-1, human telomerase reverse transcriptase, RU1, RU2, intestinal carboxyl esterase, mut hsp70-2, CD79a, CD79b, CD72, LAIR1, FCAR, LILRA2, CD300LF, CLEC12A, BST2, EMR2, LY75, GPC3, FCRL5, GPA7, and IGLL1.

Exemplary DR5 (death receptor 5) targeting agents that may be radiolabeled, unlabeled or drug-conjugated for use in the invention include the monoclonal anti-DR5 antibodies mapatumumab, conatumumab, lexatumumab, tigatuzumab, drozitumab, and LBY-135. Such DR5 targeting agents may, for example, be used in combination with a radiolabeled pMHC targeting agent for the treatment of ovarian, breast, cervical prostate, gastric, bladder, lung, melanoma, colorectal and squamous cell carcinoma cancers and any of the cancers disclosed herein.

Exemplary 5T4 (Trophoblast glycoprotein (TBPG)) targeting agents that may be radiolabeled, drug-conjugated, or unlabeled for use in the invention include the anti-5T4 monoclonal antibodies MED10641, ALG.APV-527, Tb535, H6-DM5, and ZV0508, as well as 5T4Fab-SEA/E-120 (SEQ ID NO:134), Naptumomab estafenatox (reported as SEQ ID NO:135 (chimeric heavy chain component) non-covalently bound to SEQ ID NO:136 (light chain component)) or the Fab portion thereof only, and an anti-5TF Fab molecule including a heavy chain component corresponding to residues 1 to 222 of SEQ ID NO:134 and a light chain component residues 459 to 672 of SEQ ID NO: 134. Such 5T4 targeting agents may, for example, be used in combination with a radiolabeled pMHC targeting agent for the treatment of ovarian, head and neck, breast, prostate, gastric, bladder, lung, melanoma, colorectal and squamous cell carcinoma cancers and any of the cancers disclosed herein.

Exemplary HER2 (ERBB2) targeting agents that may be radiolabeled, drug-conjugated, or unlabeled for use in the invention include the monoclonal antibodies trastuzumab and pertuzumab. Applicants have successfully conjugated Trastuzumab with p-SCN-DOTA and radiolabeled the composition with $^{225}$Ac or $^{177}$Lu. Exemplary ADCs targeting HER2 that may be used include fam-trastuzumab deruxtecan-nxki (Enhertu®; AstraZeneca/Daiichi Sankyo) and Trastuzumab emtansine (Roche/Genentech). The anti-HER2 antibody may, for example, also be a multi-specific antibody, such as bispecific antibody, against any available epitope of HER3/HER2 such as MM-111 and MM-141/Istiratumab from Merrimack Pharmaceuticals, MCLA-128 from Merus NV, and MEHD7945A/Duligotumab from Genentech. HER2 targeting agents may, for example, be used in combination with a radiolabeled pMHC targeting agent in the treatment of HER2-expressing cancers such as ovarian, breast, metastatic breast, esophageal, lung, cervical, and endometrial cancers including but not limited to those that are both HER2- and HER3-positive.

The amino acid sequences of the heavy chain and the light chain of Trastuzumab reported by DrugBank Online are: heavy chain (SEQ ID NO:102) and light chain (SEQ ID NO:103) and a HER2 binding antibody including one or both of said chains may be embodied in or used in the various embodiments of the invention.

The amino acid sequences of the heavy chain and the light chain of Pertuzumab reported by DrugBank Online are: heavy chain (SEQ ID NO:104) and light chain (SEQ ID NO:105) and a HER2 binding antibody including one or both of said chains may be embodied in or used in the various embodiments of the invention.

An exemplary HER3 antibody that may be radiolabeled and embodied in and/or used in the presently disclosed invention may, for example, include a murine monoclonal antibody against HER3 including a heavy chain having the amino acid sequence as set forth in SEQ ID NO:9 or 11 and/or a light chain having the amino acid sequence as set forth in SEQ ID NO:10 or 12, or an antibody such as a humanized antibody derived from one or more of said sequences. An exemplary HER3 antibody that may be radiolabeled and embodied in and/or used in the presently disclosed invention may include or a heavy chain with an N-terminal region having the sequence set forth in SEQ ID NO:13 and/or a light chain with an N-terminal region having the sequence as set forth in SEQ ID NO:14. A HER3 antibody that may be similarly embodied or used in various aspect of the invention may, for example, include the heavy chain variable region having the amino acid sequence as set forth in SEQ ID NO:7, and/or a light chain variable region having an amino acid sequence as set forth in SEQ ID NO:8; and/or a heavy chain including one or more of CDR1, CDR2 and CDR3 having the amino acid sequences respectively set forth in SEQ ID NOS:1-3, and/or a light chain with one or more of the CDR1, CD2 and CDR3 having the amino acid sequences respectively set forth in SEQ ID NOS:4-6. A HER3 antibody embodied in and/or used in any of the aspects of the invention may, for example, include any combination of the aforementioned light chain sequences and/or heavy chain sequences.

An exemplary HER3 antibody includes an immunoglobulin heavy chain variable region including a CDR-H1 including SEQ ID NO:15, a CDR-H2 including SEQ ID NO:16, and a CDR-H3 including SEQ ID NO:17, and/or an immunoglobulin light chain variable region including a CDR-L1 including SEQ ID NO:18, a CDR-L2 including SEQ ID NO:19, and a CDR-L3 including SEQ ID NO:20. An exemplary An exemplary HER3 antibody includes an immunoglobulin heavy chain variable region including SEQ ID NO:21 and/or an immunoglobulin light chain variable region including SEQ ID NO:22. An exemplary HER3 antibody includes an immunoglobulin heavy chain amino acid sequence of SEQ ID NO:23 and/or an immunoglobulin light chain amino acid sequence of SEQ ID NO:24.

An exemplary HER3 antibody includes an immunoglobulin heavy chain variable region including a CDR-H1 including SEQ ID NO:25, a CDR-H2 including SEQ ID NO:26, and a CDR-H3 including SEQ ID NO:27; and/or an immunoglobulin light chain variable region including a CDR-L1 including SEQ ID NO:28, a CDR-L2 including SEQ ID NO:29, and a CDR-L3 including SEQ ID NO:30. An exemplary HER3 antibody includes an immunoglobulin heavy chain variable region including SEQ ID NO:31 and/or an immunoglobulin light chain variable region including SEQ ID NO:32. An exemplary HER3 antibody includes an immunoglobulin heavy chain amino acid sequence of SEQ ID NO:33 and/or an immunoglobulin light chain amino acid sequence of SEQ ID NO:34.

An exemplary HER3 antibody includes an immunoglobulin heavy chain variable region including a CDR-H1 including SEQ ID NO:35, a CDR-H2 including SEQ ID NO:36, and a CDR-H3 including SEQ ID NO:37; and/or an immunoglobulin light chain variable region including a CDR-L1 including SEQ ID NO:38, a CDR-L2 including SEQ ID NO:39, and a CDR-L3 including SEQ ID NO:40. An exemplary HER3 antibody includes an immunoglobulin heavy chain variable region including SEQ ID NO:41, and/or an immunoglobulin light chain variable region SEQ ID NO:42. An exemplary HER3 antibody includes an immunoglobulin heavy chain amino acid sequence of SEQ ID NO:43 and an immunoglobulin light chain amino acid sequence of SEQ ID NO:44.

An exemplary HER3 antibody includes an immunoglobulin heavy chain variable region including a CDR-H1 including SEQ ID NO:45, a CDR-H2 including SEQ ID NO:46, and a CDR-H3 including SEQ ID NO:47; and/or an immunoglobulin light chain variable region including a CDR-L1 including SEQ ID NO:48, a CDR-L2 including SEQ ID NO:29, and a CDR-L3 including SEQ ID NO:49. An exemplary HER3 antibody includes an immunoglobulin heavy chain variable region including SEQ ID NO:50 and/or an immunoglobulin light chain variable region including SEQ ID NO:51. An exemplary HER3 antibody includes an immunoglobulin heavy chain amino acid sequence of SEQ ID NO:52 and/or an immunoglobulin light chain amino acid sequence of SEQ ID NO:53.

An exemplary HER3 antibody includes an immunoglobulin heavy chain variable region including a CDR-H1 including SEQ ID NO:54, a CDR-H2 including SEQ ID NO:55, and a CDR-H3 including SEQ ID NO:56; and/or an immunoglobulin light chain variable region including a CDR-L1 including SEQ ID NO:28, a CDR-L2 including SEQ ID NO:29, and a CDR-L3 including SEQ ID NO:30. An exemplary HER3 antibody includes an immunoglobulin heavy chain variable region including SEQ ID NO:57 and/or an immunoglobulin light chain variable region including SEQ ID NO:58. An exemplary HER3 antibody includes an immunoglobulin heavy chain amino acid sequence of SEQ ID NO:59 and/or an immunoglobulin light chain amino acid sequence of SEQ ID NO: 60.

An exemplary HER3 antibody includes an immunoglobulin heavy chain variable region including a CDR-H1 including SEQ ID NO:61, a CDR-H2 including SEQ ID NO:62, and a CDR-H3 including SEQ ID NO:63; and/or an immunoglobulin light chain variable region including a CDR-L1 including SEQ ID NO:64, a CDR-L2 including SEQ ID NO:65, and a CDR-L3 including SEQ ID NO:66. An exemplary HER3 antibody includes an immunoglobulin heavy chain variable region including SEQ ID NO:67, and/or an immunoglobulin light chain variable region including SEQ ID NO:68. An exemplary HER3 antibody includes an immunoglobulin heavy chain amino acid sequence of SEQ ID NO:69 and an immunoglobulin light chain amino acid sequence of SEQ ID NO:70.

An exemplary HER3 antibody includes an immunoglobulin heavy chain variable region including a CDR-H1 including SEQ ID NO:71, a CDR-H2 including SEQ ID NO:72, and a CDR-H3 including SEQ ID NO:66; and/or an immunoglobulin light chain variable region including a CDR-L1 including SEQ ID NO:28, a CDR-L2 including SEQ ID NO:29, and a CDR-L3 including SEQ ID NO:30. An exemplary HER3 antibody includes an immunoglobulin heavy chain variable region including SEQ ID NO:73, and/or an immunoglobulin light chain variable region including SEQ ID NO:74. An exemplary HER3 antibody includes an immunoglobulin heavy chain amino acid sequence of SEQ ID NO:75 and/or an immunoglobulin light chain amino acid sequence of SEQ ID NO:76.

An exemplary HER3 antibody includes an immunoglobulin heavy chain amino acid sequence of SEQ ID NO:77 and/or an immunoglobulin light chain amino acid sequence of SEQ ID NO:78.

An exemplary HER3 antibody includes an immunoglobulin light chain variable region including SEQ ID NOS:86, 87, 88, 89, 90 or 91 and/or a heavy chain variable region including SEQ ID NOS:79, 80, 81, 82, 83, 84 or 85.

An exemplary HER3 antibody includes an immunoglobulin heavy chain sequence including SEQ ID NO:92, 94, 95, 98 or 99 and/or an immunoglobulin light chain sequence including SEQ ID NO:93, 96, 97, 100 or 101.

Exemplary HER3 antibodies also include Barecetamab (ISU104) from Isu Abxis Co and any of the HER3 antibodies disclosed in U.S. Pat. No. 10,413,607.

Exemplary HER3 antibodies also include HMBD-001 (10D1F) from Hummingbird Bioscience Pte. and any of the HER3 antibodies disclosed in International Pub. Nos. WO 2019185164 and WO2019185878, U.S. Pat. No. 10,662,241; and U.S. Pub. Nos. 20190300624, 20210024651, and 20200308275.

Exemplary HER3 antibodies also include the HER2/HER3 bispecific antibody MCLA-128 (i.e., Zenocutuzumab) from Merus N.V.; and any of the HER3 antibodies, whether monospecific or multi-specific, disclosed in U.S. Pub. Nos. 20210206875, 20210155698, 20200102393, 20170058035, and 20170037145.

Exemplary HER3 antibodies also include the HER3 antibody Patritumab (U3-1287), an antibody including heavy chain sequence SEQ ID NO:106 and/or light chain sequence SEQ ID NO:107 which are reported chains of Patritumab, and any of the HER3 antibodies disclosed in U.S. Pat. Nos. 9,249,230 and 7,705,130 and International Pub. No. WO2007077028.

Exemplary HER3 antibodies also include the HER3 antibody MM-121 and any of the HER3 antibodies disclosed in U.S. Pat. No. 7,846,440 and International Pub. No. WO2008100624. Exemplary HER3 antibodies also include the EGFR/HER3 bispecific antibody DL1 and any of the HER3 antibodies, whether monospecific or multi-specific, disclosed in U.S. Pat. Nos. 9,327,035 and 8,597,652, U.S. Pub. No. 20140193414, and International Pub. No. WO2010108127.

Exemplary HER3 antibodies also include the HER2/HER3 bispecific antibody MM-111 and any of the HER3 antibodies, whether monospecific or multi-specific, disclosed in U.S. Pub. Nos. 20130183311 and 20090246206 and International Pub. Nos. WO2006091209 and WO2005117973.

According to certain aspects, the HER3 targeting agent includes an anti-HER3 antibody that binds to an epitope of HER3 recognized by Patritumab from Daiichi Sankyo, Seribantumab (MM-121) from Merrimack Pharmaceuticals, Lumretuzumab from Roche, Elgemtumab from Novartis, GSK2849330 from GlaxoSmithKline, CDX-3379 of Celldex Therapeutics, EV20 and MP-RM-1 from MediPharma, Barecetamab (ISU104) from Isu Abxis Co., HMBD-001 (10D1F) from Hummingbird Bioscience Pte., REGN1400 from Regeneron Pharmaceuticals, and/or AV-203 from AVEO Oncology. According to certain aspects, the anti-HER3 antibody is selected from one or more of Patritumab, Seribantumab or an antibody including heavy chain sequence SEQ ID NO:108 and/or light chain sequence SEQ ID NO:109 which are reported for Seribantumab, Lumretuzumab or an antibody including heavy chain sequence SEQ ID NO:110 and/or light chain sequence SEQ ID NO:111 which are reported for Lumretuzumab, Elgemtumab or an antibody including heavy chain sequence SEQ ID NO:112 and/or light chain sequence SEQ ID NO:113 which are reported for Elgemtumab, AV-203, CDX-3379, GSK2849330, EV20, MP-RM-1, ISU104, HMBD-001 (10D1F), and REGN1400.

An amino acid sequence of the human HER3 precursor protein (receptor tyrosine-protein kinase erbB-3 isoform 1 precursor NCBI Reference Sequence: NP_001973.2) is provided herein as SEQ ID NO:115.

Exemplary CD33 targeting agents that may be radiolabeled, drug-conjugated, or unlabeled for use in the invention include the monoclonal antibodies lintuzumab, gemtuzumab, and vadastuximab. In combination with a radiolabeled pMHC targeting agent as disclosed herein, a CD33 targeting therapeutic agent may, for example, be used to treat solid cancers, such as ovarian, breast, cervical prostate, gastric, bladder, lung, melanoma, colorectal and squamous cell carcinoma cancers and any of the cancers disclosed herein, for example, by depleting myeloid-derived suppressor cells (MDSCs). In one aspect, the CD33 targeting agent used in combination with a radiolabeled pMHC targeting agent is 225Ac-lintuzumab. In another aspect, the CD33 targeting agent used in combination with a radiolabeled HER3 targeting agent is the ADC gemtuzumab ozogamicin (Mylotarg®; Pfizer).

Exemplary CD38 targeting agents that may be radiolabeled, drug-conjugated, or unlabeled for use in the invention include anti-CD38 monoclonal antibodies such as daratumumab (Darzalex®; Johnson and Johnson) and isatuximab (Sarclisa®; Sanofi) or antigen-binding fragments thereof. Such CD38 targeting agents may, for example, be used in combination with the radiolabeled pMHC targeting agent(s) in the treatment of solid tumors that may, for example, be infiltrated with CD38-positive suppressive immune cells, such as but not limited to ovarian, breast, cervical prostate, gastric, bladder, lung, melanoma, colorectal and squamous cell carcinoma cancers and any of the cancers disclosed herein.

Exemplary MUC1 targeting agents that may be radiolabeled, drug-conjugated, or unlabeled for use in the invention include the monoclonal antibodies: KL-6 (epitope: a sialylated sugar of Krebs von den Lugen-6 (KL-6) PDTRPAP sequence (SEQ ID NO:239); MY1.E12 (epitope: sialyla2-3galactosylh1-3Nacetylgalactosaminide linked to a distinct threonine residue in the MUC1 tandem repeat); 5E5, 2D9 (epitope: Tn or STn in the tandem repeat domain); hMUC1-1H7 (epitope: extracellular domain of MUC1 C-terminal subunit (MUC1-C)); and TAB004 (epitope: STAPPVHNV within the TR sequence (SEQ ID NO:240)); huC242 (epitope: Sialyl-Lewis a epitope CanAg glycoprotein which is similar to MUC1); huPAM4 (epitope: omain located between the amino terminus and start of the repeat domain of a MUC1 antigen (non-VNTR) and also react with MUC5AC); hPAM4 a/k/a Clivatuzumab (epitope: Domain located between the amino terminus and start of the repeat domain of a MUC1 antigen (non-VNTR) and also react with MUC5AC); SAR56665, 8huDS6-DM4 (epitope: O-linked glycans with α2,3-sialylated and p1,4-galactosylated termini in VNTR); Gatipotuzumab (epitope: PDT*RP . . . , (SEQ ID NO:241) where T* is O-glycosylated with GalNAcα1- or a similar short, non-sialylated glycan such as Galb1-3GalNAcα1-(core-1)); AR20.5 (epitope: DTRPAP (SEQ ID NO: 242) and DTnRPAP (SEQ ID NO:243)), antigen-binding fragments of any of said monoclonal antibodies, and antibodies or antigen-binding antibody fragments recognizing the same epitopes as the any of the aforementioned anti-MUC1 antibodies. Such MUC1 targeting agents may, for example, be used in combination with the radiolabeled pMHC targeting agents in the treatment of solid tumors expressing or overexpressing MUC1, such as pancreatic cancer, breast cancer, ovarian cancer, gastric cancer, gastrointestinal cancer, liver cancer such as hepatocellular carcinoma (HCC) and cholangiocarcinoma, and colororectal cancer.

Exemplary LeY targeting agents that may be radiolabeled, drug-conjugated, or unlabeled for use in the invention include but are not limited to monoclonal antibodies such as 3S1931 and/or a humanized version thereof such as Hu3S1933, or any of the monoclonal antibodies B34, BR55-2, BR55/BR96, and IGN 133, or antigen binding fragments of any of the preceding antibodies.

According to certain aspects, the LeY targeting agent may be a monoclonal antibody including a heavy chain variable region having an amino acid sequence as set forth in any one of SEQ ID NOS:119-123. According to certain aspects, the LeY targeting agent may be a monoclonal antibody including a light chain variable region having an amino acid sequence as set forth in SEQ ID NO:124 or 125. According to certain aspects, the LeY targeting agent may be a monoclonal antibody including a heavy chain variable region having the amino acid sequence as set forth in any one of SEQ ID NOS:119-123 and a light chain variable region having the amino acid sequence as set forth in SEQ ID NO:124 or 125.

According to certain aspects, the LeY targeting agent may be a monoclonal antibody including one or more of the heavy chain N-terminal region and complementarity determining regions (CDRs) having amino acid sequences as set forth in SEQ ID NOS:126 and/or 127-129, respectively. According to certain aspects, the LeY targeting agent may be a monoclonal antibody including one or more of the light chain N-terminal region and CDRs having amino acid sequences as set forth in SEQ ID NOS:130 and/or 131-133, respectively. According to certain aspects, the LeY targeting agent may be a monoclonal antibody including one or more of the heavy chain N-terminal region set forth in SEQ ID NO:126 and the heavy chain CDRs set forth in SEQ ID NOS:127-129, and one or more of the light chain N-terminal region set forth in SEQ ID NO:130 and the light chain CDRs having amino acid sequences as set forth in SEQ ID NOS: 131-133.

It should be understood that wherever in this disclosure specific antibodies, specific antibody heavy chains and specific antibody light chains are disclosed, against any target, also intended to be disclosed for embodiment in or use in the various aspects of the invention are antibodies, such as but not limited to immunoglobulins, such as but not limited to IgG, that (i) include the heavy chain variable region of the disclosed antibody or heavy chain, (ii) include 1, 2 or 3 of the heavy chain CDRs (e.g., by Kabat definition) of the disclosed antibody or heavy chain, (iii) include the light chain variable region of the disclosed antibody or light chain, and/or (iv) include 1, 2 or 3 of the light chain CDRs (e.g., by Kabat definition) of the disclosed antibody or light chain. It should also be understood that wherever in this disclosure an antibody heavy chain or an antibody light chain is disclosed that includes an N-terminal leader sequence, also intended to be disclosed for embodiment in and use in the various aspects of the invention are corresponding heavy chains and corresponding light chains that lack the leader sequence.

In still further embodiments of the invention, an additional radiolabeled targeting agent used in combination or conjunction with the radiolabeled pNMC targeting agent for the treatment of a cancer or proliferative disorder such as any of those disclosed herein in a mammal, such as a human, includes a phospholipid-based cancer targeting agent. In certain embodiments, the phospholipid-based cancer targeting agent includes any of the radioactive phospholipid metal chelates disclosed in U.S. Pub. No. 20200291049, incorporated by reference herein, such as but not limited to

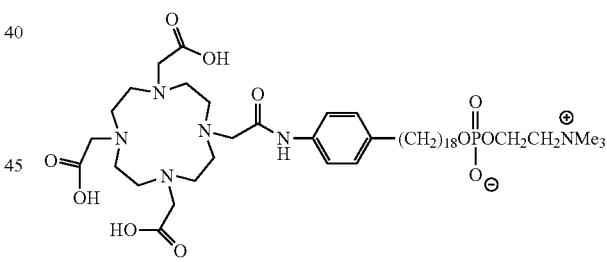

(a/k/a NM600) or a pharmaceutically acceptable salt thereof, chelated with a radionuclide, such as $^{225}$Ac, $^{177}$Lu, or $^{90}$Y.

In certain aspects, the lipid based radiolabeled targeting agent used in conjunction with the radiolabeled pMHC targeting agent includes any of the radiolabeled phospholipid compounds disclosed in U.S. Pub. No. 20140030187 or U.S. Pat. No. 6,417,384, each incorporated by reference herein, such as but not limited to

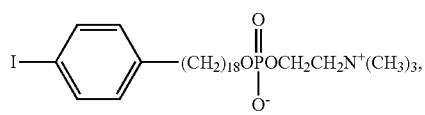

i.e., 18-(p-iodophenyl)octadecyl phosphocholine, wherein iodine is $^{131}$I (a/k/a NM404 I-131, and CLR 131), or a pharmaceutically acceptable salt thereof. In certain aspects, the phospholipid-based radiolabeled targeting agent used in conjunction with the radiolabeled pMHC targeting agent includes any of the phospholipid drug conjugate compounds disclosed in U.S. Pat. No. 9,480,754, incorporated by reference herein.

Additional Therapeutic Agents and Modalities

The methods of the present invention that include administration of a radiolabeled pMHC targeting agent therapeutic, alone or in combination with other targeting agents, may further include administration of an additional therapeutic agent or modality. According to certain aspects, the additional agent may be relevant for the disease or condition being treated by the radiolabeled pMHC targeting agent. Such administration may be simultaneous, separate or sequential with the administration of the effective amount of the pMHC targeting agent. For simultaneous administration, the agents may be administered as one composition, or as separate compositions, as appropriate. Those skilled in the art will appreciate that even when different agents are administered at separate times to a subject, the agents themselves, any active metabolites thereof, and/or their biological effects may be present in an at least partially temporally overlapping manner within the subject.

Exemplary additional therapeutic agents and modalities that may be used in combination or conjunction with a radiolabeled pMHC targeting agent include at least chemotherapeutic agents, small molecule oncology drugs, anti-inflammatory agents, immunosuppressive agents, immunomodulatory agents, include immune checkpoint therapies, DDR inhibitors, CD47 blockades, external beam radiation, brachytherapy, or any combination thereof. Exemplary additional agents and treatment modalities that may be used in combination or conjunction with a radiolabeled pMHC targeting agent alone or in combination with other targeting agents as disclosed herein are further described below.

a. Chemotherapeutic and Other Small Molecule Agents

Exemplary chemotherapeutic agents that may be used include, but are not limited to, anti-neoplastic agents including alkylating agents including: nitrogen mustards, such as mechlorethamine, cyclophosphamide, ifosfamide, melphalan and chlorambucil; nitrosoureas, such as carmustine (BCNU), lomustine (CCNU), and semustine (methyl-CCNU); Temodal™ (temozolomide), ethylenimines/methylmelamine such as thriethylenemelamine (TEM), triethylene, thiophosphoramide (thiotepa), hexamethylmelamine (HMM, altretamine); alkyl sulfonates such as busulfan; triazines such as dacarbazine (DTIC); antimetabolites including folic acid analogs such as methotrexate and trimetrexate, pyrimidine analogs such as 5-fluorouracil (5FU), fluorodeoxyuridine, gemcitabine, cytosine arabinoside (AraC, cytarabine), 5-azacytidine, 2,2'-difluorodeoxycytidine, purine analogs such as 6-mercaptopurine, 6-thioguamne, azathioprine, T-deoxycoformycin (pentostatin), erythrohydroxynonyladenine (EHNA), fludarabine phosphate, and 2-chlorodeoxyadenosine (cladribine, 2-CdA); natural products including antimitotic drugs such as paclitaxel, vinca alkaloids including vinblastine (VLB), vincristine, and vinorelbine, taxotere, estramustine, and estramustine phosphate; pipodophylotoxins such as etoposide and teniposide; antibiotics such as actinomycin D, daunomycin (rubidomycin), doxorubicin, mitoxantrone, idarubicin, bleomycins, plicamycin (mithramycin), mitomycin C, and actinomycin; enzymes such as L-asparaginase; biological response modifiers such as interferon-alpha, IL-2, G-CSF and GM-CSF; miscellaneous agents including platinum coordination complexes such as oxaliplatin, cisplatin and carboplatin, anthracenediones such as mitoxantrone, substituted urea such as hydroxyurea, methylhydrazine derivatives including N-methylhydrazine (MIH) and procarbazine, adrenocortical suppressants such as mitotane (o, p-DDD) and aminoglutethimide; hormones and antagonists including adrenocorticosteroid antagonists such as prednisone and equivalents, dexamethasone and aminoglutethimide; Gemzar™ (gemcitabine), progestin such as hydroxyprogesterone caproate, medroxyprogesterone acetate and megestrol acetate; estrogen such as diethylstilbestrol and ethinyl estradiol equivalents; antiestrogen such as tamoxifen; androgens including testosterone propionate and fluoxymesterone/equivalents; antiandrogens such as flutamide, gonadotropin-releasing hormone analogs and leuprolide; and non-steroidal antiandrogens such as flutamide.

Therapies targeting epigenetic mechanisms including, but not limited to: (i) histone deacetylase (HDAC) inhibitors such as Vorinostat (suberoylanilide hydroxamic acid; SAHA), Romidepsin, Belinostat (PDX101), Panobinostat (LBH589) and Tucidinostat, demethylating agents (e.g., Vidaza); (ii) LSD1 inhibitors such as seclidemstat, TCP (tranylcypromine), ORY-1001 (iadademstat), GSK2879552 (GSK), INCB059872 (Imago BioSciences), IMG-7289 (Bomedemstat; Imago BioSciences), ORY-2001 (Vafidemstat), and CC-90011 (Celgene); and (iii) release of transcriptional repression (ATRA) therapies, may also be used in combination or conjunction with a radiolabeled pMHC targeting agent and/or other radiolabeled targeting agents and combinations thereof as disclosed herein.

DNA demethylating agents, such as 5-azacytidine (azacytidine) and 5-aza-2'-deoxycytidine (decitabine, DAC), may, for example, also be used in combination or conjunction with a radiolabeled pMHC targeting agent and/or other radiolabeled targeting agents and combinations thereof as disclosed herein for the treatment of hematological proliferative disorders/cancers such as myelodysplastic syndrome (MDS) and acute myeloid leukemia (AML) and for the treatment of solid tumors, such as NSCLC, such as recurrent metastatic NSCLC, ovarian cancer, such as platinum-resistant ovarian cancers, hepatocellular carcinoma (HCC), such as advanced hepatocellular carcinomas, colorectal cancers, and alimentrary tract cancers such as drug-resistant relapsed/refractory alimentary tract cancers.

According to certain aspects of the present invention, the chemotherapeutic agents include at least one radiosensitizer, such as temozolomide, cisplatin, and/or fluorouracil.

The additional agents may, for example, include a bcl-2 inhibitor such as navitoclax or venetoclax (Venclexta®; Abbvie) and the combination may, for example, be used for the treatment of solid tumors such as breast cancers and lung cancer such as small cell lung carcinoma (SCLC).

The additional agents may, for example, include a cyclin-dependent kinase CDK4 and CDK6 inhibitor such as palbociclib (Ibrance®; Pfizer) and the combination may, for example, be used for the treatment of solid cancers such as breast cancers such as HR-positive and HER2-negative breast cancer, with or without an aromatase inhibitor.

The additional agents may, for example, include erlotinib (Tarceva®; Roche) and the combination may, for example, be used for the treatment of solid tumor cancers such as non-small cell lung cancer (NSCLC), for example, with mutations in the epidermal growth factor receptor (EGFR) and pancreatic cancer.

The additional agents may, for example, include sirolimus or everolimus (Affinitor®; Novartis) and the combination may, for example, be used for the treatment of solid tumor cancers such as melanoma and breast cancer.

The additional agents may, for example, include pemetrexed (Alimta®; Eli Lilly) and the combination may, for example, be used for the treatment of solid cancers such as mesothelioma such as pleural mesothelioma and lung cancer such as non-small cell lung cancer (NSCLC).

The additional therapeutic agents may, for example, be administered according to any standard dose regime known in the field. For example, therapeutic agents may be administered at concentrations in the range of 1 to 500 mg/m$^2$, the amounts being calculated as a function of patient surface area (m$^2$). For example, exemplary doses of the chemotherapeutic paclitaxel may include 15 mg/m$^2$ to 275 mg/m$^2$, exemplary doses of docetaxel may include 60 mg/m$^2$ to 100 mg/m$^2$, exemplary doses of epithilone may include 10 mg/m$^2$ to 20 mg/m$^2$, and an exemplary dose of calicheamicin may include 1 mg/m$^2$ to 10 mg/m$^2$. While exemplary doses are listed herein, such are only provided for reference and are not intended to limit the dose ranges of the drug agents of the presently disclosed invention.

B. External Beam Radiation and/or Brachytherapy

The additional therapeutic modality administered in conjunction with the pMHC targeting agent, and optionally any other of the additional therapeutics disclosed herein, may be an ionizing radiation, such as administered via external beam radiation or brachytherapy. Such radiation generally refers to the use of X-rays, gamma rays, or charged particles (e.g., protons or electrons) to generate ionizing radiation, such as delivered by a machine placed outside the patient's body (external-beam radiation therapy) or by a source placed inside a patient's body (internal radiation therapy or brachytherapy).

The external beam radiation or brachytherapy may enhance the targeted radiation damage delivered by the radiolabeled pMHC targeting agent and may thus be delivered sequentially with the pMHC targeting agent, such as before and/or after the pMHC targeting agent, or simultaneous with the pMHC targeting agents.

The external beam radiation or brachytherapy may be planned and administered in conjunction with imaging-based techniques such as computed tomography (CT) and/or magnetic resonance imaging (MRI) to accurately determine the dose and location of radiation to be administered. For example, a patient treated with any of the radiolabeled pMHC targeting agents disclosed herein may be imaged using either of CT or MRI to determine the dose and location of radiation to be administered by the external beam radiation or brachytherapy.

In various embodiments, the radiation therapy may be selected from the group consisting of total all-body radiation therapy, conventional external beam radiation therapy, stereotactic radiosurgery, stereotactic body radiation therapy, 3-D conformal radiation therapy, intensity-modulated radiation therapy, image-guided radiation therapy, tomotherapy, and brachytherapy. According to certain aspects, the radiation therapy may be provided as a single dose or as fractionated doses, e.g., as 2 or more fractions. For example, the dose may be administered such that each fraction includes 2-20 Gy (e.g., a radiation dose of 50 Gy may be split up into 10 fractions, each including 5 Gy). The 2 or more fractions may be administered on consecutive or sequential days, such as once in 2 days, once in 3 days, once in 4 days, once in 5 days, once in 6 days, once in 7 days, or in a combination thereof.

C. Immune Checkpoint Therapies

The additional agent(s) administered in conjunction with the pMHC targeting agent may be an immune checkpoint therapy. Cancer cells have developed means to evade the standard checkpoints of the immune system. For example, cancer cells have been found to evade immunosurveillance through reduced expression of tumor antigens, downregulation of MHC class I and II molecules leading to reduced tumor antigen presentation, secretion of immunosuppressive cytokines such as TGFβ, recruitment or induction of immunosuppressive cells such as regulatory T cells (Treg) or myeloid-derived suppressor cells (MDSC), and overexpression of certain ligands [e.g., programmed death ligand-1 (PD-L1)] that inhibit the host's existing antitumor immunity.

Another major mechanism of immune suppression by cancer cells is a process known as "T-cell exhaustion", which results from chronic exposure to tumor antigens, and is characterized by the upregulation of inhibitory receptors. These inhibitory receptors serve as immune checkpoints in order to prevent uncontrolled immune reactions.

Various immune checkpoints acting at different levels of T cell immunity have been described in the literature, including PD-1 (i.e., programmed cell death protein 1) and its ligands PD-L1 and PD-L2, CTLA-4 (i.e., cytotoxic T-lymphocyte associated protein-4) and its ligands CD80 and CD86, LAG3 (i.e., Lymphocyte-activation gene 3), B and T lymphocyte attenuator, TIGIT (T-cell immunoreceptor with Ig and ITIM domains), TIM-3 (i.e., T-cell immunoglobulin and mucin-domain containing protein 3), and VISTA (V-domain immunoglobulin suppressor of T cell activation).

Enhancing the efficacy of the immune system by therapeutic intervention is a particularly exciting development in cancer treatment. As indicated, checkpoint inhibitors such as CTLA-4 and PD-1 prevent autoimmunity and generally protect tissues from immune collateral damage. In addition, stimulatory checkpoints, such as OX40 (i.e., tumor necrosis factor receptor superfamily, member 4; TNFR-SF4), CD137 (i.e., TNFR-SF9), GITR (i.e., Glucocorticoid-Induced TNFR), CD27 (i.e., TNFR-SF7), CD40 (i.e., cluster of differentiation 40), and CD28, activate and/or promote the expansion of T-cells. Regulation of the immune system by inhibition or overexpression of these proteins is an area of promising current research.

Thus, a promising therapeutic strategy is the use of immune checkpoint therapies that may remove certain blockades on the immune system that are utilized by cancer cells, in combination with the pMIC targeting agents disclosed herein. For example, antibodies against certain immune checkpoint inhibitors (ICI) may block interaction between checkpoint inhibitor proteins and their ligands, therefore preventing the signaling events that would otherwise have led to inhibition of an immune response against the tumor cell.

Moreover, there is a growing body of preclinical evidence supporting the ability of radiation to synergize with ICI antibodies, and this is also being explored in the clinic with increasing numbers of clinical trials evaluating the combination of external beam radiation with immune checkpoint therapies across various tumor types and ICI antibodies (Lamichhane, 2018). Clinical evidence supporting this combination has been generated in melanoma, with two studies demonstrating a clinical benefit using radiation in combination with the anti-cytotoxic T-lymphocyte-associated protein 4 (CTLA-4) ICI antibody, Ipilimumab (Twyman-Saint Vistor, 2015).

Accordingly, an object of the presently disclosed invention is to provide therapies for the treatment of cancer using a radiolabeled pMHC targeting agent in combination with one or more immune checkpoint therapies, such as an ICI antibody.

Immune checkpoint therapies of the present invention include molecules that totally or partially reduce, inhibit, interfere with or modulate one or more checkpoint proteins. Checkpoint proteins regulate T-cell activation or function. Immune checkpoint therapies may unblock an existing immune response inhibition by binding to or otherwise disabling checkpoint inhibition. The immune checkpoint therapies may include monoclonal antibodies, humanized antibodies, fully human antibodies, antibody fragments, small molecule therapeutics, or a combination thereof.

Exemplary immune checkpoint therapies may specifically bind to and inhibit a checkpoint protein, such as the inhibitory receptors CTLA-4, PD-1, TIM-3, VISTA, BTLA, LAG-3 and TIGIT, and/or the activating receptors CD28, OX40, CD40, GITR, CD137, CD27, and HVEM. Additionally, the immune checkpoint therapy may bind to a ligand of any of the aforementioned checkpoint proteins, such as PD-L1, PD-L2, PD-L3, and PD-L4 (ligands for PD-1); CD80 and CD86 (ligands for CTLA-4); CD137-L (ligand of CD137); and GITR-L (ligand of GITR). Other exemplary immune checkpoint therapies may bind to checkpoint proteins such as CD226, B7-H3, B7-H4, BTLA, TIGIT, GALS, KIR, 2B4 (belongs to the CD2 family of molecules and is expressed on all NK, γδ, and memory CD8+ (αβ) T cells), CD160 (also referred to as BY55), and CGEN-15049.

Central to the immune checkpoint process are the CD137, CTLA-4 and PD-1 immune checkpoint pathways.

The CTLA-4 and PD-1 pathways are thought to operate at different stages of an immune response. CTLA-4 is considered the "leader" of the immune checkpoint inhibitors (ICI), as it stops potentially autoreactive T cells at the initial stage of naive T-cell activation, typically in lymph nodes. The PD-1 pathway regulates previously activated T cells at the later stages of an immune response, primarily in peripheral tissues. Moreover, progressing cancer patients have been shown to lack upregulation of PD-L1 by either tumor cells or tumor-infiltrating immune cells. Immune checkpoint therapies targeting the PD-1 pathway might thus be especially effective in tumors where this immune suppressive axis is operational and reversing the balance towards an immune protective environment would rekindle and strengthen a pre-existing anti-tumor immune response. PD-1 blockade can be accomplished by a variety of mechanisms including antibodies that bind PD-1 or its ligand, PD-L1.

According to certain aspects of the presently disclosed invention, the immune checkpoint therapy may include an inhibitor of the PD-1 checkpoint, which may decrease, block, inhibit, abrogate, or interfere with signal transduction resulting from the interaction of PD-1 with one or more of its binding partners, such as PD-L1 and PD-L2. The inhibitor of the PD-1 checkpoint may be an anti-PD-1 antibody, antigen binding fragment, fusion proteins, oligopeptides, and other molecules that decrease, block, inhibit, abrogate or interfere with signal transduction resulting from the interaction of PD-1 with PD-L1 and/or PD-L2. In some embodiments, a PD-1 checkpoint inhibitor reduces the negative co-stimulatory signal mediated by or through cell surface proteins expressed on T lymphocytes so as render a dysfunctional T-cell less dysfunctional (e.g., enhancing effector responses to antigen recognition). In some embodiments, the PD-1 checkpoint therapy is an anti-PD-1 antibody.

Thus, according to certain aspects of the present invention, the immune checkpoint therapy may include a monoclonal antibody against an immune checkpoint inhibitor (ICI) such as against CTLA-4, PD-1, or PD-L1.

According to certain aspects, the ICI antibody may be an antibody against PD-1. The ICI antibody may be an anti-PD-1 antibody, such as nivolumab. For example, the inhibitors of PD-1 biological activity (or its ligands) disclosed in U.S. Pat. No. 7,029,674. Exemplary antibodies against PD-1 include: Anti-mouse PD-1 antibody Clone J43 (Cat #BE0033-2) from BioXcell; Anti-mouse PD-1 antibody Clone RMP1-14 (Cat #BE0146) from BioXcell; mouse anti-PD-1 antibody Clone EH12; Merck's MK-3475 anti-mouse PD-1 antibody (Keytruda®, pembrolizumab, lambrolizumab); and AnaptysBio's anti-PD-1 antibody, known as ANB011; antibody MDX-1 106 (ONO-4538); Bristol-Myers Squibb's human IgG4 monoclonal antibody nivolumab (Opdivo®, BMS-936558, MDX1106); AstraZeneca's AMP-514, and AMP-224; and Pidilizumab (CT-011), CureTech Ltd.

According to certain aspects, the immune checkpoint therapy is an inhibitor of PD-L1. Exemplary inhibitors of PD-L1 include antibodies (e.g., an anti-PD-L1 antibody, i.e., ICI antibody), RNAi molecules (e.g., anti-PD-L1 RNAi), antisense molecules (e.g., an anti-PD-L1 antisense RNA), dominant negative proteins (e.g., a dominant negative PD-L1 protein), and small molecule inhibitors. An exemplary anti-PD-L1 antibody includes clone EH12. Exemplary antibodies against PD-L1 include: Genentech's MPDL3280A (RG7446); anti-mouse PD-L1 antibody Clone 10F.9G2 (Cat #BE0101) from BioXcell; anti-PD-L1 monoclonal antibody MDX-1105 (BMS-936559) and BMS-935559 from Bristol-Meyer's Squibb; MSB0010718C; mouse anti-PD-L1 Clone 29E.2A3; and AstraZeneca's MEDI4736 (Durvalumab).

According to certain aspects, the immune checkpoint therapy is an inhibitor of PD-L2 or may reduce the interaction between PD-1 and PD-L2. Exemplary inhibitors of PD-L2 include antibodies (e.g., an anti-PD-L2 antibody, i.e., ICI antibody), RNAi molecules (e.g., an anti-PD-L2 RNAi), antisense molecules (e.g., an anti-PD-L2 antisense RNA), dominant negative proteins (e.g., a dominant negative PD-L2 protein), and small molecule inhibitors. Antibodies include monoclonal antibodies, humanized antibodies, deimmunized antibodies, and Ig fusion proteins.

According to certain aspects, the immune checkpoint therapy may be an inhibitor of CTLA-4, such as an anti-CTLA-4 antibody, i.e., ICI antibody. According to one aspect, the ICI antibody may be ipilimumab. The anti-CTLA-4 antibody may block the binding of CTLA-4 to CD80 (B7-1) and/or CD86 (B7-2) expressed on antigen presenting cells. Exemplary antibodies against CTLA-4 include: Bristol Meyers Squibb's anti-CTLA-4 antibody ipilimumab (also known as Yervoy®, MDX-010, BMS-734016 and MDX-101); anti-CTLA4 Antibody, clone 9H10 from Millipore; Pfizer's tremelimumab (CP-675,206, ticilimumab); and anti-CTLA-4 antibody clone BNI3 from Abcam. According to certain aspects, the immune checkpoint inhibitor may be a nucleic acid inhibitor of CTLA-4 expression.

CD137 (also known "TNF receptor superfamily member 9") is a costimulatory receptor member of the tumor necrosis factor receptor superfamily, mediating CD28-dependent and independent T-cell co-stimulation (Bartkowiak, 2015). CD137 is inducibly expressed by T cells, natural killer (NK) cells, dendritic cells (DC), B cells, and other cells of the immune system. The protein is composed of a 255-amino acid protein having a short N-terminal cytoplasmic portion, a transmembrane region, and an extracellular domain that possesses 3 cysteine-rich motifs. Ligation of CD137 by its ligand CD137L (4-1BBL; TNFSF9), which is mainly, though not exclusively, expressed on Antigen-Presenting Cells (APCs), evokes various T cell responses such as cell expansion, increased cytokine secretion and the prevention of activation-induced cell death. Thus, such ligation serves to activate the immune system. However, cis-interactions between CD137 and CD137L also potently downregulate the expression of CD137L (Kwon, 2015). The CD137 ligand thus functions to control the extent and kinetics of CD137-mediated immune system activation (Kwon, 2015). Significantly, CD137 expressed on human NK cells becomes upregulated upon binding to anti-tumor antibodies that have become bound to tumor cells (Wei, 2014).

Thus, according to certain aspects of the presently disclosed invention, the immune checkpoint therapy may include an antibody against CD137, which could be used to activate the immune system and thereby provide a therapy for cancer in combination with the presently disclosed pMHC targeting agents. Exemplary anti-CD137 antibodies that may be used are disclosed in U.S. Publication Nos. 20140274909; 20130280265; 20130273078; 20130071403; 20120058047; 20110104049; 20110097313; 20080166336; 20080019905; 20060188439; 20060182744; 20060121030; and 20030223989.

According to certain aspects of the present invention, the immune checkpoint therapy may include more than one modulator of an immune checkpoint protein. As such, the immune checkpoint therapy may include a first antibody or inhibitor against a first immune checkpoint protein and a second antibody or inhibitor against a second immune checkpoint protein.

Within the DDR, there are several DNA repair mechanisms, including base excision repair, nucleotide excision repair, mismatch repair, homologous recombinant repair, and non-homologous end joining. Approximately 450 human DDR genes code for proteins with roles in physiological processes. Dysregulation of DDR leads to a variety of disorders, including genetic, neurodegenerative, immune, cardiovascular, and metabolic diseases or disorders and cancers. For example, the genes OGG1 and XRCC1 are part of the base excision repair mechanism of DDR, and mutations in these genes are found in renal, breast, and lung cancers, while the genes BRCA1 and BRCA2 are involved in homologous recombination repair mechanisms and mutations in these genes leads to an increased risk of breast, ovarian, prostate, pancreatic, as well as gastrointestinal and hematological cancers, and melanoma. Exemplary DDR genes are provided in Table 3.

An object of the presently disclosed invention is to administer radiolabeled pMHC targeting agents that deliver ionizing radiation, in combination with a DDRi. Thus, according to certain aspects, the additional agent(s) administered with the pMHC targeting agent may target proteins in the DDR, i.e., DDR inhibitors or DDRi, thus maximizing DNA damage or inhibiting the repair if the damage, such as in G1 and S-phase and/or preventing repair in G2, ensuring the maximum amount of DNA damage is taken into mitosis, leading to cell death.

TABLE 3

| DNA repair mechanism | Gene examples | Cancer |
|---|---|---|
| Base Excision Repair | OGG1 | Renal, breast and lung cancer |
|  | XRCC1 | Non-small cell lung cancer |
| Nucleotide Excision Repair | ERCC1 | Lung and skin cancer, and glioma |
|  | XP | Xeroderma pigmentosum predisposing to skin cancer. Also increased risk of bladder and lung cancer |
| Mismatch Repair | MSH2, MLH1 | Lynch syndrome predisposing to colorectal cancer as well as endometrial, ovarian, stomach, small intestine, hepatobiliary tract, upper urinary tract, brain and skin cancer |
| Homologous Recombinant Repair | BRCA1, BRCA2 | Increased risk of breast, ovarian, prostate, pancreatic, as well as gastrointestinal and hematological cancer, and melanoma |
| Non-homologous End Joining | KU70 | Breast, colorectal and lung cancer |
|  | KU80 | Lung cancer |
| Cell cycle checkpoints | ATM | Ataxia-telangiectasia predisposing to leukemia, breast and pancreatic cancer |
|  | ATR | Leukemia, lymphoma, gastric and endometrial cancer |

D. DNA Damage Response inhibitors

Additional agents administered in conjunction with the radiolabeled pMHC targeting agent may be one or more DNA damage response inhibitors (DDRi). DNA damage can be due to endogenous factors, such as spontaneous or enzymatic reactions, chemical reactions, or errors in replication, or may be due to exogenous factors, such as UV or ionizing radiation or genotoxic chemicals. The repair pathways that overcome this damage are collectively referred to as the DNA damage response or DDR. This signaling network acts to detect and orchestrate a cell's response to certain forms of DNA damage, most notably double strand breaks and replication stress. Following treatment with many types of DNA damaging drugs and ionizing radiation, cells are reliant on the DDR for survival. It has been shown that disruption of the DDR can increase cancer cell sensitivity to these DNA damaging agents and thus may improve patient responses to such therapies.

Moreover, one or more DDR pathways may be targeted to ensure cell death, i.e., lethality to the targeted cancer cells. For example, mutations in the BRCA1 and 2 genes alone may not be sufficient to ensure cell death, as other pathways, such as the PARP1 base excision pathway, may act to repair the DNA damage. Thus, combinations of multiple DDRi inhibitors or combining DDRi with antiangiogenic agents or immune checkpoint inhibitors, such as listed hereinabove, are possible and an object of the presently disclosed invention.

Exemplary DDRi—ATM and ATR Inhibitors

Ataxia telangiectasia mutated (ATM) and Ataxia talangiectasia mutated and Rad-3 related (ATR) are members of the phosphatidylinositol 3-kinase-related kinase (PIKK) family of serine/threonine protein kinases.

ATM is a serine/threonine protein kinase that is recruited and activated by DNA double-strand breaks. The ATM phosphorylates several key proteins that initiate activation of a DNA damage checkpoint, leading to cell cycle arrest, DNA repair, or cellular apoptosis. Several of these targets, including p53, CHK2, and H2AX, are tumor suppressors. The protein is named for the disorder ataxia telangiectasia caused by mutations of the ATM. The ATM belongs to the superfamily of phosphatidylinositol 3-kinase-related kinases (PIKKs), which includes six serine/threonine protein kinases that show a sequence similarity to a phosphatidylinositol 3-kinase (PI3K).

Like ATM, ATR is one of the central kinases involved in the DDR. ATR is activated by single stranded DNA structures, which may for example arise at resected DNA DSBs or stalled replication forks. When DNA polymerases stall during DNA replication, the replicative helicases continue to unwind the DNA ahead of the replication fork, leading to the generation of long stretches of single stranded DNA (ssDNA).

ATM has been found to assist cancer cells by providing resistance against chemotherapeutic agents and thus favors tumor growth and survival. Inhibition of ATM and/or ATR may markedly increase cancer cell sensitivity to DNA damaging agents, such as the ionizing radiation provided by the radiolabeled pMHC targeting agent. Accordingly, an object of the presently disclosed invention includes administration of an inhibitor of ATM (ATMi) and/or ATR (ATRi), in combination with the pMHC targeting agents, to inhibit or kill cancer cells, such as those expressing tor overexpressing pMHC.

The inhibitor of ATM (ATMi) or ATR (ATRi) may, for example, be an antibody, peptide, or small molecule that targets ATM or ATR, respectively. Alternatively, an ATMi or ATRi may reduce or eliminate activation of ATM or ATR by one or more signaling molecules, proteins, or other compounds, or can result in the reduction or elimination of ATM or ATR activation by all signaling molecules, proteins, or other compounds. ATMi and/or ATRi also include compounds that inhibit their expression (e.g., compounds that inhibit ATM or ATR transcription or translation). An exemplary ATMi KU-55933 suppresses cell proliferation and induces apoptosis. Other exemplary ATMi include at least KU-59403, wortmannin, CP466722, and KU-60019. Exemplary ATRi include at least Schisandrin B, NU6027, NVP-BEA235, VE-821, VE-822, AZ20, and AZD6738.

Exemplary DDRi—Wee1 Inhibitors

The checkpoint kinase Wee1 catalyzes an inhibitory phosphorylation of both CDK1 (CDC2) and CDK2 on tyrosine 15, thus arresting the cell cycle in response to extrinsically induced DNA damage. Deregulated Wee1 expression or activity is believed to be a hallmark of pathology in several types of cancer. For example, Wee1 is often overexpressed in glioblastomas, malignant melanoma, hepatocellular carcinoma, breast cancer, colon carcinoma, lung carcinoma, and head and neck squamous cell carcinoma. Advanced tumors with an increased level of genomic instability may require functional checkpoints to allow for repair of such lethal DNA damage. As such, the present inventors believe that Wee1 represents an attractive target in advanced tumors where its inhibition is believed to result in irreparable DNA damage. Accordingly, an object of the presently disclosed invention includes administration of an inhibitor of Wee1, in combination with the pMHC targeting agents, to inhibit or kill cancer cells, such as those expressing tor overexpressing pMHC.

A Wee1 inhibitor may be an antibody, peptide, or small molecule that targets Wee1. Alternatively, a Wee1 inhibitor may reduce or eliminate Wee1 activation by one or more signaling molecules, proteins, or other compounds, or can result in the reduction or elimination of Wee1 activation by all signaling molecules, proteins, or other compounds. The term also includes compounds that decrease or eliminate the activation or deactivation of one or more proteins or cell signaling components by Wee1 (e.g., a Wee1 inhibitor can decrease or eliminate Wee1-dependent inactivation of cyclin and Cdk activity). Wee1 inhibitors also include compounds that inhibit Wee1 expression (e.g., compounds that inhibit Wee1 transcription or translation).

Exemplary Wee1 inhibitors include AZD-1775 (i.e., adavosertib), and inhibitors such as those described in, e.g., U.S. Pat. Nos. 7,834,019; 7,935,708; 8,288,396; 8,436,004; 8,710,065; 8,716,297; 8,791,125; 8,796,289; 9,051,327; 9,181,239; 9,714,244; 9,718,821; and 9,850,247; U.S. Pub. Nos. US 20100113445 and 20160222459; and International Pub. Nos. WO2002090360, 2015019037, 2017013436, 2017216559, 2018011569, and 2018011570.

Further Wee1 inhibitors include a pyrazolopyrimidine derivative, a pyridopyrimidine, 4-(2-chlorophenyl)-9-hydroxypyrrolo[3,4-c]carbazole-1,3-(2H, 6H)-dione (CAS No. 622855-37-2), 6-butyl-4-(2-chlorophenyl)-9-hydroxypyrrolo[3,4-c]carbazole-1,3-(2H,6H)-dione (CAS No. 62285550-9), 4-(2-phenyl)-9-hydroxypyrrolo[3,4-c]carbazole-1,3-(2H,6H)-dione (CAS No. 1177150-89-8), and an anti-Wee1 small interfering RNA (siRNA) molecule.

Exemplary DDRi—PARP Inhibitors

Another exemplary type of DDRi that may be used are inhibitors of poly(ADP-ribose) polymerase ("PARP"). Inhibitors of the DNA repair protein PARP, referred to individually and collectively as "PARPi", have been approved for use in a range of solid tumors, such as breast and ovarian cancer, particularly in patients having BRCA1/2 mutations. BRCA1 and 2 function in homologous recombination repair (HRR). When mutated, they induce genomic instability by shifting the DNA repair process from conservative and precise HRR to non-fidelitous methods such as DNA endjoining, which can produce mutations via deletions and insertions.

PARPi have been shown to exhibit synthetic lethality, as exhibited by potent single agent activity, in BRCA1/2 mutant cells. This essentially blocks repair of single-strand DNA breaks. Since HRR is not functional in these tumor cells, cell death results. Because most tumors do not carry BRCA1 or BRCA2 mutations, the potency of PARPi in such tumors is far less pronounced.

To date, the FDA has approved four PARPi drugs (olaparib, niraparib, rucaparib and talazoparib) as monotherapy agents, specifically in patients with germline and somatic mutations in the BRCA1 and BRCA2 genes. Along with veliparib, olaparib, niraparib and rucaparib were among the first generation of PARPi that entered clinical trials. Their IC50 values were found to be in the nanomolar range. In contrast, second generation PARPi like talazoparib have IC50 values in the picomolar range.

These PARPi all bind to the binding site of the cofactor, b nicotinamide adenine dinucleotide (b-NAD+), in the catalytic domain of PARP1 and PARP2. The PARP family of enzymes use NAD+ to covalently add Poly(ADP-ribose) (PAR) chains onto target proteins, a process termed "PARylation." PARP1 (which is the best-studied member) and PARP2, are important components of the DNA damage response (DDR) pathway. PARP1 is involved in the repair of single-stranded DNA breaks, and possibly other DNA lesions (Woodhouse, et al.; Krishnakumar, et al.). Through its zinc finger domains, PARP1 binds to damaged DNA and then PARylates a series of DNA repair effector proteins, releasing nicotinamide as a by-product (Krishnakumar, et al.). Subsequently, PARP1 auto-PARylation leads to release of the protein from the DNA. The available PARPi, however, differ in their capability to trap PARP1 on DNA, which seems to correlate with cytotoxicity and drug efficacy. Specifically, drugs like talazoparib and olaparib are more effective in trapping PARP1 than are veliparib (Murai, et al., 2012; Murai, et al., 2014).

The efficacy of PARPi in ovarian cancer and breast cancer patients who have loss-of-function mutations in BRCA1 or BRCA2 genes is largely attributed to the genetic concept of synthetic lethality: that proteins of BRCA 1 and 2 normally maintain the integrity of the genome by mediating a DNA repair process, known as homologous recombination repair (HRR); and PARPi causes a persistent DNA lesion that, normally, would otherwise be repaired by HR. In the presence of PARPi, PARP1 is trapped on DNA which stalls progression of the replication fork. This stalling is cytotoxic unless timely repaired by the HR system. In cells lacking effective HR, they are unable to effectively repair these DNA lesions, and thus die.

Again, mutations in BRCA genes and others in the HRR system are not prevalent in many cancer types. So, to better harness the therapeutic benefits of PARPi in such cancers, one can induce "artificial" synthetic lethality by pairing a PARPi with either chemotherapy or radiation therapy. Preclinical studies have demonstrated that combining radiation therapy and PARPi can increase the sensitivity of BRCA1/2 mutant tumor cells to PARP inhibition and extend the sensitivity of non-mutant BRCA tumors to PARP inhibition. Additional studies have shown that ionizing radiation (IR) itself can mediate PARPi synthetic lethality in tumor cells.

Accordingly, an object of the presently disclosed invention is to administer radiolabeled pMHC targeting agents that deliver ionizing radiation in combination with a PARPi.

In the various embodiments of this invention, the PARPi may be any known agent performing that function, and preferably, one approved by the FDA. Preferably, the PARPi is olaparib (Lynparza®), niraparib (Zejula®), rucaparib (Rubraca®) or talazoparib (Talzenna®).

Clinically, therapy with PARPi has resulted in sustained anti-tumor responses in a range of cancers including ovarian, prostate, pancreatic, and triple-negative breast cancers (TNBC). In one clinical trial, TNBC patients with germline BRCA1/2 mutations were treated with the PARPi, olaparib. While this therapy demonstrated a higher disease stabilization rate in BRCA1/2-mutant compared to non-mutant patients, there were no sustained responses achieved in either cohort (Gelmon, 2011).

The present inventors realized that the effect of PARPi may be improved through increases in dsDNA breaks induced by ionizing radiation provided by a pMHC targeting agent while these repair pathways are being blocked by the PARPi. Exemplary PARPi include olaparib, niraparib, rucaparib and talazoparib.

E. CD47 Blockades

The additional agents administered with the radiolabeled pMHC targeting agent may be a CD47 blockade, such as any agent that interferes with, or reduces the activity and/or signaling between CD47 (e.g., on a target cell) and SIRPα (e.g., on a phagocytic cell), for example, through interaction with either CD47 or SIRPα. Non-limiting examples of suitable CD47 blockades include CD47 and/or SIRPα reagents, including without limitation soluble SIRPα polypeptides, anti-SIRPα antibodies or antibody fragments, soluble CD47 polypeptides, and anti-CD47 antibodies or antibody fragments.

The CD47 blockade may alternatively, or additionally, include agents that modulate the expression of CD47 and/or SIRPα, such as phosphorodiamidate morpholino oligomers (PMO) that block translation of CD47 such as MBT-001 (PMO, morpholino, Sequence: 5'-CGT-CACAGGCAGGACCCACTGCCCA-3') [SEQ ID NO:114]) or any of the PMO oligomer CD47 inhibitors disclosed in any of U.S. Pat. Nos. 8,557,788, 8,236,313, 10,370,439 and Int'l Pub. No. WO2008060785.

The CD47 antibodies or anti-sense approaches may, for example, inhibit CD47 expression (e.g., inhibiting cell surface expression of CD47), activity, and/or signaling, or may interfere with the interaction between CD47 and SIRPα. The agents provided herein completely or partially reduce or otherwise modulate CD47 expression or activity upon binding to, or otherwise interacting with, CD47, e.g., a human CD47. The reduction or modulation of a biological function of CD47 is complete, significant, or partial upon interaction between the antibodies and the human CD47 polypeptide and/or peptide. The agents are considered to inhibit CD47 expression or activity when the level of CD47 expression or activity in the presence of the antibody is decreased by at least 50%, e.g., by 60%, 70%, 80%, 90%, 95%, 96%, 98%, 99%, or 100% as compared to the level of CD47 expression or activity in the absence of interaction, e.g., binding, with the antibody described herein.

According to certain aspects, an anti-CD47 agent is an antibody that specifically binds CD47 (i.e., an anti-CD47 antibody) and reduces the interaction between CD47 on one cell (e.g., an infected cell) and SIRPα on another cell (e.g., a phagocytic cell). Non-limiting examples of suitable antibodies include clones B6H12, 5F9, 8B6, and C3 and any of those described in International Pub. No. WO2011/143624 and U.S. Pub. 20210246206. Suitable anti-CD47 antibodies include fully human, humanized or chimeric versions of such antibodies.

Exemplary human or humanized antibodies especially useful for in vivo applications in humans due to their low antigenicity include at least monoclonal antibodies against CD47, such as Hu5F9-G4, a humanized monoclonal antibody available from Gilead as Magrolimab (Sikic, et al. (2019) *Journal of Clinical Oncology* 37:946); Lemzoparlimab and TJC4 from I-Mab Biopharma; AO-176 from Arch Oncology, Inc; AK 117 from Akesobio Australia Pty; IMC-002 from Innovent Biologics; ZL-1201 from Zia Lab; SHR-1603 from Jiangsu HengRui Medincine Co.; and SRF231 from Surface Oncology. Bispecific monoclonal antibodies are also available, such as IBI-322, targeting both CD47 and PD-L1 from Innovent Biologics. Antibodies against SIRPα may also be used such as BI 765063 (OSE-172) from OSE; as well as small molecule inhibitors, such as RRx-001 (1-bromoacetyl-3,3 dinitroazetidine) from EpicentRx and Azelnidipine (CAS number 123524-52-7) or pharmaceutically acceptable salts thereof. See also Table 4 for further description of exemplary agents.

TABLE 4

| Company | Approach | Agent/Program |
|---|---|---|
| Akesobio Australia Pty Ltd | CD47 mAb | AK117 |
| Arch Oncology (Tioma Therapeutics) | CD47 mAb | AO-176 |
| Elpiscience Biopharma Inc. | CD47 | ES004 |
| EpicentRx | Small molecule inhibitor of dinitroazetidine hypoxia sensor to downregulate CD47/SIRPα | RRx-001 (1-bromoacetyl- 3,3 dinitroazetidine) |
| ImmuneOncia Therapeutics | CD47 mAb human | IMC-002 |
| Innovent Biologics | CD47 mAb | IBI-188 (CD47 mAb) |
|  | CD47/PD-L1 bispecific mAb | IBI-322 (Bispecific) |
| OSE | SIRPα mAb | BI 765063 (OSE-172) |
| Zai Lab | CD47 mAb | ZL-1201 |
| Alx Oncology | High-affinity SIRPα-Fc | ALX148 |
| Gilead/Forty Seven | CD47 mAb SIRPα mAb | Magrolimab FSI-189 |
| I-Mab Biopharma | CD47 mAb | TJC4 |
| Jiangsu HengRui Medicine Co., Ltd. | CD47 mAb | SHR-1603 |
| Surface Oncology | CD47 mAb human | SRF231 |
| Morphiex | CD47 targeting phosphorodiamidate morpholino oligomers | MBT-001 |

AO-176, in addition to inducing tumor phagocytosis through blocking the CD47-STRPα interaction, is reported to preferentially bind tumor cells versus normal cells (particularly RBCs where binding is negligible) and directly kills tumor versus normal cells.

According to certain aspects, a SIRPα reagent may include the portion of SIRPα that is sufficient to bind CD47 at a recognizable affinity, which normally lies between the signal sequence and the transmembrane domain, or a fragment thereof that retains the binding activity. A suitable SIRPα reagent reduces (e.g., blocks, prevents, etc.) the interaction between the native proteins SIRPα and CD47. For example, the CD47 blocking agent used in various aspects of the invention may be any of those disclosed in U.S. Pat. No. 9,969,789 including but not limited to the SIRPα-IgG Fc fusion proteins disclosed therein, such as TTI-621 and TTI-622, both of which preferentially bind CD47 on tumor cells while also engaging activating Fc receptors. A SIRPα-IgG Fc fusion protein including the amino acid sequence SEQ ID NO: 116, SEQ TD NO: 117, or SEQ ID NO:118 may, for example, be used. Still other SIRPα Fc domain fusions proteins that may be used include ALX148 from Alx Oncology.

Therapeutically effective doses of an anti-CD47 antibody or other protein CD47 inhibitor may be a dose that leads to sustained serum levels of the protein of about 40 μg/ml or more (e.g., about 50 ug/ml or more, about 60 ug/ml or more, about 75 ug/ml or more, about 100 ug/ml or more, about 125 ug/ml or more, or about 150 ug/ml or more). Therapeutically effective doses or administration of a CD47 blockade, such as an anti-CD47 antibody or SIRPα fusion protein or small molecule, include, for example, amounts of 0.05-10 mg/kg (agent weight/subject weight), such as at least 0.1 mg/kg, 0.5 mg/kg, 1.0 mg/kg, 1.5 mg/kg, 2.0 mg/kg, 2.5 mg/kg, 3.0 mg/kg, 3.5 mg/kg, 4.0 mg/kg, 4.5 mg/kg, 5.0 mg/kg, 5.5 mg/kg, 6.0 mg/kg, 6.5 mg/kg, 7.0 mg/kg, 7.5 mg/kg, 8.0 mg/kg, 8.5 mg/kg, 9.0 mg/kg; or not more than 10 mg/kg, 9.5 mg/kg, 9.0 mg/kg, 8.5 mg/kg, 8.0 mg/kg, 7.5 mg/kg, 7.0 mg/kg, 6.5 mg/kg, 6.0 mg/kg, 5.5 mg/kg, 5.0 mg/kg, 4.5 mg/kg, 4.0 mg/kg, 3.5 mg/kg, 3.0 mg/kg, 2.5 mg/kg, 2.0 mg/kg, 1.5 mg/kg, 1.0 mg/kg, or any combination of these upper and lower limits. Therapeutically effective doses of a small molecule CD47 blockade such as those disclosed herein also, for example, include 0.01 mg/kg to 1,000 mg/kg and any subrange or value of mg/kg therein such as 0.01 mg/kg to 500 mg/kg or 0.05 mg/kg to 500 mg/kg, or 0.5 mg/kg to 200 mg/kg, or 0.5 mg/kg to 150 mg/kg, or 1.0 mg/kg to 100 mg/kg, or 10 mg/kg to 50 mg/kg.

According to certain aspects, the anti-CD47 agent is a soluble CD47 polypeptide that specifically binds SIRPα and reduces the interaction between CD47 on one cell (e.g., an infected cell) and SIRPα on another cell (e.g., a phagocytic cell). A suitable soluble CD47 polypeptide can bind SIRPα without activating or stimulating signaling through SIRPα because activation of SIRPα would inhibit phagocytosis. Instead, suitable soluble CD47 polypeptides facilitate the preferential phagocytosis of infected cells over non-infected cells. Those cells that express higher levels of CD47 (e.g., infected cells) relative to normal, non-target cells (normal cells) will be preferentially phagocytosed. Thus, a suitable soluble CD47 polypeptide specifically binds SIRPα without activating/stimulating enough of a signaling response to inhibit phagocytosis. In some cases, a suitable soluble CD47 polypeptide can be a fusion protein (for example, as described in U.S. Pub. No. 20100239579).

Advantageously, CD47 blockade can enhance the cytotoxic and prophagocytotic effect of a radiolabeled targeting agent, such as a radiolabeled pMHC targeting agent and/or HER2 targeting agent, while reducing the dose-limiting radiotoxicity of the targeting agent, thereby improving tolerability and permitting higher radiation doses of the targeting agent to be used/tolerated in the treatment of a subject.

EXAMPLES

Example 1: Production of Soluble Radiolabeled Targeting Agents

The pMHC targeting agent, such as a monoclonal antibody against a pMHC, may, for example, be labeled with Iodine-131 ($^{131}$I) or other Iodine isotopes according to the radio-iodination procedures detailed in International Publication No. WO 2017/155937 and U.S. Pat. No. 10,420,851 or with Actinium-225 ($^{225}$Ac) or Lutetium-177 ($^{177}$Lu), each of which can be chelated by DOTA, according to procedures detailed in U.S. Pat. Nos. 9,603,954.

Preparing the DOTA-conjugated antibody using p-SCN-Bn-DOTA: antibody conjugates may be prepared by reacting a concentrated solution of monoclonal anti-pMHC antibody, such as Hyb3 or an antigen-binding portion thereof, with p-SCN-Bn-DOTA in bicarbonate or in phosphate buffers at pH between about 8 and about 9 and by incubation at either about 37° C. or at room temperature. The conjugates may be purified from excess of the bifunctional chelator by repeated filtration or centrifugation and by gravity size exclusion chromatography (SEC). During the purification process, the bicarbonate or phosphate buffer is changed to N-2-Hydroxyethylpiperazine-N-2-ethanesulfonic acid (HEPES; Free Acid) or acetate medium. Conjugates may be characterized by size exclusion high performance liquid chromatography (SE-HPLC).

Preparing the DOTA-conjugated antibody using PODS-DOTA: DOTA may be conjugated to a monoclonal antibody, such as an IgG, such as Hyb3 or an antigen-binding portion thereof, using PODS-DOTA in the presence of TCEP, a mild reducing agent that cleaves the inter-chain disulfide bonds within an immunoglobin according to the methods set forth in U.S. Pat. No. 11,000,604. The structure of PODS-DOTA is

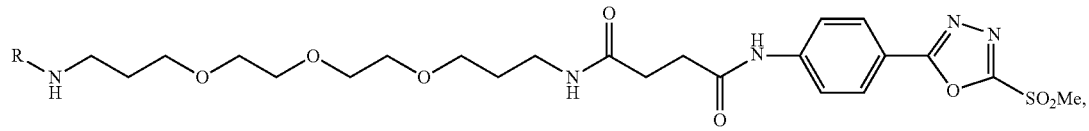

wherein R is a covalently bound DOTA moiety.

In more detail, to a suspension of 200 µg of antibody in PBS pH 7.4 (1 mg/mL) 1.33 µL of a fresh TCEP solution (10 mM in water, 10 eq.) is added and the appropriate volume of a solution of PODS-DOTA (1 mM in DMSO). The reaction mixture is then stirred on a thermomixer (25° C. or 37° C.) for 30 min, 2 h, or 24 h. The conjugate is then purified on a size exclusion column (Sephadex G-25 M, PD-10 column, GE Healthcare; dead volume=2.5 mL, eluted with 2 mL of PBS, pH 7.4) and concentrated using centrifugal filtration units with a 50,000 Da molecular weight cut off (AMICON™ Ultra 4 Centrifugal Filtration Units, Millipore Corp. Billerica, Mass.)

Radiolabeling the DOTA-conjugated antibody: The antibody may be conjugated to a linker, such as any of the linkers described in the above indicated patent applications or as outlined above. An exemplary linker includes at least dodecane tetraacetic acid (DOTA), wherein a goal of the conjugation reaction is to achieve a DOTA-antibody ratio of 3:1 to 5:1. Chelation with the radionuclide (e.g., $^{225}$Ac or $^{177}$Lu) may then be performed and efficiency and purity of the resulting radiolabeled anti-pMHC antibody may be determined by HPLC and iTLC.

An exemplary labeling reaction for $^{225}$Ac is as follows: A reaction including 15 µl 0.15M NH$_4$OAc buffer, pH=6.5 and 2 µL (10 µg) DOTA-anti-pMHC (5 mg/ml) may be mixed in an Eppendorf reaction tube, and 4 µL $^{225}$Ac (10 µCi) in 0.05 M HCl subsequently added. The contents of the tube may be mixed with a pipette tip and the reaction mixture incubated at 37° C. for 90 min with shaking at 100 rpm. At the end of the incubation period, 3 µL of a 1 mM DTPA solution may be added to the reaction mixture and incubated at room temperature for 20 min to bind the unreacted $^{225}$Ac into the $^{225}$Ac-DTPA complex. Instant thin layer chromatography with 10 cm silica gel strip and 10 mM EDTA/normal saline mobile phase may be used to determine the radiochemical purity of $^{225}$Ac-DOTA-anti-pMHC through separating $^{225}$Ac-labeled anti-pMHC ($^{225}$Ac-DOTA-anti-pMHC) from free $^{225}$Ac ($^{225}$Ac-DTPA). In this system, the radiolabeled antibody stays at the point of application and $^{225}$Ac-DTPA moves with the solvent front. The strips may be cut in halves and counted in the gamma counter equipped with the multichannel analyzer using channels 72-110 for $^{225}$Ac to exclude its daughters.

Purification: An exemplary radiolabeled pMHC targeting agent, such as $^{225}$Ac-DOTA-anti-pMHC, may be purified either on PD10 columns pre-blocked with 1% HSA or on Vivaspin centrifugal concentrators with a 50 kDa MW cut-off with 2×1.5 mL washes, 3 min per spin. HPLC analyses of the $^{225}$Ac-DOTA-anti-pMHC after purification may be conducted using a Waters HPLC system equipped with flow-through Waters UV and Bioscan Radiation detectors, using a TSK3000SW XL column eluted with PBS at pH=7.4 and a flow rate of 1 ml/min.

Stability determination: An exemplary radiolabeled pMHC targeting agent, such as 225Ac-DOTA-anti-pMHC, may be used for stability determination, wherein the $^{225}$Ac-DOTA-anti-pMHC may be tested either in the original volume or diluted (2-10 fold) with the working buffer (0.15 M NH$_4$OAc) and incubated at room temperature (rt) for 48 hours or at 4° C. for 96 hours and tested by ITLC. Stability is determined by comparison of the intact radiolabeled anti-pMHC before and after incubation. Other antibodies labeled with $^{225}$Ac have been found to be stable at 4° C. for up to 96 hrs.

Immunoreactivity (IR) determination: An exemplary radiolabeled pMHC targeting agent, such as $^{225}$Ac-DOTA-anti-pMHC, may be used in immunoreactivity experiments. pMHC positive cells and control pMHC negative cells may be used in the amounts of 1.0-7.5 million cells per sample to investigate the amount of binding (percent radioactivity binding to cells after several washes; or using an immunoreactive fraction (IRF) bead assay may be performed according to methods disclosed in described by Sharma, 2019). Prior assays for other antibodies radiolabeled with $^{111}$In or $^{225}$Ac demonstrated about 50-60% immunoreactivity.

Example 2: Production of TCR Mimic Antibodies

The present disclosure relates to methodologies for producing antibodies that function as T-cell receptor mimics (TCRm) and recognize peptides displayed in the context of MHC molecules, wherein the peptide is associated with a tumorigenic, infectious or disease state. These antibodies will mimic the specificity of a T cell receptor (TCR) such that the molecules may be used as therapeutic and diagnostic reagents. The T cell receptor mimics generally have a higher binding affinity than a T cell receptor, such as a binding affinity of about 10 nanomolar or greater.

An identified peptide of interest capable of being presented by an MHC molecule can be complexed with a MHC molecule, and administered to a host, such as a mouse, for eliciting an immune response. Serum may be collected from the host and assayed to determine if desired antibodies that recognize a three-dimensional presentation of the peptide in the binding groove of the MHC molecule are being produced. Once immunized with the selected pMHC immunogen, standard hybridoma production and screening methods may be employed to isolated hybridoma clones producing monoclonal antibody specific for the pMHC complex. The desired antibodies may differentiate the peptide/MHC complex from the MHC molecule alone, the peptide alone, and a complex of MHC and irrelevant peptide. Those skilled in the art will readily appreciate that other antibody production methods, such as screening of phage display antibody libraries, may also be employed.

The peptide of interest may be associated with at least one of a tumorigenic state, an infectious state and a disease state, or the peptide of interest may be specific to a particular organ or tissue. The presentation of the peptide in context of an MHC molecule may be novel to cancer cells, or it may be greatly increased in cancer cells when compared to normal cells.

The methods may include recombinantly expressing the peptide/MHC complex in the form of a single chain trimer, or recombinantly expressing the peptide/MHC complex and chemically cross-linking the peptide/MHC complex to aid in stabilization of the immunogen, or recombinantly expressing the MHC heavy chain and the MHC light chain separately in *E. coli*, and then refolding the MHC heavy and light chains with peptide in vitro.

Example 3: Exemplary TCRm Antibody Clones

Certain TCRm antibodies are commercially available. For example, antibody clone Hyb3, which recognizes the MHC complex (HLA-A1) displaying the peptide EADPTGHSY (SEQ ID NO:140) derived from MAGE-A1, is commercially available from Creative Biolabs (Shirley, NY, USA) as Catalog No. TCR-LA-ZP142. An scFv molecule based on Hyb3 that recognizes MAGE-A1 pMHC is also commercially available from Creative Biolabs as Catalog No. PSBC-072. Antibody clone T1, which recognizes the MHC complex (HLA-A2) displaying the peptide SLLMWITQC (SEQ ID NO:238) or SLLMWITQV (SEQ ID NO:184) derived from NY-ESO-1, can be generated using the heavy chain and light chain sequences published in International Pub. No. WO 2010/106431 A2, wherein the heavy and light chains include the sequences:

```
Heavy Chain -
                                           (SEQ ID NO:244)
EVQLLESGGGLVQPGGSLRLSCAASGFTFSTYQMSWVRQAPGKGLEWVS
GIVSSGGSTAYADSVKGRFTISRDNSKNTLYLQMNSLRAEDTAVYYCAG
ELLPYYGMDVWGQGTTVTVSS Light chain -
                                          (SEQ ID NO: 245)
QSELTQPRSVSGSPGQSVTISCTGTERDVGGYNYVSWYQQHPGKAPKLII
HDVIERSSGVPDRFSGSKSGNTASLTISGLQAEDEADYYCWSFAGGYYVF
GTGTDVTVL
```

Example 4—Methods for Testing the Soluble Radiolabeled Biomolecule as a Single Modality The soluble radiolabeled biologics may be tested for therapeutic efficacy, for example, in a solid tumor model. An exemplary solid tumor model includes a xenograft model of human colorectal cancer using the HCT116 cell line.

Biodistribution of Radio-conjugated Hyb3: Immunodeficient NSG mice will be injected subcutaneously in the right flank with $2.5 \times 10^6$ HCT116 cells. When tumors grow to approximately 100 mm³, mice will be treated intravenously with Hyb3 antibody conjugated with $^{111}$In a gamma-emitting radioisotope that does not cause DNA damage or cancer cell death. Blood, tumor, and major organs will be harvested 4, 24, 48, 96, and 168 hours post $^{111}$In-Hyb3 administration for dosimetry calculations in which the absorbed dose of radiation is quantified for each tissue and time point. $^{111}$In-Hyb3 should home to tumor tissue but not in healthy tissue because only the transplanted tumors would express the Hyb3-specific antigen.

Dose Escalation Study with $^{225}$Ac-Hyb3: $^{225}$Ac causes DNA damage and cancer cell death. Immunodeficient mice will be injected subcutaneously with HCT116 cells. When tumors grow to approximately 100 mm³, mice will be treated intravenously with various doses of $^{225}$Ac-conjugated Hyb3 antibody (0, 100, 200, 400, 500 nCi $^{225}$Ac). This dose escalation study will determine the maximum tolerated dose (MTD) and minimum effective dose (MED). MTD will be defined as the highest dose that permits all treated mice to maintain weight above 85% of the baseline weight, and MED will be defined as the minimum dose that leads to quantifiable shrinkage of the tumors. Total body weights and tumor volumes will be measured twice a week, and a Kaplan-Meier survival curve will be generated.

Example 5: Methods for Testing Therapeutic Combination Approaches

Combining Radio-conjugated Hyb3 with DDR Inhibitor In vivo: Immunodeficient mice will be injected subcutaneously with HCT116 cells. When tumors grow to approximately 100 mm³, mice will be treated intravenously with various doses of radio-conjugated Hyb3 antibody (0, MED, and MTD $^{225}$Ac), in the presence or absence of a DDR inhibitor, which may include but not be limited to a PARP inhibitor, ATM or ATR inhibitor, or Wee1 inhibitor. Total body weights and tumor volumes will be measured twice a week, and a Kaplan-Meier survival curve will be generated to determine if this combinatorial approach extends overall survival.

Combining Radio-conjugated Hyb3 with CD47 Blockade In vivo: Immunodeficient mice will be injected subcutaneously with HCT116 cells. When tumors grow to approximately 100 mm³, mice will be treated intravenously with various doses of radio-conjugated Hyb3 antibody (0, MED, and MTD $^{225}$Ac), in the presence or absence of an antibody that blocks the function of human CD47. Total body weights and tumor volumes will be measured twice a week, and a Kaplan-Meier survival curve will be generated to determine if this combinatorial approach extends overall survival. In a separate experiment, tumor infiltration of immune cells (eg, monocytes, macrophages, T cells, NK cells, neutrophils) can be quantified using flow cytometry to determine if addition of CD47 blockade activates an antitumor immune response.

Combining Radio-conjugated Hyb3 with I-O (PD-L1 or PD-1 inhibitor) In vivo: Mice will undergo sublethal total body irradiation and be inoculated intravenously with $2 \times 10^7$ human peripheral blood lymphocytes. After confirmation of successful engraftment, mice will be injected subcutaneously with HCT116 cells. When tumors grow to approximately 100 mm³, mice will be treated intravenously with various doses of radio-conjugated Hyb3 antibody (0, MED, and MTD $^{225}$Ac), in the presence or absence of an antibody that blocks the function of human PD-L1 or PD-1. Weights and tumor volumes will be measured twice a week, and a Kaplan-Meier survival curve will be generated. In a separate experiment, tumor infiltration of immune cells (eg, monocytes, macrophages, T cells, NK cells, neutrophils) can be quantified using flow cytometry to determine if addition of PD-1/PD-L1 blockade activates an antitumor immune response.

Example 6: Method for Testing the Feed-Forward Mechanism of Tumor Eradication

Hyb3 antibody conjugated with a DNA damage-inducing radioisotope could lead to a feed-forward mechanism that further enhances the accumulation of the therapeutic agent within the tumor. The molecular underpinnings are as follows: Radiation from the radioisotope up-regulates MHC expression, which then leads to more targeted binding of the therapeutic agent specifically within the tumor. The ionizing radiation is a crucial component of the feed-forward mechanism. To experimentally corroborate this model, we will radio-conjugate Hyb3 with $^{225}$Ac or $^{111}$In and measure the tumor accumulation of radiation over time. Since $^{225}$Ac induces DNA damage via ionizing radiation whereas $^{111}$In does not cause DNA damage, only $^{225}$Ac-Hyb3 can up-regulate MHC expression within the tumor and cause target accumulation.

Induction of MHC expression can first be measured in vitro using HCT116 cells exposed to dose escalation of the $^{225}$Ac-conjugate Hyb3 antibody. Cells can then be evaluated by Western blot, immunofluorescence microscopy, or flow cytometry to measure upregulation of peptide-MHC target.

Immunodeficient mice will be injected subcutaneously with HCT116 cells. When tumors grow to approximately 200 mm$^3$, mice will be treated intravenously with $^{225}$Ac- or $^{111}$In-conjugated Hyb3 antibody (MTD nCi). Mice will then be euthanized at 24, 48, 96, 192, and 384 hours post injection, and tumors will be dissected and weighed for scintillation counting. If $^{225}$Ac-Hyb3 induces MHC expression within the tumor, this would be manifested through a higher overall accumulation of radiation per gram tissue over time compared to $^{111}$In-Hyb3 because a greater number of target sites are available for antibody binding. In contrast, $^{111}$In-Hyb3 does not cause DNA damage and would not elevate the expression of MHC, leading to a more muted accumulation compared to $^{225}$Ac-Hyb3.

In a separate experiment, mice will be treated as described above, and tumor volumes will be measured at 24, 48, 96, 192, and 384 hours post $^{225}$Ac-Hyb3 or $^{111}$In-Hyb3 administration. Then, the samples will be subjected to immunofluorescent microscopy to detect expression of MHC. Since $^{225}$Ac-Hyb3 would initiate a feed-forward mechanism of MHC induction but $^{111}$In-Hyb3 would not, only the $^{225}$Ac-Hyb3 treated mice would exhibit intratumoral MHC expression that increases over time, paralleling a substantial decrease in tumor volume from baseline. As an alternative to immunofluorescent microscopy, western blot or flow cytometry can be performed to detected MHC.

Example 7: Antibody Dose—Radio-Conjugated Versus Unconjugated

Conjugating an antibody with $^{225}$Ac would substantially decrease the amount of total antibody necessary to achieve tumor response. Based on previous experience comparing the efficacy of $^{225}$Ac conjugated- and unconjugated monoclonal antibodies (Dawicki et al. OncoImmunology 2019), the amount of Hyb3 antibody required to elicit tumor response may be decreased at least 30-fold if conjugated with $^{225}$Ac. Furthermore, due to the potency of the alpha-emitter and the feed-forward mechanism that could be enacted, a single administration of the radio-conjugated Hyb3 antibody should be sufficient to observe tumor reduction. However, because biological responses to antitumor therapy are difficult to predict, we will also test hypofractionated regimens, where the total radiation dose is divided into two or three administrations to determine which schedule is optimal.

Example 8—Exemplary PARPi Administration and Dosing Regimes (A) Olaparib (Lynparza®)—Normal and Reduced Dosing Regimens Olaparib is sold by AstraZeneca under the brand name Lynparza®. Lynparza® is sold in tablet form at 100 mg and 150 mg. The dosage is 300 mg taken orally twice daily for a daily total of 600 mg. Dosing continues until disease progression or unacceptable toxicity. This dosing regimen is referred to herein as the "normal" human dosing regimen for Lynparza®, regardless of the disorder treated. Any dosing regimen having a shorter duration (e.g., 21 days) or involving the administration of less Lynparza® (e.g., 300 mg/day) is referred to herein as a "reduced" human dosing regimen. Examples of reduced human dosing regimens include the following: (i) 550 mg/day; (ii) 500 mg/day; (iii) 450 mg/day; (iv) 400 mg/day; (v) 350 mg/day; (vi) 300 mg/day; (vii) 250 mg/day; (viii) 200 mg/day; (ix) 150 mg/day; (x) 100 mg/day; or (xi) 50 mg/day.

(B) Niraparib (Zejula®)—Normal and Reduced Dosing Regimens

Niraparib is sold by Tesaro under the brand name Zejula®. Zejula® is sold in capsule form at 100 mg. The dosage is 300 mg taken orally once daily. Dosing continues until disease progression or unacceptable adverse reaction. This dosing regimen is referred to herein as the "normal" human dosing regimen for Zejula®, regardless of the disorder treated. Any dosing regimen having a shorter duration (e.g., 21 days) or involving the administration of less Zejula® (e.g., 150 mg/day) is referred to herein as a "reduced" human dosing regimen. Examples of reduced human dosing regimens include the following: (i) 250 mg/day; (ii) 200 mg/day; (iii) 150 mg/day; (iv) 100 mg/day; or (v) 50 mg/day.

(C) Rucaparib (Rubraca®)—Normal and Reduced Dosing Regimens

Rucaparib is sold by Clovis Oncology, Inc. under the brand name Rubraca™. Rubraca™ is sold in tablet form at 200 mg and 300 mg. The dosage is 600 mg taken orally twice daily for a daily total of 1,200 mg. Dosing continues until disease progression or unacceptable toxicity. This dosing regimen is referred to herein as the "normal" human dosing regimen for Rubraca™ regardless of the disorder treated. Any dosing regimen having a shorter duration (e.g., 21 days) or involving the administration of less Rubraca™ (e.g., 600 mg/day) is referred to herein as a "reduced" human dosing regimen. Examples of reduced human dosing regimens include the following: (i) 1,150 mg/day; (ii) 1,100 mg/day; (iii) 1,050 mg/day; (iv) 1,000 mg/day; (v) 950 mg/day; (vi) 900 mg/day; (vii) 850 mg/day; (viii) 800 mg/day; (ix) 750 mg/day; (x) 700 mg/day; (xi) 650 mg/day; (xii) 600 mg/day; (xiii) 550 mg/day; (xiv) 500 mg/day; (xv) 450 mg/day; (xvi) 400 mg/day; (xvii) 350 mg/day; (xviii)

300 mg/day; (xix) 250 mg/day; (xx) 200 mg/day; (xxi) 150 mg/day; or (xxii) 100 mg/day.

(D)—Talazoparib (Talzenna™)—Normal and Reduced Dosing Regimens

Talazoparib is sold by Pfizer Labs under the brand name Talzenna™. Talzenna™ is sold in capsule form at 1 mg. The dosage is 1 mg taken orally. Dosing continues until disease progression or unacceptable toxicity. This dosing regimen is referred to herein as the "normal" human dosing regimen for Talzenna™, regardless of the disorder treated. Any dosing regimen having a shorter duration (e.g., 21 days) or involving the administration of less Talzenna™ (e.g., 0.5 mg/day) is referred to herein as a "reduced" human dosing regimen. Examples of reduced human dosing regimens include the following: (i) 0.9 mg/day; (ii) 0.8 mg/day; (iii) 0.7 mg/day; (iv) 0.6 mg/day; (v) 0.5 mg/day; (vi) 0.4 mg/day; (vii) 0.3 mg/day; (viii) 0.2 mg/day; or (ix) 0.1 mg/day.

Example 9: Dosing Regimens for the Soluble Radiolabeled Biologic and PARPi

A human patient may be treated according to the following regimen. One of olaparib, niraparib, rucaparib or talazoparib (PARPi) is orally administered according to one of the dosing regimens listed in Example 3, accompanied by intravenous administration of a soluble radiolabeled biologic as detailed herein in either single or fractional administration. For example, the dosing regimens include, by way of example: (a) the PARPi and the soluble radiolabeled biologic administered concurrently, wherein (i) each is administered beginning on the same day, (ii) the soluble radiolabeled biologic is administered in a single dose or fractionated doses not less than one week apart, and (iii) the PARPi is administered daily or twice daily (as appropriate), and for a duration equal to or exceeding that of the soluble radiolabeled biologic administration; or (b) the PARPi and soluble radiolabeled biologic are administered concurrently, wherein (i) the PARPi administration precedes soluble radiolabeled biologic administration by at least one week, (ii) the soluble radiolabeled biologic is administered in a single dose or fractionated doses not less than one week apart, and (iii) the PARPi is administered daily or twice daily (as appropriate), and for a duration equal to or exceeding that of the soluble radiolabeled biologic administration.

Example 10: Dosing Regimens for the Soluble Radiolabeled Biologic and a CD47 Blockade According to certain aspects of the present invention, the CD47 blocking agent may be a monoclonal antibody or other biologic such as a SIRPα-Fc fusion protein that prevents CD47 binding to SIRPα. Exemplary CD47 blockades that interfere with CD47-SIRPα binding that may be used include at least magrolimab, lemzoparlimab, AO-176, TTI-621, TTI-622, or a combination thereof. The CD47 blockade may alternatively, or additionally, include agents that modulate the expression of CD47 and/or STRPa, such as phosphorodiamidate morpholino oligomers (PMO) that block translation of CD47.

Therapeutically effective doses of anti-CD47 antibodies include at least 0.05-10 mg/kg. Thus, methods of the present invention may include administering one or more of the anti-CD47 antibodies or other agents, accompanied by intravenous administration of a soluble radiolabeled biologic as detailed herein in either single or fractional administration. For example, the dosing regimens include, by way of example: (a) the anti-CD47 antibody or agent and the soluble radiolabeled biologic administered concurrently, wherein (i) each is administered beginning on the same day, (ii) the soluble radiolabeled biologic is administered in a single dose or fractionated doses not less than one week apart, and (iii) the anti-CD47 antibody or agent is administered daily or twice daily (as appropriate), and for a duration equal to or exceeding that of the soluble radiolabeled biologic administration; or (b) the anti-CD47 antibody or agent and soluble radiolabeled biologic are administered concurrently, wherein (i) the anti-CD47 antibody or agent administration precedes the soluble radiolabeled biologic administration by at least one week, (ii) the soluble radiolabeled biologic is administered in a single dose or fractionated doses not less than one week apart, and (iii) the anti-CD47 antibody or agent is administered daily or twice daily (as appropriate), and for a duration equal to or exceeding that of the soluble radiolabeled biologic administration.

Example 11: Dosing Regimens for the Soluble Radiolabeled Biologic and an ICI

According to certain aspects of the present invention, the immune checkpoint inhibitor (ICI) may be a monoclonal antibody against any of PD-1, PD-L1, PD-L2, CTLA-4, CD137. Therapeutically effective doses of these antibodies include at least 0.05-10 mg/kg. Thus, method of the present invention include administering one or more ICI, accompanied by intravenous administration of a soluble radiolabeled biologic as detailed herein in either single or fractional administration. For example, the dosing regimens include, by way of example: (a) the ICI and the soluble radiolabeled biologic administered concurrently, wherein (i) each is administered beginning on the same day, (ii) the soluble radiolabeled biologic is administered in a single dose or fractionated doses not less than one week apart, and (iii) the ICI is administered daily or twice daily (as appropriate), and for a duration equal to or exceeding that of the soluble radiolabeled biologic administration; or (b) the ICI and soluble radiolabeled biologic are administered concurrently, wherein (i) the anti-CD47 antibody administration precedes soluble radiolabeled biologic administration by at least one week, (ii) the soluble radiolabeled biologic is administered in a single dose or fractionated doses not less than one week apart, and (iii) the ICI is administered daily or twice daily (as appropriate), and for a duration equal to or exceeding that of soluble radiolabeled biologic administration.

Without limitation, the following aspects of the invention are provided:

Aspect 1. A composition including a soluble biologic, wherein the biologic includes a radiolabel and is an antibody, recombinant T-cell receptor protein (rTCR), designed ankyrin repeat protein, or anticalin including an antigen-binding region that binds specifically to a complex composed of a Major Histocompatibility Complex (MHC) having a peptide bound thereon (pMHC). The composition may be a radiopharmaceutical composition. The composition may optionally further include one or more pharmaceutically acceptable excipients or carriers.

Aspect 2. The composition according to any preceding aspect, wherein the radiolabel is selected from $^{131}$I, $^{125}$I, $^{123}$I, $^{90}$Y, $^{177}$Lu, $^{186}$Re, $^{188}$Re, $^{89}$Sr, $^{153}$Sm, $^{32}$P, $^{225}$Ac, $^{213}$Bi, $^{213}$Po, $^{211}$At, $^{212}$Bi, $^{213}$Bi, $^{223}$Ra, $^{227}$Th, $^{149}$Tb, $^{137}$Cs, $^{212}$Pb, $^{103}$Pd, or a combination thereof.

Aspect 3. The composition according to any preceding aspect, wherein the radiolabel is selected from $^{211}$At, $^{212}$Bi, $^{213}$Bi, $^{223}$Ra, $^{227}$Th, $^{149}$Tb $^{212}$Pb, $^{17}$Lu, or $^{225}$Ac.

Aspect 4. The composition according to any preceding aspect, wherein the radiolabel is selected from $^{225}$Ac or $^{17}$Lu.

Aspect 5. The composition according to any preceding aspect, wherein the soluble biologic includes $^{225}$Ac and a radiation dose of 0.1 to 50 µCi/kg body weight of the subject, or 0.1 to 5 µCi/kg body weight of the subject, or 5 to 20 µCi/kg subject body weight, or a radiation dose of 2 µCi to 2 mCi, or 2 µCi to 250 µCi, or 75 µCi to 400 µCi.

Aspect 6. The composition according to any preceding aspect, wherein the soluble biologic includes a $^{177}$Lu radiolabel and a radiation dose of less than 1000 µCi/kg body weight of the subject, or 1 to 900 µCi/kg body weight of the subject, or 5 to 250 µCi/kg body weight of the subject, or 50 to 450 µCi/kg body weight, or a radiation dose of 10 mCi to 30 mCi, or 100 µCi to 3 mCi, or 3 mCi to 30 mCi.

Aspect 7. The composition according to any preceding aspect, wherein further including an unlabeled fraction of the soluble biologic, wherein the composition includes a protein dose of less than 3 mg/kg body weight of the subject, such as from 0.001 mg/kg patient weight to 3.0 mg/kg patient weight, or from 0.005 mg/kg patient weight to 2.0 mg/kg patient weight, or from 0.01 mg/kg patient weight to 1 mg/kg patient weight, or from 0.1 mg/kg patient weight to 0.6 mg/kg patient weight, or 0.3 mg/kg patient weight, or 0.4 mg/kg patient weight, or 0.5 mg/kg patient weight, or 0.6 mg/kg patient weight.

Aspect 8. The composition according to any preceding aspect, wherein the soluble biologic includes a heavy chain of IgG1, IgG2, or IgG4, such as of a human IgG1, IgG2, or IgG4.

Aspect 9. The composition according to any preceding aspect, wherein the peptide is a tumor-specific antigen or a tumor-associated antigen, selected from any of the peptides listed in Table 1, such as a WT1 peptide, a NY-ESO peptide, a KRAS peptide, a PR1 peptide, a MAGE peptide, a P53 peptide, a gp100 peptide, a Her2 peptide, a PRAME peptide, a MIF peptide, a p68 peptide, a TARP peptide, a MUC1 peptide, or an hTERT peptide.

Aspect 10. The composition according to any preceding aspect, wherein the antigen presenting molecule is a Human Leukocyte Antigen (HLA) molecule, such as an HLA class I molecule or HLA class II molecule, such as an HLA class I molecule is an HLA-A1 or HLA-A2 molecule.

Aspect 11. The composition according to any preceding aspect, wherein the biologic does not bind the MHC in the absence of the MHC-restricted peptide and does not bind the MHC-restricted peptide in absence of the MHC.

Aspect 12. The composition according to any preceding aspect, wherein the biologic binds the pMHC when naturally presented on a cell.

Aspect 13. A method of killing or damaging a target cell expressing or displaying a naturally processed complex composed of an antigen-presenting molecule and an MHC-restricted peptide derived from a tumor antigen, the method including contacting the target cell with the composition of any one of aspects 1 to 12, wherein the composition is directed against the complex expressed or displayed by the target cell.

Aspect 14. A method of treating a subject having a cancer characterized by a tumor antigen, the method including administering to the subject an effective amount of the composition according to any one of aspects 1 to 12, wherein the composition is directed against the tumor antigen.

Aspect 15. The method according to any preceding method aspect, wherein the cancer is a solid cancer selected from breast cancer, gastric cancer, bladder cancer, cervical cancer, endometrial cancer, skin cancer, stomach cancer, testicular cancer, esophageal cancer, bronchioloalveolar cancer, prostate cancer, colorectal cancer, ovarian cancer, cervical epidermoid cancer, pancreatic cancer, lung cancer, renal cancer, head and neck cancer, or any of the cancers disclosed herein, or any combination of the preceding.

Aspect 16. The method according to any preceding method aspect, wherein the therapeutically effective amount of the soluble radiolabeled biologic includes a single dose that delivers less than 2Gy, or less than 8 Gy, such as doses of 2 Gy to 8 Gy, to the subject.

Aspect 17. The method according to any preceding method aspect, wherein the soluble radiolabeled biologic is $^{225}$Ac-labeled, and the therapeutically effective amount includes a dose of 0.1 to 50 µCi/kg body weight of the subject, or 0.2 to 20 µCi/kg body weight of the subject, or 0.5 to 10 µCi/kg subject body weight.

Aspect 18. The method according to any preceding method aspect, wherein the soluble radiolabeled biologic is a full-length antibody, and the therapeutically effective amount includes less than 5 µCi/kg body weight of the subject, such as 0.1 to 5 µCi/kg body weight of the subject.

Aspect 19. The method according to any preceding method aspect, wherein the soluble radiolabeled biologic is an antibody fragment, such as a Fab or a $Fab_2$ fragment, or an scFv molecule, minibody or nanobody, and the therapeutically effective amount includes greater than 5 µCi/kg body weight of the subject, such as 5 to 20 µCi/kg body weight of the subject.

Aspect 20. The method according to any preceding method aspect, wherein the soluble radiolabeled biologic is $^{225}$Ac-labeled, and the therapeutically effective amount includes 2 µCi to 2 mCi, or 2 µCi to 250 µCi, or 75 µCi to 400 µCi.

Aspect 21. The method according to any preceding method aspect, wherein the soluble radiolabeled biologic is $^{177}$Lu-labeled and the therapeutically effective amount includes a dose of less than 1000 µCi/kg body weight of the subject, such as a dose of 1 to 900 µCi/kg body weight of the subject, or 5 to 250 µCi/kg body weight of the subject or 50 to 450 µCi/kg body weight.

Aspect 22. The method according to any preceding method aspect, wherein the soluble radiolabeled biologic is $^{177}$Lu-labeled, and the therapeutically effective amount includes a dose of 10 mCi to below 30 mCi, or from at least 100 µCi to below 3 mCi, or from 3 mCi to below 30 mCi.

Aspect 23. The method according to any preceding method aspect, wherein the therapeutically effective amount includes a protein dose of less than 3 mg/kg body weight of the subject, such as from 0.001 mg/kg patient weight to 3.0 mg/kg patient weight, or from 0.005 mg/kg patient weight to 2.0 mg/kg patient weight, or from 0.01 mg/kg patient weight to 1 mg/kg patient weight, or from 0.1 mg/kg patient weight to 0.6 mg/kg patient weight, or 0.3 mg/kg patient weight, or 0.4 mg/kg patient weight, or 0.5 mg/kg patient weight, or 0.6 mg/kg patient weight.

Aspect 24. The method according to any preceding method aspect, wherein the effective amount of the composition includes maximum tolerated dose of the soluble radiolabeled biologic.

Aspect 25. The method according to any preceding method aspect, wherein the composition is administered according to a dosing schedule selected from the group consisting of once every 7, 10, 12, 14, 20, 24, 28, 36, and 42 days throughout a treatment period, wherein the treatment period includes at least two doses.

Aspect 26. The method according to any preceding method aspect, further including administering to the subject a therapeutically effective amount of an immune checkpoint therapy, a DNA damage response inhibitor (DDRi), a chemotherapeutic agent, a CD47 blockade, or a combination thereof.

Aspect 27. The method according to aspect 26, wherein the immune checkpoint therapy includes an antibody against CTLA-4, PD-1, TIM-3, VISTA, BTLA, LAG-3, TIGIT, CD28, OX40, GITR, CD137, CD40, CD40L, CD27, HVEM, PD-L1, PD-L2, PD-L3, PD-L4, CD80, CD86, CD137-L, GITR-L, CD226, B7-H3, B7-H4, BTLA, TIGIT, GALS, KIR, 2B4, CD160, CGEN-15049, or a combination thereof.

Aspect 28. The method according to aspect 26, wherein the immune checkpoint therapy includes an antibody against PD-1, PD-L1, PD-L2, CTLA-4, CD137, or a combination thereof.

Aspect 29. The method according to aspect 26, wherein the DDRi includes a poly(ADP-ribose) polymerase inhibitor (PARPi), an ataxia telangiectasia mutated inhibitor (ATMi), an ataxia talangiectasia mutated and Rad-3 related inhibitor (ATRi), or a Wee1 inhibitor.

Aspect 30. The method according to aspect 29, wherein the PARPi includes one or more of olaparib, niraparib, rucaparib and talazoparib.

Aspect 31. The method according to aspect 29, wherein the ATMi includes one or more of KU-55933, KU-59403, wortmannin, CP466722, or KU-60019.

Aspect 32. The method according to aspect 29, wherein the ATRi includes one or more of Schisandrin B, NU6027, NVP-BEA235, VE-821, VE-822, AZ20, or AZD6738.

Aspect 33. The method according to aspect 29, wherein the Wee1 inhibitor includes AZD-1775 (i.e., adavosertib).

Aspect 34. The method according to aspect 26, wherein the CD47 blockade includes a monoclonal antibody that prevents CD47 binding to SIRPα and/or a SIRPα-Fc fusion protein and/or an agent that modulates CD47 expression.

Aspect 35. The method according to aspect 34, wherein the CD47 blockade includes magrolimab, lemzoparlimab, AO-176, TTI-621, TTI-622, or an agent that modulates CD47 expression includes phosphorodiamidate morpholino oligomers (PMO) that block translation of CD47 (e.g., MBT-001), or any combination thereof.

Aspect 36. The method according to aspect 34, wherein the therapeutically effective amount of the CD47 blockade includes 0.05 to 5 mg/Kg patient weight.

Aspect 37. The method according to aspect 26, wherein the chemotherapeutic agent includes a radiosensitizer.

Aspect 38. The method according to any one of aspects 26-37, wherein the soluble radiolabeled biologic is administered at least one week before the immune checkpoint therapy and/or the DDRi and/or the CD47 blockade; or wherein the immune checkpoint therapy and/or the DDRi and/or CD47 blockade is administered at least one week before the soluble radiolabeled biologic.

Aspect 39. The method according to any one of aspects 26-37, wherein the soluble radiolabeled biologic is administered with one of the immune checkpoint therapy or the DDRi or the CD47 blockade, and the other of the immune checkpoint therapy or the DDRi or the CD47 blockade is administered either before or after the soluble radiolabeled biologic.

Aspect 40. The method according to any one of aspects 26-37, wherein the soluble radiolabeled biologic is administered simultaneously with the immune checkpoint therapy and/or the DDRi and/or the CD47 blockade.

Aspect 41. A method for treating a proliferative disease or disorder, the method including: diagnosing the subject with antigen-positive cells; and if the subject has antigen-positive cells, administering to the subject a therapeutically effective amount of a composition according to any one of aspects 1 to 12.

Aspect 42. The method according to aspect 41, wherein the diagnosing includes obtaining a sample of blood or tissue from the subject; mounting the sample on a substrate; and detecting the presence or absence of antigen-positive cells using a diagnostic antibody, wherein the diagnostic antibody includes an antibody against the antigen with a radiolabel such as $^{3}$H, $^{14}$C, $^{32}$P, $^{35}$S, and $^{125}$I; fluorescent or chemiluminescent compounds, such as fluorescein isothiocyanate, rhodamine, or luciferin; or an enzyme, such as alkaline phosphatase, β-galactosidase, or horseradish peroxidase.

Aspect 43. The method according to aspect 41, wherein the diagnosing includes administering a soluble radiolabeled biologic to the subject, wherein the biologic includes an antibody, T-cell receptor (TCR) fusion protein, designed ankyrin repeat protein, or anticalin including an antigen-binding region that binds specifically to a complex composed of an antigen-presenting molecule and a Major Histocompatibility Complex (MHC)-restricted peptide derived from a tumor antigen, the a radiolabel selected from the group including $^{18}$F, $^{11}$C, $^{68}$Ga, $^{64}$Cu, $^{89}$Zr, $^{124}$I, $^{99m}$Tc, or $^{111}$In; and after a time sufficient to allow the soluble radiolabeled biologic to accumulate at a tissue site, imaging the tissues with a non-invasive imaging technique to detect presence or absence of antigen-positive cells.

Aspect 44. The method according to aspect 43, wherein the non-invasive imaging technique includes positron emission tomography (PET imaging) for $^{18}$F, $^{11}$C, $^{68}$Ga, $^{64}$Cu, $^{89}$Zr, or $^{124}$I labeled soluble biologic or single photon emission computed tomography (SPECT imaging) for $^{99m}$Tc or $^{111}$In labeled soluble biologic.

Aspect 45. A radiopharmaceutical composition comprising a soluble pMHC targeting (-specifically binding) biomolecule such as but not limited to an antibody or antigen binding fragment thereof, an antibody mimetic such as a DARPin, or a soluble TCR, such as but not limited to any of those specifically disclosed herein and in the case of antibodies or fragments thereof antibodies or fragments thereof that include the CDR sequences of antibodies or CDR combinations exemplified herein, wherein the soluble pMHC-targeting biomolecule is radiolabeled with one or more radionuclides such as any disclosed herein, for example $^{225}$Ac or $^{177}$Lu, and wherein the composition optionally includes one or more pharmaceutically acceptable excipients or carriers.

Aspect 46. The radiopharmaceutical composition of Aspect 45, wherein a chelator, such as but not limited to DOTA or a DOTA derivative or any of those disclosed herein, is chemically conjugated to the soluble pMHC targeting biomolecule and the radionuclide, such as $^{225}$Ac or $^{177}$Lu, is chelated by the conjugated chelator.

Aspect 47. The radiopharmaceutical composition of Aspect 46, wherein the soluble pMHC targeting biomolecule is chemically conjugated to a DOTA chelator by reaction of the unconjugated soluble pMHC targeting biomolecule with p-SCN-Bn-DOTA or any of the DOTA-bearing bifunctional chelator molecules disclosed herein.

Any and all publications, patents, patent applications and other documents cited in this application are hereby incorporated by reference in their entireties for all purposes to the same extent as if each individual publication, patent, patent application or other document were individually indicated to be incorporated by reference for all purposes.

It should be understood that wherever in this disclosure an aspect or embodiment of the invention or an element or step thereof is described in terms of "including," "include(s)," "comprising," or "comprise(s)," corresponding aspects, embodiments, elements or steps thereof expressed, instead, in terms of "consisting essentially of" or "consisting of" are also intended to be disclosed and provided by this disclosure.

While various specific embodiments have been illustrated and described herein, it will be appreciated that various changes can be made without departing from the spirit and scope of the invention(s). Moreover, features described in connection with one embodiment of the invention may be used in conjunction with other embodiments, even if not explicitly exemplified in combination within.

REFERENCES

Bartkowiak, T. et al., 4-1BB Agonists: Multi-Potent Potentiators Of Tumor Immunity, *Frontiers* Oncol. 2015, 5:117.

Beckermann, Kathryn E., et al., Dysfunctional T cell metabolism in the tumor microenvironment, Cytoldne *Growth Factor Rev.* 2017 June; 35: 7-14.

Bell, Meghan M., et al., Glypican-3-Targeted Alpha Particle Therapy for Hepatocellular Carcinoma, Molecules 2021, 26, 4.

Chang, Aaron Y., et al., Opportunities and challenges for TCR mimic antibodies in cancer therapy, *Expert Opin Biol Ther.* 2016 August; 16(8): 979-987.

Cornel, Annelisa M., et al., MHC Class I Downregulation in Cancer: Underlying Mechanisms and Potential Targets for Cancer, *Cancers* 2020,12,1760.

Dahan, Rony, et al., T-cell-receptor-like antibodies—generation, function and applications, *Expert Rev. Mol. Med.* Vol. 14, e6, February 2012.

Dubrovsky, Leonid, et al., T cell receptor mimic antibodies for cancer therapy, *OncoImmunology* 5:1, e1049803; January 2016.

Garg, Ravendra, et al., m$^{15}$Ac-labeled CD33-targeting antibody reverses resistance to Bcl-2 inhibitor venetoclax in acute myeloid leukemia models, *Cancer Medicine.* 2020; 00:1-13.

Gelmon, et al., Olaparib in Patients With Recurrent High-Grade Serous or Poorly Differentiated Ovarian Carcinoma or Triple-Negative Breast Cancer: A Phase 2, Multicentre, Open-Label, Non-Randomized Study, *Lancet Oncol,* 2011, 12:852-61.

Hafeez, Umbreen, et al., Antibody-Drug Conjugates for Cancer Therapy, *Molecules* 2020, 25,4764.

Han, Xue-Jiao, et al., Progress in Neoantigen Targeted Cancer Immunotherapies, *Front. Cell Dev. Biol.,* 30 Jul. 2020.

He, Qinghua, et al., TCR-like antibodies in cancer immunotherapy, *Journal of Hematology & Oncology* (2019) 12:99.

He, Qinghua, et al., Targeting cancers through TCR-peptide/MHC interactions, *Journal of Hematology & Oncology* (2019) 12:139.

Høydahl, Lene Støkken, et al., Targeting the MHC Ligandome by Use of TCR-Like Antibodies, *Antibodies* 2019, 8, 32.

Janelle, Valérie, et al., T-Cell Immunotherapies Targeting Histocompatibility and Tumor Antigens in Hematological Malignancies, *Front. Immunol.,* 21 Feb. 2020.

Kwon, B., Is CD137 Ligand (CD137L) Signaling a Fine Tuner of Immune Responses?, *Immune* Network, 2015, 15(3): 121-124.

Lamichhane, P., et al., Checkpoint Inhibition: Will Combination with Radiotherapy and Nanoparticle-Mediated Delivery Improve Efficacy? *Medicines,* 2018, 5:114.

Liddy Nathaniel, et al., Monoclonal TCR-redirected tumor cell killing, *Nature Medicine* Volume 18, Number 6, June 2012.

Murai, J., et al., Trapping of PARP1 and PARP2 by Clinical PARP Inhibitors. *Cancer Res,* 2012, 72:5588-5599.

Murai, J., et al., Stereospecific PARP Trapping by BMN 673 and Comparison with Olaparib and Rucaparib. *Mol Cancer Ther,* 2014, 13 (2):433-443.

Minati, Robin, et al., A Roadmap Toward the Definition of Actionable Tumor-Specific Antigens, *Front. Immunol.,* 3 Dec. 2020.

Nelson, Bryce J. B., et al., Targeted Alpha Therapy: Progress in Radionuclide Production, Radiochemistry, and Applications, *Pharmaceutics* 2021, 13, 49.

Oates, Joanne, et al., ImmTACs Novel bi-specific agents for targeted cancer therapy, *OncoImmunology* 2:2, e22891; February 2013.

Reits, Eric A., et al., Radiation modulates the peptide repertoire, enhances MHC class I expression, and induces successful antitumor immunotherapy, *JEM* Vol. 203, No. 5, May 15, 2006 1259-1271.

Sharabi, A B, et al., Radiation and checkpoint blockade immunotherapy: radiosensitisation and potential mechanisms of synergy, *Lancet Oncol,* 2015; 16(13):e498-509.

Sharma, Sai Kiran, et al., A rapid bead-based radioligand binding assay for determination of target-binding fraction and quality control of radiopharmaceuticals, *Nucl. Med. Biol.,* 2019, 71:32-38.

Shen, Ying, et al., TCR-mimic antibody-drug conjugates targeting intracellular tumor-specific mutant antigen KRAS G12V mutation, *Asian Journal of Pharmaceutical Sciences*, Volume 15, Issue 6, November 2020, Pages 777-785.

Sikic, et al. Functional characterization of the selective pan-allele anti-SIRPα antibody ADU-1805 that blocks the SIRPα-CD47 innate immune checkpoint, *Journal of Clinical Oncology* 2019, 37:946

Sun, Chong, et al., Regulation and Function of the PD-L1 Checkpoint, *Immunity* 48, Mar. 20, 2018.

Twyman-Saint Victor, C. et al. Radiation and dual checkpoint blockade activate non-redundant immune mechanisms in cancer, *Nature* 2015, 520:373-377.

Vazquez-Lombardi, Rodrigo, et al., Challenges and opportunities for non-antibody scaffold drugs, *Drug* Discovery *Today*, Volume 20, Number 10, October 2015.

Walcer, Marcel, et al., *Abstract* 690: Application of the DARPin® technology for specific targeting of tumor-associated MHC class I:peptide complexes, *Cancer Res* 2020; 80 (16 Suppl): Abstract nr 690.

Walle, T, et al., Radiation effects on antitumor immune responses: Current perspectives and challenges, *Ther Adv Med Oncol.* 2018; 10.

Wang, Hao, et al., Immune checkpoint blockade and CAR-T cell therapy in hematologic malignancies, *Journal of Hematology & Oncology* (2019) 12:59.

Wang, Rong-Fu, et al., Immune targets and neoantigens for cancer immunotherapy and precision medicine, *Cell Research* (2017) 27:11-37.

Wei, Jun, et al., Nutrient and Metabolic Sensing in T Cell Responses, *Front. Immunol.,* 9 Mar. 2017.

Yoon, Dok Hyun, et al., Incorporation of Immune Checkpoint Blockade into Chimeric Antigen Receptor T Cells (CAR-Ts): Combination or Built-In CAR-T, *Int. J. Mol. Sci.* 2018, 19, 340.

Yossef, Rami, et al., Enhanced detection of neoantigen-reactive T cells targeting unique and shared oncogenes for personalized cancer immunotherapy, *JCI Insight.* 2018; 3(19): e122467.

---

What is claimed is:

1. A method for treating a cancer in a human subject, comprising administering a composition consisting essentially of an effective amount of a radiolabeled antibody comprising:

an antibody component comprising the complementarity determining regions (CDRs):

$CDR_{H1}$ comprising amino acid sequence DYAMH, (SEQ ID NO: 177)

$CDR_{H2}$ comprising amino acid sequence GISWNSGSIGYADSVKG, (SEQ ID NO: 178)

$CDR_{H3}$ comprising amino acid sequence GRGFHYYYYGMDI, (SEQ ID NO: 179)

$CDR_{L1}$ comprising amino acid sequence GGNNIGSRSVH, (SEQ ID NO: 180)

$CDR_{L2}$ comprising amino acid sequence DDSDRPS, and (SEQ ID NO: 181)

$CDR_{L3}$ comprising amino acid sequence QVWDSRTDHWV; (SEQ ID NO: 182)

a chelator chemically conjugated to the antibody component, wherein the chelator is DOTA or a DOTA derivative; and $^{225}$Ac radionuclide chelated by the chelator.

2. The method of claim 1, wherein the antibody has been conjugated to DOTA by reaction of the unconjugated antibody with p-SCN-Bn-DOTA.

3. The method of claim 1, wherein the cancer is breast cancer, metastatic breast cancer, tamoxifen-resistant breast cancer, triple-negative breast cancer (TNBC), non-small cell lung cancer (NSCLC), colorectal cancer, bladder cancer, head and neck carcinoma, endometrial cancer, hepatocellular carcinoma, melanoma, or cutaneous melanoma.

4. A method for treating a cancer in a human subject, comprising administering a composition consisting essentially of an effective amount of a radiolabeled antibody comprising:

an antibody component comprising the complementarity determining regions (CDRs):

$CDR_{H1}$ comprising amino acid sequence DYAMH, (SEQ ID NO: 177)

$CDR_{H2}$ comprising amino acid sequence GISWNSGSIGYADSVKG, (SEQ ID NO: 178)

$CDR_{H3}$ comprising amino acid sequence GRGFHYYYYGMDI, (SEQ ID NO: 179)

$CDR_{L1}$ comprising amino acid sequence GGNNIGSRSVH, (SEQ ID NO: 180)

$CDR_{L2}$ comprising amino acid sequence DDSDRPS, and (SEQ ID NO: 181)

$CDR_{L3}$ comprising amino acid sequence QVWDSRTDHWV; (SEQ ID NO: 182)

a chelator chemically conjugated to the antibody component, wherein the chelator is DOTA or a DOTA derivative; and $^{225}$Ac radionuclide chelated by the chelator, wherein the antibody has been conjugated to DOTA by reaction of the unconjugated antibody with p-SCN-Bn-DOTA, and wherein the cancer is breast cancer, metastatic breast cancer, tamoxifen-resistant breast cancer, triple-negative breast cancer (TNBC), non-small cell lung cancer (NSCLC), colorectal cancer, bladder cancer, head and neck carcinoma, endometrial cancer, hepatocellular carcinoma, melanoma, or cutaneous melanoma.

* * * * *